(12) United States Patent
Publicover et al.

(10) Patent No.: US 11,127,048 B2
(45) Date of Patent: Sep. 21, 2021

(54) COMPUTERIZED METHOD AND SYSTEM FOR PROVIDING CUSTOMIZED ENTERTAINMENT CONTENT

(71) Applicants: Mark W. Publicover, Saratoga, CA (US); William Knight Foster, Saratoga, CA (US)

(72) Inventors: Mark W. Publicover, Saratoga, CA (US); William Knight Foster, Saratoga, CA (US)

( * ) Notice: Subject to any disclaimer, the term of this patent is extended or adjusted under 35 U.S.C. 154(b) by 0 days.

(21) Appl. No.: 16/784,120

(22) Filed: Feb. 6, 2020

(65) Prior Publication Data
US 2020/0349611 A1 Nov. 5, 2020

Related U.S. Application Data

(63) Continuation of application No. 15/128,917, filed as application No. PCT/US2015/022528 on Mar. 25, (Continued)

(51) Int. Cl.
*G06Q 30/02* (2012.01)
*H04W 4/21* (2018.01)
(Continued)

(52) U.S. Cl.
CPC ..... *G06Q 30/0269* (2013.01); *G06F 16/2358* (2019.01); *G06F 16/24575* (2019.01); (Continued)

(58) Field of Classification Search
CPC ............. H04N 21/252; H04N 21/2668; H04N 21/4532; H04N 21/4858; H04N 21/25883;
(Continued)

(56) References Cited

U.S. PATENT DOCUMENTS 5,724,521 A 3/1998 Dedrick
5,794,210 A 8/1998 Goldhaber et al.
(Continued)

FOREIGN PATENT DOCUMENTS

CN 102843589 12/2012
WO WO 2008/098163 8/2008
(Continued)

OTHER PUBLICATIONS

International Search Report and Written Opinion, International Application No. PCT/US2014/057532, 13 pages, dated Feb. 6, 2015.
(Continued)

*Primary Examiner* — Yassin Alata
(74) *Attorney, Agent, or Firm* — Klarquist Sparkman, LLP

(57) ABSTRACT

Targeted Content solutions can be provided using a variety of techniques. Targeted Content can be provided in place of generic advertisements on a first device or on personal computing devices. Targeted Content can be presented during, or in place of, generic advertisements in Content (e.g., television content, streaming content, etc.). Targeted Content can include customized video content to improve a user's viewing experience and thereby provide increased revenue opportunities for advertisers and content providers. The video content and/or customized content that is provided to a user can be paused or substituted to permit customized content to be delivered to the user. The video content and/or customized content can be of sporting events, and can facilitate and improve participation in a Fantasy Sports league.

20 Claims, 47 Drawing Sheets

Related U.S. Application Data 2015, now Pat. No. 10,580,043, which is a continuation-in-part of application No. PCT/US2014/057532, filed on Sep. 25, 2014.

(60) Provisional application No. 61/970,878, filed on Mar. 26, 2014, provisional application No. 62/024,964, filed on Jul. 15, 2014, provisional application No. 62/024,973, filed on Jul. 15, 2014, provisional application No. 61/883,180, filed on Sep. 26, 2013, provisional application No. 61/891,323, filed on Oct. 15, 2013.

(51) Int. Cl.
| | | |
|---|---|---|
| *G06F 16/23* | (2019.01) | |
| *G06F 16/2457* | (2019.01) | |
| *H04L 29/08* | (2006.01) | |
| *H04N 21/2187* | (2011.01) | |
| *H04N 21/25* | (2011.01) | |
| *H04N 21/258* | (2011.01) | |
| *H04N 21/2668* | (2011.01) | |
| *H04N 21/45* | (2011.01) | |
| *H04N 21/485* | (2011.01) | |
| *H04N 21/658* | (2011.01) | |

(52) U.S. Cl.
CPC ....... *G06Q 30/0251* (2013.01); *H04L 67/306* (2013.01); *H04N 21/2187* (2013.01); *H04N 21/252* (2013.01); *H04N 21/25883* (2013.01); *H04N 21/2668* (2013.01); *H04N 21/4532* (2013.01); *H04N 21/4858* (2013.01); *H04N 21/6582* (2013.01); *H04W 4/21* (2018.02)

(58) Field of Classification Search
CPC ............ H04N 21/2187; H04N 21/6582; H04L 67/306; G06Q 30/0251; G06Q 30/0269; G06F 16/2358; G06F 16/24575; H04W 4/21

See application file for complete search history.

(56) References Cited

U.S. PATENT DOCUMENTS

| | | | |
|---|---|---|---|
| 6,009,410 | A | 12/1999 | LeMole et al. |
| 6,134,532 | A | 10/2000 | Lazarus et al. |
| 6,449,657 | B2 | 9/2002 | Stanbach, Jr. et al. |
| 6,456,981 | B1 | 9/2002 | Dejaeger et al. |
| 6,460,036 | B1 | 10/2002 | Herz |
| 6,519,571 | B1 | 2/2003 | Guheen et al. |
| 6,868,525 | B1 | 3/2005 | Szabo |
| 6,959,319 | B1 | 10/2005 | Huang et al. |
| 6,973,436 | B1 | 12/2005 | Shkedi |
| 7,010,492 | B1 | 3/2006 | Bassett et al. |
| 7,079,712 | B1 | 7/2006 | Silverbrook et al. |
| 7,260,823 | B2 | 8/2007 | Schlack et al. |
| 7,562,304 | B2 | 7/2009 | Dixon et al. |
| 8,527,337 | B1 | 9/2013 | Lim et al. |
| 8,584,174 | B1 | 11/2013 | Fyock et al. |
| 2001/0034647 | A1 | 10/2001 | Marks et al. |
| 2001/0042002 | A1 | 11/2001 | Koopersmith |
| 2001/0042104 | A1 | 11/2001 | Donoho et al. |
| 2002/0010757 | A1 | 1/2002 | Granik et al. |
| 2002/0032906 | A1 | 3/2002 | Grossman |
| 2002/0042741 | A1 | 4/2002 | Wilson et al. |
| 2002/0046099 | A1 | 4/2002 | Frengut et al. |
| 2002/0099605 | A1 | 7/2002 | Weitzman et al. |
| 2002/0099607 | A1 | 7/2002 | Sosa et al. |
| 2002/0103855 | A1 | 8/2002 | Chatani |
| 2002/0111994 | A1 | 8/2002 | Rahunandan |
| 2002/0120564 | A1 | 8/2002 | Strietzel |
| 2002/0128908 | A1 | 9/2002 | Levin et al. |
| 2003/0028415 | A1 | 2/2003 | Herschap et al. |
| 2003/0046149 | A1 | 3/2003 | Wong |
| 2003/0080997 | A1 | 5/2003 | Fuehren et al. |
| 2003/0229537 | A1 | 12/2003 | Dunning et al. |
| 2004/0064361 | A1 | 4/2004 | Anderson et al. |
| 2004/0073437 | A1 | 4/2004 | Halgas et al. |
| 2004/0139025 | A1 | 7/2004 | Coleman |
| 2004/0205059 | A1 | 10/2004 | Nishioka et al. |
| 2004/0260653 | A1 | 12/2004 | Tsuei |
| 2005/0005242 | A1 | 1/2005 | Hoyle |
| 2005/0114548 | A1 | 5/2005 | Tucciarone |
| 2005/0174975 | A1 | 8/2005 | Mgrdechian |
| 2005/0216336 | A1 | 9/2005 | Roberts |
| 2006/0020614 | A1 | 1/2006 | Kolawa |
| 2006/0041477 | A1 | 2/2006 | Zheng |
| 2006/0074870 | A1 | 4/2006 | Brill et al. |
| 2006/0136335 | A1 | 6/2006 | Ferguson, III |
| 2006/0179072 | A1 | 8/2006 | Eves et al. |
| 2006/0206381 | A1 | 9/2006 | Frayman |
| 2006/0212350 | A1 | 9/2006 | Ellis et al. |
| 2006/0242554 | A1 | 10/2006 | Gerace et al. |
| 2006/0253458 | A1 | 11/2006 | Dixon et al. |
| 2006/0282304 | A1 | 12/2006 | Bedard et al. |
| 2006/0282328 | A1 | 12/2006 | Gerace et al. |
| 2007/0055566 | A1 | 3/2007 | Gaughan |
| 2007/0067297 | A1 | 3/2007 | Kublickis |
| 2007/0129123 | A1 | 6/2007 | Eryou et al. |
| 2007/0130005 | A1 | 6/2007 | Jaschke |
| 2007/0130109 | A1 | 6/2007 | King et al. |
| 2007/0179846 | A1 | 8/2007 | Jain et al. |
| 2007/0179847 | A1 | 8/2007 | Jain |
| 2007/0179848 | A1 | 8/2007 | Jain et al. |
| 2007/0179849 | A1 | 8/2007 | Jain |
| 2007/0239534 | A1 | 10/2007 | Liu et al. |
| 2008/0062318 | A1 | 3/2008 | Ellis et al. |
| 2008/0081699 | A1 | 4/2008 | Haeuser et al. |
| 2008/0288354 | A1 | 11/2008 | Flinn et al. |
| 2010/0293057 | A1* | 11/2010 | Haveliwala ........ G06Q 30/0269 705/14.66 |
| 2010/0332583 | A1 | 12/2010 | Szabo |
| 2011/0283311 | A1* | 11/2011 | Luong ............... H04N 21/43615 725/28 |
| 2011/0295988 | A1 | 12/2011 | Le Jouan |
| 2012/0011550 | A1* | 1/2012 | Holland ................ H04N 21/40 725/78 |
| 2012/0109755 | A1 | 5/2012 | Birch et al. |
| 2012/0304206 | A1 | 11/2012 | Roberts et al. |
| 2013/0072307 | A1 | 3/2013 | Heller et al. |
| 2013/0086607 | A1 | 4/2013 | Tom et al. |
| 2014/0095609 | A1 | 4/2014 | Bhardwaj et al. |
| 2015/0046254 | A1 | 2/2015 | Raab et al. |
| 2018/0197209 | A1 | 7/2018 | Publicover |

FOREIGN PATENT DOCUMENTS

| | | | |
|---|---|---|---|
| WO | WO 2010/075882 | 7/2010 | |
| WO | WO-2010075882 A1 * | 7/2010 | ............. H04L 67/42 |
| WO | WO 2010/093510 | 8/2010 | |
| WO | WO 2011/090951 | 7/2011 | |

OTHER PUBLICATIONS

International Search Report and Written Opinion, International Patent Application No. PCT/US2015/022528, dated Jul. 2, 2015, 10 pages.

International Preliminary Report on Patentability, International Patent Application No. PCT/US2014/057532, 10 pages, dated Apr. 7, 2016.

International Preliminary Report on Patentability, International Patent Application No. PCT/US2015/022528, 8 pages, dated Oct. 6, 2016.

Extended Search Report, European Application No. 14847018.0, 8 pages, dated Feb. 10, 2017.

Extended Search Report, European Application No. 15768536.3, dated Aug. 10, 2017, 7 pages.

Office Action, European Application No. 14847018.0, 8 pages, dated Feb. 27, 2018.

(56) References Cited

OTHER PUBLICATIONS

Office Action, European Application No. 15768536.3, 6 pages, dated Aug. 7, 2018.
Extended Search Report, European Divisional Application No. 19170238.0, dated May 16, 2019, 8 pages.
First Office Action, Chinese Patent Application No. 201580028345.0, dated Jul. 2, 2019, 11 pages. (no translation).
Examination Report No. 1, Australian Patent Application No. 2014324893, dated Jun. 12, 2019, 3 pages.
Chang, "Don't trust Yelp reviews? Six tips for consumers," downloaded from https://www.latimes.com/business/la-xpm-2013-aug-23-la-fi-tech-savvy-yelp-20130824-story.html, 6 pages, Aug. 23, 2013.
First Office Action, Chinese Patent Application No. 201580028345.0, dated Jul. 2, 2019, 14 pages (with translation).
Extended European Search Report, EPC Application No. 20175021.3, dated Jun. 9, 2020, 8 pages.
First Examination Report, Indian Application No. 201617036028, dated Jun. 2, 2020, 6 pages.
Second Office Action, Chinese Application No. 201580028345.0, dated Apr. 28, 2020, 10 pages.
Examination Report, EPC Application No. 19170238.0, dated Jul. 16, 2020, 7 pages.
Official Action, Canada Patent Application No. 2,923,041, dated Dec. 29, 2020, 4 pages.
Notice of Rejection, Chinese Patent Application No. 201580028345.0, dated Jan. 12, 2021, 16 pages.
Examination Report, EPC Application No. 20175021.3, dated Jul. 20, 2021, 7 pages.

\* cited by examiner

COMPUTERIZED METHOD AND SYSTEM FOR PROVIDING CUSTOMIZED ENTERTAINMENT CONTENT

CROSS REFERENCE TO RELATED APPLICATIONS

This application is a continuation of U.S. patent application Ser. No. 15/128,917, which is a national stage of PCT Application No. PCT/US2015/022528, filed Mar. 25, 2015, which claims benefit of U.S. Provisional Application No. 61/970,878, filed Mar. 26, 2014, U.S. Provisional Application No. 62/024,964, filed Jul. 15, 2014, and U.S. Provisional Application No. 62/024,973, filed Jul. 15, 2014. This application is a continuation of U.S. patent application Ser. No. 15/128,917, which is a national stage of PCT Application No. PCT/US2015/022528, filed Mar. 25, 2015, which is a continuation-in-part of PCT application No. PCT/US2014/057532, filed Sep. 25, 2014, which claims benefit of U.S. Provisional Application No. 61/883,180 filed Sep. 26, 2013, U.S. Provisional Application No. 61/891,323 filed Oct. 15, 2013, U.S. Provisional Application No. 61/970,878, filed Mar. 26, 2014, U.S. Provisional Application No. 62/024,964, filed Jul. 15, 2014, and U.S. Provisional Application No. 62/024,973, filed Jul. 15, 2014. The above-referenced applications are incorporated herein by reference in their entirety.

FIELD OF THE INVENTION

This invention relates to computerized methods and systems for providing entertainment content and in particular to providing customized entertainment content.

BACKGROUND

Entertainment content is increasingly available in digital form for transmission to a variety of devices such as televisions, computers and handheld devices. Such entertainment content can be transmitted via a variety of systems to permit not only traditional broadcasting of the same content to a wide audience but also targeted transmission via streaming and downloads. Storage of entertainment content in digital video recorders (DVRs) provides additional flexibility.

Sporting events, as a form of entertainment content, are now available in a variety of formats including live broadcast and on-demand streaming and download. Moreover, highlights are shown in a variety of programs and are also available online for on-demand viewing. Supplementing the video content is an increasingly rich set of data regarding sporting events and players.

Fantasy Sports (e.g. American football, basketball, Australian rules football, rugby, soccer, cricket, baseball, and hockey) is a competition (statistical game) in which Contestants act as owners to select/build and manage an imaginary team from among the real players of a professional sport to compete against other Fantasy Sports Team owners in a league by scoring points according to the actual performance/statistics of their team's players. Specific rules vary from league to league, but tend to be similar in nature and often include rules associated with standard league types (e.g. head-to-head, total points, all play, keeper style, salary cap, two quarterback, and daily league types). Fantasy Football, by way of example, takes advantage of the rich set of data that is compiled by the National Football League (NFL) and other organizations. In Fantasy Football, Contestants group together to form a league and compete throughout the NFL season. Being ardent fans, these Contestants are regular viewers of NFL games and in particular of the games involving their selected players.

While there are a number of options by which entertainment content can be delivered and viewed, there remains a need for methods and systems that provide customized entertainment content and in particular that provide customized content with respect to sporting events.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein provide improved customization of video content to improve a User's viewing experience and thereby provide increased revenue opportunities for advertisers and content providers. In certain embodiments, video content that is provided to a User is paused or substituted to permit customized content to be delivered to the User. For example, a User watching a live transmission of a football game (or other sports game) is provided, during a commercial break or other game play hiatus, with replays featuring players of interest to the User. In some embodiments, game play may be replaced or temporarily paused to allow replay of a play (or portion thereof) in another game transpiring contemporaneously that includes an interesting event for a player of interest.

Such players may be for example, players selected by the User for their Fantasy Football Team (or other Fantasy Sports Team) or for the players of another team they are competing against, such as in head-to-head leagues. Some Users may be in a plurality of leagues for a given sport and may select at any given time the one or more leagues they are in which is of current interest to them for that sport. Each league may be assigned a distinctive look-and-feel, either as assigned by the User and/or defaulted by their league's SyncGroup. The distinctive look-and-feel allows the User to easily recognize which of their leagues is being presented to them at a given time. The distinctive look-and-feel may include a league name and/or logo that is shown as a digital on-screen graphic, as well as a distinctive color-scheme, font or layout for statistical and other Fantasy Football information pertaining to plays (or portion(s) thereof) being viewed. In audio content, the distinctive look-and-feel may correspond to a unique voice, accent, pace, cadence and/or tonal quality being assigned to a league. Selected replays may be composed together to create a narrative analogous to a regular football game. For example, in one replay clip, a user's quarterback may make a successful pass, and in a subsequent clip, one of the user's players (possibly playing in a different game) may make a successful reception, or alternatively, a player on a Fantasy Football team they are competing with might make an interception. These plays (or portion(s) thereof) may be choreographed together to compose a fictional narrative that is composed of the selected replays for a user and optionally the one or more users they are facing in, for example, a week's competition. The narrative may reveal a running score, analogous to a running score during a game. The order of replays being revealed may be set so as to increase the number of times one team pulls ahead of another. Plays (or portion(s) thereof) can be weaved together so as to make logical connections, such as replaying a quarter back initiating a pass in one replay and then cutting to an opposing player making an interception in another play or alternatively, cutting to another player of user making a successful reception.

Rules and/or heuristics may be created to automatically define how different kinds of plays (or portion(s) thereof) may be pleasingly fitted together and replay segments may be annotated with the kinds of plays (or portion(s) thereof, e.g. a pass throw, a reception, a tackle, etc.) they contain as well as time-coded entry and exit points for use in various contexts. For example, in a passing play, time-coded tags might be placed on the formation at the line of scrimmage, the point of ball snap, a shot of the ball being thrown, another as it reaches the peak/vertex of its parabolic arc, and a third at successful reception or interception. Such time points are a useful cut point to go between portions of two different plays such as from your quarterback in one play portion to your receiver in another.

In other embodiments, a Contestant in a Fantasy Football league that is a User is provided with a video anthology of plays (or portion(s) thereof) featuring players in the Contestant's Fantasy Football Team. For example, such an anthology can include key plays (or portion(s) thereof) by players in the Contestant's Fantasy Football Team in games over the prior week. Such an anthology can be inserted into another program being viewed by the Contestant. For example, if the Contestant is viewing a Monday night football game, plays (or portion(s) thereof) from the prior Sunday's games featuring players in the Contestant's Fantasy Football Team can be inserted into commercial breaks of the Monday night game.

It is to be understood that both the foregoing and the following descriptions are exemplary and explanatory only and are not intended to limit the claimed invention or application thereof in any manner whatsoever. For example while the forgoing describes an implementation within the context of a football game, the principles described herein may be applied to a variety of other sports. Moreover, while the delivery of customized video is described in the context of the disclosed Arkiïs™ system, the principles disclosed herein may be applied to a variety of other systems.

DETAILED DESCRIPTION

Figure 1:
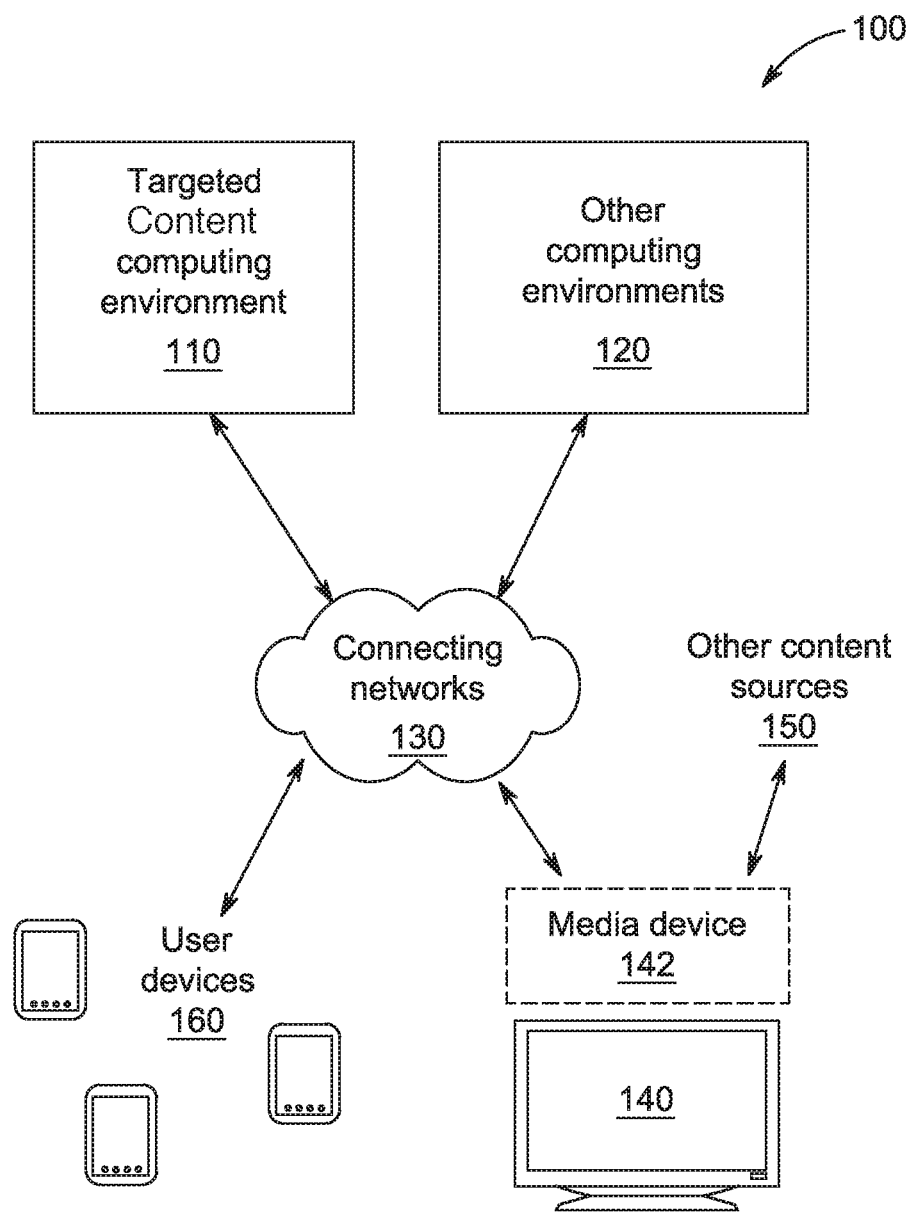
FIG. 1 is a block diagram of an example system for providing targeted advertising.

| 1. Table of Contents | |
|---|---|
| 1. Table of Contents | 9 |
| 2. Key Terms | 9 |
| 3. System for Providing Targeted Advertising | 16 |
| 4. Providing Targeted Content | 23 |
| 5. Operational Overview | 53 |
| 6. User Profiles | 58 |
| 7. Alternate Device Synchronization | 85 |
| 8. Coordination between Devices | 90 |
| 9. Sharing Targeted Advertising between Users | 95 |
| 10. Providing Targeted and/or Premium Content | 117 |
| 11. Providing Feedback on Content, Goods, and Services | 122 |
| 12. Providing Payment for Content, Goods, and Services | 140 |
| 13. Exemplary General Purpose Computing System | 150 |
| 14. Exemplary General Purpose Mobile Device | 152 |
| 15. Exemplary General Purpose Cloud Computing System | 159 |
| 16. Exemplary Implementations | 160 |
| 17. Advertising and Fulfillment System | 170 |
| 18. Privacy | 175 |
| 19. Alternative Advertising and Fulfillment System | 178 |
| 20. Providing Customized Entertainment Content | 185 |
| 21. Alternatives | 200 |

2. Key Terms

Certain words within the description of the disclosed system have specific meanings, and are generally capitalized within the text of the description. These words whether in singular or plural form, shall have the meanings as defined below.

| | |
|---|---|
| Alternate Device: | A Device that may provide alternate Targeted Content to that of a First Device. In some embodiments, the Alternate Device is a mobile device being used by a single User where the First Device may be shared by a plurality of Users. Other Alternate Devices include a DVR, a Roku ™ player, and a networked Blu-Ray player. |
| Assertion: | A forward-looking declaration of a User's intention to take future action(s) related to a targeted marketing profile (e.g. make a purchase, travel, go to college in fall, adopt a baby) and which may be qualified with a probability (e.g. 80% likely to go to Europe) and/or a condition (e.g. if my portfolio grows by 10% then I will buy a new car). |
| Business User: | An Individual User that is acting on behalf of a business, non-profit, governmental, or other incorporeal entity. |
| Business User Profile: | Either a Goods & Services Provider Profile, Marketer Profile, Content Producer Profile, or Content Provider Profile. |
| Badge: | Awarded recognition in a publically visible manner that a User is independently certified to have achieved an accomplishment. Sometimes described as an emblem. |
| Certifier: | A Reviewer that provides independent certification about suppliers for specific metrics and often is a Non-Governmental Organization (NGO) or individual. |
| Certifier Profile: | A collection of delineating information about a Certifier that may be used by Consumers to filter associated certification content. |

-continued

| | |
|---|---|
| Consumer: | A User or SyncGroup of Users, who can remain anonymous, that receives content from Content Producers, which may be received by way of Content Providers and may buy from Goods & Services Providers. |
| Content: | Any experiential information consumed by a User, that may include interactions and/or artistic expression such as video, audio, still photos, words, comic strips, and live performances. Content is a continuum from paid premium to targeted advertising that may pay the User, who can remain anonymous. |
| Content Producer: | An entity that creates Content for consumption. |
| Content Producer Profile: | Any delineating information about a Content Producer that may be used by Consumers to Filter their Content delivery. |
| Content Provider: | An entity that delivers Content for consumption. |
| Content Provider Profile: | Any delineating information about a Content Provider that may be used by Consumers to Filter their Content delivery. |
| Content Spectrum: | The range of available Content that spans from high-value/Premium Content to low or negative value Content - like advertising that pays Consumers. A particular Content's value may vary depending upon Consumer's preferences, context, etc. |
| Contestant: | A person who competes in at least one Fantasy Sports league against other Contestants of the same league. A Contestant may be a User. |
| Context Information: | Data points, often from a User's Profile, that can remain private, which may be utilized to deduce the Content likely being consumed by the Consumer. |
| Device: | An instrument that reproduces digital Content for a Consumer. |
| Family Friendly Location: | A location where all Content being delivered adheres to Profile Filtering of all detected persons present. |
| Family Friendly Content: | Content that may be audited, rated, and/or judged by a Content Producer, a User, and/or a third party to adhere to certain individual, family, and/or community standards that one or more Users may wish to govern. |
| Family Friendly Device: | A device that may be configured to detect the presence of minor children with Filtering requirements and automatically Filter Content to that which satisfies the Filtering criteria for all the detected children present. Adults may also configure Filtering requirements for themselves to be protected through Content filtration. |
| Fantasy Football: | An exemplary Fantasy Sport wherein the real players in a Contestant's team are selected from a single professional football league such as the National Football League (NFL) and are awarded points according to the activity of those players within said league. |
| Fantasy Football Team: | An exemplary Fantasy Sports Team within a Fantasy Football league. |
| Fantasy Sport: | A competition (statistical game) in which Contestants select and manage an imaginary sports team from among the real players of a professional sport to compete against other Contestants in a league by scoring points according to the actual performance/statistics of their imaginary team's players. |
| Fantasy Sports Team: | The collection of a Contestant's selected real players within a professional sports league for a particular Fantasy Sports league wherein such players may usually only appear on a single team. |
| Feedback: | Assessment of consumed Content by a Consumer provided either unsolicited or in response to solicitation by the Content Producer. Feedback may also be an assessment of a Consumer's transactional performance by a Goods & Services Provider party of a transaction. |
| Filter: | The control of blocking Consumer visibility of Products, Content, Marketers, Reviewers, and Content Producers based upon preferences in a Consumer's Profile. |
| First Device: | The initial Device or Devices a User engages with in a Content consumption session whose Content may be superseded by the addition of one or more Alternate Devices. An Alternate Device may itself be the First Device of a further superseding Alternate Device. |
| Generic Advertisement: | Generic Content where the Content is Marketing Content. |
| Generic Content: | Content that is not individually Targeted toward a Consumer. |
| Goods & Services Provider: | An entity, such as a manufacturer or service provider, that sells goods and/or services for consumption. |
| Goods & Services Provider Profile: | A collection of delineating information about a Goods & Services Provider that may be used by Consumers to Filter associated Marketing Content. |
| Independent Reviewer Certification: | A trusted check on facts and source for specific comparative metrics about a Provider, Product, or service, often provided by an NGO or individual. |
| Individual User: | A User that is an individual person, representing themselves that can maintain their anonymity. |
| Individual User Profile: | A collection of delineating information about an Individual User. |
| Market Request: | A process by which Consumers publish desires and/or commitments to buy goods or services for which there is nothing exactly matching and presently available. This allows Users to extend their values into the marketplace to influence the way goods and services are created for them. Consumers may also publish Market Requests related to Product Champions, Champion performances, reviews, or |

-continued

| | |
|---|---|
| | certifications. |
| Marketer: | An entity that targets Marketing Content to select Consumers. (Sometimes described as an advertiser.) |
| Marketer Profile: | A collection of delineating information about a Marketer that may be used by Consumers to Filter their Marketing Content. |
| Marketing Content: | Content created in an attempt to induce a Consumer action and that may be the basis for a payment to the Consumer and may be targeted. |
| Master Profile: | A private Profile connected to a single User that helps to delineate their individual identity. |
| Participants: | Consumers, Reviewers, Marketers, Content Providers, Content Producers, and Goods & Services Providers that are included in the Arkiïs ™ system. |
| Physical Proximity: | A plurality of Users in the same general physical location (near each other, such as in the same room) at the same time such that Users may readily share one or more Devices or interact with each other such as by smelling, touching, talking, or hand signals. |
| Premium Content: | Content that a Consumer usually pays to consume and which may be targeted. Broadcast television is also premium and paid for by the included generic advertisements. |
| Primary Content: | Content for which Arkiïs ™ Targeted Content may be overlaid. |
| Product: | Goods or services including Content or anything that can be consumed, viewed, used, or received. |
| Product Champion: | A Consumer that promotes, compares, or disparages Products to other Consumers and may be compensated by an interested Marketer. (Sometimes described as a Champion) |
| Profile: | A collection of information that delineates an identity and can be accessed for targeting purposes while remaining anonymous. |
| Provider: | A Goods & Services Provider, Reviewer, Product Champion, or Content Producer. An entity that supplies something to a User. |
| Reviewer: | A User or SyncGroup of Users who provide detailed Feedback related to transactions, Content, goods, services, or others' Feedback. |
| Reviewer Profile: | A collection of delineating information about a Reviewer that may be used by Consumers to Filter associated review Content. |
| Sub Profile: | A User-designated subset (possibly an improper subset) of their Master Profile's demographic information about them that is used for the purpose of helping select the Content they receive. This may contain false information in order to protect a User's privacy. Sub Profiles may be private or public. |
| SyncGroup: | A plurality of Users who join together into a group to synchronize their consumption of Content and who may elect to maintain a group Profile. Sometimes described as a shared advertising group. |
| SyncGroup Profile: | A Profile that is created to identify a SyncGroup that is persistent or ongoing. |
| Targeted Content: | Content that is selected based upon a Consumer's Profile information. |
| Targeted Marketing Content: | Marketing Content that is also Targeted Content. |
| Targeted Premium Content: | Premium Content that is also Targeted Content. |
| User: | A person who logs into the Arkiïs ™ system, on behalf of themselves, another individual, or another entity and can maintain a privacy protected identity. |
| User Profile: | A Profile that is created to identify a User. |
| Visualization: | A compound pictogram that communicates how well a Product matches a Consumer's stated values, ethics, goals, and standards. (Also referred to as a certificate or graphic.) |
| Virtual Proximity: | A plurality of Users consuming the same Content at the same time. |

3. System for Providing Targeted Advertising

FIG. 1 is a block diagram of an example system 100 for providing targeted advertising solutions to implement the Arkiïs™ system. An operational overview of the system 100 is provided in Section 3—System for Providing Targeted Advertising and describes providing targeted advertising solutions to Users of computing devices (e.g., mobile computing devices) that are also receiving Content on a First Device (e.g., viewing a television). Providing targeted advertising solutions can comprise providing Targeted Content (e.g., targeted advertising content and/or other types of Content provided in association with targeted advertising) to Users of computing devices.

The example system 100 comprises a Targeted Content computing system 110. The Targeted Content computing system 110 can comprise various types of computing resources (e.g., computer servers, database servers, streaming media servers, networking resources, and/or other types of computing resources) for providing targeted advertising solutions to user devices 160 and their associated users. For example, the Targeted Content computing system 110 can be implemented as a cloud computing system.

The example system 100 also comprises User Devices 160. The User Devices 160 are computing Devices associated with Users (e.g., mobile phones, smartphones, tablet devices, smartwatches, etc.).

The system 100 also comprises a First Device 140 (e.g., a television or another type of display Device). The Device 140 can be a shared First Device (e.g., a display that is shared by the Users of the User Devices 160, such as a television in a home being viewed by multiple Users or a television in a business such as a sports bar or a movie screen in a theater). In some situations, multiple First Devices can be provided (e.g., multiple televisions can be viewed by multiple Users in a shared viewing system, such as a sports bar).

While mobile devices offer a quick way to bootstrap the Arkiïs™ system, in the long run, it will be easier for Users to have Arkiïs™ functionality integrated with the devices that provide Content to First Devices that can be simultaneously shared with Users present. There are several ways this may be accomplished, including:

Custom DVR boxes (or audio only equivalent, DAR) that interleave live broadcast feeds with prerecorded Targeted Marketing Content. In some embodiments, the live broadcast is time shifted by several seconds to allow more seamless feed integration, commercial detection, and synchronization of targeted advertising end (including Consumer Feedback). Such buffering adjusts automatically from one commercial break to the next to keep the live lag to a minimal amount sufficient to allow seamless integration of the live and pre-recorded streams. A Custom DVR adds integration with the Arkiïs™ system to a traditional DVR by allowing one or more Arkiïs™ Profiles to be associated with the DVR. When consuming Content, an Arkiïs™ Profile is activated either by manual designation on the DVR, one or more Consumers designating to Arkiïs™ their current First Device source as being the Custom DVR, automatically by facial recognition of audience members, etc. The active Profile of a Custom DVR determines the Targeted Marketing Content presented to Consumers. The Custom DVR is in communication with the Arkiïs™ cloud servers to receive Targeted Marketing Content for presentation and for recording for future presentation. The Custom DVR keeps track of the Profile(s) to which Targeted Marketing Content applies. Such Content may have expiration dates by which time it must be received or deleted. The Custom DVR communicates to the Arkiïs™ servers information about which Content is presented at what time. The Custom DVR may detect commercial segment start/entry and end/exit points in any of several methods including through local video feed algorithmic analysis, communicating its current primary source feed channel to the Arkiïs™ servers and receiving notification of segment start and end points as computed by the Arkiïs™ cloud, detecting primary source feed signal encoding of entry and exit points, etc.

Remote virtual cloud DVR technology where the DVR functionality is provided in the cable owner's facilities and with licensing agreements with Content Providers, efficiencies are achieved that allow for a single copy (due to compensation agreements with copyright holders) of all Content to be stored and shared among all Users. This allows Users to not have to specify their intention to record a show in advance since a dedicated copy is not needed for each Consumer.

Blu-Ray streaming application or custom Roku™ channel to provide Targeted Content that is interleaved with traditional live streaming Primary Content sources.

Customized hardware to provide the alternate Content presented to Users of the system may also include sensing equipment such as video cameras, microphones, and Near Field Communication (NFC). These sensors are used to dynamically determine the consuming audience so that Targeted Content may be automatically adjusted and optimized for group consumption.

Alternatively, in some alternate embodiments, rather than having the First Device's streaming source communicate directly with nearby Alternate Devices or deduce its audience through environmental detection strategies (e.g., video cameras, microphones, etc.), coordination can instead be done with the help of the Arkiïs™ servers. The coordinated group consumption of Alternate Devices is facilitated by the Arkiïs™ servers and thus the Content delivery device for the First Device may be aware and join such groups with hints from the source Device and its linked Profile.

The example system 100 supports providing Targeted Content solutions. For example, the Device 140 can present Content (e.g., television programs, movies, streaming content, advertising, and/or other types of audio and/or video Content) for consumption by Users associated with the User Devices 160. The Content can be received from a number of sources for presentation by the Device 140. For example, the Content can be received via a connecting network 130 (e.g., as streaming television or streaming video Content supported by other computing systems 120). The Content can also be received from other Content sources 150 (e.g., Content Provider, over-the-air broadcast television, cable television, etc.).

The example system 100 supports providing Targeted Marketing Content to Users in place of Generic Advertisements (i.e. non-targeted). For example, the Device 140 can present Content (e.g., television Content and/or other Content with associated Generic Advertisements) to the Users of the User Devices 160. During a Generic Advertisement (e.g., a generic commercial), a targeted advertisement can be presented to the Users in example system 100. In some implementations, the targeted advertisement is presented on the Device 140 instead of the Generic Advertisement (e.g., the targeted advertisement can be inserted by the Targeted Content computing system 110, by other computing systems 120, or by an optional media device 142 such as a set-top box, DVR, cable box, streaming media player, etc.). In other implementations, the targeted advertisement is presented on the User Devices 160 (e.g., provided by the Targeted Content computing system 110 for reproduction at the User Devices 160). The User Devices 160 can reproduce the same targeted advertisement or different advertisements. The User Devices 160 can reproduce targeted advertisements alone (e.g., while the Device 140 is reproducing a Generic Advertisement) as well as in combination with the Device (e.g., while the Device 140 is reproducing the same or a different targeted advertisement).

In the event that connectivity is lost between the First Device and the Arkiïs™ Content servers (e.g., the power goes out in your home), the Arkiïs™ Content feed being broadcast may automatically fail over to any Alternate Devices (e.g., smartphones) that are synchronized with the First Device. Such connectivity loss may be detected in many ways including: explicit designation by the User on their Alternate Device, the failure of the First Device to respond to a ping-like request in a reasonable time period, or the loss of ability for the Alternate Device to see the First Device such as on a local Wi-Fi network. In a preferred embodiment, if complete connectivity is lost and even the Alternate Devices are not reachable (or none are present), the Arkiïs™ Content servers may automatically begin recording the Content being consumed for subsequent resumption at the point of disconnect. In the case of failover to an Alternate Device, the servers back up/record the Content so as to resume on the Alternate Device at the point that contact was lost with the First Device even though it may take several seconds for the failover to be negotiated.

In a preferred embodiment, each Device maintains communication with the Arkiïs™ cloud servers through a heartbeat mechanism whereby at periodic regular intervals (e.g. once per second) each Device notifies the cloud servers what Content is being presented to the Consumers on the Device. When the Arkiïs™ servers stop receiving the heartbeat and no shutdown notification was just sent, Device connectivity to the servers is deemed to be lost.

The example system 100 supports targeted advertising in a group setting. For example, the Users of the User Devices 160 can be grouped into a static or dynamic shared advertising group (e.g., based on various criteria, such as Physical Proximity, Virtual Proximity, explicit grouping by the Users, grouping based on receiving the same Content on the Device 140, or based upon the group's values, ethics, goals, standards, stated Consumer Assertions, etc.). Targeted advertising can be provided to the shared advertising group (i.e. SyncGroup). For example, Profile information can be used by the Targeted Content computing system 110 to select targeted advertisements (e.g., based on the Profiles, payout information, and/or other criteria) to be presented to the Users (e.g., on the User Devices 160 and/or overlaid on the Device 140). Profile information can include information about a User voluntarily uploaded by the same User for targeting purposes, it can also include User authorized aggregation of information collected from disparate sources, and it can omit information deleted by a User. For example, a group may indicate intent to only ever purchase certified organic food, or non-GMO food. Such a Profile may prevent such a group from receiving fast-food advertisements or the like. Nor would a fast-food advertiser likely desire to push its advertising to such a group. Thus, both Consumer and Marketer benefit and the system gains increased economic efficiencies.

The example system 100 can determine the specific Content being watched by the Users in order to provided targeted advertisements at appropriate times (e.g., during generic advertisements). For example, the Targeted Content computing system 110 can use Context Information to determine the specific Content being received by the Users of the User Devices 160. The Context Information can include various types of information, such as information provided by the Users of the User Devices 160 (e.g., the Users can enter the specific program, channel, time, and/or other information about the Content), location information (e.g., location of the user devices 160), Profile information, information from the media device 142, information from other computing systems 120 (e.g., programming and commercial information provided by a streaming service), and/or other types of information.

Custom DVR hardware, as described above, may allow the Arkiïs™ User to seamlessly consume Targeted Marketing or Alternate Premium Content that is interleaved into live broadcast streams (e.g. television or radio) to overlay the generic advertising that such streams contain. The Arkiïs™ User may log into their Arkiïs™ Profile on the DVR and the Arkiïs™ server may then provide Targeted Content feeds that are queued up while the User is consuming Premium Content. When a commercial break is detected in the Primary Content feed, the DVR may seamlessly switch to the Targeted Marketing Content. Based upon the Arkiïs™ User's Profile, either Targeted Marketing Content may be automatically selected or the User may be given a menu of subjects and how much they would pay, and how well other Users have rated them. From this menu, the User may be allowed to choose the Content they would like to consume. A reference certificate or symbol may be shown to further permit a User to quickly evaluate the rating of a Product or Products to match their interests (such as product's relevancy or usefulness to their needs) and values. On the other side, a potential provider of Targeted Marketing Content may either decrease or increase the likelihood of sending information to a Consumer via the use of an integrity rating tied or linked to the Consumer which indicate the relationship between the Consumer's stated purchasing intentions (i.e. Assertions) and timelines and their actual purchasing conduct. The Marketing Content may be automatically packed to fit into the projected commercial space of the live feed. Based on a User's Profile preferences, the live feed may be queued up when it returns from commercial break until the current Targeted Marketing Content advertisement completes. The buffer on the live feed may actively be managed to drive it back towards a zero second delay compared to the live feed.

In some preferred embodiments, Arkiïs™ may provide a custom hardware DVR that accepts broadcast, cable, or satellite feeds and dynamically detects commercial breaks on the fly to substitute previously downloaded Targeted Marketing Content that is queued up on the DVR.

In other embodiments, cable providers may provide an interface box in the User's home or business to access DVR capability. Such cloud based DVRs may be housed and maintained in data centers maintained by the cable company and accessed on demand over the Internet.

Figure 2:
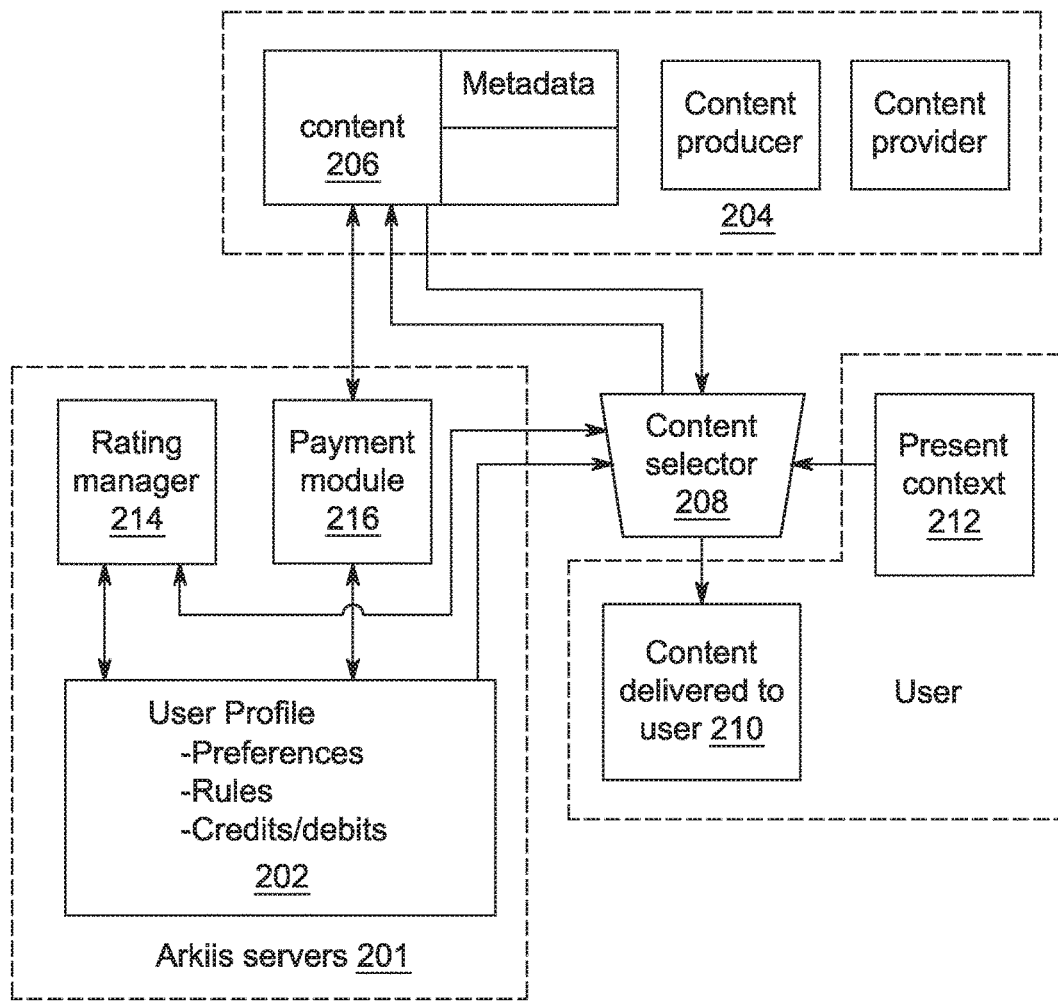
FIG. 2 is a diagram depicting the selection of Content to deliver to a Consumer based upon the Consumer's Profile that includes preferences and rules, the present context including the time, location, social, and adjacent Content of the User, and the matching Content information including Independent Reviewer Certifications and bid amount.
Figure 15:
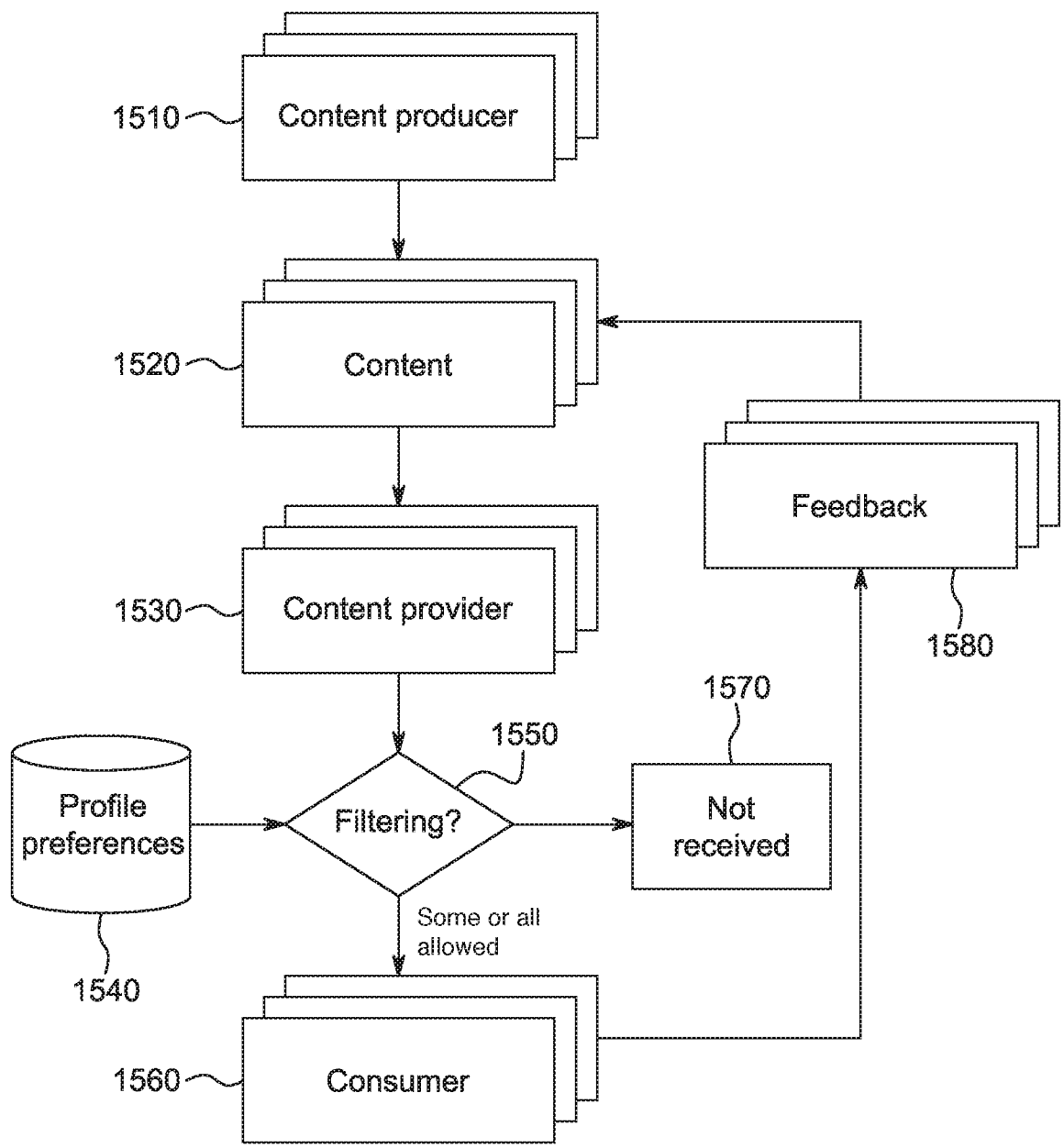
FIG. 15 is a flow chart depicting how Content is created, provided, filtered, and fed back upon.

FIG. 2 provides a flow diagram to illustrate operation of certain embodiments. In FIG. 2 Arkiïs™ 201 servers include functional modules a User Profile 202 includes preferences and rules regarding the User such as certification preferences. Further details for the User Profile 202 are provided in connection with FIG. 12. A source for Content, such as described in further detail in connection with FIG. 15 is shown at 204. The Content 206 includes meta-data regarding the Content and the source of the Content. A Content Producer and Content Provider are shown generally in connection with Content 206. The Content Producer and Content Provider may be the same or different entities. As set forth in the definitions in Section 2—Key Terms the Content Producer creates the Content and the Content Provider delivers the Content. The Content Producer and/or Content Provider and/or a third entity receives input from the content selector 208 and payment module 216. These inputs are shown generally for purposes of illustrating the general flow of information and the exact manner in which the inputs are processed may take a variety of forms.

Content selector 208 operates to select Content for delivery to the User shown at 210. The content selector 208 receives portions of the User Profile 202 and other information regarding the present context 212 of the User. Present context 212 may include the User's recent communication history culled from their caller ID log, Skyping, texting, etc. and the identity of communicating parties and the nature of those parties' typical interaction for the present context as captured in their Profile and the vocabulary, tone of voice, etc. in the communication (e.g., Sally's mood usually improves after communicating with her mom, for example, they shared a joke with each other and laughing can be detected in the communication). Content might also be filtered out at one time based on context, but not at another time, in a different context. Similarly, Content might be graded differently in different contexts. Rating manager 214, generates an integrity rating that indicates a correlation between the User's actual purchase of goods and services and the intention indicated in that Assertion by the User. The rating manager compares the integrity rating to an integrity rating requirement that may be provided by the Content Provider. Further details of the operation of rating manager 214 are provided in Section 11—Providing Feedback on Content, Goods, and Services. Payment module 216 computes credits and debits that are indicative of payments to be made to the User for consuming advertising. The payment module is responsive to the meta-data associated with the Content 206. Further details of payment module 216 are provided in Section 12—Providing Payment for Content, Goods, and Services.

The Content selector 208 receives Content 206 and retrieves from the User Profile consumption preferences that indicate goods and services that the User prefers. The Content selector 208 performs a comparison between the retrieved consumption preferences and meta-data associated with the Content 206. The comparison yields a match level indicator that indicates a correlation (which may take a variety of known forms) between the Content and the consumption preferences. The match level indicator is then employed to determine whether to provide the Content to the User. For example, the User may have provided in their preference a threshold that must be exceeded by the match level indicator in order to be provided the Content. Alternatively, the User may choose to be presented with all Content, or Content that exceeds the threshold and be permitted to decide whether to experience the Content. The presentation to the User of the match level indicator (or Visualization) may be performed in accordance with the embodiments shown in FIGS. 17A, 17B, and 29.

Figure 4:
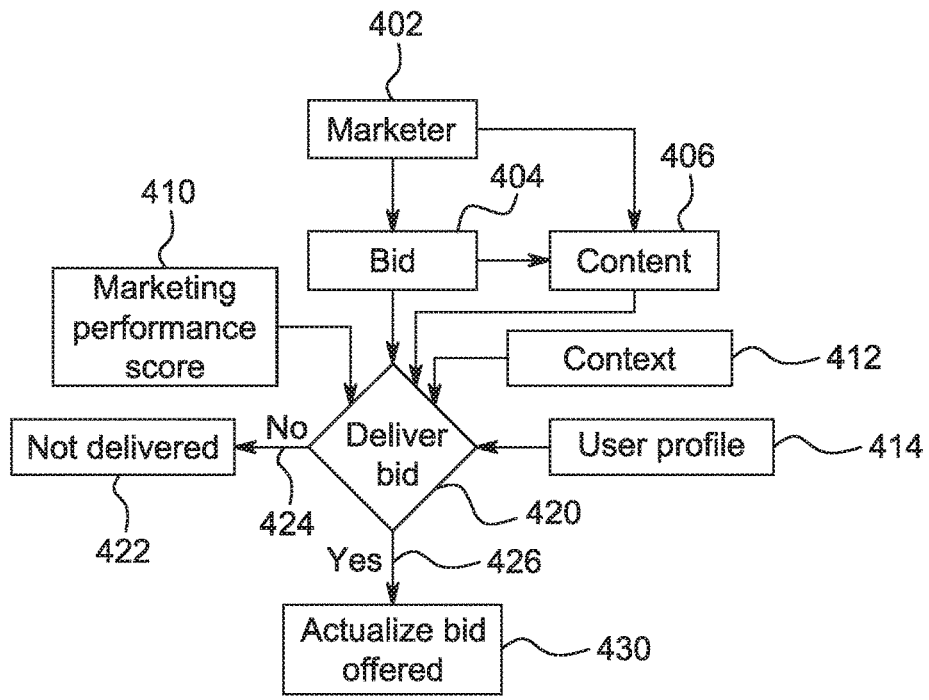
FIG. 4 is an illustration of the generation of an actualize bid offered by a Marketer for use by content selector.

FIG. 4 illustrates the generation of an actualize bid offered by a Marketer for use by Content selector 208 to select Content 206. As seen in FIG. 4 the Marketer 402 supplies a bid 404 (that may include a payout formula) in connection with Content 406. A deliver bid module 420 receives the bid 404, the Content 406, along with context 412, and user profile information 414, together with the marketing performance score 410. The deliver bid module 420 operates in accordance with a variety of known techniques to determine whether to deliver (yes 426) the bid 404 or to not deliver (422) it (no 424). In embodiments where the bid 404 includes a variable function, the function is evaluated as part of the deliver bid module 420 together with one or more variable inputs (406, 410, 412, 414) to compute an actual bid amount to be offered. (See Section 6—User Profiles for examples where a Marketing Performance Score (410) or context (412) affect how much a Marketer is willing to offer for actualize bid (430). Also see Section 12—Providing Payment for Content, Goods, and Services for examples of formulas in bid 404 and bid delivery 420.) The actualize bid offered 430 is delivered to content selector 208. Additional details of marketing performance score 410 maybe found in Section 6—User Profiles. The actualize bid offered 430 is compared by content selector 210 to criteria pertaining to the User to determine if the Content 206 is to be delivered to the User.

4. Providing Targeted Content

Figure 3:
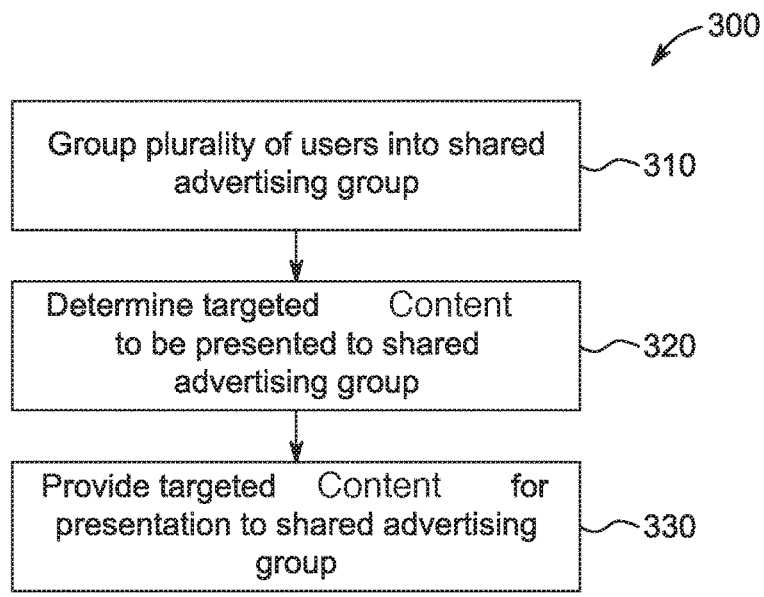
FIG. 3 is a flowchart of an example method providing targeted advertising to a group of Users.

FIG. 3 is a flowchart of an exemplary method 300 for providing Targeted Content to a group of Users. For example, the example method 300 can be performed by one or more computing devices (e.g., by the Targeted Content computing system 110 described above in relation to FIG. 1).

At 310, a plurality of Users is grouped into a shared advertising group (SyncGroup) and can be affected through use of a temporary or permanent grouping variable. For example, the plurality of Users (e.g., along with their associated computing devices, such as smartphones) can be grouped, manually or automatically, based on Physical Proximity, Virtual Proximity, explicit grouping, consuming a shared First Device at the same location, etc.

At 320, one or more Targeted Content are determined for presentation (e.g., audio and/or video playback) to the shared advertising group. For example, the one or more Targeted Content can be presented on a First Device (e.g., a television on a home or business setting) and/or on personal Alternate Devices (e.g., on displays of the computing devices, such as smartphones, of the Users in the shared advertising group). The one or more Targeted Content can be determined based, at least in part, on Profiles or only voluntarily supplied or only authorized information in Profiles of the Users in the shared advertising group which may be selected to maximize payout amount for one or more of the Users, selected based on a minimum payout amount across all Users of the group, or selected based on other criteria such as Physical Proximity using GPS or similar data where the User may have given permission to use such criteria for the purpose of receiving Targeted Content.

At 330, the one or more Targeted Content are provided for presentation to the shared advertising group. The Targeted Content can be presented (i.e. reproduced) on a First Device and/or on personal computing Devices (e.g., smartphone displays). The Targeted Content can be presented on a Device instead of generic advertisements (e.g., in place of generic television commercials that are not targeted to the shared advertising group).

The most basic alternative Content is substitution of the generic mass-market advertising with that which is targeted specifically to the Consumer based upon their Arkiïs™ Profile. Given the estimated amount of time available before the live broadcast feed returns, Arkiïs™ may optimize the selection of targeted advertising to fit in the available time duration. In the case that the specific duration to be filled is not exactly known, the server may heuristically pack the space with the targeted commercials. Longer commercials or ones that may not be interrupted due to advertiser requirements may be packed at the beginning of an indeterminate commercial segment break while shorter ones or those for which a partial message may effectively be delivered may be packed towards the end. As each message draws towards an end, the follow on messages may be repacked to account for any new information that affects the time of the break's end.

When consuming live broadcasts with commercial breaks of indeterminate length, the Arkiïs™ system may allow a User to configure their Profile to allow the targeted advertising to overrun the commercial break by a short period and automatically pause the live feed when it returns and await the completion of the targeted advertising overrun before resuming the now slightly delayed live feed. Any such overrun is subtracted out of the following commercial break. In one embodiment, when consuming targeted advertising on their personal mobile device, the User's mobile device may automatically send the remote control codes to pause the live feed when it returns, and resume play and unmute it when the targeted advertisement completes on their mobile device. This is most useful when their First Device is not playing an integrated Arkiïs™ feed.

The producer of a targeted advertisement may encode reentry points (i.e., rewind points) for their message that a Consumer must return to when a targeted advertisement is interrupted (e.g., due to return to live play or a Consumer's override action) and subsequently resumed to satisfy the originally promised consuming payout. These rewind points may be stored within Arkiïs™ servers, or may be recognized by software as an advertisement is played. By default, the beginning of an advertisement is used for reentry when resuming an interrupted message. (Note that some message payouts are context dependent and thus if resumed at a later point in time, the beneficial context may be diminished or gone and the payout computation may have consequently changed. In such cases, the User may request or the Marketer and/or producer may require deferral of resumption until the same or similar circumstances have returned or disadvantageous circumstances have disappeared.) When reentry points are supplied, by default, upon resumption of a targeted message, the first reentry point that directly precedes the point of interruption may be generally used and the message may resume play from that entry point. However, the User may choose to ignore the reentry point and instead resume at the exact point at which they left off at the risk of sacrificing some of the payout as configured by the Marketer that is supplying the message. Selection of how to resume may automatically be configured in the User's Profile or specifically chosen in an instance. In one embodiment, Consumer override actions include: simply stopping a message and doing something else, pausing a message briefly before returning to it, and even common DVR actions such as variable fast-forward/rewind, and skip forward/backward. In some embodiments, the Content Producer may encode more complex reentry point information, for example, specifying different reentry points that vary as a function of how long the Consumer has been away (e.g., how much time has elapsed since the message was originally interrupted) or vary depending upon the User's Profile information (such as their integrity rating as to their actual behavior versus their Assertions over time) which may predict the Consumer's likelihood of effecting a purchase or vary depending upon what other Content the Consumer has consumed such as other messages from the same Marketer.

In addition to targeted advertisement selection based upon optimizing payout and space, an individual's Arkiïs™ Profile may weight other factors such as the level of humor in a commercial, or the category the commercial falls into. They may also combine criteria (e.g., give me a funny commercial that pays the most). Their Profile may also indicate when and how they wish to consume commercials. Additionally, a Consumer may have a pattern related to their most likely time or day or seasons of purchases, and/or for what items are more likely to be purchased and when. This data may be added to their Profile and criteria that a Provider may use to affect what Targeted Marketing Content they send or push and the amount they may offer to pay or charge for consuming such Content.

The following example describes an embodiment of the disclosed system: Greg's Profile, stored in the Arkiïs™ cloud servers, shows that he is willing to watch ads during football games placed only at time-outs and during halftime. Further, he requires that only one ad may be served per break period and that it should be no longer than 30 seconds unless the advertiser is willing to pay quadruple or more than his average payout rate over the last seven days as computed by the Arkiïs™ cloud servers. If the ads are insufficient to cover the broadcast Content cost, he wishes to take the remainder due out of his Arkiïs™ Profile earnings balance, or if his balance is insufficient, to accept just enough more advertisements to keep his balance positive at all times. During the times that the regular broadcast feed is delivering generic commercials and Greg is not watching targeted advertising, he is instead watching behind the scenes extra Targeted Premium Content that is streamed to his Device from the Arkiïs™ cloud servers. This includes extra commentary and interviews that are oriented towards his favorite football team. The Arkiïs™ cloud servers automatically charge his Arkiïs™ Profile for the extra Targeted Premium Content he consumes. Greg may have a high integrity rating related to his Assertions about his football viewing behavior and his purchases that are correlated to advertisements presented related to football, as he may never miss a game of his favorite teams and often buys Products advertised during games. Thus, Providers may adjust their Targeted Marketing Content and payouts because Greg's rating indicates that he will be watching a game regularly and tends to purchase items that are being advertised to him during a game. Thus, his integrity rating can be related to the Content Greg consumes and to his purchases.

Celebrities (e.g. LeBron James or Miley Cyrus) may be listed in your Profile of people you admire, trust, and like to listen to. Arkiïs™ Profile settings may indicate that if they are a spokesperson for a commercial that you will want to consume it regardless of other criteria in your Profile. Because you love a particular sports figure, artist, singer, or other person you know, you may agree to watch messages that would otherwise not meet your Profile criteria.

Example packing of a commercial break during live football with no assistance from the television broadcaster:
During Premium Content consumption, the User's Device has downloaded targeted advertising in advance to prepare for the next commercial break:
One 120 second commercial requiring detailed Feedback
Two 90 second commercials requiring quick Feedback
Two 60 second commercials requiring quick Feedback
One 50 second commercial with optional Feedback
One 30 second commercial requiring quick Feedback
One 30 second commercial with optional Feedback
Two 15 second commercials with optional Feedback
Based upon historical sampling, the server begins by assuming the break will be between 3 and 5 minutes long.
The User's Device begins with the two minute commercial.
After the commercial, the User spends 30 seconds answering detailed questions about the commercial just consumed.
During the break, the server has been monitoring the live television feed and 2.5 minutes have now elapsed. The live broadcast is now on its fourth commercial that is recognized to be a 60 second spot with 45 seconds remaining. The server directs the User's Device to now select the 30 second spot that requires quick Feedback.
The User's Device begins the 30 second commercial.
After the commercial, the User spends 10 seconds answering one quick question.
The server has 5 seconds remaining on the 45 second commercial in the live feed and directs the User's Device to begin one of the 15 second commercials and be prepared to terminate mid-stream if the Premium Content returns in five seconds.
The User's Device begins the 15 second commercial.
The server detects a 60 second spot begin in the live feed and directs the User's Device to play the 50 second commercial next.
The User's Device begins the 50 second commercial.
The server directs the User's Device to play the $2^{nd}$ 15 second commercial next.

The server detects the resumption of live Premium Content and directs the User's Device to halt the targeted advertisement based upon the User's preference to not delay the live feed.

The User's Device fades one second into the 15 second spot.

All commercials that were not used are retained for a subsequent commercial break and the very briefly shown $2^{nd}$ 15 second spot is also retained for reuse at a later time.

Once an Arkiïs™ User's Alternate Device, usually a mobile Device, is synchronized with the First Device, they may receive Targeted Content on their Alternate Device to substitute for or overlay on top of the Generic Content (i.e., not targeted) delivered through their Content Provider. In some preferred embodiments when such Content is being overlaid on a User's Alternate Device, their Alternate Device may be configured to automatically subdue or mute the First Device using remote control technology during consumption of the alternate stream on their Alternate Device. Ideally, the broadcaster has a cooperative deal with Arkiïs™ so that they transmit commercial intention information as it becomes available, of when a break to commercial will begin, and when it will end. However, lacking that, the breaks can be detected live/extemporaneously as done by the AdSkip Project (phys.org/news/2012-08-commercial-free-tv-device-technology-contest.html). Additionally, previously known commercial messages may be detected on the Arkiïs™ servers when they are being rebroadcast for the purpose of knowing how long such messages last (e.g., 30 seconds or 60 seconds) and thus providing a more accurate gauge of when the broadcast commercials will end. Detection of previously known commercial messages may be carried out through video recognition methods (for example, ordered or non-ordered tree matching algorithms) or audio recognition methods (for example, hidden Markov modeling or spectrogram/acoustic fingerprint comparison). When receiving live broadcasts such as sporting events where the broadcaster is an Arkiïs™ partner, the broadcaster may provide live Alternate Premium Content (e.g. additional behind the scenes interviews or commentary and game analysis) that is coordinated with the generic live broadcast. Such feeds may also be delivered on a User's Alternate Device. Such feeds may also be auxiliary and continue in parallel with the broadcast Generic Content and afford the User simultaneous alternate feeds on the live action.

In anticipation of commercial breaks, the Arkiïs™ Alternate Device application may download substitute Targeted Marketing or Alternate Premium Content. Downloading may occur in advance, during the Primary Content's non-commercial portions, and/or during the breaks themselves. Given that the non-commercial portion of a typical broadcast program is typically much longer than the commercial sequences (approximately 2.75 times as long), Targeted Content may be downloaded in less than real time. Thus, Targeted Content may be shown in high-definition even if the User's Alternate Device connection does not have enough band-width to support real-time high-definition downloads; assuming the above premium to advertising content ratio, overlaid Targeted Content may be shown at a quality level that exceeds the User's real-time bandwidth limitation by a factor of almost four. If an Arkiïs™ User configures their consuming to not completely fill the commercial time with Targeted Content, this ratio grows even higher and allows for even higher quality Content (e.g., higher resolution video). For example, a User may leave during the commercial break to use a bathroom and get a snack to eat.

At the detected beginning of a generic commercial in a broadcast stream, the Alternate Device application may turn on the interface, for example the screen (stackoverflow.com/questions/9569529/android-face-detector-using-android-camera) through the remote-control behavior described previously, and await User attention to begin the targeted ad's playback. If their Alternate Device does not support that, it may await a touch of the play button on the Alternate Device's interface.

In the following example, embodiments of Targeted Content selection are described. John is a junior at Northeastern University and has gone to the local sports bar to watch his home team of the San Francisco 49ers play the New England Patriots. He has logged into Arkiïs™ using his smartphone and his smartphone has automatically detected that he is watching football by listening to the room and detecting the audio feed of the game in a Shazam-like or IntoNow-like manner and/or John pointing his smartphone camera at the screen to detect the game by matching the screenshot or video feed to match the video analogously to how audio is matched. The application determines from his Wi-Fi, GPS and/or microphone that he is also in a noisy location (a sports bar) and that his Bluetooth headset is not turned on and/or paired; therefore, during game play, his phone downloads from the sports bar's wireless Ethernet connection the substitute targeted advertisements that he will watch during the next commercial break. The targeted ads are selected for John by Arkiïs™ based upon his Profile and to best fit his contextual location of a noisy bar, being ones that do not depend upon the audio portion to best deliver their message. While the television is showing a Coke commercial, John sees a Pepsi® commercial on his phone that features references to his favorite team, the San Francisco 49ers. At the end of the Pepsi® ad, John is presented with a coupon for $1 off a Pepsi® at the bar in the next ten minutes. He turns to the bartender and presents the coupon on his smartphone that they accept and give him 1 off the price of a Pepsi®. He then rates the Pepsi® commercial and is offered the option to view an alternative Pepsi® commercial to compare against the first. He accepts on his phone and watches the alternate. At the end he provides a side-by-side rating of the first versus the second Pepsi® commercial along ten metrics provided by Pepsi®. He then checks his earnings in the Arkiïs™ app to see that the last comparison earned him $2 and that three minutes are projected to remain in this commercial break. He decides to forgo further commercials and instead use the bathroom.

The disclosed system allows for an individual to provide simple targeted advertising that may require little effort to produce (e.g., a simple video, web page, or email message). Such may be the case for selling a used item or their unique artwork. One may wish to sell a used Mercedes® and can create a simple video showing the car, along with some text detailing its history, and a link to a free CARFAX® report on the car. This simple marketing message can be targeted to individuals at the seller's choosing. Their query criteria might include those who live near the seller, have bought used cars from a private seller in the past, have sufficient income to afford the car, have indicated they are in the market for a Mercedes® class of car, and have a track record of performing that exceeds 85%. They may decide they are willing to pay $2 for such viewers. They may choose alternate criteria along with alternate payouts; they may also allow anyone to view the ad for free.

The targeted advertisements can be presented to the shared advertising group (at 330) at the same time as generic advertisements (e.g., inserted on a shared First Device in place of the generic advertisements and/or presented on personal computing devices of the Users). In order to present the targeted advertisements at the same (e.g., substantially simultaneous) time as the generic advertisements, the specific Content being watched by the Users of the shared advertising group can be determined. For example, the specific Content being watched (e.g., on a shared First Device) can be determined based on Context Information. For example, the Context Information can include location information for the Users in the group, time and date information, audio information from the Content being watched, video information from the Content being watched, Profile information associated with the Users of the group, explicit selection of Content (e.g., program name, channel, network, time, etc.) by one or more of the Users, and/or other types of Context Information.

The Users of the shared advertising group can provide Feedback regarding the targeted advertisements. For example, Feedback may be used to adjust payout amount that the Users will receive. Feedback can be received from one or more of the Users of the shared advertising group independently (e.g., via each User's computing device). Feedback can also be received from Users jointly (e.g., a number of the Users can agree on joint Feedback).

In some implementations, one or more Users of a shared advertising group can opt-out of a particular targeted advertisement being provided to the group. For example, if a specific User does not wish to view a particular targeted advertisement, then the specific User can opt-out of viewing the particular targeted advertisement. For example, the specific User who opts-out can be presented with a different targeted advertisement (e.g., an individually targeted advertisement) than the targeted advertisement being presented to the remainder of the shared advertising group. The different targeted advertisement that is presented to the specific User who opts-out can be selected, for example, based on priority information (e.g., the highest payout advertisement that fits in the duration of the targeted advertisement being presented to the remainder of the group). Or, a different targeted advertisement may be employed in response to a User's values, ethics or standards.

In some implementations, targeted advertisements are selected based, at least in part, on duration (e.g., to fit within the duration of a generic advertisement). Selection of targeted advertisements can also take into account time needed for Feedback (e.g., a time period, such as 15 seconds, can be saved for Feedback). For example, if a generic advertisement is 1 minute in duration, then a targeted advertisement can be selected that is 45 seconds in duration with 15 seconds remaining for User Feedback. Feedback can be provided after the targeted advertisement (e.g., immediately following the targeted advertisement) and/or Feedback can be provided at a later time (e.g., after the User is finished consuming Content).

Figure 5:
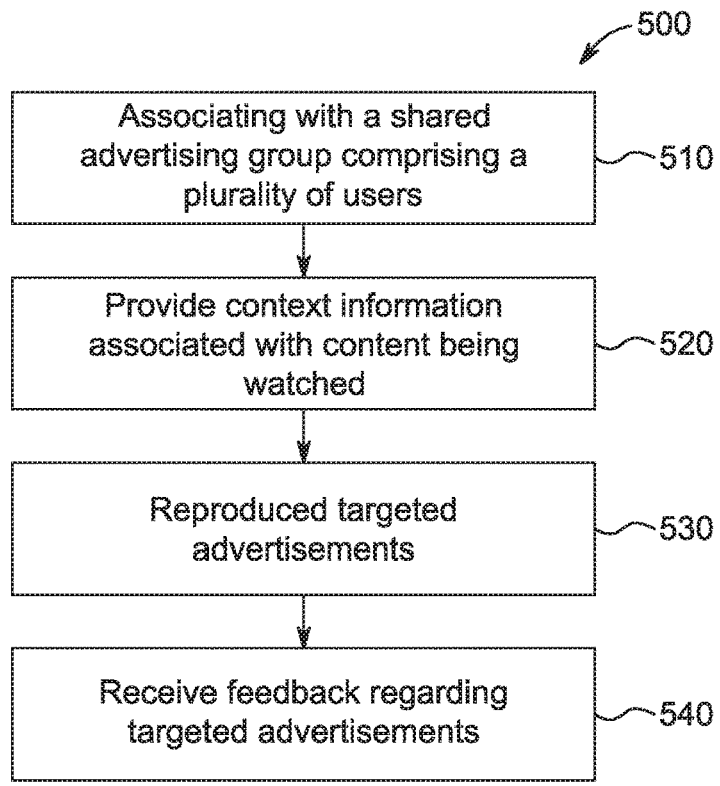
FIG. 5 is a flowchart of an example method for participating in a shared advertising group comprising a plurality of Users.

FIG. 5 is a flowchart of an exemplary method 500 for participating in a shared content advertising group comprising a plurality of Users. For example, the example method 500 can be performed by one or more computing devices (e.g., by the user devices 160 described above in relation to FIG. 1).

At 510 a computing device (e.g., a mobile computing device associated with a User, such as a mobile phone or tablet device) is associated with a shared advertising group. The shared advertising group comprises a plurality of Users (including the User of the computing device) and their associated computing devices. The computing device can be associated with the shared advertising group based on various criteria, such as sharing the same general physical location, sharing the same content at the same time, explicit association by the User of the Device, etc.

At 520, the computing device provides Context Information associated with Content being consumed by the User. For example, the Context Information can be received from the User (e.g., entered via a user interface of the computing device). The Context Information can include location information of the computing device and/or other devices in the group, time and date information, audio information from the Content being watched, video information from the Content being watched, Profile information associated with the User and/or other Users in the group, explicit selection of Content (e.g., program name, channel, network, time, etc.) by the User and/or other Users in the group, and/or other types of Context Information).

At 530, one or more targeted advertisements are reproduced by the computing device. The one or more advertisements are selected for presentation to the shared advertising group based, at least in part, on Profile information of the Users of the group. The targeted advertisements can be reproduced on the computing device at the same time as generic advertisements are reproduced on a shared First Device (e.g., a shared television being watched by the Users of the shared advertising group).

At 540, Feedback is received from the User regarding one or more of the reproduced targeted advertisements. For example, the Feedback can be used, at least in part, to determine payout amount that the User will receive. Feedback can be provided via the user's computing device. Feedback can also be provided using another device (e.g., on a First Device, on an Alternate Device, etc.).

Users can be paid for receiving targeted advertisements. The amount that Users are paid can vary depending on a variety of criteria. For example, payout amount can vary depending on User Profile information (e.g., demographic information) of one or more Users. Payout amount can be provided as a range, which can depend on Feedback (e.g., the payout amount can be more if the User agrees to provide Feedback) or some other type of indication that the User has received the Content. Or payout amount can be adjusted based upon a User's integrity rating, measuring the relationship between the User's stated intended needs and activities (i.e. Assertions), and the User's actual implementation of same in actual practice over time.

Figure 6:
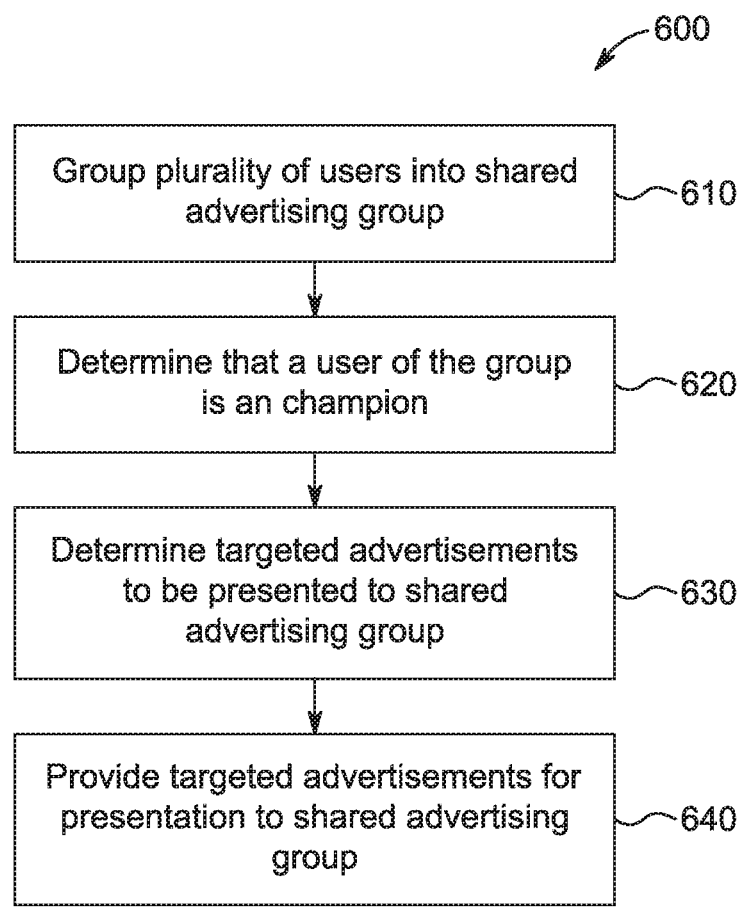
FIG. 6 is a flowchart of an example method providing targeted advertising to a group of Users including a Champion.

FIG. 6 is a flowchart of an exemplary method 600 for providing targeted advertising to a group of Users including a Champion. For example, the example method 600 can be performed by one or more computing devices (e.g., by the Targeted Content computing system 110 described above in relation to FIG. 1).

At 610, a plurality of Users is grouped into a shared advertising group. For example, the plurality of Users (e.g., along with their associated computing devices, such as smartphones) can be grouped based on Physical Proximity, Virtual Proximity, explicit grouping, consuming from a shared First Device at the same location, etc.

At 620, a determination is made that a User has agreed to be a Champion. For example, a User can pre-select a number of Products and/or services with which the User has personal experience and is willing to Champion, which are then saved to a Profile associated with the Champion for use later. The advertising system can then detect that the Champion is available (e.g., is part of the shared advertising group) and ask if the Champion is willing to promote the Product and/or service (e.g., by providing a payout offer that the Champion will receive).

At 630, one or more targeted advertisements are determined for presentation (e.g., audio and/or video playback) to the shared advertising group. The one or more targeted advertisements are determined based, at least in part, on the Champion. For example, an advertisement for a Product and/or service that is listed in the Profile of the Champion can be selected. The one or more targeted advertisements can be presented on a First Device (e.g., a television on a home or business setting) and/or on personal Devices (e.g., on displays of the computing devices, such as smartphones, of the Users in the shared advertising group). The one or more targeted advertisements can be also determined based, at least in part, on Profiles of the Users in the shared advertising group (e.g., selected to maximize payout amount for one or more of the Users, selected based on a minimum payout amount across all Users of the group, or selected based on other criteria).

At 640, the one or more targeted advertisements are provided for presentation to the shared advertising group with a corresponding presentation by the Champion. The targeted advertisements and Champion presentation can be presented on a First Device and/or on personal computing Devices (e.g., smartphones). The targeted advertisements and Champion presentation also can be presented on a Device instead of generic advertisements (e.g., in place of generic television commercials that are not targeted to the shared advertising group).

Using the platform created by the Arkiïs™ system, a business can create their own Targeted Marketing Content for prospective clients and when in a public situation, such as taking the prospective clients out to a sports bar, the company's salesperson can sponsor their own advertising to serve as Targeted Content for delivery to the screens near their prospective clients to further reinforce the message the salesperson has given them during the day of a sales pitch. In some embodiments, the Content can be personally tailored for the particular clients they are entertaining and refer specifically to them. In further embodiments, the sponsor can get an alert on their phone right before their message is going to be sent so they are sure not to miss it. It can also be a simple message, for example, a brief message that states "This quarter is brought to you with premium content and commercial free by Hank!" and shows his profile picture or a quick video blurb instead of any commercials to allow for extra Premium Content.

The following example usage scenario describes how personally directed public advertising may be implemented through the Arkiïs™ system. George and Frank are in Atlanta trying to make a sale of their time tracking software to improve employee productivity. George allocated a budget of up to $100 to fund inserting their company's ads into the targeted advertising stream around them while they wine and dine their prospective clients in the evening. George set it up using his Arkiïs™ app so that shared Device ads will only air if both he and Frank are together in front of a First Device and so that they will each get a notification on their smartphone 15 seconds before each time their ads will be presented. The first opportunity arises while they are waiting for a table in the restaurant in its bar area. The television is not very large and cannot be heard very well in the crowded bar, so the first ad only costs them $3. During dinner, there are no televisions, however, in the bathroom, each of the urinals has silent video advertising messages. Their company's message is cycled into the selection of messages being displayed on these screens for another $2 while they are in the restaurant. After dinner, they take their prospective clients to their corporate skybox to see the basketball game. For 40 they buy all the Targeted Marketing Content to cover the entire time they are in their private skybox and may be viewing either of the two screens in their room. George configured the targeted advertisements using his smartphone app so that in each commercial break, a sixty second spot for their company is to be shown with the rest of the time filled in with behind the scenes Premium Content for the game. After the game, they go to a pool hall and spend $40 to take over the two screens in view of the two pool tables they are congregating around. George has configured the presentation of Premium Content to align with his clients' interests as delineated in their client's Profiles. This is possible because several of the prospective clients are Arkiïs™ customers and joined into his SyncGroup early in the evening. Arkiïs™ servers select stand-up comedy and sports commentary shows as best fitting his client's profiled interests. Each show begins and ends with a short 15-second message for his company indicating that they are sponsoring the selected Premium Content. At the end of the evening, the group splits up into two cars, one driven by Frank and the other by George, to return the clients to their workplace. In the car, the radio plays a selection of tunes streamed from their connected smartphones that are commercial free and match the interests of the clients in each respective car for a total charge of another 2. The total cost for advertising during the evening was 87, an Arkiïs™ way to mix business with pleasure.

The Arkiïs™ system facilitates the fortuitous location of brick and mortar stores that have Products of interest to a User. Stores may be fortuitously located in the present moment for a User by monitoring their location as provided by GPS, Wi-Fi triangulation, mobile cell tower proximity, or the like. A User's affirmation of their future plans including calendar entries, navigation requests, or explicit Arkiïs™ Assertions (e.g. I'm going to drive down to my mom's on next Monday) may also be used to facilitate the fortuitous location of brick and mortar stores whose proximity is predicted to occur in the future. Additionally, a prediction of their near future path based upon the vector of their current travel, optionally combined with their historical travel paths, may be used to locate candidate stores whose proximity is predicted to occur in the future. In some embodiments, a User may receive a recommendation to travel to a location outside their normal typical daily range when the confluence of several buying opportunities combines to make such a special trip desirable. A User's Profile may include Assertions of Products they are considering buying and Arkiïs™ may alert them when they are in the vicinity of a store offering a particular Product they are interested in. A User's Profile may record either an exact Product or a general Product they desire. An exact Product may be identified by many means including its UPC code, Stock Keeping Unit (SKU) for a particular store, manufacturer and description, manufacturer and model, website URL description page, or internal Arkiïs™ identifier. General Product interest may be identified by associated keywords and/or categories of products. Brick and mortar stores may integrate with the Arkiïs™ platform to publish information for the Products they have in stock that may include, pricing, location within particular stores, quantity in stock, related Products, or competing Products. Store integration with the Arkiïs™ system may include Product keyword and/or category associations for Products they carry. In some embodiments, brick and mortar store information may be augmented, extended, corrected, or built from crowdsourcing and/or computed from Arkiïs™ member purchase histories.

Figure 7:
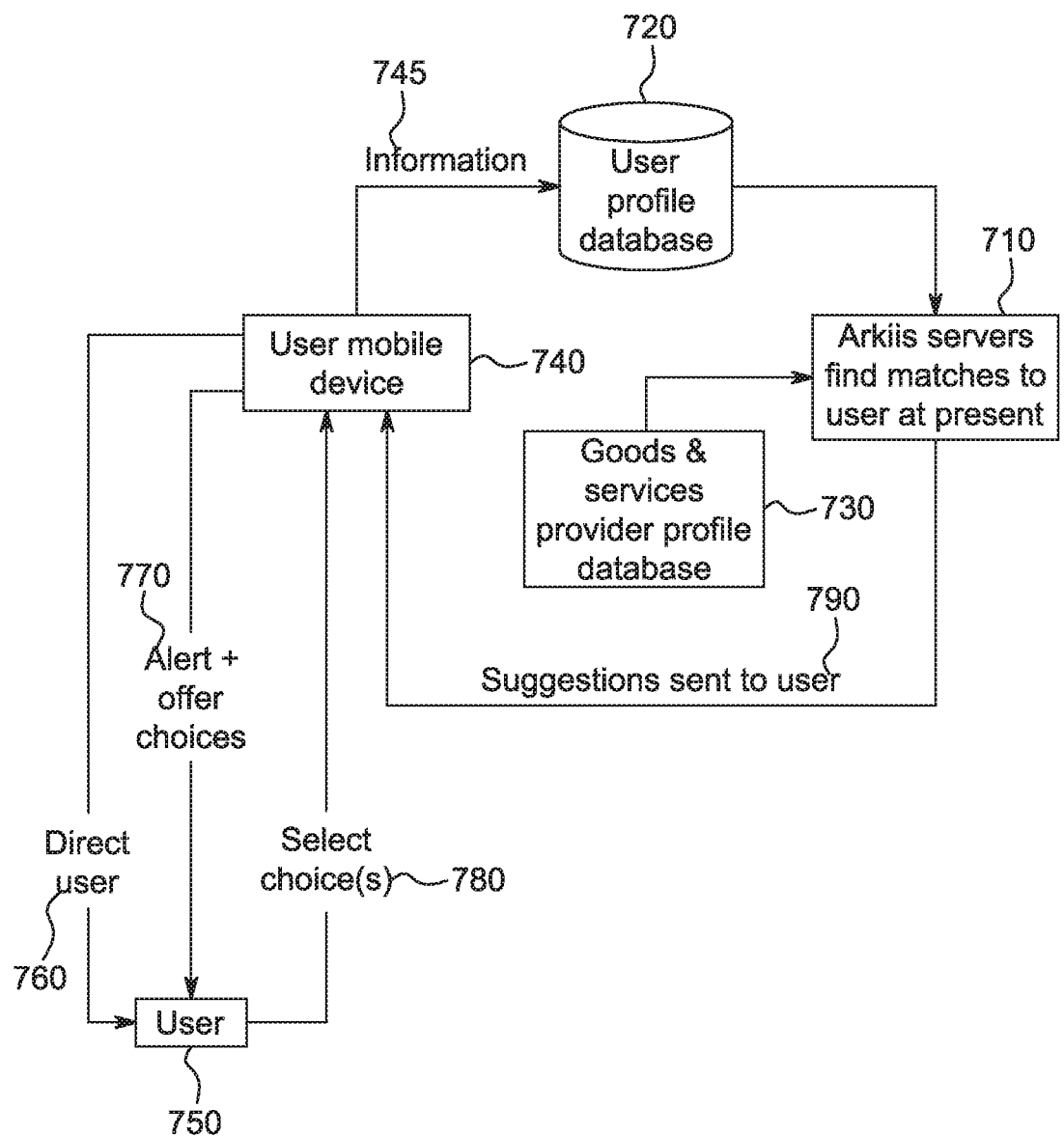
FIG. 7 is a flowchart of an exemplary depiction of how Users and Merchants are connected together to provide opportunities to a User based upon their location.

FIG. 7 illustrates by way of a flow diagram how the examples in the prior two paragraphs may be implemented. As seen in FIG. 7, the Arkiïs™ servers (710) receive information from the User Profile database (720) and Goods & Services Provider Profile database (730). The User mobile Device (740) adds information (745) to the User Profile database (720) including current location information and selected choices (780). The Arkiïs™ servers identify matches for the User (750) based upon in part upon their User Profile database (720) such as their current location and current time and the Goods & Services Provider Profile database (730) such as store locations, Products, prices, shelf information, services, hours, and interests. For example, the Arkiïs™ servers may send detailed suggestions (790) including shelf locations within a store to the User's mobile Device (740) and the User (750) may be alerted and offered choices (770) to select (780), where selected choices are sent to the User Profile database (720) and accessed by the Arkiïs™ servers (710) to provide further suggestions (790) including an optimal path to traverse to User Mobile Device (740) that then directs (760) the User (750), in the prioritized efficient order as suggested (790) to one or more particular locations in one or more stores where one or more selected (780) items of interest may be found.

The guidance may direct the User to the exact location within the store where the particular product may be located including directions to the correct aisle and shelf. The final guidance may be fine-tuned by a User's mobile device detecting the RFID tags of the Product. This guidance may also apply to shopping lists such as for a grocery store that are stored in their Profile. In a preferred embodiment, the Arkiïs™ system may know what a User wants to buy at the store by the User making Assertions and by the Arkiïs™ system detecting the frequency at which various Products are purchased and proactively suggesting further items to add to such a shopping list. When a product is offered in multiple configurations such as size or quantity, the Arkiïs™ system may recommend the configuration that is the most cost-efficient after taking into consideration any shelf life limitations of the Product and the rate at which the User typically consumes the Product. Such computations may satisfy a confidence factor from a User's Profile such that the probability of the optimum size determination being correct exceeds the confidence level. For example, a 90% confidence level would mean that for the recommended purchase size, 90% of the time, that purchase size will be the least expensive choice in the long run after future predictions on pricing and consumption rates become actual.

The Arkiïs™ system may direct the User through the store using a traveling salesman problem (TSP) solution/heuristic from computational complexity theory to provide a short path or the shortest path to get all the items they need/desire in a store. More generally, the traveling purchaser problem may be applied to select the least expensive method to procure all items on a shopping list from a plurality of possible stores where costs may include travel expenses and time. The purchase price of the traveling purchaser problem may be replaced by a formula for an adjusted purchase price that accounts for the value a User places on their travel time and/or the actual travel costs in addition to the actual purchase price, further the adjusted price may be computed to account for an assigned value that reflects the perceived/judged costs of negative externalities. For example, a User may place a high value on the environment and thus may ascribe a monetary cost to the carbon footprint of competing Products and also upon the footprint to travel to the Product's location to acquire it. Such assignment of monetary cost in a formula may be facilitated by a Certifier (see Section 11—Providing Feedback on Content, Goods, and Services) the User trusts such as an NGO providing an assessment of, for example, the carbon footprint of a Product. Alternatively, a User may provide their own formula for computing an adjusted price that includes as input the various metrics of Independent Reviewer Certification for Products in the Arkiïs™ system. Such formulas may weight the various factors that are inputs differently according to their relative assessed importance. Such formulas may require as input information from a User's Profile, information from an Independent Reviewer Certification, and/or information about a Product, merchant, or store. Such computations are too complex and time consuming for one or more humans to carry out, even more so considering their need to be computed nearly instantly to have any real value to the User, and thus require the automation of one or more computational devices, which when using this method enables each individual User to more effectively compare competing Products along dimensions of interest to themselves than a simple comparison of just price and/or features of a Product or service. Such non-conventional computations are far from routine activities and not previously known in the full form explained herein.

The Arkiïs™ system may communicate with a store's smart shelf technologies whereby a shelf or product packaging may include computer devices and the ability to display information or provide auditory prompts or other sensory output (e.g. emit a scent or vibrate). One example is the addition of LED indicators along a shelf to attract attention or indicate a customized and or time limited level of discount, or highlight Product features of interest to you, like non-GMO ingredients. Another example is a reusable packaging enclosure that lights up to bring attention to it. These features may be activated through the use of Near Field Communication (NFC), Wi-Fi, or GPS, for example.

In some embodiments, free samples might be dispersed conditionally based upon Profiles that are good candidates for a Product. For example, a vending machine may only supply free samples to identified selected shoppers whose Profiles in general or whose ratings within their Profiles satisfy Marketer requirements. Selected Users' smartphones, detecting proximity to such vending machines, may offer Users the Products and allow Users to accept or reject the one or more offers. If accepted, their smartphones may communicate with the vending machine dispenser to cause the matching accepted Products to be dispensed. Communication may be by sending Infrared (IR) codes, Near Field Communication (NFC), displaying a QR code that is read by the vending machine, submitting a response back to Arkiïs™ cloud servers for network dissemination back to the vending machine, etc. Alternatively, a human worker may dispense freshly created samples when either alerted to do so by a mobile device that may present a photo of the recipient, light up green when a matching User's smartphone is waved, or when a designated recipient produces a distinctly recognizable supplied photo on their smartphone.

The store's shelves may communicate with the Arkiïs™ system to coordinate with Users such that the shelves respond to Users as they traverse the store and help them locate Products of interest to them such as those being on their shopping list. For example, individually addressable LEDs may line store shelves where such LEDs are activated by the Arkiïs™ system when a User is nearby a Product for which they are searching/interested in order to draw attention to its exact location. The lights may be turned on and off in patterns to create the appearance of a focal point for the Product's exact location. For example, turning on the whole Product's shelf's lights to direct attention to the correct shelf, following by turning them off from the left and right sides of the shelf in succession until the position directly under the Product is reached simultaneously from both the left and right sides can easily direct a User's attention to the exact Product location by the animating effect of the lights being individually controlled.

The map of a store's inventory may be provided directly by a store or it may be grown organically/crowdsourced by Arkiïs™ Users contributing the information incrementally as they find and buy Products at a store. Users may grow the database of items, prices, configurations, and their locations within a store by scanning the UPC of items (or other identifying features such as QR code) as they place them in their basket and thus providing the location of the item within the store and optionally its price. The Users that benefit from the foregoing data being collected may compensate the Users within the Arkiïs™ system that provide the data. The Users that provide the data may also have their integrity rating in a given area improved. Users may be presented with the last known price of an item and offered the ability to correct it if the price has changed. The average location of all Users scanning an item, possibly after screening out the outliers, may be combined to give a good fine-tuned approximation of an item's location in a store. If Users start reporting a completely new location, the item must have been moved to a new location in the store or is now available in more than one location in a store. The history of an item's location as provided by all the contributing Users might weight recent logging of its location more heavily when directing a User to its location in a store. Users may also log the absence of a Product at its predicted location to further refine the database information and accuracy. Users may also contribute pricing information to the system and help other Users decide where to buy an item if they are going to visit several stores.

The following example usage scenario shows how the shopping assistant feature may be implemented. Elena recently discovered she is gluten intolerant and puts this information on her Arkiïs™ Profile so that she will be targeted with advertisements of gluten-free Products. She drives to her local supermarket to buy groceries for the week every Tuesday at 6 PM. On this specific Tuesday, her smartphone's GPS confirms that she is heading towards the supermarket at 5:50 PM, so Arkiïs™ offers her an audio advertisement for a new brand of gluten-free bagels available at the supermarket, which will pay for the cost of her commercial-free satellite radio station. Elena agrees, and is impressed by the selection of flavors available. Her audible "Wow!" is picked up by her smartphone's microphone and informs the Arkiïs™ system that she had a positive reaction to the advertisement. After listening to the advertisement, Elena receives a coupon on her smartphone, containing a QR code that can be scanned to receive $2 off of a dozen bagels. Since she seemed to react positively to the gluten-free bagels advertisement, the Product is automatically added to the shopping list Arkiïs™ has curated for her, which is based on her prior purchase patterns. When Elena enters the store, she checks Arkiïs™ for her optimized shopping route and is initially directed towards the gluten-free baked goods section of the supermarket. As Elena approaches the gluten-free baked goods section of the store, the shelves around the advertised bagels flash violet and aqua, which are her favorite colors listed on her Arkiïs™ Profile. A bakery employee is alerted by the Arkiïs™ system to offer Elena samples of the bagel flavors so that she can choose her favorites. Deciding on jalapeño cheddar and cinnamon walnut, she grabs half a dozen of each, and then uses her smartphone to find the next closest item's location within the store using Arkiïs™.

The Arkiïs™ system may allow a User to specify a set of stores they are going to shop at in a day and Arkiïs™ may direct the User to optimize their purchases by directing them to only those items that are least expensive at a given store and deferring the other items to a later store where they cost less. In some embodiments, the Arkiïs™ system may also suggest new stores to consider adding or replacing to a User's current shopping stores based upon pricing information being better optimized with the new suggested store. Suggested stores may be based in part upon the route a User is planning to take or the route that Arkiïs™ may recommend to minimize distance, travel time, parking costs, walking distances, and or other expense during the day as they shop at multiple stores so as to minimize the time and expense required for the suggested added stop. The User's Profile may include a numeric dollar attribution at which they value their time (e.g. $20 per hour) and such an attribution may be incorporated into their suggested shopping plan such that any time saved or extra time required at that rate would have to be offset by an even greater cost savings in the Products they buy to produce a shopping plan that looks at the big picture of savings vs. time.

Arkiïs™ may allow for targeted product placement within Premium Content. For example, at present during baseball games, there is already a green-screen billboard being used behind the batter. During live broadcast, the Content Provider digitally overlays Content on the billboard, typically changing the message each half-inning. However, with Arkiïs™ this content may now be targeted specifically to the viewer. This may be done by the broadcaster providing the Arkiïs™ servers a feed where the green-screen has not been substituted and Arkiïs™ may arrange, internally or through a third party depending on the embodiment, for Targeted Content to replace the green-screen before delivering to the end viewer.

In a preferred embodiment, the static live action product placement of today can also be supplanted dynamically with targeted product placement. Today, Premium Content sells static product placement in movies and television shows. For example, Florida's Natural® may place their carton of orange juice in a show where, during a scene, a character takes the carton out of the refrigerator and pours a glass. With the functionality made possible by Arkiïs™ this substitution can be deferred and dynamic. Rather than using an actual fixed product placement, the actor uses a green-screen version in the shape of the Product to be substituted. For example, an unlabeled carton of juice, a can of soda, or a tube of toothpaste may be used. The green-screen version of the Product contains keying locations to help the computer recognize the 3-dimensional orientation of the Product. The product orientation is then computed during production and editing and the video feed encodes sufficient information for a dynamic product placement during final playback. The audio portion can even likewise be synchronized to provide an audio component of the product placement by having the actors record the words for the various placement choices desired or by having a computer construct the alternate words based upon samples of the actor's voice.

An embodiment of Arkiïs™ implementing dynamic product placement is described: Heather is watching The News-room on HBO as streamed to her by the Arkiïs™ cloud servers and in one scene, Jeff Daniels takes a carton of juice out of the refrigerator and pours himself a glass and leaves the carton on the counter. Because Heather's Profile shows that she prefers grapefruit juice over orange juice, the Arkiïs™ cloud servers provide a feed in which her targeted product placement chooses grapefruit juice over orange, further, based upon her Profile, Tropicana® is chosen over Florida's Natural®. In the dialog, Jeff Daniels offers his friend a glass of grapefruit juice instead of offering orange juice as it was originally recorded by the cloud server software splicing in the alternate dialog in Heather's streaming feed. Further, the green-screen colored carton he holds during filming is substituted with the Tropicana® version of grapefruit juice in Heather's feed. To Heather, it appears that the original scene was filmed specifically for her targeted product placement selection.

Alternate Content is also available by way of product placement in video and/or audio only games. Alternate Content may be inserted into, depending on the embodiment: computer games, mobile (smartphone, tablet) games, console-accessed video games, etc. During gameplay, a User may optionally consume a Targeted Marketing Content commercial to buy an in-game advantage. In some embodiments, based on your Profile, there can be targeted product placement in the game. For example, an in-game potion can be branded with Coca-Cola® and the potion appears as a Coca-Cola® bottle and color in the game and offers an extra in-game bonus compared to the non-productized default version of the potion. In an alternate embodiment, a video game can be optimized based upon the nutritional density of in-game food based upon its real world value. In this way, nutritious branded foods can be placed in the game and have in-game value proportional to their real world nutritional value. The targeted product placement in the game is based upon the User's Arkiïs™ Profile characteristics. By linking a User's Arkiïs™ Profile with their online gaming accounts (e.g. Xbox Live®, PlayStation® Network Account, Club Nintendo® Account, etc.) targeted advertisements and product placement in games may closely reflect a User's gaming persona.

The following is an example usage scenario of the Arkiïs™ system implementing video game product placement. Tom is playing Diablo III® and has linked his character in the game to his real-life Arkiïs™ Profile. Tom prefers Pepsi®, as it is his favorite kind of soda. He has agreed in the game to Pepsi's® product placement. His rejuvenation potions are rendered in the game to appear as Pepsi® cans and bottles, and in return for the product placement, his rejuvenation potions offer a 20% extra effect each time they are imbibed.

An example usage scenario describing product placement in a video game is as follows: Joey is nine years old and has recently become interested in skateboarding. His parents have configured Joey's Arkiïs™ Profile to require in varying degrees that all Content include things that encourage him to think and act in ways that enhances his moral, physical, and mental abilities. So his parents have configured his Profile online to require that all advertising include an educational component that is approved by one of the third party non-governmental organizations they designate. JumpSport® has recently come out with a safer skateboard design for children and has an approved educational advertisement to target Joey's professed interest in buying his first skateboard. JumpSport's® targeted ad wins placement by satisfying his Profile requirements and bidding highest and pays Joey $0.25 to play and complete it. The advertisement is an interactive video game that requires Joey to complete a series of multiplication problems that are tailored to his individual educational needs as determined by his linked standardized test results or certain approved online math educational programs that are linked to his Arkiïs™ Profile. Completed problems allow Joey to virtually build and configure his proposed new skateboard to gather the parts and then assemble them followed by his selecting and virtually donning his safety gear. Only once his skateboard is fully assembled and he is wearing all the safety gear is he able to ride the virtual skateboard and unlock a video tutorial that teaches him his first skateboarding trick. Because Joey completes the multiplication problems quickly and correctly, he is also awarded with a coupon for free shipping on a new JumpSport® skateboard. Additionally, Joey's parents have sweetened the deal by agreeing to contribute their own Arkiïs™ credits to increase Joey's advertising credit by $5 for each education advertisement Joey completes that demonstrates his improvement. Joey's performance on the JumpSport® advertisement demonstrated improvement in his multiplication skills and thus earned him the $5 bonus supplied by his parents through the Arkiïs™ system, sufficiently raising his Arkiïs™ User Profile balance so that he can now afford the skateboard with his own money. Joey places the order online using JumpSport's® Arkiïs™ enabled website. The website notifies the Arkiïs™ servers of the order and awaits final authorization for the payment. The Arkiïs™ servers route the order to Joey's parents for final approval along with a targeted advertisement that explains the safety advantages of their Product to his parents. Once his parents approve the order, JumpSport® is notified that the funds are now available. JumpSport® ships the skateboard and requests disbursement from the Arkiïs™ servers.

It can be appreciated that Joey's parents may also have Content pushed to their son that reflects their ethics, beliefs and/or values. For example, positive phrases that reflect their values or beliefs may be embedded in or adjacent to the advertisements that Joey sees related to his interest area. Thus, Joey may also see a positive statement before or after the advertisement that displays a value the parent wants Joey to reflect upon or see. For example, a statement saying, "Courage is not the absence of fear, but doing your best in spite of your fear." Other value statements, biblical quotes, or the like can be included in the material consumed by their children, so that parents can transmit their values to their children even when they are not present with them.

In a preferred embodiment, Users may add a plug-in to their browser that automatically replaces Internet ads with more highly targeted Arkiïs™ ads. This may be done similarly to how the Adblock Plus or AdBlock plug-ins block advertising on web pages displayed in a browser—for example, by intercepting requests from the browser to particular domains, hiding advertisements based on CSS formatting, hiding page elements which fit the dimensions of standard web advertisements, or hiding page elements whose source domain is recognized to be for advertising (e.g. doubleclick.net). However, instead of blocking, the ads are substituted with Arkiïs™ ads based upon the User's Profile and the layout position and dimensions of each ad being replaced. In an alternate embodiment, instead of substituting existing ads with like-sized ads, the page layout may be dynamically reconfigured to allow Arkiïs™ to substitute more highly targeted ads. This may be accomplished by marking areas of a page (e.g. page position of top left/bottom right corner, width and height of area) where advertisements may be displayed, and overlaying ads within these areas that may not be the same size as the originally displayed advertisement(s). The User may be paid for display of ads and/or for clicking on ads. Additionally, a portion of the ad revenue may be shared with the website whose ads are being replaced. One possible method of revenue sharing is by having the Arkiïs™ plug-in detect websites that are Arkiïs™-enabled (e.g. through matching the URL with URLs within an Arkiïs™-enabled site's database) and supplying an Arkiïs™ anonymous ID to uniquely identify the User that is browsing and having the website serve up its own Arkiïs™ ads that are targeted by Arkiïs™ for that User. Such anonymous identifiers or tokens may be uniquely supplied to participating websites with each new website being visited receiving a new unique identifier. In another embodiment, an identifier or token may be reused across multiple websites or sessions for a set time period such as ten minutes and upon expiration a new identifier supplied for subsequent sites being visited or even within an active session at a site that spans the expiration, a replacement identifier or token may be supplied in the middle of a User's visit to a web site. In yet another embodiment, Users sharing a display and browsing together may form a SyncGroup and receive ads for the group and may have a shared identifier or token that represents the group's identity. Additionally, Users may combine into a SyncGroup so that even when they are independently browsing, they may receive ads targeted to their SyncGroup and may have the same or different identifiers but which are all associated by Arkiïs™ with the identity of their SyncGroup.

Content Producers may not initially choose to cooperate with Arkiïs™, but advertisements can be served in a separate window while still sharing a portion of revenues with them. Such ads can be selected while still knowing the content of the page being viewed so that such history is taken into the User's Profile and ads are more contextually based.

The following example usage scenario describes an embodiment of the system utilizing online advertising. Doug installs the Arkiïs™ plug-in into his Chrome® browser and, using the plug-in, logs into the Arkiïs™ servers and receives a set of 256 bit identifiers (or any other size appropriate for hashing security) that each uniquely and or anonymously identify himself as a particular Arkiïs™ member or classification/type of member to participating websites. He goes to Amazon®, an Arkiïs™ participant, and the plug-in provides one of these identifiers. The identifier may be supplied by adding it to the URL his browser navigates to at Amazon®. (Periodically, when his set of identifiers runs low or will expire soon, his plug-in may request additional identifiers from the Arkiïs™ servers.) On Amazon®, all sponsored links are selected by the Amazon® web servers by utilizing Doug's supplied identifier and submitting it to Arkiïs™, along with the current Amazon® page he is about to view, in order for Amazon® to receive targeted sponsored links from Arkiïs™. Alternatively, Amazon® may query Arkiïs™ for areas of interest for the given Profile with respect to Products for sale on Amazon and or advertisements being used on Amazon's® site. This may include Amazon® supplying a database or directory of Products and advertisements and the corresponding desired target demographics of the customers they are trying to attract for each of those Products and advertisements that may be matched and selected by Arkiïs™ for Amazon® for the User. This allows Amazon® to customize the web pages including any suggestions they wish to make to the Arkiïs™ User. Amazon® servers build their web page for Doug utilizing the information supplied and or facilitated by Arkiïs™ and serve up their page, customized for Doug, but without Amazon® learning of Doug's actual identity or his demographic information. If Doug clicks on any of the sponsored links, the Arkiïs™ servers will automatically credit Doug and Amazon® a portion of the proceeds. After finding a Product he is interested in on Amazon®, Doug decides to check eBay®, in a new tab, to see if one is available used. Because eBay® is not yet an Arkiïs™ integrated site, his plug-in does not supply one of his identifiers in the eBay® URL and instead may use ad blocking technology to detect the advertisements that are included in the eBay® pages and either block them, or if eBay® has agreed to accept Arkiïs™ payments, then the ads which are blocked can be substituted with Arkiïs™ ads. Substitution works by determining the window location and size of each ad to be blocked and individually querying the Arkiïs™ servers for Doug's targeted ads that may adhere and fit in the available real estate, creating an overlaid web page that contains the core Content from eBay® but with all ads being replaced by Doug's targeted advertising from Arkiïs™. Arkiïs™ automatically shares a portion of the ad revenues with both Doug and eBay®. (Sites may fall along a spectrum of varying levels integration, beginning with the most basic level of just accepting payments from Arkiïs™, continuing onto accepting ad substitution, and finally offering complete seamless site integration. Sites may be rewarded with higher revenue shares as they proceed along this Content Spectrum.) When Doug completes his Amazon® session or exits his browsing session, any cookies related to his unique Arkiïs™ identifiers may be automatically purged and deleted from his computer by the Arkiïs™ browser plug-in.

Through the functionality granted by the Arkiïs™ system, Users may control the direct mail advertising they receive from participating Marketers who may use detailed criteria to precisely select recipients who are receptive to their messages. Such mail may contain custom QR codes that recipients may scan with their phone to get paid for reviewing the mail piece and possibly lead to follow up ads on their smartphone. Alternatively, the mail may contain a unique piece number and Arkiïs™ telephone number the recipient may call and enter their piece's number to get paid for reviewing the mail and possibly lead to follow up audio ads over their phone. When calling in to confirm receipt, a User's caller id and voiceprint may be used to authenticate and confirm their identity in a preferred embodiment. Users may avoid receiving duplicate copies of direct mail that is addressed to different people at the same address by requesting such in their Profiles to receive shared mail that may contain individual QR codes or unique piece numbers for each intended recipient in a household. In a preferred embodiment, recipients may send Feedback on received mail through their Arkiïs™ Profile via a Device for additional payouts including Feedback that the advertisement was poorly targeted and not of interest to them. Arkiïs™ may partner with delivery services to allow advertisers to supply unaddressed bulk mailings to a shipper who addresses each mailing as selected out of the Arkiïs™ databases, thus insulating recipients from divulging their identity to advertisers.

Users may control the newspapers, magazines, and other periodicals they receive from participating publishers. Control may include advertising Content (or lack thereof) and Premium Content to customize a periodical to better match the specific interests of a reader. Users can pay publishers for Content directly or share revenues they receive from targeted advertising in the periodicals. Advertisers may be aware of the contextual Content within which they would be placed in selecting their target audience. By linking their wearable computing devices with their Arkiïs™ Profile, Users may use wearable computing devices such as Google® Glasses to track consumption of Content and only pay for what they actually read. Alternatively, representative samples from the population may be used (representatives may be compensated to facilitate sampling) to track typical consumption patterns and apply them as norms for matching groups from the general population. Users may choose to compose their own custom periodicals and associated targeted advertising that pull Content from multiple sources into a single customized printed or electronic periodical that they control through their Arkiïs™ Profile. In a preferred embodiment, Users may request Content selection be prioritized by Content highly rated by other Users with similar Arkiïs™ Profiles in the Content's interest area. Companies like The Wall Street Journal may wish to encourage potential readers to subscribe through Arkiïs™ because more highly targeted advertisements and Content generate higher revenues and thus they may, for example, offer potential subscribers three months of free access in return for receiving their subscription integrated with Arkiïs™.

Users may pay for and select Content based upon its value to them and they may be asked to rate or grade the Content on a sliding scale along metrics such as quality of writing, value, and interestingness. Before reading an article, the User may be presented (via a Device) with a sliding cost the article may cost along with a predicted likely cost based upon their predicted rating. The article cost can then be finalized based upon how much of the article the User consumed together with how highly the User rated the article and optionally together with the ratings of everyone else or only like-minded others as determined by their Profiles.

Placard advertisements in public places such as billboards, public transportation advertising, etc., may contain generic QR codes that a User may scan with their location-aware, Arkiïs™ enabled smartphone to confirm receipt, get paid, and possibly receive follow up advertising with additional payouts. In some preferred embodiments, Users may take a picture of the entire advertisement and submit the picture for pattern recognition and identification to confirm receipt together with smartphone location information. In other preferred embodiments, these advertisements may contain a unique advertisement number and telephone number that they may call and enter the advertisement's number to get paid for reviewing it and possibly lead to follow up paid audio advertisements over their phone. When a User calls the number, their phone's caller ID number may be used to identify them, or alternatively, they may enter their unique User ID. A User's voiceprint may be used to further confirm their identity. These public advertisements may indicate a minimum payout recipients will receive for confirming viewing.

While traveling, a User may automatically be credited for billboards they pass by their location-aware smartphone in return for allowing Arkiïs™ to provide the advertiser some of their demographic information, possibly anonymously. This information may also include a timestamp of when the advertisement was passed. The User may be credited by matching their location found though GPS, Wi-Fi triangulation, mobile cell tower proximity, or other means to a billboard location database, after confirming the direction a User is facing on the road. In an alternate embodiment, a User's direction may be inferred (and possibly still confirmed) by analyzing the direction of the vector of their travel with the presumption that they are facing forward in their vehicle unless otherwise specified in the User's Profile. In another embodiment, Users may automatically be queried as to whether they wish to provide Feedback on the billboard at the time of passing or at a later time if they are a driver. For dynamic electronic billboards, the billboard may adapt to the automatic SyncGroup of Users currently in range to view the billboard to optimize for the current group of potential viewers. This optimization may, in some embodiments, partition a billboard screen up into multiple advertisements that divide up the screen to allow individual optimization for different subsets of the passing population and may entail independent switching of advertisements for different subsets at different times. Subsets may even target down to the individual and offer Champion messages featuring their friends. Arkiïs™ may direct Users, such as through their smartphone, to the display region corresponding to the advertisement that most closely targets their interest. In some embodiments, the advertisements may be color-coded, such as with a colored outline that your smartphone directs you to locate. When an advertisement is particularly interesting or appropriate, your smartphone may alert you to pay attention, such as by emitting an audible alarm. This direction may indicate contextual cues such as look for red, look for the puppy, or look for their friend (a Champion) to direct the User to the appropriate advertisement. Additionally, after seeing a billboard and still traveling, a User may be offered targeted advertisements on their Arkiïs™ radio feed for follow up audio messages to reinforce the billboard or at a later time they may get a reinforcing television, Internet advertisement, or subsequent dynamic billboard advertisement.

In a preferred embodiment, Badges (either physical, digital/electronic, or both) can be awarded (as an added entry/record as part of a User's Profile) for accomplishments: for example, an "iBadge" that is earned upon buying an iPhone®, iPad®, and MacBook Air®. Users may configure in their Profile the visibility of their digital Badges, causing some to be invisible to others or only visible to a select set of friends. In some embodiments, Badges can be earned based upon Content consumed, such as a Game of Thrones Badge for watching every episode of season 1. Badges may be awarded along competitive metrics such as the amount of advertising a User has consumed, amount of Feedback provided to advertisers, or amount of Feedback provided on items purchased. There may be a scoring system managed by the Arkiïs™ cloud servers based upon accomplishments recorded in User Profiles such as purchases made and a leaderboard view into the Arkiïs™ databases may show which Users are doing the best within a group of Users or globally. Badges may include the date they were earned as part of a database entry. Other Badges can reflect values and social responsibility, such as Arkiïs™ tracking your carbon footprint based upon your activities and awarding Badges for improvement or being below a level. In some embodiments, Users may compete with their friends to get a green score, for example to have the lowest carbon footprint for the month. Other values can also be tracked and Badges awarded such as, for example, a Badge or competition for eating well or buying goods that are socially responsible in their manufacture. Another Badge area can be for Arkiïs™ participation such as a Badge for providing Feedback on some number of commercials, reaching a certain trust level, maintaining an active Profile for a certain number of years, or providing some number of reviews. Earned Badges may include payout bonuses that may be agreed upon by advertisers and included in their payout formulas, for example, a User that uses a complete suite of Products within a month may earn a 5% bonus payout on all advertisements related to that suite of Products. Or, alternatively, one Badge may possess multiple rankings as to behavior, integrity (honesty as to stated intent, Assertions, and actual behavior), as well as other valuations. Such a single emblem can be a wheel with various quadrants showing standing in multiple areas of User behavior and values. Or the quadrants of the wheel can show the top ten or twenty areas of User activity or importance in a pie chart based on other criteria or values. Other polygonal and/or color-coded visuals may be created to reflect User information and/or standing. If a person is colorblind, emblems or Badges can be modified to depict Badge rankings by other means that allow for differentiation by the colorblind person.

Another kind of Badge is the right to have distinctive notifications which, depending on the embodiment, may be one or more of: auditory, visual, and or tactile (e.g. vibration) on your computing devices that are only available to Users currently satisfying the Badge's criteria. This can be done to enable Users with physical and/or mental disabilities to receive information as well as a non-disabled User. In some embodiments, other Users near Users having earned such Badges or virtually interacting with such Users, may receive Arkiïs™ notifications on their computing devices certifying such Badges and notifying them with audio, visual, or vibration alerts. For example, you may earn a low carbon footprint for the month and thus be allowed to use a distinctive ringtone that others may recognize as meaning you have earned this Badge and which goes away in subsequent months if you do not maintain the Badge's criteria. Such audio alerts may be combined with smartphone screen alerts that identify the Badge associated with the audio alert and teach others its meaning. When authorized by a User in their Profile, other Users may hear a distinctive ringtone when you call their phone or get a vibration alert on their smartwatch when you are near them if they have configured their Profiles to allow their Devices to receive such information. Also, in certain embodiments, a User may authorize the sharing of aspects of their Profile so that other Users may receive this data on their digital devices (e.g. Google® Glasses when looking at them or a representation of them such as their printed name or photograph.)

Users may be awarded Profile Badges or emblems, coupons, or bonus payouts for being confirmed to have received every one in a series of related ads. An advertiser can have an ad campaign that consists of ten different ads placed throughout a subway system and when a User is confirmed to have viewed all ten ads, they receive one of these bonus awards. For example, after viewing all five ads for five new summer Starbucks iced coffee flavors, a User may receive a coupon for one free cup of iced coffee as well as a Badge depicting a golden cup of coffee for possible display on their public User Profile as viewed by others. Depending on the embodiment, the viewing of public placard advertisements to receive Profile Badges, coupons, and/or bonuses may be verified by one or more of the following: scanning a QR code located on the public placard via the User's smartphone, comparing a user-submitted picture of the public placard to the known image on the public placard, verifying the User's location through GPS or other location determining data and prompting the User to answer a question related to the public placard, image verification or QR code scanning through wearable technology such as Google® Glass, and the like.

Artists may perform in public (e.g. street performers) and receive payment through the Arkiïs™ system by posting a QR code which passersby may scan, allowing Users to check in using GPS data, or the like and choose a contribution they wish to make to support the performances. Users may rate the performances and help like-minded Users to locate public performances that may be of interest to them. Performers may be Champions and may offer free samples. To facilitate the tracking of free samples, the Champion may receive an audible alert each time their QR code or the sample QR code is scanned or a User confirms receipt on their smartphone depending on the embodiment. The QR code may require the User's scanning smartphone is location-aware and in the vicinity of the Champion. Alternatively, Arkiïs™ may know the location of the performer due to the performer being a User who has registered as a performer with Arkiïs™ and submitted their location to the Arkiïs™ servers or enabled location tracking on their phone for the duration of the performance. In some embodiments, Users may get alerts because their smartphones are location-aware and in the performer's vicinity. These alerts may allow the User to acknowledge they are watching the performance and to easily make a contribution if they desire. Such alerts may also indicate when the performer is a Champion and/or when they are providing free samples. Alerts may also include a schedule of performance information.

Another kind of advertising possible through the Arkiïs™ system is a live pitch delivered one-on-one to a User over a telephone, videophone, Internet chat, text messages, in person, etc. Such advertising may be coordinated by the Arkiïs™ system to match up the live Content with Users selected by Arkiïs™ for targeting. In these pitches, a person (or computer simulation of a person, in some embodiments) contacts the User directly using audio and/or video or by physically meeting up with the User to provide direct Content. Such contact is coordinated by the Arkiïs™ system, including its being offered to a User and whether they accept such contact. Content may be Marketing Content or Premium Content or a combination such as an advertisement that leads into Premium Content if the person accepts the offer being sold as the Premium Content. The User's Profile may contain requirements to control the contact and Content, such as an outline or flow chart of how the interaction shall transpire. If the live Content violates a User's requirements the Provider may be required to compensate the User as a penalty for violating the requirements agreed to before contact was initiated. In embodiments where contact is by electronic means (i.e. not in person) Arkiïs™ may serve as broker to connect the two parties in order that their identities may be kept anonymous, undesired follow up contact outside the Arkiïs™ system is inhibited, and/or Arkiïs™ systems may maintain accounting of the transaction. Such brokering may take the form of Arkiïs™ interposing itself between the parties where each party individually connects with the Arkiïs™ system and Arkiïs™ connects the parties together within the Arkiïs™ system. For example, each party dials a telephone number for Arkiïs™ and upon each party properly identifying themselves to Arkiïs™, their telephone calls are bridged or conferenced together.

Some Users may watch pirated Content and advertisers may be motivated to provide targeted advertising in and around such Content and to target Users that enjoy particular titles regardless of how the User comes to consume the Content. However, the consumption of pirated materials may affect a User's integrity rating and the like at the exact same time targeted advertising is being successfully provided to that same User. The Arkiïs™ identification of Content such as by matching audio signatures applies equally well to pirated Content and thus allows Arkiïs™ to detect when Content is being consumed, regardless of how it was acquired by the User. As such, targeted advertising revenue may be shared with Content Producers even in the case that their Content has been pirated. Content Providers may wish to target those pirating their Content with offers to sell paraphernalia related to the Content.

5. Operational Overview

The following description is directed to computerized techniques and solutions for more effectively providing targeted advertising (e.g., by providing Targeted Marketing Content and/or other types of Content in association with targeted advertising). For example, targeted advertising can be provided in a combined system comprising one or more First Devices (e.g., one or more televisions being viewed by one or more people) and one or more personal computing devices (e.g., one or more individual smartphones or tablet devices). Targeted advertising can be provided in an individual or in a group environment. For example, advertisements can be targeted to a group of Users (e.g., based on Profile information of one or more members of the group). Targeted advertising can also be provided in a system with just one or more First Devices, or with just one or more personal computing devices.

Figure 8:
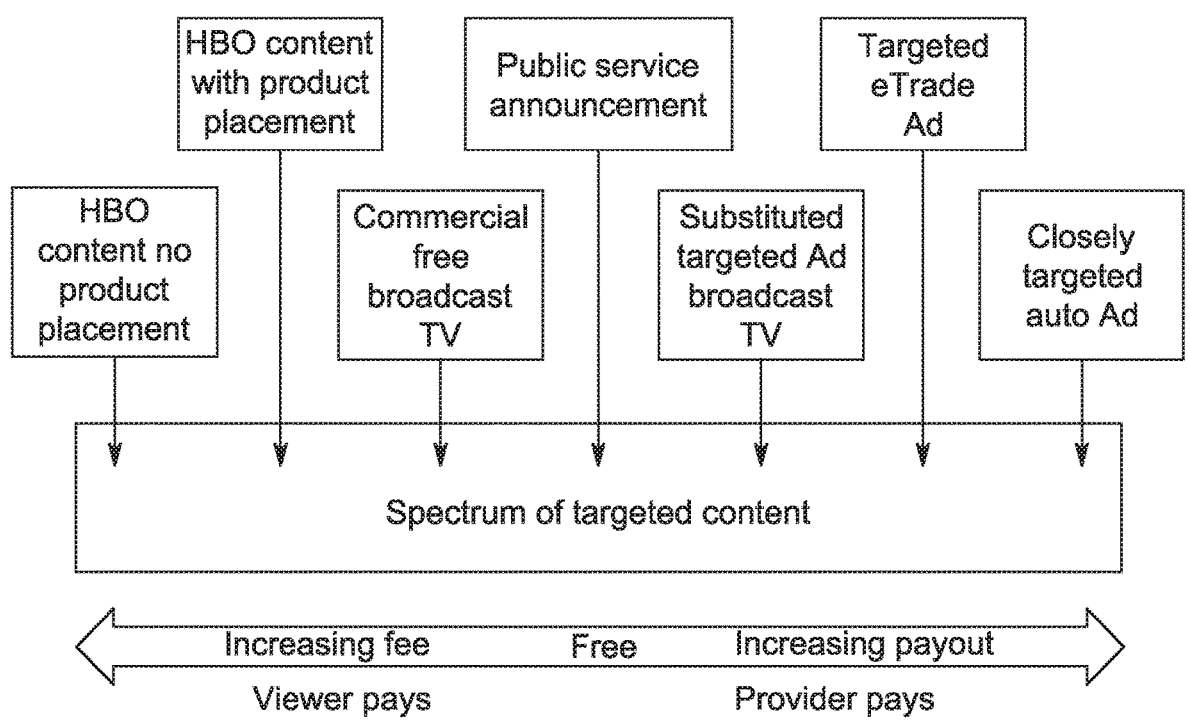
FIG. 8 is a diagram depicting the Spectrum of Targeted Content.
Figure 9:
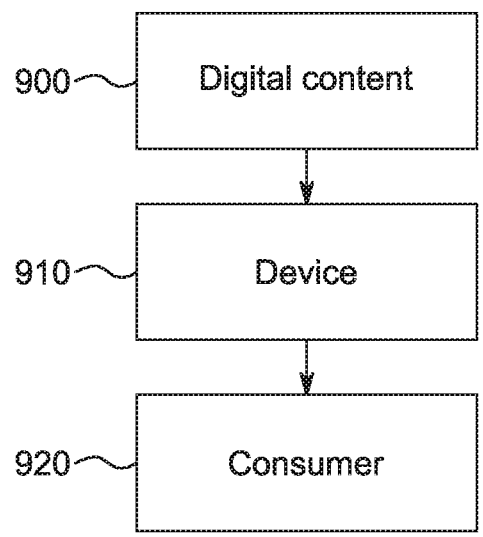
FIG. 9 is a diagram of the flow of digital Content to a Consumer.

Content is to be interpreted as experiential information delivered to a User and may include interactions and/or artistic expression such as video, audio, still photos, words, comic strips, and live performances. As shown in FIG. 8, Content varies across a Content Spectrum that may range from high-value/Premium Content to low or negative value Content—like advertising that pays Consumers (i.e. a User or a SyncGroup of Users). Content may be Targeted by selecting it based upon a Consumer's Profile information (e.g. an advertiser's search criteria matches information in a Consumer's Profile such as their demographics, stated interests, buying history, future intentions, etc.). The Arkiïs™ system provides mechanisms to overlay Targeted Content on top of minimally Targeted Content (i.e., Generic Content). As shown in FIG. 9, Digital Content (900) is Content that may be stored by digital means for subsequent reproduction on a Device (910) (e.g. a radio, television, or smartphone) on behalf of a Consumer (920).

An advertising overlay using a First Device—such as a television, radio, and/or other Alternative Devices—such as a smartphone or wearable device, which provide targeted advertisements that may be received in place of general (non-targeted) advertisements by a Consumer. A custom set-top box (e.g. DVR) or a streaming media service (e.g. on-demand television) may deliver the overlay. Advertisements may involve consumption of other sensory input (i.e., viewing, listening, feeling, tasting, and smelling).

In some embodiments, advertisements are overlaid on a television. For example, using both an Alternate Device (e.g., smartphone) and a First Device (e.g., television), targeted advertisements can be provided that are presented in place of general (non-targeted) advertisements. Overlaying can be performed, for example, via a custom set-top box (e.g., DVR), a cloud-based DVR, or a streaming media service (e.g., on-demand television). Targeted advertisements can be presented on the First Device and/or on the mobile device (e.g., the mobile device can be called the Alternate Device). There are embodiments for a Consumer (a User or a SyncGroup of Users). There are also embodiments without an Alternate Device (e.g., where only the mobile device(s) are utilized).

In some implementations, Users are grouped into a shared advertising group and can be grouped on the basis of contextual or User supplied information, rather than mined data. For example, a number of Users consuming the same Content can be grouped together (e.g., a number of Users viewing a football game on one or more televisions in a sports bar). Users can be grouped into a shared advertising group based, at least in part, on whether the Users participate in the same targeted advertising system and/or based on other criteria (e.g., Physical Proximity, Virtual Proximity, explicit grouping by the Users, etc.). Users can join or leave a shared advertising group (e.g., when a new User enters a location with an existing shared advertising group or when an existing User leaves the location). Two or more shared advertising groups can merge, and a shared advertising group can split into multiple groups. Independent groups can also be created at the same location (e.g., for a sports bar with multiple televisions, those Users of the sports bar watching a particular television can be grouped together).

In preferred implementations, Users are paid for receiving targeted advertising. For example, Users can be paid an amount based on various criteria, such as User Profile information (e.g., demographic information, purchase history, and/or other Profile information), Feedback (e.g., whether the User confirms that the advertisement was consumed, answers to specific questions, and/or other types of Feedback), etc. Feedback can also be used in determining future targeted advertisements to be presented to a User (e.g., to present a follow-up targeted advertisement to a User that expressed an interest in a particular Product or service during prior Feedback).

The following is an example usage scenario that illustrates one way in which the technology described herein can be embodied.

Ted and Mary have decided to buy a custom-made armoire from a local artisan to celebrate their fifth wedding anniversary. On Sunday afternoon, Ted logs into his Arkiïs™ Profile in the cloud and adds, to his shared marriage SyncGroup Profile, a listing indicating their intention to buy such an armoire on one of the next two weekends with a budget not to exceed $5,000. Based upon their individual Profile preferences, Ted receives an email and Mary receives a text message confirming the addition to their shared SyncGroup Profile. Mary reviews the text message and notices that Ted's listing in their shared SyncGroup Profile failed to include the fact that the furniture is to be crafted by a local artisan. Mary responds by texting back to Arkiïs™ the new listing with the word 'local' added to the description. Arkiïs™ receives the text and updates their listing to reflect her addition, sending a new alert to both Ted and Mary. Ted indicated in his Profile that he is most receptive to ads when he is alone driving home from work. Arkiïs™ has detected a pattern in Ted's behavior indicating that he is most responsive to ads delivered on Thursday afternoons on his way home from work in San Francisco, after he has been on the highway for two minutes. Additionally, Arkiïs™ has detected that Ted often travels with others on Wednesdays and Fridays due to his regular participation in SyncGroups with his carpool friends on those days. On Thursday, Ted is driving home and listening to his smartphone over his car's connected audio system. The Arkiïs™ app on his smartphone detects the Bluetooth or wired connection and surmises that Ted is in his car and communicates this to the Arkiïs™ cloud servers to include this information in his Profile. After he gets onto the highway, detected by the GPS on his smartphone, either his phone preferences and/or his Arkiïs™ cloud Profile preferences are matched against his current situation to detect an optimal time for message delivery. Arkiïs™ continues and checks to see that no other Arkiïs™ registered smartphones are in continuous ongoing proximity to his location and turns on his smartphone's microphone to listen for any other voice prints that might be in the car. Detecting none other, Arkiïs™ queries Ted audibly via his smartphone to see whether he is indeed alone and Ted confirms 'yes' which Arkiïs™ receives by way of his smartphone's microphone. Arkiïs™ knows that there are three local artisans that can meet Ted and Mary's requirements. The first is Jim's Custom Furniture that offers to pay him $20 to listen and respond to their two-minute ad. The second is Angela's Armoires that offers $30 to review and send Feedback on a three-minute television commercial. The third is Phillip's Fine Furniture that offers $60 if Ted is willing to take a five-minute phone call within five minutes of receiving a one-minute audio commercial, or if the call is declined after listening it only offers $10. With the knowledge that Ted is alone and getting on the highway, Arkiïs™ sends an alert to Phillip via text message, email, or phone call querying whether he will be available to take a call with Ted, if he agrees after listening to the commercial. Phillip acknowledges his availability. After being on the freeway for two minutes, Ted is told by Arkiïs™ that Phillip's Fine Furniture is currently selected to present a one-minute commercial now if he would be available after the message for a short phone call with the owner who is standing by and available. Ted can counter the offer, but instead decides to agree to the proposed terms and the commercial begins and Phillip is notified that the call is imminent. 30 seconds into the commercial, Arkiïs™ detects sudden deceleration in his smartphone's accelerometer due to Ted's accident avoidance braking together with a dramatically increased heart rate detected through his Arkiïs™ enabled smartwatch or smartphone-linked FitBit-like device. As a result, Arkiïs™ interrupts Phillip's advertisement because the advertising terms require attentive focus. Arkiïs™ then substitutes music known to be soothing to Ted. After Ted's detected heart rate lowers significantly and the car is traveling normally again, the music is faded and the advertisement is resumed by replaying from the last designated entry point before it was interrupted, in this case the beginning. This satisfies the agreed-upon payout structure that requires that the entire ad be listened to without interruption. While the ad is playing, Phillip's Arkiïs™ app calls an Arkiïs™ virtual conference room where he then waits for Ted. Alternatively, Phillip uses his Arkiïs™ app on his smartphone to call Ted's phone. Either Phillip's smartphone has Ted's number and calls him directly or Arkiïs™ blocks Ted's number and routes the call indirectly through an Arkiïs™ call routing center. Ted's Arkiïs™ app detects the incoming phone call from Phillip and automatically answers it without ringing or vibrating and places Phillip into an immediate hold. At the end of the one-minute message, Ted accepts the invitation to speak with Phillip and his phone retrieves Phillip's connection, sending an audible alert to Phillip to notify him that Ted is now on the line. Phillip greets Ted and proceeds to learn more about Ted's needs in-depth while showing how his Products will meet those needs. They wind up the call after six minutes with Ted agreeing to discuss visiting Phillip that weekend with his wife. Ted earns the full $60 having satisfied all the ad terms. Next Arkiïs™ serves up the two-minute ad for Jim's Custom Furniture. Ted is intrigued by their use of sustainably harvested wood from a local source. At the end of the message, Ted is queried about his interest and he audibly indicates that the local sustainably harvested wood was the most appealing feature to him from their message. Arkiïs™ sends Ted a message containing a link to a video where he can view examples of Jim's Custom Furniture that Jim has already selected to most closely match Ted and Mary's professed desires. The link includes notification that viewing the video within the next 2 hours will earn him another $5. During the rest of Ted's drive home, he listens to a podcast selected by Arkiïs™ about the history of custom furniture craftsmanship in America. While Ted is still on the road home, Mary finishes the calculus class she teaches at Foothill Community College and heads home in her car. She is offered ads from the same two companies that contacted Phillip. Because Ted expressed interest in Jim's Custom Furniture, their ad is presented first to Mary. Given Ted's Feedback that he loved that they sourced their wood from a local supplier employing sustainable methods, Arkiïs™ serves Mary an alternate advertisement where Jim highlights this point in much greater detail in a three-minute message that pays $20 and requires no Feedback. At the end of the message, because Ted sent his Feedback while using their SyncGroup Profile, Arkiïs™ asks Mary if she would like to hear Ted's Feedback to Jim of what he liked. Mary accepts and hears Jim's voice indicating his keen interest on having an armoire fashioned from local sustainably harvested wood. Mary is concerned that local wood may not offer the range of grains and tones she was imagining. Mary responds to Jim, and copies Ted, indicating that she was imagining an armoire made from cherry and walnut wood. Mary asks if these can be locally sourced, or if not, if there is a comparable wood that can be substituted. That evening after watching the third Provider's video ad and reviewing the follow-up pictures and videos provided by the other two, after discussion Ted and Mary make their final choice of Phillip. To purchase, they may call Phillip directly and have Phillip enter the purchase through a Square-like app (such as available from Square, Inc., San Francisco, Calif.) that links with the Arkiïs™ app and credits Ted and Mary for their performance. Alternatively, they can use their PayPal®-like account that is linked to/included in their Arkiïs™ Profile to pay Phillip. Additionally, they may make the purchase online using Phillip's Arkiïs™ enabled website that accepts their Arkiïs™ credentials as part of a PayPal® like purchase. Alternatively, they may go in person and supply their Arkiïs™ identification barcode that is swiped together with their credit card. Alternatively, their credit card provider may be linked with Arkiïs™ and transfer their credit card purchase data into their Arkiïs™ Profile. Alternatively, their credit card purchase data may already be collected by a website like Mint or Upromise and they have linked that website to their Arkiïs™ Profile so that all data collected by the third party is automatically integrated into their Arkiïs™ Profile in return for sharing a very small portion of their earnings or a fixed monthly fee debited from their earnings.

The following is another example usage scenario that illustrates one way the disclosed system can be implemented. Josh and Tyler share an apartment in New York City and decide to splurge on the new Xbox® One system. They have not chosen where they will buy it; however, they do want to ensure that wherever they buy it, the store provides at least a living wage to all its employees. Therefore, they edit their shared SyncGroup Profile to record their intent and requirements. During a Rangers game that evening, they receive a message from Arkiïs™ cloud servers that retailer J&R Music World® has recently put in place a living wage standard for its employees in New York as validated by a non-governmental organization their SyncGroup Profile indicates they trust.

6. User Profiles

Figure 10:
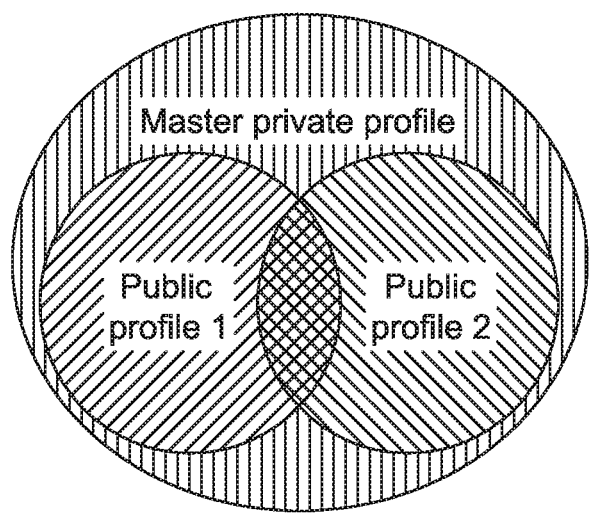
FIG. 10 is a Venn diagram of the relationship between a Master Profile and Public Profiles.

An Arkiïs™ User may control one or more Master Profiles that are connected to their identity and help to delineate their individual identity. Profiles may be persistently stored in one or more computer databases (e.g. object oriented, relational, etc.) for manipulation, query, and retrieval into computer processing memory, such as in a cloud server computer. As seen in FIG. 10, each Master Profile may contain one or more Sub Profiles of select information from the Master Profile of the User's choosing. Some Sub Profiles may be public facing. Public facing Profiles may represent how Users appear to others and contain the information a User specifically elects to share with others. In some embodiments, a User may remain anonymous from others by using a private Profile to anonymously receive Targeted Content from Marketers whose queries match their private Profile. Profiles may be a subset of a User's Master Profile, which in a preferred embodiment contains the maximum of their personal information available to be shared. Profiles may also be salted with false information to provide heightened User privacy. For example, whole fictitious Profiles unlinked to real Users may be created, and the use of this false profile information can trigger security alerts. In some additional embodiments, Profiles may be fictitiously created whereby one creates a separate persona for oneself, but payouts can be based upon the performance of that fictitious persona, for example, one can have a Second Life® persona which can be served ads that target that persona within the game. Fictitious Profiles may be created as either a completely new Master Profile that is unrelated and unconnected to any other Master Profile or as a Sub Profile that may override information from an existing Master Profile.

Individual Users may also control Sub Profiles for minor children and consequently control the subject matter of Content that reaches them. The minor children's Profiles may be configured to be accessible by proxy from one or more guardians' Individual User Profiles.

The User may select what portions of their Arkiïs™ Master Profile are included in a given Sub Profile to control the privacy of their information. The choices of what information to publish in their Profiles may change over time. In a preferred embodiment, no one is allowed to attempt to correlate and connect together any of a User's public facing Profiles without permission; however, internal to Arkiïs'™ servers, consumption history of the User's own Content across all of a User's Sub Profiles may be utilized for the purpose of avoiding oversaturation of similar Content messages.

To ensure the accuracy of Arkiïs'™ Content and to protect its integrity, Users may be required to prove their identity for a Master Profile through various means such as by successfully answering LexisNexis® identity questions. A User may be allowed to use the system without proving their identity, but in such cases, their rights and abilities may be limited for that Master Profile. For example, a User may not earn referral bonuses for the creation of other Master Profiles they referred if either the referrer or referral has not proved their identity. Additionally, a User may not be allowed to vote in the governance of Arkiïs™ if their identity has not been proven. In a preferred embodiment, Business Users never vote in the governance of Arkiïs™. A User may be given the option, for example through a check box on their Arkiïs™ preferences page, to begin using their Master Profile without proving their identity but later decide to supply proof of their identity and thus gain the rights and privileges granted to fully identified Users starting at the point they prove their identity.

In some embodiments, once a Master Profile is linked with a proven identity, all the other Master Profiles of that proven identity may be linked internally, however, the visibility of other linked Master Profiles may be hidden from Marketers. This allows the User some manner of privacy between their Profiles but might make recovery of their credentials to their unlinked Master Profiles more difficult depending upon the level of isolation. For example, providing the login account name of one Master Profile might allow recovery of the password from a linked Master Profile whose credentials are still retained.

Figure 11:
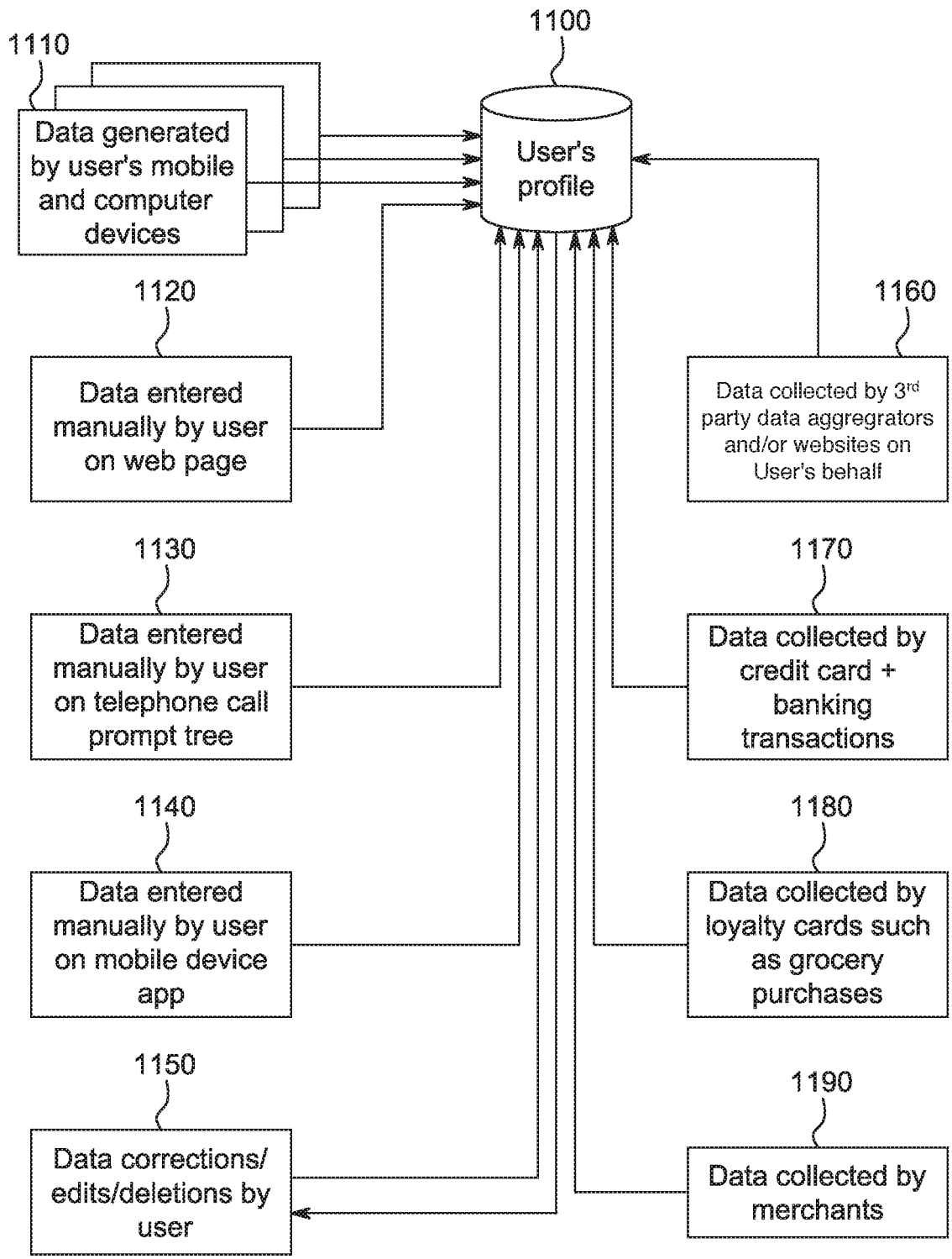
FIG. 11 is a diagram depicting many of sources of information for building a User's Profile in the Arkiïs™ system including corrections, edits, and deletions by the User.

An Arkiïs™ User may elect to register their existing grocery loyalty cards and credit cards to allow their Master Profile to automatically reflect actual purchasing decisions (as is already the practice with sites such as eScrip.com and uPromise.com) as illustrated in FIG. 11 with Data collected by loyalty cards such as grocery purchases 1180. Additionally, they may register their online accounts at merchants such as Amazon® (Amazon.com) and NewEgg (newegg.com) so that details of specific purchases may also be automatically included in their Master Profile. In some embodiments, social networking sites such as Facebook and LinkedIn may be integrated with your Arkiïs™ Profile to help you get recommendations (e.g. Sam is a friend of your best friend Mary, Sam has received the highest integrity rating grade from Mary, and Sam is a Champion of a Product that you are interested in.)

To ensure the confidence and trust of the User, the security of the Arkiïs™ system is carefully controlled and monitored. The User may configure the security controls that gate access to viewing and editing of their Profiles. Controls may include, but are not limited to, various biometrics such as face, voiceprint, and handprint recognition together with challenge questions they have configured to which generally only they know the correct answers, depending on the embodiment.

Figure 12:
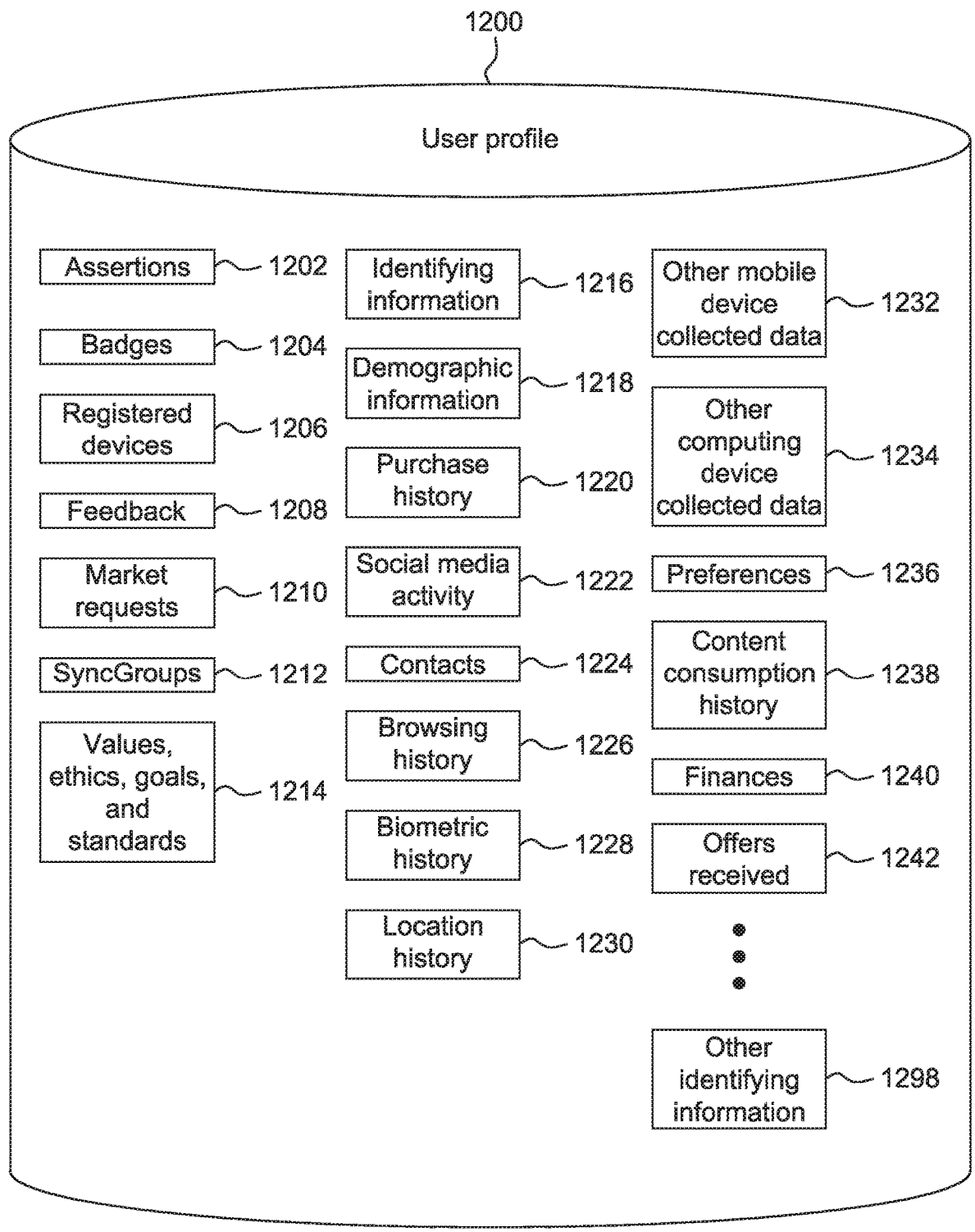
FIG. 12 is a diagram depicting a User Profile, that can be privacy protected, and many of the constituent pieces of a User Profile.

An Individual User's Arkiïs™ Profile as depicted in FIG. 12 may include information such as the following examples:

Proof of identity through answering a series of credit history questions provided by LexisNexis® (1216)
Income and their sources (1240)
Assets (1240)
Credit obligations (1240)
Mortgage/Rent obligations (1240)
Credit FICO® score for the three major bureaus (1240)
Gender (1218)
Sexual orientation (1218)
Religion (1218)
Political views (1218)
Age, Height, Weight, and Blood Pressure (1218)
Ethnicity (1218)
Education level (1218)
Children and optionally link to children's Profile (1224)
Marital Status and optionally link to spouse's Profile (1224)
Grocery purchases of individual and family as recorded through loyalty cards (1220)
Spending patterns of individual and family as recorded through linked credit card transactions (1220)
Consumer goods purchases as recorded through linked shopping sites (1220)
Geographical location information through linked Foursquare (Foursquare.com) account (1230)
Anticipated purchases and timelines of big ticket items (1202)
Advertising to which they desire or wish to exclude Content (1236)
Desired Products or features which are not available today (1210)
Badges earned for accomplishments (1204)

Registered televisions and cable providers (1206)
Reviews and ratings of Products (1208)
Persistent SyncGroups the User is a member of (1212)
Facebook posts and likes (1222)
Internet browsing history of pages visited and bookmarks (1226)
Wi-Fi networks visible from smartphone (1232)
Operating system and installed software on laptop computer (1234)
Google Nest data including preferred temperature and patterns of room usage at home (1234)
History of television shows watched on DVR (1238)
Coupons and rebates received and redeemed (1242)
Any other information that help identify an individual and that may be used for targeting purposes (1298)
Associations based upon values, ethics, public or private service (1214)

Figure 13:
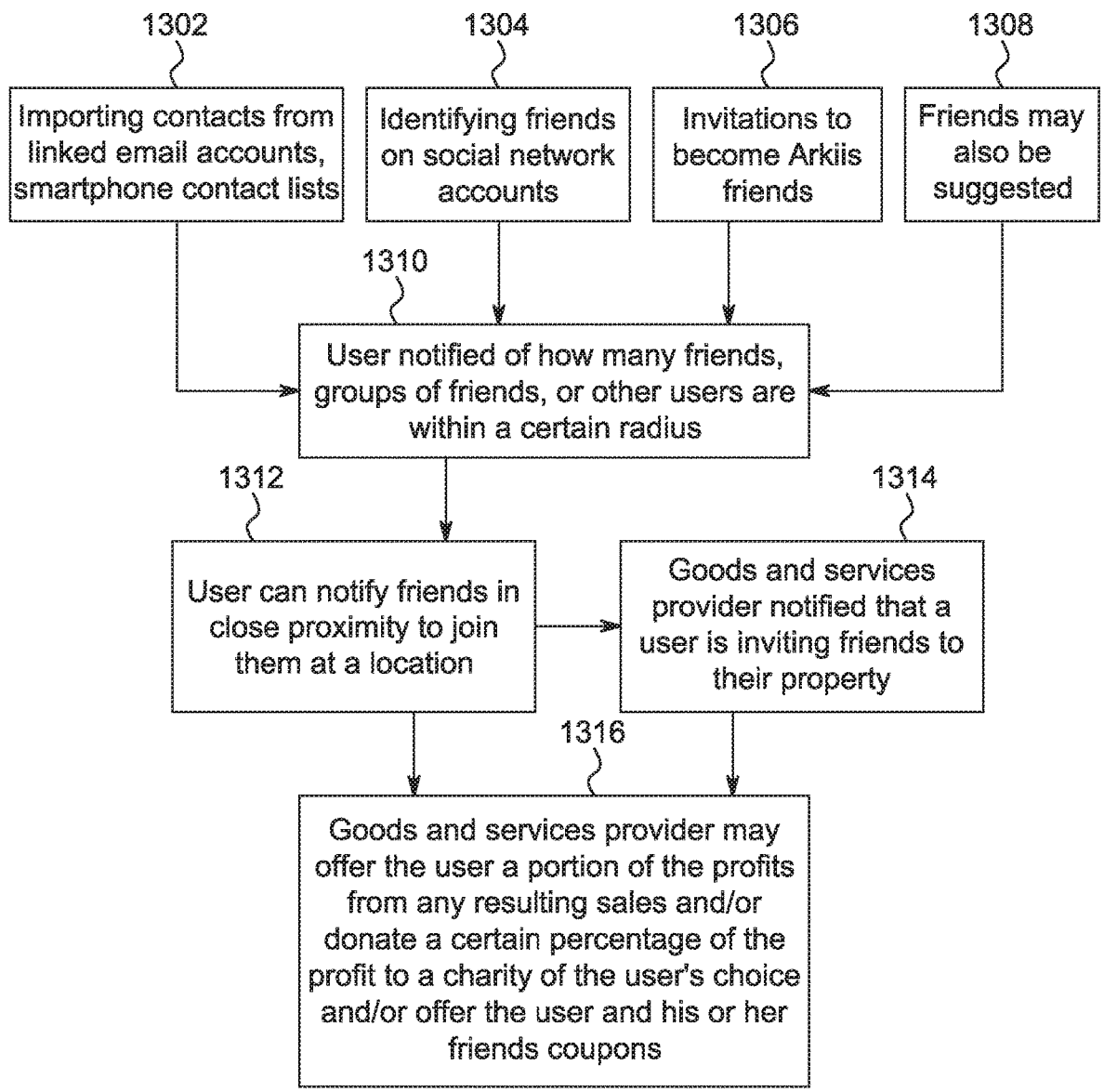
FIG. 13 is a flowchart of friendship, networking, and social media integration.

A User may elect to work with third parties to help and ease population of their Profile, examples of which are shown in FIG. 13 and illustrated in FIG. 11 with data collected by 3$^{rd}$ party data aggregators and/or websites on User's behalf 1160. For example, a User may choose to work with a Provider such as Google® or Facebook® to have their mined demographic information automatically populated into their Profile. The User may review and edit such automatically gathered data to make corrections and fill in missing details is illustrated in FIG. 11 with data corrections/edits/deletions by User 1150. In return for saving the User the time required to manually populate their Profile, Google® may receive a portion of advertising revenue that was targeted based upon Profile information derived from Google®. A User may also choose to partner with their credit card issuer to populate their spending history and provide third-party confirmation in return for sharing a portion of their revenues derived from such information as illustrated in FIG. 11 with data collected by credit card and banking transactions 1170.

Each custom targeted streaming source for a Device, whether it is a dedicated piece of hardware (e.g., local DVR or remote DVR), a Blu-Ray streaming application, a Roku™ channel, an HD radio, a tablet, or a smartphone, may be associated with its owner's Profile. In the case of source Devices that feed large displays that are shared, this Profile is often the owner's family's SyncGroup Profile. Registering a shared Device eases deducing the audience due to the association with its owner's Profile, minimizing the chance that another adjacent User's settings will influence the Device's presented Content. A Device's registration status may be stored within a database, allowing for simple identification of all Devices linked to a User. In some embodiments, numerous Users may register the same Device, either submitting a hierarchy of Users to determine whose settings override the settings of other Users linked to the Device or jointly agreeing on the Device's settings (through creating a Sync Group for the Device, or submitting some form of mutual consent). When multiple Users register a shared Device, this further simplifies deducing the audience in a situation where multiple Users consume Content from a Device frequently.

For personal Devices, the Consumer is generally assumed to remain static unless otherwise explicitly overridden (e.g., my daughter is using my tablet to view Content). However, depending on the embodiment, different heuristics can also be applied to detect alternate Users (e.g., other family members). For example, the Premium Content consumption patterns may suggest that someone other than the registered owner is using a personal Device. Facial recognition and gesture patterns can also be used to detect alternate Users. When an alternate User is suspected, they may be challenged to provide the owner's password if they claim to be the owner or may select from suggested alternates and enter their own password. When an alternate User is selected, any of their personal Profile Filters or parentally assigned limitations may apply in addition to or instead of the owner's Filtered or parentally assigned Content limitations depending on the embodiment.

The owner of a source Device may place strictures upon what Content may be consumed on a Device registered in their Arkiïs™ Profile. Any Filtering requirements may be honored regardless of whether the source Device owner is present.

The following is a description of an embodiment of the Arkiïs™ system where a Device is linked to a Profile: Michele is the owner of a sports bar and has strong beliefs about the need to consume Products made in the USA and has configured her Profile so that no ads for non-USA made goods may ever be displayed on the screens in her sports bar that are linked to her Profile. When the Google® cloud servers stream Content to her configured screens, the Google® servers first query the Arkiïs™ servers for approval based upon her Profile so that Google® may deliver Content that meets her requirements. The only way to receive such Content that does not conform to Michele's requirements in her sports bar is on a different User's personal mobile Device brought into the bar.

Figure 14:
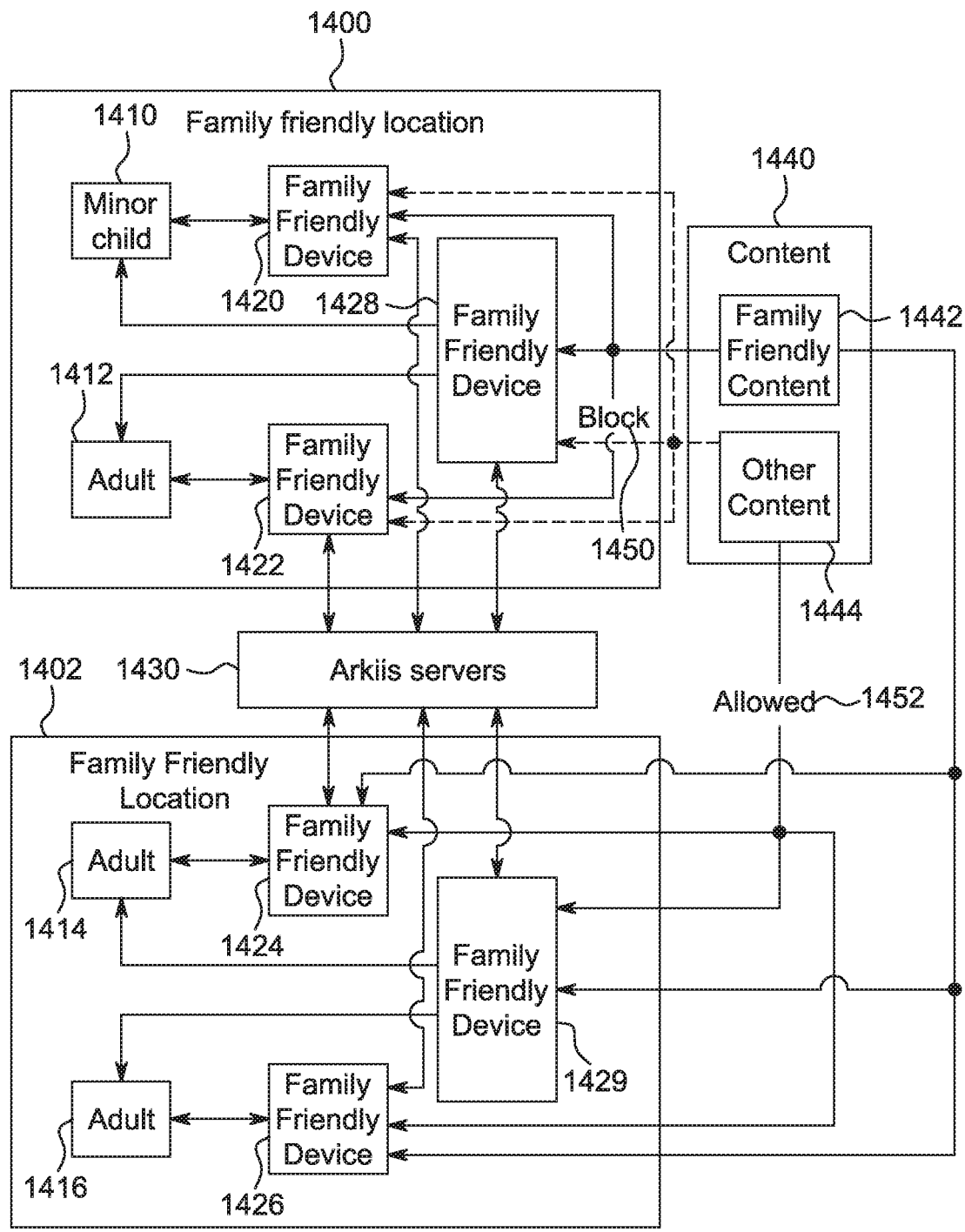
FIG. 14 is a diagram of the workings of a Family Friendly Location.

Similarly, as shown in FIG. 14, minor children (or other content controlled User) (1410) may be tagged with Filtering requirements to limit, modify and/or control the Content (1440) they are exposed to. A child may be tagged by registering a Device (1420) generally present on the child and tracking the tagged Device's distance from other Family Friendly Devices (1428) such as a shared television and other Adult (1412) Family Friendly Devices (1422) such as a personal mobile device that are presenting Content (1440), as well as submitting the child's face, likeness, or voiceprint to secure Arkiïs™ servers (1430) for automatic recognition and subsequent Filtering. Furthermore, if multiple Devices are listed in the Arkiïs™ servers (1430) as being located in the same house or dwelling or location (1400), each of the linked Devices may be configured as family friendly engaged when the child (1410) is tagged as being located near any of the Devices (1422, 1428). Devices may be configured and/or locked down to be Family Friendly engaged, and when so configured, adhere (e.g., always adhere) to the strictest parental control or parent/guardian-defined Content Filtering (1450) settings in any situation that is known to include children, in such configuration, Devices only reproduce authorized Family Friendly Content (1442) while Filtering (1450) out all unauthorized Other Content (1444). Depending on the embodiment, such Filtering may include controlling what files, websites, audio, and video may be accessed with a Device. When a child enters an environment or location (1402), such as another family's household with more relaxed Filtering requirements or presently allowing (1452) unauthorized Other Content (1444), all Family Friendly Devices (1424, 1426, 1429) such as Adult (1414, 1416) personal phones (1424, 1426) and televisions (1429) may automatically honor the stricter Filtering requirements placed upon that child and only reproduce authorized Family Friendly Content (1442). In some embodiments, the foregoing more restrictive filtering may include locking down previously allowed (1452) downloaded Content on such Devices so that such Content cannot be accessed or reproduced during the minor child's presence. An immediate audio, visual, or tactile alert may be sent by Arkiïs™ servers (1430) to any or all Devices of profile-configured guardians/Adults (1412) if a child ever comes in contact with a Device that is not an engaged Family Friendly Device. A parent may view a log of all the Marketing and Premium Content (1440) that has been served up to their child in the recent past, to monitor and be aware of what they are watching when out of their direct supervision. In some embodiments, a registered parent or guardian may request a certification through Arkiïs™ that some or all Devices registered to a different family were engaged as family friendly during the duration of the minor child's stay. In these embodiments, data is sent to a database every time a User's or household's Family Friendly Content mode is engaged or disengaged on a Family Friendly Device to facilitate this certification. In a preferred embodiment, a Device can be guaranteed to remain family friendly engaged for a set period and not allow relaxation of the control until the guaranteed time has elapsed. Advertisers may also place their own restrictions and refuse to advertise in situations where unauthorized children might see their messages.

As shown in FIG. 15, Content Producers (1510) may agree to voluntarily label, classify, and/or tag the Content (1520) they produce along various metrics that may be used for Filtering (1550). Consumers (1560) do not receive (1570) Content (1520) that is Filtered (1550). Such designations may be attached to the work as a whole or on individual sections or pieces of a work (e.g. on specific dialog or text words or on subsections of a photo or video). Producers that inappropriately label/tag their Content may be required to pay penalties and fund third-party certification during a probationary period. Arkiïs™ Consumers (1560) may choose Profile preferences (1540) for Filtering (1550) all Content supplied by Content Providers (1530) through third-party Independent Reviewer Certification (see Section 11—Providing Feedback on Content, Goods, and Services), which may audit such labeling, tagging, and or classifications in return for a portion of Targeted Marketing Content revenues related to the consumption of such Content in some embodiments. Any User may flag Content as inappropriately labeled, tagged, or classified. Producers found to repeatedly produce Content that is inappropriately labeled by a representative plurality or by a competent, certified review panel may be barred from participation and have all their Content treated as being inappropriate for all children whose Content is filtered. In addition, a generic or specific child certificate may also be employed as a backup for new advertisers to self govern whether they send a new advertisement (not yet vetted by others) to self regulate what may be sent to that child. Such certificates may also be utilized in the same manner for adults. Other controls may be employed to prevent inadvertent exposure to material that a Consumer has stated is undesirable.

When Content is delivered through Arkiïs™ cloud servers, such as when viewing a personalized Roku™ channel, Content may be individually customized and automatically censored when delivered to such feeds to "bleep out" or substitute profanity or other Content matching a User's Filtering preferences, depending on the embodiment. In alternate embodiments, portions of videos or images to be Filtered may be overlaid with checkerboard pattern substitutions to obfuscate portions deemed inappropriate. Arkiïs™ may be presented with a feed without any Filtering and perform transformations on it to automatically Filter and replace objectionable portions, as determined by a particular User's Profile, before forwarding the feed on to that User. In both audio and video, the original signal may contain tagging to aid automated Filtering and/or analysis may be applied to automatically block Content when tagging is absent or suspect. In other embodiments, a Content feed may be delayed by a few seconds so that the Arkiïs™ servers can detect profanities and other inappropriate Content through audio and video recognition, then censor the inappropriate Content before showing it to a viewer.

The following two example embodiments portray different Family Friendly Device settings possible through the Arkiïs™ system. Richard and Phoebe do not want their children to be exposed to messages promoting alcohol, drugs, or smoking and have therefore configured all the screens in their house and all their family's mobile devices to prohibit any advertising or entertainment that contains non-Family Friendly Content which promotes any of these activities. Additionally, they have flagged their children's Profiles with this limitation and before allowing their children to go to a friend's house, they first confirm that the Devices in that child's home are configured to unconditionally honor their filtering requirements with a Family Friendly Device engagement registration guaranteed for at least the time they will be in attendance at that house. In the event that somehow their children are exposed to such messages or enter an environment where there is a potential for such, the Arkiïs™ cloud servers detect this and immediately send an alert to both parents specifying the details of the violation, or in the case of a potential violation, giving them the ability to outbid such undesired messages before they can appear. Before going out to a restaurant, they also first confirm that the restaurant is a Family Friendly Location and thus adheres all its Devices to all child Profile Filtering requirements. They may check a restaurant's Family Friendly Location status in many ways, including, using the Arkiïs™ website to look up the restaurant, viewing the restaurant's Arkiïs™-enabled Facebook page, sending a text message with the establishment's telephone number to a special Arkiïs™ number that automatically texts back the status of the requested phone number's establishment, sending a request via an Arkiïs™-enabled Twitter hashtag, entering the proximity of the restaurant and checking their Arkiïs™ app on their smartphone for statuses in their vicinity, etc.

Juan and Clarita are married and have two girls, ages 13 and 15, and configure their Profile to only accept advertising that is labeled as Family Friendly Content by the independent Family Values Coalition (FVC) non-profit that has 12 million subscribers in the Arkiïs™ network. The FVC enlists the aid of volunteers like Juan and Clarita to review Content (including both premium and advertising) and use the Arkiïs™ cloud servers, by way of for example their smartphone, to give it a letter grade of 'A', 'B', 'C', 'D', or 'F' to indicate how well the Content represents the "family values" they wish to bring to their family. Alternatively, they use the Twitter network of cloud servers to report their grading and Twitter automatically links with their Arkiïs™ Profile to register their grade. Juan and Clarita have designated that only Content achieving at least a 'B' on this scale is to be served to their family They decide to watch "Castle" (a crime drama) but the software Filters out the latest episode that features a murder with a backdrop of sexually provocative dancers that is given a 'C' rating by FVC and instead they view an older episode rated with a 'B' that Arkiïs™ knows they have not previously viewed. Because they have a well-established Profile in Arkiïs™ and a household income of $90K, they only need to view two 30-second commercials to cover the cost of the hour-long "Castle" episode they are going to watch. They decide to watch these two commercials up front. Their Arkiïs™ Profile indicates they do not drink alcohol so two beer commercials that would have otherwise bid the highest are rejected. Instead, the first commercial is for automobile insurance and specifically targets their situation of having a teenager who is about to begin driving with a program that recognizes her good grades in school and offers a lower rate as a result. The second commercial is for a Disney cruise ship 5-day family vacation in the Caribbean that caters to families with teenagers. Because their Profile indicates that they are Latinos and that Spanish is their preferred language, both commercials are presented with Spanish audio and feature Latino actors. Both commercials were rated an 'A' by the FVC and after paying $2 for the otherwise commercial free viewing of "Castle" they still net $1 in earnings. After each commercial is viewed, the system pauses briefly while all four are queried for Feedback on their smartphones with specific questions based upon their individual Profiles. Once all four have provided their Feedback on their smartphones, their Arkiïs™ app forwards the Feedback to the Arkiïs™ cloud servers, the servers are also providing the streaming Content and the playback on their television automatically resumes. After the "Castle" episode completes they are also asked on their smartphones to rate that episode on the Family Values scale. They also rate how well they enjoyed the programming and which aspects were the most appealing so that future Premium Content system recommendations from the Arkiïs™ cloud servers can be more effective.

Figure 16:
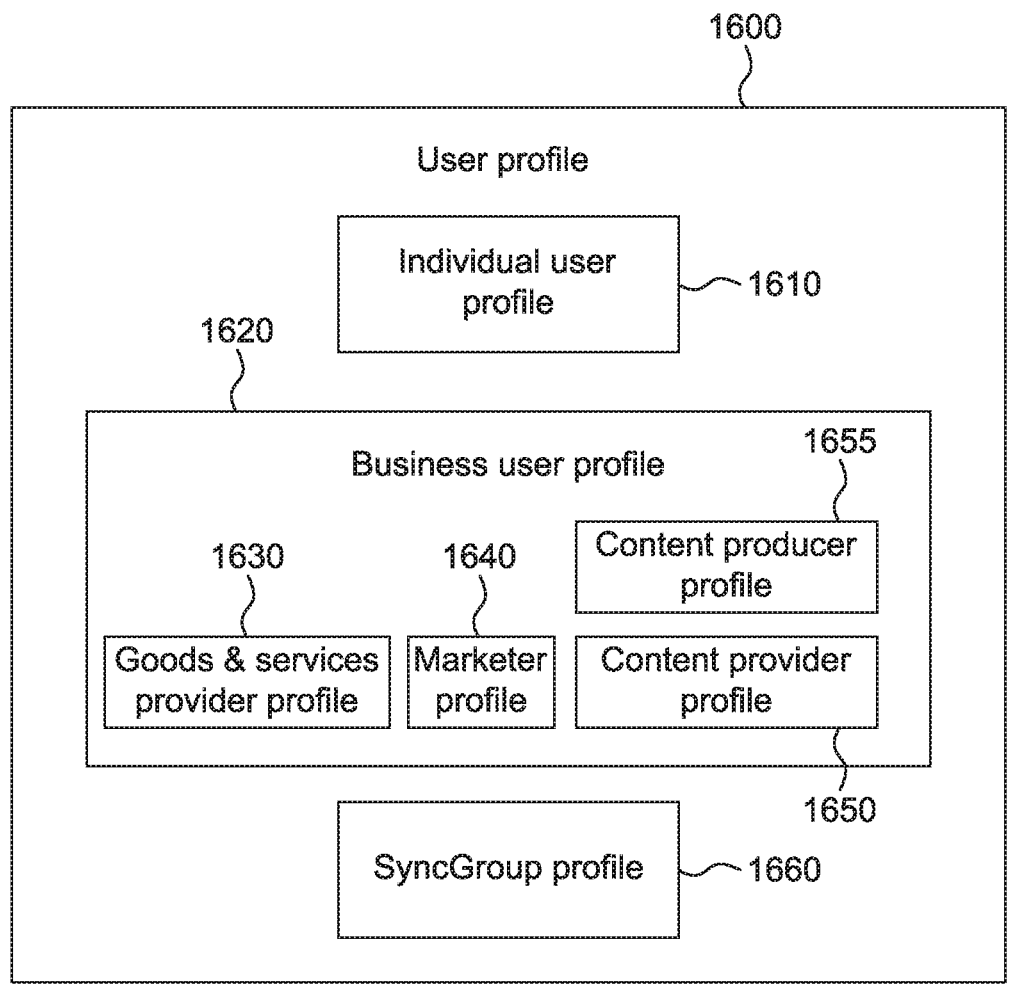
FIG. 16 is a Venn diagram showing the different kinds of User Profiles.

FIG. 16 is a Venn diagram that shows the various kinds of User Profiles (1600). In a preferred embodiment, Business Users may have and control Business User Profiles (1620) for their business similarly to Individual User Profiles (1610). At the point that an individual person (e.g., an employee) working for the business interfaces with Arkiïs™ on behalf of the business, they use an individual business Sub Profile that is owned and controlled by the individual. A business has administrator (i.e. root) privileges over its individual Sub Profiles and can, for example, change the access level/rights or delete Sub Profiles if desired (e.g., due to an employee leaving the company).

Just as Individual Users have Profiles, other business Participants have Profiles such as Content Producer Profiles (1655), Content Provider Profiles (1650), Marketer Profiles (1640) and Goods & Services Provider Profiles (1630) have their own Business User Profiles (1620) in the preferred embodiment.

A Business' Arkiïs™ Profile may include information such as the following:
  Proof of identity (e.g., government/certified documents)
  Revenues, expenses, debt, and capital
  Average, median, lowest, and highest wages of employees
  Contractors providing services to the company
  Benefits provided to employees such as health insurance and retirement
  Philosophical vision and goals of the company
  Goods and Services categories and specific Products for sale and/or planned for production.
  Location(s) of stores or venues
  Indexes of Products sold that specify their variations (e.g. different sized packaging, different movie cuts), showings, price, inventory and location(s) within store(s) and may include aisle and shelf designations as well.
  Hours of operation and performance schedules
  Competitor(s)

In some preferred embodiments, Arkiïs™ also has provisions to accommodate those Participants (i.e., Consumers, Reviewers, Marketers, Content Providers, Content Producers, and Goods & Services Providers) who may prefer complete anonymity for some interrelationships and thus wish to, for example, review, market, produce/provide Content, or buy/sell goods and services that are provided through Arkiïs™ with cash or the like. Some Participants may choose anonymous interactions by default and only explicitly select to reveal their identity, on an interaction-by-interaction basis. To achieve this, a Participant may create a secret virtual identity Profile and bank account and privately fund it with traditional currencies (e.g. US dollars) and/or cryptocurrencies (e.g. Bitcoin). For Users, this may be done in two ways, either by creating a separate anonymous Master Profile, or by creating a new anonymous Sub Profile in their already existing Master Profile. They then may use their anonymous Profile to purchase or sell goods that are, for example, paid out of or into their funded bank account and delivered to or picked up from a prearranged locker box. Such mechanisms allow the Participants to have the anonymity of cash or cryptocurrency while still being a part of the reviewing, marketing, delivery or shipment of goods & services to and from a convenient location, such as their home.

Alternatively, if the User desires anonymous shipment to their home or from their business, the seller may be given a coded address label from Arkiïs™ to anonymously address a package and ship it with a standard shipping service. The seller may only know the cost to ship the package and perhaps its zone or general delivery area, but not its exact destination. This approach may also be applied to delivery to and from drop boxes. To help ensure privacy, the tracking software to ship the package may use a system analogous to Tor's onion routing Internet communication (see wikipedia.org/wiki/Onion_Routing) to hide the addresses of the sender and receiver, only in this case, even the sender and receiver do not know each other's address, it is only the Arkiïs™ system that has this knowledge. The Arkiïs™ system may know the sender and receiver Profiles and may compute a circuit or route for the package's delivery. Arkiïs™ may then provide the original delivery circuit information and pricing to the shipper in an encrypted or coded format. This may, for example, include attaching the package to a reusable individual token generating apparatus where the tokens are required to prove the package's identity and location in order to learn each next step in the circuit from sender to receiver. Alternatively, at each step of the circuit, the shipper may contact the Arkiïs™ servers to retrieve the next step of the circuit after proving the location and identity of the package by providing, for example, a code number. In such a system, the Arkiïs™ servers may no longer respond to requests for the next code number once a code number has already been processed. This may take effect immediately when the next code is provided or occur once the package has proceeded to some number of steps forward along the circuit or continuum of distribution. Alternatively, the shipper may only know the general originating area and delivery area and compute its own circuit or route between these, and only contact Arkiïs™ for final delivery instructions. An anonymous buyer may receive a code from Arkiïs™ that allows the bearer to retrieve the package without further identifying themselves.

The following example describes how anonymous shipping may be implemented in the system. Justin wishes to anonymously ship his package to an anonymous purchaser through Arkiïs™. He purchases shipping for $10.85 and receives instructions to use UPS. He prints out an 18-digit alphanumeric coded anonymous address label provided by Arkiïs™ in consultation with UPS that represents the circuit or route to the destination. To help maintain his anonymity, Justin deposits the prepaid package at a UPS drop box in Eugene, Oreg. When UPS picks up the package, they bring it to the Eugene pickup center where a location aware scanner that is registered with Arkiïs™ reads and submits the 18-digit code to Arkiïs™. Arkiïs™ verifies the Eugene UPS location and scanner as valid together with the package code and provides a new code that is put on the package in place of the first code. The new code directs UPS to send the package to Springfield, Oreg. When the package arrives in Springfield and is location scanned, Arkiïs™ provides the next package code and removes the original Eugene package code from its outward facing servers to hinder any reverse engineering to determine the package's ultimate sender or receiver. The supplied next code directs UPS to now send the package to Portland, Oreg. At Portland, the Springfield code information is removed from the outward facing Arkiïs™ interface and the next code is generated for the package to now be sent to Ontario, Calif. However, due to error, UPS misroutes the package to Dallas. When the package is location scanned in Dallas, the error/exception is detected and Arkiïs™ adjusts the route in consultation with UPS to omit Ontario and instead go directly to Oakland, Calif. and generates a new 18-digit code to route the package to Oakland, Calif. while clearing the Portland code information. Once location scanned at Oakland, the Ontario code is removed and a new code is generated to take the package to Sunnyvale, Calif. Once the package is location scanned in Sunnyvale, the recipient gets a notification that their package has arrived at the designated UPS location and may be picked up using their retrieval code or they may release an address for delivery. The final route information is expunged from the Arkiïs™ outward-facing servers.

Even though the Participant may be using an anonymous Profile, they may still receive credit for their performance Anonymous Feedback may be provided for any interaction a Participant engages in or is connected to. When such Feedback is subsequently reviewed, it may be identified as anonymous.

Before initiating an interaction, a Participant may opt out of the right to provide Feedback or to have Feedback written about them. This election is divulged to the interacting parties.

In a preferred embodiment, a User may elect to temporarily select a contrived Profile that does not actually reflect their demographics, this may be for the purpose of seeing what would happen to their Targeted Content were aspects of their real Profile to change. This mode is revealed to the Content Producers who may prohibit their Content from being consumed under hypothetical Profiles. In preferred embodiments with this mode enabled, actual advertising payouts and Premium Content charges are still based upon your real Profile, although you may be able to see what the payout or charge would have been under the hypothetical Profile, were it to be actual. One way this feature might be used is to see what it can feel like to be a multi-millionaire. From an earlier example, a Consumer interested in looking at yachts, but without the means or intention to purchase one, may explore the subject through such a hypothetical Profile. In such a manner, the Consumer's integrity rating of their Profile is undamaged or otherwise affected.

A User may also elect to enter a mode where they are represented by a fictitious Profile or avatar that represents a virtual persona that they take on in virtual worlds such as video games. In one embodiment, a User may enter this mode by selecting an option within their settings page that specifies that all activity will be attributed to their virtual persona Profile until the option is deselected. Such designation may occur on one Device but may apply to one or more other Devices. Alternatively, such designation may be specified to automatically be activated or queried for confirmation when one or more conditions occur such as being in Proximity (Virtual or Physical) of one or more particular Users, based upon a calendar or time schedule, based upon an activity or purchase, based upon arrival or departure to or from a location, based upon a Device, based upon an application being entered, particular Content or genre of Content being consumed, etc. This allows the User to more fully engage in the role-playing of their persona and receive ads that target their virtual persona. In this mode, the User may earn payouts but the payouts are determined by the performance of their persona-specific Arkiïs™ Profile. For example, a User may appreciate playing Second Life® and may create an Arkiïs™ persona or avatar that represents their alternate identity in Second Life®. This allows them to receive in-game advertising that is targeted to their persona to purchase in-game goods for their persona.

A User may snapshot, borrow, or copy a Profile from a friend to help build a fictitious Profile. This may be done with their friend's permission. In some preferred embodiments, fictitious Profiles may import or auto-fill data from other Profiles, and may prompt Users to manually input certain fields or approve their importation. Such Profiles may be useful for the purpose of selecting a birthday gift that is well suited for a friend. These Profiles may be further contrived or edited such as to adjust financial demographics to more closely align with any User. Users may also adjust preferences in order to limit such a Profile to overlaps between their own Profile and their friend's tastes and preferences. In some embodiments, overlaps between a User's Profile and their friend's Profile may be determined by analyzing shared interest keywords or similar browsing history data. Alternatively, any similar, common, or shared demographic information may be emphasized. Similar, shared, or common forward looking Assertions may also be emphasized. This may be useful for identifying a gift that can appeal to both themselves and their friend or to find a gift they can share together. Such joint Profile generating techniques may be correspondingly applied to SyncGroup Profiles, for example, using a husband and wife's SyncGroup Profile to buy a wedding gift for their friends based upon their wedding SyncGroup Profile or alternatively for a couple to buy a birthday gift for a shared friend, or alternatively for an individual to buy a wedding present for a SyncGroup couple. Such Profiles may be informed by what objects or activities feature most prominently in your life in order to help others effectively shop for you.

The following example shows how a User may create and utilize a fictitious Profile combining the interests of multiple Users. Kevin is shopping for his friend Lisa, and the shopping website he visits links into Arkiïs™. During shopping, the browser app accepts Kevin's Assertion that he is shopping for Lisa and, honoring Lisa's permission settings, Kevin's shopping is guided and he may see Lisa's information including: her interests, her wish list, things she is looking for, proposed gift's correlation with other things she already owns, and Assertions of gifts she desires from Kevin. The shopping site displays a score on each possible gift to rate Lisa's likely reception of the gift as determined by Arkiïs™. Such grading may take into account emotional appeal, whether she needs it right now, whether it is on her wish list, its practicality, her likely emotional response, and coordination/match level with her wardrobe. Kevin does not have full access to Lisa's actual Profile, but is limited to seeing what is necessary and according to Lisa's permission settings, e.g. it does not disclose what kind of toilet paper she uses, or show intimate details about her personal hygiene or hygienic purchases. Such a search includes the price point Kevin is looking for and the prediction that Lisa will like it. Kevin may get ads targeting him based upon this purchase intent for Lisa; such ads may be ranked based upon the likelihood of Lisa liking the Product. While shopping for Lisa, Kevin may be targeted based upon other aspects of his Profile unrelated to his gift buying for Lisa. Such ads may relate to purchasing for him or for gift buying for others he has asserted. While his focus may be upon buying for Lisa at a given point in time, he may fortuitously come across other opportunities that are particularly well suited for his current context and thus may warrant interrupting his search for Lisa with these other targeted ads. Such ads that deviate from his immediate goal may be clearly marked as detours that may be advantageous, allowing him to decide for himself whether he wants to take any such detours.

Users may choose to associate their Profile with any wearable gadgets they adorn that change their appearance based upon their location, context, and other Users around them. For example, a t-shirt may contain a display (e.g. through use of LEDs/light-emitting diodes) that varies the Content shown based upon their interaction with other Arkiïs™ Users in their vicinity to display their shared rankings and or interests related to their carbon footprint, charitable giving, music, professional activities, sports, achievements, awards, etc. Alternatively, Users may share such information to a computing device in the possession of those physically near them or virtually interacting with them. A User may alter their Profile settings to automatically share information (or configure to query for approval) with other Users in physical or Virtual Proximity, or may actively share selected Profile facts with friends or Users in physical or Virtual Proximity at any moment, or may be prompted to approve sharing of information requested by those in physical or Virtual Proximity A User may have different levels of such divulging of information about themselves. They may choose to manually increase the level over time. Alternatively, Arkiïs™ may automatically assess a User based upon their Profile information, such as their integrity rating, and choose the level of revealing of information based upon preselected Profile controls.

Users may also choose to allow the Arkiïs™ cloud to utilize their identity information and associate it with information collected by a computing device in the possession of those physically near them or virtually interacting with them in order to provide hints to help facilitate the identification of individual sources within such collected data. For example, Alice may be speaking to Bob and alerted by Arkiïs™ (e.g. via text message or an Arkiïs™ smartphone alert) that Bob's smartphone is recording and her voice and Arkiïs™ cloud servers may use Alice's Physical Proximity to Bob, as indicated by Alice's smartphone being in proximity to Bob's smartphone or by their being joined together in a SyncGroup, as a strong indicator to the identification algorithm used in the Arkiïs™ cloud servers that one of the identified voices in Bob's smartphone audio stream is highly likely to be Alice. Alternatively, when Bob takes a photograph with his smartphone while they are near each other, there is a strong indicator to the identification algorithm in the Arkiïs™ cloud servers that one of the faces and/or bodies identified in Bob's smartphone picture is highly likely to be Alice.

In a preferred embodiment, Arkiïs™ members receive a Marketing Performance Score (which is analogous to a FICO® credit score and is a specific kind of integrity rating) that varies from one Product or service to another and is objectively based upon professed and demonstrated preferences, forward-looking Assertions (e.g. I'm getting married in March), past purchasing behavior, track record of fulfilling their own previous predictions, and other measureable behavior data in their Profile. If a Consumer lacks a track record with respect to fulfilling their own previous predictions in a given area then Arkiïs™ instead deduces an average track record based upon similar Profiles. A Profile may be considered to be similar by the use of marketing geodemographic segmentation, or in other embodiments, the use of multivariate statistical classification to discover whether Arkiïs™ Profiles segment into different groups whose marketing performance scores are closely correlated. For example, statistical analysis may reveal that single, college educated women aged 25-30 are 82% likely to fulfill Assertions related to durable goods purchases with a time horizon of six months or less. Alternatively, when a Consumer lacks a track record in a new area, their score can be predicted by looking at their track record in other synergistic areas and finding like-minded Profiles of others in those areas that also have a track record in the new area and using these like-minded individuals to predict the Consumer's behavior in the new area.

The following is an example usage scenario of the disclosed system. Phoebe has a 95% rate of fulfilling her purchase predictions in consumer electronics and has recently made a bunch of predictions about purchasing household appliances for which she does not yet have any track record. Therefore, her Profile is matched against other Arkiïs™ Profiles for individuals with similar demographics and who also have a similar rate of fulfilling their predictions in consumer electronics. These matching profiles are then used to predict her fulfillment rate in this new area of household appliances. The prediction weights the predictive factor from matching Profiles based upon how well those Profiles correspond to her own profile.

To assist in building a Profile that includes detailed and objective information, Arkiïs™ allows Consumers to link their Profiles as illustrated in FIG. 11 (User's Profile 1100) with data aggregators such as credit card companies (data collected by credit card and banking transactions 1170) and merchants (data collected by merchants 1190). Members may also enlist an expert (or a parent may act as an expert for their child) to build and automate the continued expansion of their Profile in order to optimize their payouts in return for a small portion of the gain. A User may enable the access to their Profile by such an expert who may access their Profile using login credentials unique to that expert but with proxy access to the User's profile so that the expert may make changes to the Profile as if they were the User but creating an audit trail that identifies the source of such changes as being the expert. These independent sources of information, together with other information such as personal and professional references, help to increase the accuracy of their score, leading to greater payouts. For example, Jim's credit card purchase history helps validate his ability to buy a new BMW® sports car that was also recently purchased by his close friend, Andy, both of these facts support the accuracy of the high score he received for buying the BMW® in the next two months.

Arkiïs™ may deduce which aspects of a User's Profile are not easily automatically built from collected data sources and occasionally prompt the User to fill in some of these details. For example, a large portion of a User's Profile may be automatically built from the details of their purchasing histories, but statistical analysis may show that purchase histories poorly correlates with a User's political preferences, therefore, a User may be asked to manually supply information about their political ideology such as illustrated in FIG. 11 data entered manually by User on web page 1120, data entered manually by User on telephone call prompt tree 1130, or data entered manually by User on mobile device app 1140. Similarly, purchase history may not correlate with a person's eye color, and thus a User may be asked to supply the color of their eyes. This allows Arkiïs™ to gather details of a User's Profile via periodic prompts over time to build up the Arkiïs™ Profile with greater depth. Such prompts may include simple questions with simple multiple-choice answers to allow easy responses from the User analogous to dating compatibility questions on OkCupid®. Depending upon answers supplied, subsequent questions may be adjusted to account for previous answers and follow on questions may drill down for more detail in areas of interest to advertisers based upon previously supplied answers (through use of, for example, filter or contingency questions) as demonstrated by those advertiser's search criteria and payout offers.

In some embodiments, advertisers may place a premium on targeting based upon more detailed information and thus pay more for ads delivered to Users with matching detailed Profiles. Arkiïs™ may recognize patterns in such ad requests (for example, through association rule learning algorithms including the Frequent Pattern-growth (FP-growth) algorithm and the Apriori algorithm, which highlight relations between variables in large databases), and project the added ad payout value a User might receive by providing certain types of information. Arkiïs™ may direct the User to supply those pieces of information for which the greatest value is estimated to be derived for them.

The following is an example usage scenario of the disclosed system. Sam is presented with an opportunity to expand his Profile with information on the home he owns and told by Arkiïs™ that by spending 15 minutes to fill out a survey about his home, he will likely increase his ad revenue by 20% over the next six months. Sam agrees and during the survey he indicates that he last replaced his hot water heater five years ago with a 50-gallon gas fired water heater and that he does not anticipate replacing it for another five years. He is then targeted with an ad asking if he realizes his current water heater is wasting approximately $200 per year and in 2.5 years, this new on-demand hot water heater can pay for itself, and over five years you would save 500 compared to sticking with his current hot water heater plus get the benefit of not running out of hot water when multiple showers are being taken at once. The ad is so compelling— and fact checked by his trusted consumer household goods Reviewer who he shares part of his ad revenue with in return for unbiased fact checking on goods being marketed to him—that he decides to go ahead and replace his hot water heater today instead of waiting five years as he originally was planning A Marketing Performance Score (410) may also be used to predict the effect a particular ad will have on a Consumer's buying tendency for a specific Product and thus help determine how much an advertiser is willing to offer in an actualized bid (430) to present that ad to the Consumer's Content selector (208). For example, Arkiïs™ detects a pattern where individuals who highly rated a certain racing school ad and who also specified they were going to buy a luxury car in the next 12 months, became 15% more likely to buy a BMW® after watching an ad including an offer for free racing school lessons with any BMW® purchase. This example broadens across groups of ads and or Content which together create synergies that may, in aggregate, increase or decrease a Consumer's buying tendencies towards a specific Product. For example, Arkiïs™ statistics may show that viewers are more likely to respond positively to a milk ad when preceded by an ad for chocolate chip cookies when followed by a cooking show featuring cupcakes. Unlike the FICO® credit score, the Consumer is allowed to see and dig into the complete calculation details to fully understand their score and how they can improve it by changing their future behavior.

Figure 26:
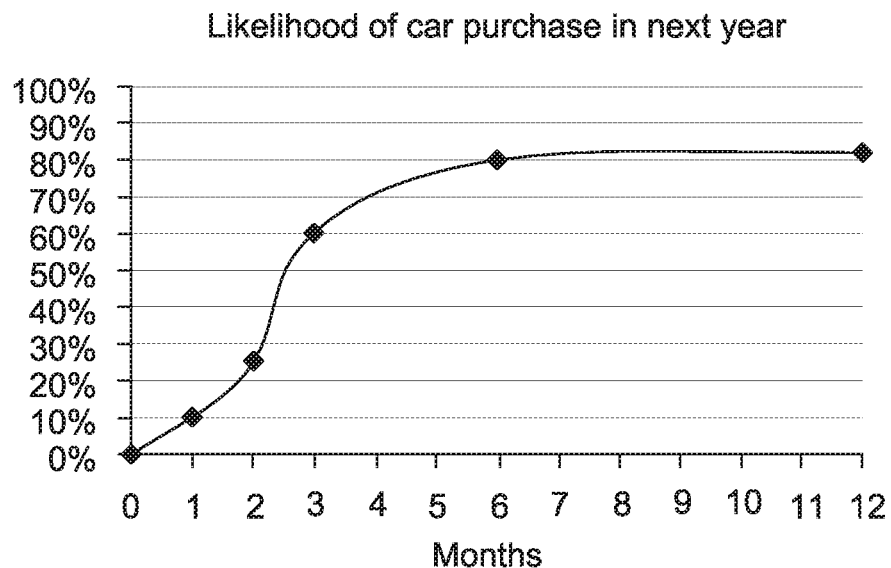
FIG. 26 is a graph depicting the likelihood a User will purchase a new car over the time of a year.

The following scenario exemplifies how a Marketing Performance Score may be used within the disclosed system. Julia states in her Profile, by logging into her Arkiïs™ Profile online, using her computer, that she is 90% likely to buy her first new car, a sedan, for less than $35K in the next 3 to 6 months and to finance the purchase. This is called an Arkiïs™ Assertion. Her performance will be tracked by Arkiïs™ and used to influence her Consumer Marketing Performance Score generally, and weighted more heavily for other potential purchases related to her other pending Assertions with similar characteristics (e.g. purchase price magnitude, time horizon, or Product category) these types of projections. Given that she has no Arkiïs™ history but is confirmed to be a recent graduate of college (as demonstrated by her diploma supplied to Arkiïs™ or a school-validated transcript or her confirmed membership in the school's alumni SyncGroup or the school's Profile links with her Profile and Julia has sent an Arkiïs™ data release to the school and the school has provided her confirmed school records) and is also confirmed to have just started her first job earning $40K a year (as demonstrated by two recent paystubs supplied to Arkiïs), her Profile is statistically matched by the Arkiïs™ cloud servers against similar historical Consumers and found to be 63% likely to follow through on her Arkiïs™ commitment to purchase a car. Ford Motors decides to run a targeted advertising campaign to recent college graduates whose Arkiïs™ Profile transcript confirms they did well in math. The campaign is for their Fusion Energi in the hopes of building brand loyalty for future car purchases. Ford submits to the Arkiïs™ servers a request to deliver one of several customized ads to those Users who graduated from college within the last year, averaged B or better in their math curriculum or participated in classes or clubs that focus on protecting the environment, intend to buy a car in the next year, have a professed interest in the environment, and can afford the payments based upon a price of $500 above dealer invoice at $38K with a five year loan at 1%. Ford also provides Arkiïs™ a formula that calculates how much potential targeted viewers can be paid based upon their Profile contents. Profile criteria utilized include the projected likelihood of actually buying any car in each of the next twelve months as shown in FIG. 26. Julia's Profile matches and Arkiïs™ applies the formula to her Profile and computes a $5 offer, which she accepts. This car would be a bit out of her price range, but based upon her Profile's matching characteristics Ford offers the pre-negotiated price together with financing that can make it fit her budget. Additionally, since her Profile shows her favorite color is purple, the ad she receives is the variant that shows the car in its blue-purple exterior paint color. Four months later, Julia ends up purchasing a Prius and not the Fusion Energi, but because the Prius purchase matches her professed intention that she recorded, she builds positive history. This allows future advertisers to ascertain that her likelihood of following through on future purchase intentions based upon her past behavior now shows she is 87% likely to follow through on big-ticket items and thus now the ad she was previously paid $5 to view would now be worth $7 were the same scenario to repeat today.

All Content provided by Arkiïs™ may be Filtered based upon the application of Content preferences in a User's Profile. For example, if a person desires to exclude Content related to the sale of guns, they can ensure, through their Profile, that no gun advertising reaches them through Arkiïs™. For Content that passes a User's Filtering preferences, it may then be graded as to how well the Content matches the User's Profile stated interests and desires. There are multiple dimensions upon which Content may be independently graded. Dimensions of grading may include how well the Content matches a User's point of view in: humor, emotion, politics, demographics, present physical location, present social context, projected travel path, and preferences, etc.

The Filtering and grading of Content may vary contextually (e.g., location, likely travel path, current or recent activity, or state of mind) by what a User has recently done by deduction from clues in the User's Profile together with mobile device data such as GPS, motion, accelerometer data, calendar data, etc. Depending on the embodiment, Filtering and grading may also vary by the User's emotional state (e.g. mood), recent activity, recent Content consumption, current news events, and whom they are SyncGrouped with. This may include their recent communication history culled from their caller ID log, Skyping, texting, etc. and the identity of communicating parties and the nature of those parties' typical interaction for the present context as captured in their Profile and the vocabulary, tone of voice, etc. in the communication (e.g., Sally's mood usually improves after communicating with her mom, for example, they shared a joke with each other and laughing can be detected in the communication). Content might also be Filtered out at one time based on context, but not at another time, in a different context. Similarly, Content might be graded differently in different contexts.

The following example usage scenario describes how contextual clues can influence the Content delivered to a User. Carol has been using Siri on her iPhone® to dictate messages for the past year and has become comfortable with her words being recorded and sent into the cloud to be transcribed. Therefore, she has decided to allow Arkiïs™ to listen in on her smartphone's and/or smartwatch's microphone during phone calls and when she is not on the phone but comfortable being recorded (e.g. in public locations) for the purpose of better targeting her state of mind and has configured her Profile using her Arkiïs™ app on the smartphone to allow this or configured using the Facebook interface which is linked to her Arkiïs™ Profile. As she talks on the phone her recorded words are submitted to the Arkiïs™ cloud servers for transcription and tonal quality analysis to help deduce emotional state and this information is mined for clues as to what she is thinking and feeling. When Arkiïs™ is monitoring the audio of her phone it may use her phone's location in order to alert other Arkiïs™ Users whose Profile preferences request notice when they are within proximity of an Arkiïs™ enabled Device that is actively recording and thus their words can be recorded. Arkiïs™ servers combine this information with the context of to whom she is talking that is based in part upon matching up their phone number or other means of connection (e.g. Skype® handle) with her Profile information. Arkiïs™ discovers that Carol is talking to her mother and asking for advice about dating given an unpleasant date she was on the prior night, at Benihana's Steak House, where she ended up arguing with her date about women's rights and he left her with the bill and no ride home. From this information, Carol is subsequently targeted with an advertisement for OkCupid® dating site that focuses on philosophical compatibility. However, Benihana omits sending her a message, which, in the absence of her conversation with her mom, would otherwise have been inappropriately targeted toward her.

An advertiser may place a premium on sending a message when a User is in a particular location or is projected to soon be in a location interesting to the advertiser (e.g. near their store or near a competitor). An advertiser may offer to provide, pay for, or subsidize a User's travel to their store. This may take the form of premium parking reservations, valet services, or subsidy and defraying transportation costs including fuel and public transportation fares. An advertiser may provide a shuttle bus to bring customers to and from their location and locate passengers by way of their Arkiïs™ Profiles by sending targeted ads that query whether the User would like a lift, and direct the User and a shuttle to efficiently meet by creating a SyncGroup led by the shuttle. An advertiser can coordinate with idle taxis for reduced-rate short shuttle rides also coordinated by the Arkiïs™ system. For mobile businesses such as a dog grooming service on wheels, Arkiïs™ can target ads to potential nearby customers providing offers on a limited first-come basis to fill in unbooked time and facilitate directing customers to the mobile business efficiently when, for example, parked outside an office building or on a public street.

The following is an example embodiment of the disclosed system. Juanita just completed exercising at the gym. Arkiïs™ was able to deduce this activity by observing that her phone's GPS showed her location at Planet Fitness and corroborated by connecting to the Wi-Fi at Planet Fitness while she was there and also identifying her pattern of repeatedly visiting this location on Tuesday and Thursday afternoons each week. Additionally, her Arkiïs™-enabled smartwatch detected elevated heart levels consistent with a workout regimen for the past 45 minutes. Further, in her Profile, she indicated that she has a Planet Fitness membership and her smartphone's and/or smartwatch's accelerometer picked up a pattern of motion consistent with exercise for the past 45 minutes. Finally, Juanita has linked her Fitbit® account (where she records her workout) to her Arkiïs™ Profile. Together, these data points give the software running on the Arkiïs™ cloud servers a very high confidence level to the conclusion that she has just been exercising and is now on her way home from the Gym. Therefore, the cloud servers decide in conjunction with a Marketer that they will send Juanita a targeted advertisement when she is next projected to be on her way to the Gym and is in her car listening to a custom streaming audio feed from her smartphone that is fed by the Arkiïs™ cloud servers. The ad is to be for a competing Gym that can offer her a free personal training session in a small group workout using fitness trampolines if she comes then instead of going to her normal Gym. The closely targeted ad pays her three dollars since it is playing shortly before her next gym visit and offers her free valet parking at their entrance. Another commercial targets her on her way home from the Gym (as detected by her smartphone's location and movement monitored by her Yelp app that is connected to her Arkiïs™ Profile on the Arkiïs™ servers) and is for a new yogurt shop that just opened around the corner from the gym where she is now and that serves high-protein non-fat yogurt and offers her a full serving for free for coming by in the next fifteen minutes and trying it out in the hopes that she will make them a part of her gym ritual. They also offer her reserved on-street pre-paid parking within a one-minute walking distance of the entrance.

Figure 17A:
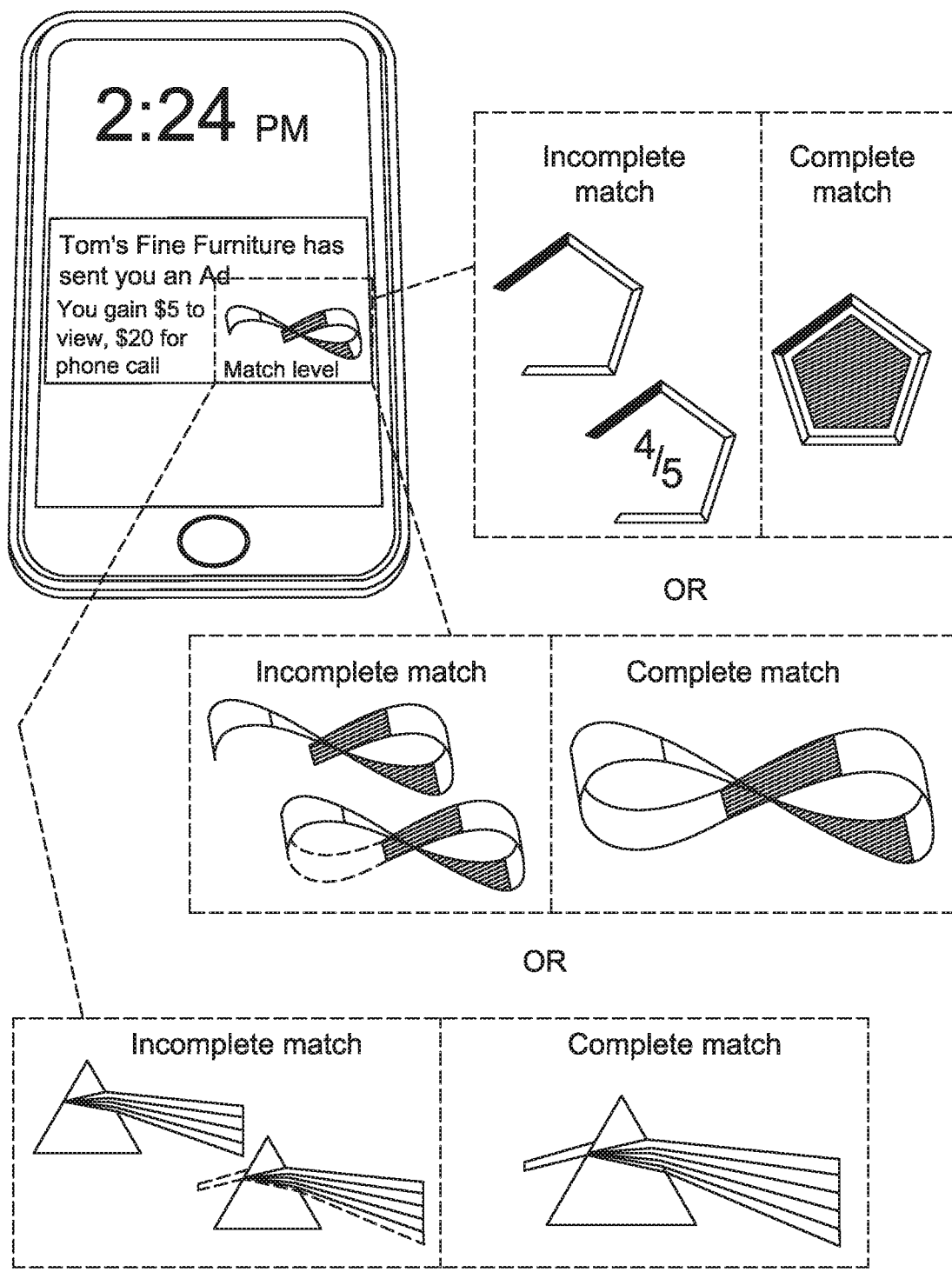
FIG. 17A is a series of exemplary depictions of the match level between the interests of a Profile and a particular piece of Targeted Content.
Figure 17B:
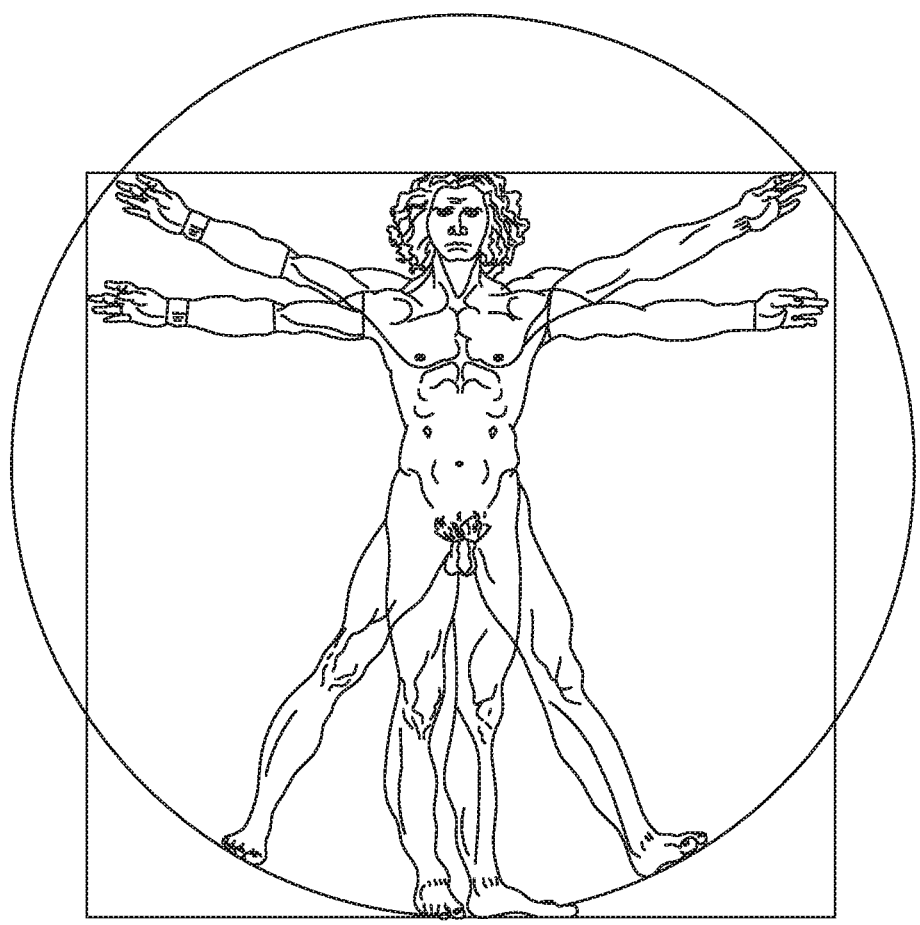
FIG. 17B is an exemplary depiction of the match level between the interests of a Profile and a particular piece of Targeted Content.

The Arkiïs™ system may utilize a certificate that indicates a prediction of how any given marketing message, Content, Product, or service matches an individual's (or SyncGroup's) Profile(s). FIG. 17A shows a variety of different Visualizations for the certificate that may be employed. Different areas of the Visualization represent different aspects of a person such as their predicted emotional or logical response to a message, or whether it relates more to their personal or family life. Color-coding also encapsulates aspects of the message's fit to one's Profile. Alternatively, the Visualization may be a two-dimensional or three-dimensional geometric shape, which may depend on the number of parameters a Consumer would like to view in conjunction with each marketing message—for example, a Consumer specifying six parameters can have a cube as a Visualization with each side a different color and representing a different aspect of the message's fit to the Consumer's Profile. If only five out of six aspects are fulfilled, the cube will appear to have one side missing, corresponding with the aspect that was not fulfilled. The Visualization may also be depicted as a DNA helix, with base pairs that are depicted in different colors corresponding with aspects of the message's fit to the Consumer's Profile. Connected base pairs may represent matching aspects, and unlinked base pairs may represent aspects that do not match. Other possible Visualizations include a pyramid with separate levels each representing an aspect, a star with each point representing an aspect of the message's fit to the Consumer's Profile, an emoticon or table of emoticons which are happy, sad, or neutral depending on whether or not marketing matches are predicted to match an individual's or SyncGroup's Profiles, etc. Alternatively, Consumers may choose certain aspects they would like an advertisement to match and pick percentages depicting how important each aspect is to them, with the sum of the percentages adding up to 100% (e.g. humor=25%, family values=10%, alcohol-free=5%, local company=20%, scientifically correct=20%, contains animals=2%, good videography=13%, NGO certified=5%). Consumers may vary their choices for how matching is determined and may create temporal, spatial, and social rules that automatically control such choices, for example, a User may desire funny messages in the evening and serious messages in the day or alcohol-free when at home or family values when in a SyncGroup with their partner/spouse. A horizontal bar may depict a user-defined threshold as a vertical line intersecting the bar, and the matching aspects may be depicted in different colors on the bar, with their percentages added up denoting whether an advertisement meets the matching threshold shown on the bar. A Consumer may specify in their Profile that certain aspects are absolute requirements and others are relative, for example, a User may require that a trusted NGO certifies that a Product is absolutely child-labor free but is willing to accept an environmental requirement that a Product is carbon-neutral relatively and thus accept messages about a non-carbon-neutral Product if the message pays them enough or has other mitigating characteristics such as being humorous enough. Visualizations may have features that only appear when a marketing message or Product matches with the Consumer completely, or matching is past a certain triggering threshold. For example, a star Visualization may light up, a pyramid may depict a beam of light coming out of its apex, colored beams of light may combine together into a white beam of light through a prism, an outline of a shape may be filled in, etc. Third-party add-ons to the Arkiïs™ system may allow the Visualization to be customized. The Visualization may also be utilized for providing Feedback on a marketing message. Once a message has been consumed, the Consumer may adjust the visualization to correct it to match their actual perception of the message's relation to their subjective preferences. For example, if a message was predicted to rate very funny for a User, but the User only found it somewhat funny then they can correct the Visualization to reflect their actual subjective feeling of how funny it was. Such Feedback may be used to refine the system's prediction of funniness of that message for other Users, and with stronger weight for those Users with similar tastes to the User, further, such Feedback may also be used by the system to learn and better predict the User's feelings for future messages in a manner similar to Netflix's movie prediction ratings. There are embodiments where the Visualization may be represented completely or in part by an audio depiction (e.g., an easily recognizable series of chords being played). The initial Visualization values may be predicted using a neural network based on Profiles of other Consumers that have already viewed and corrected their predicted Visualization to reflect their actual response and how those Consumers' Profiles relate to one's own Profile. FIG. 17B shows a sample certificate which takes the form of a Visualization derived from something like da Vinci's Vitruvian Man where the head, heart, hands, etc. may light up to depict a relative match level for logical thinking, feelings, skills, etc.

In the case of physical world Products, a User may scan the Product or a QR code in order for the Product to be identified to the Arkiïs™ system and a customized certificate retrieved for that product for a particular User. Such certificate may be viewed on a User's mobile device. Alternatively, a Product may have packaging or shelving that detects a User's presence by the proximity of their mobile device and retrieves the certificate for that User and displays such certificate on the Product packaging or shelving. Such packaging may be reusable and removed at the point of purchase for reuse.

Just as a User can choose to follow Reviewers, a User can choose alternate grading algorithm plug-ins. When a User configures their Profile to use an alternate grading algorithm plug-in, a portion of their earnings may be shared with the author(s) of the alternate grading system for the period that such system is employed.

The following example usage scenario describes how an alternate grading algorithm plug-in may be utilized within the Arkiïs™ system. Jerry learns that his friends, Joe and Mike, are working on a new Arkiïs™ plug-in that is specialized for sports fans. Jerry configures his Profile using his laptop and an Arkiïs™ web page in a browser to start using it to support his friends and because he is an avid sports fan of the Lakers. Once configured, the Arkiïs™ cloud servers update his streaming feed to utilize the plug-in and his digital on-screen graphic is updated to a basketball, hoop, and backboard to depict how well Content matches his Profile, with a swish indicating a perfect match. This algorithm weights his interests in sports, and particularly the Lakers more heavily than normal and utilizes the recommendations of famous sports figures. After using it for a week, Arkiïs™ servers have automatically shared $0.35 of his $12 in earnings that week with Joe and Mike.

The grade of Content may be visually represented using a standardized graphic that represents how well the Content matches a User's Profile overall and in various dimensions such as humor, logic, emotion, and politics. In group consumption (see Section 9—Sharing Targeted Advertising between Users) situations, the shared First Device may show the match for the group as a whole and each User's Alternate Device may show their individual match level. The Visualization may be shown on the screen like a digital on-screen graphic (i.e., off in one corner and semi-transparent, see wikipedia.org/wiki/Digital_on-screen_graphic). By default, the graphic may appear temporarily at the beginning of Content and then disappear after a short period, however, the User may configure this behavior or use their remote control to pull it up again or hide it in a particular instance. The grade of live Content may be provided on each User's Alternate Device.

In a preferred embodiment, the grading system uses an adaptive algorithm and statistical analysis to predict how well Content matches your interests and objectives. Additionally, a User may choose to follow the recommendations of other Users they trust. For example, a User may select likeminded humor critics in their Profile and only consume Content that has been previously reviewed by one of these critics that they trust and given a positive rating in the humor dimension. In return, the humor critic may get a small payout taken from the User's earnings for consumed Content that is selected based in part upon their recommendations and guidance.

Figure 18:
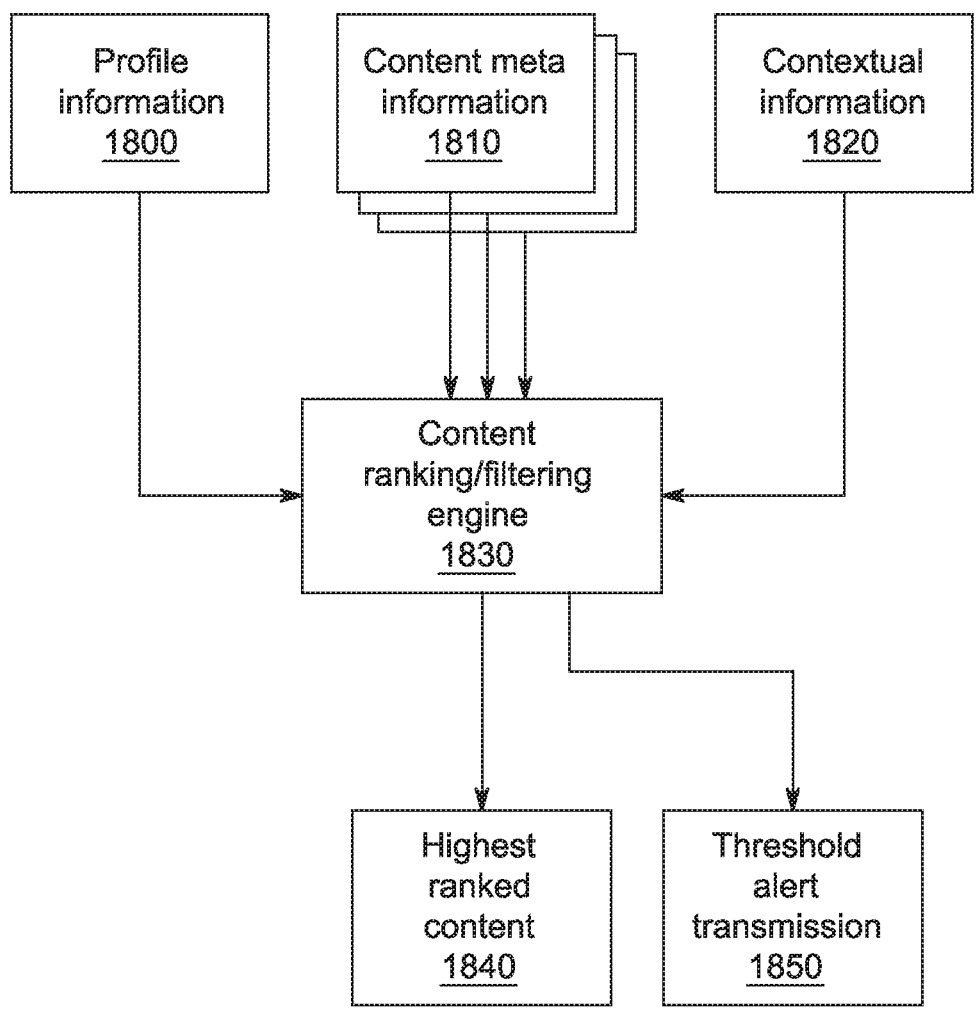
FIG. 18 is an information flow diagram in an exemplary Content ranking, Filtering, and alerting system that can be used in conjunction with the technologies described herein.

FIG. 18 is an information flow diagram in an exemplary Content ranking, Filtering, and alerting system that can be used in conjunction with the technologies described herein.

In FIG. 18 Profile Information 1800 together with Contextual Information 1820 are applied to Content Meta Information 1810 (e.g. certifications, certifiers, reviews, reviewers, Product, etc.) in the Content Ranking/Filtering Engine 1830 to find the Highest Ranked Content 1840 for transmission to the User. A User's Profile Information 1800 may specify that the User will be alerted if Content surpasses certain thresholds (e.g. the payout amount for Content surpasses a certain threshold, or the humor rating of Content surpasses a certain threshold). If Content ranked by the Content Ranking/Filtering Engine 1830 surpasses any of these User-specified thresholds, a Threshold Alert Transmission 1850 will occur. Threshold Alert Transmission 1850 may involve sending an alert (e.g. audio, visual, haptic feedback, etc.) to the Device or Devices (e.g. smartphone, tablet, wearable computing device) of a User identified with Profile Information 1800.

Similar to the Arkiïs™ marketing score, a Goods & Services Provider may receive an Arkiïs™ Goods & Services Provider score to assess the likelihood of a User being satisfied with that Provider. The score combines the assessments of other Users with similar outlooks to the User and Reviewers they may have elected to trust. In some embodiments, assessments cover the truthfulness, interestingness, and funniness of the Provider's marketing messages. Assessments by those who actually purchased the goods or services being sold also determine the Goods & Services Provider's effectiveness in meeting the marketing message put forth. A User's Profile may include prohibitions that block targeting from Goods & Services Providers that do not meet various metrics of their choosing such as, for example, requiring that at least 80% of their customers are satisfied with their purchases. Thus, the integrity rating of Users increases the economic efficiencies by increasing the likelihood of honest interactions.

7. Alternate Device Synchronization

To optimize the coordination of an Alternate Device (e.g., a smartphone delivering Targeted Content) with a First Device (e.g., television), the Alternate Device application/platform may be synchronized with the Content being delivered on the First Device by configuration of the exact channel or station source being consumed (e.g., being watched or listened to) on the First Device. This may be done heuristically by gathering contextual information along with hints previously provided by the Alternate Device User in their Profile and presently, specifically about what they are consuming to deduce the likely channel source and Content being consumed along with alternative matches that are ranked by their likelihood. The Alternate Device User may confirm or correct the proposed match as required, potentially providing more information resulting in a new set of ranked results.

The following table (Table 1) enumerates contextual information that may be used by the heuristics to identify the Content Provider (e.g., Cox or Dish Network) and Premium Content channel, i.e., Content source, (e.g., Monday Night Football on FOX broadcast channel 2, House Hunters on Comcast HGTV, or The Big Bang Theory on CBS broadcast channel 5):

TABLE 1

| Metric | Content Provider | Content Source |
|---|---|---|
| Mobile device location information gathered from GPS, cell towers, and Wi-Fi networks detected by the mobile device. | Yes | No |
| The present time and date | No | Yes |
| Using the microphone of the mobile device to listen to the audio portion of the Premium Content being delivered on the First Device and submitting this to the cloud to identify the Content being delivered. (This is akin to the Shazam mobile application that identifies a song from brief clips gathered by a mobile device.) | Yes (using commercial audio) | Yes |
| Using the video camera in the mobile device to watch (and listen as above) the video portion of the Premium Content being delivered on the First Device and submitting this to the cloud to identify the | Yes (using commercial video) | Yes (also using digital on-screen graphic to identify Content Provider) |

TABLE 1-continued

| Metric | Content Provider | Content Source |
| --- | --- | --- |
| Content being delivered. (This is an extension of the Shazam idea, but applied to video instead of audio.) | | |
| Arkiïs ™ Profile information about Content Providers to which User subscribes, (e.g., Comcast and Netflix) | Yes | No |
| Arkiïs ™ Profile information about Content preferences, (e.g., favorite football team is the San Francisco 49ers) | No | Yes |
| Arkiïs ™ Profile information about friends and family | Yes | Yes |
| Arkiïs ™ historical consumption patterns | Yes | Yes |
| Hints provided by User on their mobile device, (e.g., "I'm watching football.") | No | Yes |

In a preferred embodiment, this Alternate Device synchronization may be configured to assist in automating the building of a User's Profile. Once Arkiïs™ is aware of Content being consumed on a Device that is not integrated with the Arkiïs™ system or when consuming Content on an Arkiïs™ integrated Device or from a Device reproducing a feed from an Arkiïs™ coordinated source, a User's Profile can be expanded to include the history of Content being consumed. This Profile history can facilitate the addition of features such as the seamless ability to begin consuming Content on one Device and completing it on another Device. This may be accomplished by tracking the Content time position (i.e. playback location) a User has reached or in the case of live Content the absolute time at which playback was interrupted. The Content position may be easily known when fed from an Arkiïs™ source or when consuming from a non-Arkiïs™ source the position may be known by the Arkiïs™ servers also monitoring the same non-Arkiïs™ source in the cloud to identify a relative position within a feed. While consuming from a First Device, which is not Arkiïs™ enabled, a User's Alternate Device, which is Arkiïs™ enabled, can follow the First Device by monitoring its audio and video feeds in a Shazam-like fashion. In this way, a User's Alternate Device can detect the Content time position at which they separate from the First Device or the First Device ceases to transmit a particular feed and this position may be recorded in their Profile relative to the Content whose receipt was suspended. This position timestamp may be associated with a corresponding point in the Content independently monitored by the Arkiïs™ cloud servers and thus allow subsequent DVR like resumption from their suspended position on a different Arkiïs™-enabled Device. The Arkiïs™ cloud servers may coordinate alternate distribution feeds of the same Content and allow Users to seamlessly switch between feeds (e.g. begin watching a sporting event on a radio and switch part way through to a television or a smartphone). This coordination across Devices applies to all forms of Content including Premium Content and Targeted Marketing Content.

The following is an example usage scenario that illustrates one way in which the technology described herein can be implemented. Helen is visiting her daughter, Jennifer, in her new, sparsely decorated apartment. They both decide to watch an episode of House Hunters that is just now airing. Both of them are Arkiïs™ Participants, and because Helen is in close Physical Proximity to Jennifer, their Alternate Devices offer to hook up into a SyncGroup (see Section 9—Sharing Targeted Advertising between Users) for group coordinated shared consumption. (Their computers, smartphones, smartwatches, or other wearable computing devices that are Arkiïs™ enabled hook up due to Physical Proximity detected by one or more of the following means: using Bump Technologies-like technology, using GPS, using Wi-Fi router location triangulation technology, or using direct communication via Bluetooth, Wi-Fi, Near-Field Communication, and/or infrared communication (IR), etc. An Arkiïs™-enabled Device is one that includes software that communicates with the Arkiïs™ cloud and/or other Arkiïs™-enabled Devices through the installation of an app, firmware update, factory-supplied Arkiïs™ chip or ROM, SIM-like card, and/or add-on hardware device like the Square™ mobile credit card reader that attaches to the host device to make it Arkiïs™-enabled.) Helen is using her computer as her Alternate Device and receives a pop-up dialog, email, text message, instant message, and/or other means of notification indicating that she may wish to join into a SyncGroup with Jennifer. She follows the link provided in the notification to an Arkiïs™ dialog or replies to the notification to accept the SyncGroup. Because she shares several key demographics (e.g. they shared the same old address in their Profiles for a long period when Jennifer was a child), Arkiïs™ strongly suspects that Helen and Jennifer are mother and daughter or at least close friends. Helen is queried as to whether Jennifer is indeed her daughter, which she confirms. Jennifer turns to her phone after her mom has accepted and sees that her phone is now asking for confirmation to join into a SyncGroup with her mom, which she accepts. Because they are now linked up and are in Jennifer's apartment, the Arkiïs™ server gathers the contextual information that Jennifer has in her Profile that she receives her Content from Cablevision. Helen speaks into her Alternate Device, "We are watching House Hunters." This is recorded and submitted to the Arkiïs™ cloud which processes Helen's speech in a Siri-like fashion to understand (possibly combined with lip-reading technology for improved accuracy) what she said and combine this hint together with their viewing location to deduce that House Hunters is being viewed through Cablevision. It sees that only the HGTV channel is presently broadcasting an episode of House Hunters, but it detects that Helen has already seen this episode and instead sends back a suggestion to both Helen and Jennifer to watch a different episode that neither has seen before (as indicated by their Profiles) and may be shown on demand using Jennifer's personal Arkiïs™ Roku™ channel. Jennifer accepts on her Alternate Device and her Device automatically sends IR and RF codes to her First Device to change the Device source to her personal Arkiïs™ channel. The First Device queries via Roku™ how they wish to consume this episode with several on-screen choices including paying for it to be ad-free and watching sufficient commercials to pay for it up front. They decide to watch their ads up front and Jennifer scrolls through these choices using her smartphone Arkiïs™ app and selects their choice on the First Device. They are given a single 30 second Targeted Marketing Content advertisement for a local consignment furniture store that has several couches in stock since Jennifer's Profile indicates she is actively looking to buy a couch and it sees that her mother has already purchased some furnishings for Jennifer since she has moved in. It further offers her a 10% discount coupon if they come by the store today together. This one targeted spot covers the cost of viewing the whole House Hunters episode without any further commercials. After House Hunters, they decide to earn some cash and select their next most valuable commercial, which in this case is not the same ad. Consequently, the First Device feed from Roku™ splits the screen in half and delivers the video to each of them simultaneously, while providing their individual audio via their smartphone's Bluetooth headset or by listening to the smartphone that delivers their audio portion. To synchronize the audio and video being delivered on separate Devices, the smartphone or other Alternate Device may accept the audio directly from the Roku™ box or other DVR-like device feeding their First Device. Alternatively, the audio may be sourced from the cloud or a cellular network and buffered on the audio device and the audio and video are then synchronized by direct communication between the local video device and the audio device by way of Wi-Fi, Bluetooth, or other local low-latency communication up front and periodically during message delivery. The audio on the Alternate Device may need to be buffered further ahead in time if it is downloading more slowly than the video on the First Device to ensure that by the end of the message the audio is completely downloaded. Alternatively, to ensure uninterrupted message delivery, both audio and video may need to be fully downloaded before the message begins and the two signals are synchronized.

As another heuristic approach (e.g., in combination with other heuristic approaches), the User can specify identifying information for the Content currently being consumed (e.g., Content Provider such as a television network, cable network, radio station, streaming Internet provider, etc. and/or Content identifier information such as a broadcast or cable channel number, program name, time and date, geographical location, etc.). For example, if the User is consuming particular Content (e.g., a specific television show, movie, or another type of programming Content), then the User can select a channel (e.g., a specific broadcast channel, cable channel, etc.), network (e.g., cable network, traditional broadcast network, etc.), Provider (e.g., a specific cable or satellite provider, a specific Internet streaming provider, or another type of Provider), day and time (e.g., the particular day and/or time that the Content begins), and/or location (e.g., whether the User is watching at home, at a sports bar, or at another location). As an example, if the User is watching Monday Night Football, the User can select a channel (e.g., channel 500), a network (e.g., ESPN), a provider (e.g., Comcast cable), and a time (e.g., 6:00 PM PDT).

8. Coordination Between Devices

The Arkiïs™ User may consume a spectrum of alternative Content ranging from Premium Content that they must pay to consume to high value, focused, Targeted Marketing Content that may earn them money when consumed. See FIG. 8.

Various technologies exist today to automatically detect the transition to and from commercial Content in a live Content feed. For example, a black screen is sometime inserted, or a change in the Content volume can be detected, or a large change in scenery. To date, broadcasters have not wished to facilitate such detection since it works against their advertising interests when it is coupled with DVR ad-skipping technology such as Dish Network's Ad Hopper.

However, with the revenue sharing possibilities of Arkiïs™, this dynamic is changed and broadcasters can benefit from such ad detection in their feeds. Arkiïs™ may create a standard for broadcasters to follow to indicate the beginning and end of commercial breaks along with dynamic predictions of when a commercial break will end for live broadcasts. These may be encoded in the broadcast signal such that they are not readily apparent to the Consumer. Strategies for encoding can include adding steganographic (hidden message) information to the following portions of the signal:

Digital video feed
Closed captioning feed
Digital audio feed
Guide Plus+ feed
Radio Data System (RDS)
Vertical Blanking Interval (VBI) lines Alternatively, broadcasters may provide a direct confidential feed to Arkiïs™ through the cloud to help ensure only those who will compensate the broadcaster for skipped commercials use the information. This feed may be shared with Arkiïs™ Users such as on their smartphones that may give an estimated countdown to when Premium Content will return.

The following example shows how the detection of commercial Content can aid in choosing the best targeted advertisements to show to a user: Peter is a Lakers fan and is watching a Lakers game against Miami Heat from his home. With 30 seconds to go in the game and a score of 110 to 109, Miami calls a time-out with possession of the ball. ABC goes to commercial break during the time-out and transmits an initial estimate of 3 minutes duration or Arkiïs™ computes their own estimate based upon statistical analysis for time-outs in similar basketball game scenarios. Peter begins watching a targeted two-minute commercial. ABC continues to broadcast a 3-minute duration, so at the end of that commercial, Peter is served up a one-minute commercial, however, fifteen seconds into his commercial, ABC changes their estimate to be 2.5 minutes based upon Miami's players returning to the court. Peter's Profile indicates he only wants to view basketball games live and is not willing to view a feed lagging even by a few seconds since he often gets on the phone with rival friends that are Miami fans and wishes to be synced up with their viewing. Therefore, upon ABC's notification, he gets a popup graphic superimposed over the commercial indicating the game is about to return and when the referee is about to put the ball in play and broadcast returns, Peter's second advertisement is truncated midstream in order to return to the live TV feed without missing any action. At the next commercial break, Peter's targeted feed returns to the truncated second advertisement he was watching before and resumes play at the last entry/rewind point (these are encoded in the commercial by the producer) that precedes where he broke out at the end of the last commercial break.

Another alternative to consuming targeted advertising made possible by the Arkiïs™ system is a simple countdown clock, reproduced on either the Alternate Device (e.g., mobile device) or First Device, to indicate the estimated time till the end of the commercial break and the resumption of Premium Content. Such a clock can also include an audio component alarm to audibly alert to when the commercial is nearly finished. The end of the countdown may be estimated through statistical sampling and Shazam-like recognition (through comparing spectrograms and/or other acoustic fingerprints) of individual advertisements so that knowledge of how long particular advertisements run may be used. The countdown time may change as the estimate changes and the User may be alerted to substantial changes to the estimate. The broadcaster may coordinate with Arkiïs™ to provide detailed projections and alerts to make the countdown estimates more accurate.

The following scenario exemplifies the utility of implementing a countdown clock within the Arkiïs™ system. Andrea is watching American Idol and is taking a break during the commercials and pauses her alternate Targeted Marketing Content as the Primary Content goes to commercial and her targeted advertising is about to begin. Both the television (First Device) and her smartphone (Alternate Device) count down the dynamically changing estimate of time remaining until the commercials end and the Premium Content resumes by retrieving this evolving estimate from the Arkiïs™ cloud servers. This includes an audio alert at count down intervals beginning at 90 seconds (one beep), 45 seconds (two beeps), and 15 seconds (three beeps) to give Andrea the ability to leave the room but retain awareness of when the commercial break will most likely end.

Figure 19:
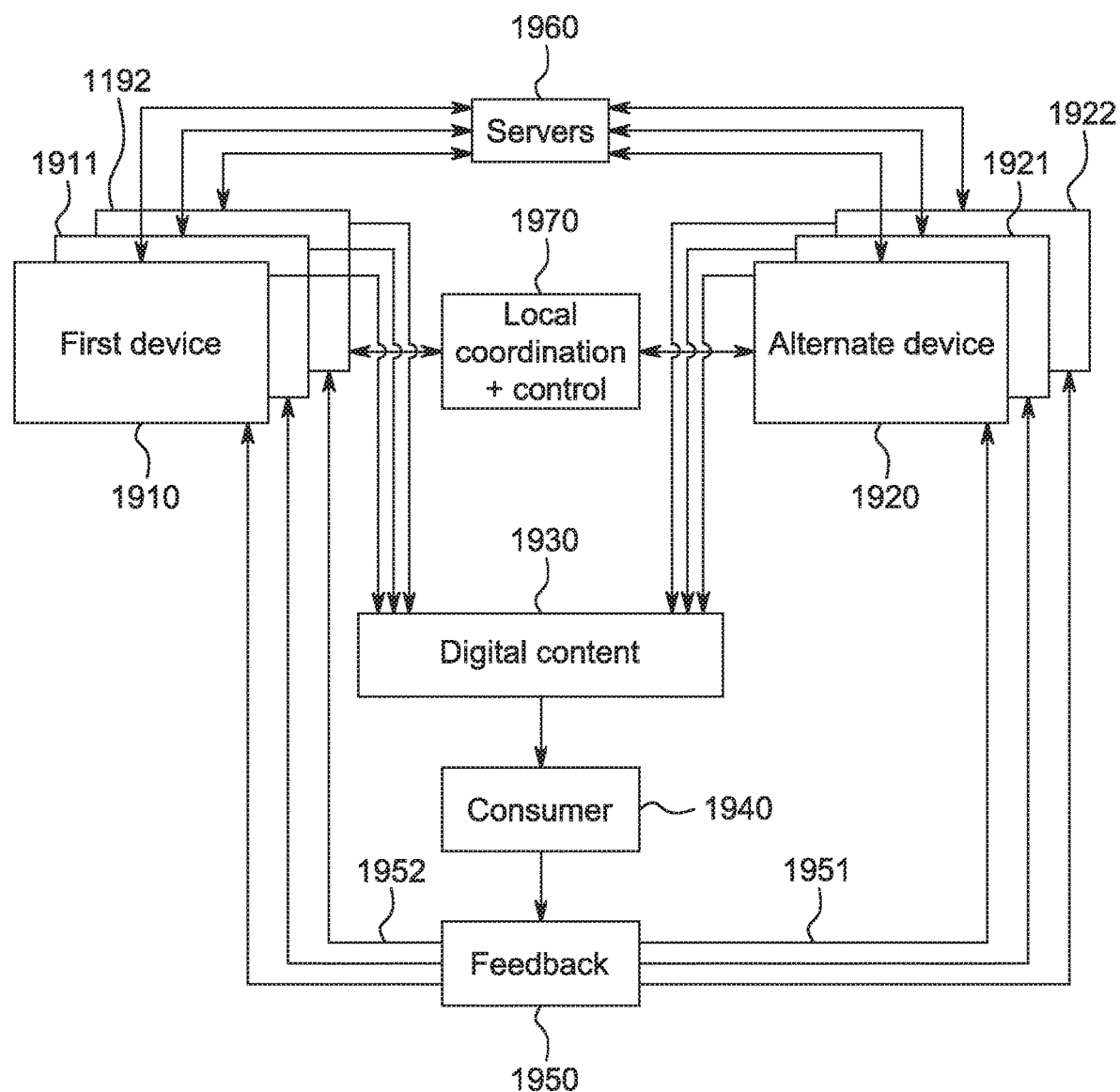
FIG. 19 is a diagram depicting the various Devices that a Consumer may receive digital content from along with their ability to provide Feedback back to those Devices.

In some implementations, information identifying Content currently being consumed can be provided by a User's mobile device as illustrated in FIG. 19 Alternate Device 1920 providing local coordination and control 1970 of First Device 1910. For example, the User's Alternate Device 1920 (e.g. a mobile device) can function as a remote control for a First Device 1910 (e.g., a television). When the User selects specific Content to reproduce on the First Device 1910 (e.g., selects a specific broadcast channel or cable channel), then the mobile device can provide identifying information (e.g., channel, network, location, day and time, etc.). For example, the mobile device 1920 can run an application that provides the identifying information to a targeted advertising system 1960 so that the targeted advertising system (servers 1960) can provide targeted advertisements to the User at the time generic advertisements are presented on the First Device 1910. In some implementations, the application on the user's mobile device 1920 can perform other functions. For example, the application can mute (local coordination and control 1970) the First Device 1910 while targeted advertisements are consumed by the User on the mobile device 1920 (e.g., so that the User is not interrupted by a generic advertisement being played on the First Device 1910). The application can also pause 1970 a DVR 1910 if a targeted advertisement is being played on the mobile device 1920 and if the targeted advertisement runs longer than a corresponding generic advertisement on the First Device 1910, then the application can resume playback 1970 on the First Device 1910 when the targeted advertisement is over (e.g., by resuming playback 1970 at the beginning of the Content 1930 that the User 1940 was consuming). If the targeted advertisement runs longer, then the application may choose a shorter targeted commercial to compensate in the next commercial break (e.g., by selecting a shorter targeted advertisement(s) such that they do not run longer than the corresponding generic advertisement(s)).

As illustrated in FIG. 19, an Alternate Device 1920 (e.g., smartphone), after synchronization 1970 with the First Device 1910 previously described above, can help orchestrate 1970 the behavior of the First Device 1910 by acting as a remote control 1970 and sending infrared (IR) or Radio Frequency (RF) commands to the First Device 1910, to 1970 mute and unmute or change channels to alternate (possibly targeted) Premium Content 1930, or to a specialized Roku™ channel that contains the targeted advertising 1930 for an individual Arkiïs™ Consumer 1940. Additionally, in embodiments where the User 1940 provides Feedback 1950 using their Alternate Device 1951 (instead of providing Feedback 1950 using their First Device 1952) while consuming the targeted advertising using the First Device 1910, targeted advertising can be paused 1970 before and resumed 1970 after such Feedback is provided as directed by the Alternate Device 1920. Alternatively, the synchronization 1970 of an Alternate Device 1920 may proceed before the First Device 1910 is tuned to the desired Content 1930, wherein the Alternate Device 1920 performs a search given a description of the desired Content 1930, and after synchronization 1970 the Alternate Device 1920 may act as a remote control for the First Device 1910 including the option to power it on, select an input source, select a Content channel, and/or adjust the audio levels 1970.

In some embodiments, a User may temporarily enter a do-not-disturb period within which they will not be presented with ads. The period may be recurring on a schedule or occur in response to a one-time request. The period may only apply to a particular medium such as television or radio. The do-not-disturb periods may have configurable limits or controls that allow time-sensitive or high priority messages to still be presented. The period may be tied to an event such as the duration of a sports event. The filtering may also be tied to a genre such as no food commercials allowed after 7 pm. In general, the User has complete control over when and what and how advertisements are presented to them.

An Arkiïs™ User may configure alerts in their Profile to send a notification to their mobile device which is in signal communication with the Arkiïs™ servers, for example, to cause it to vibrate when a high paying ad is about to be served to a shared First Device that they are SyncGrouped with. Advertisers may wish to send a message during a sporting event when a team has an exciting scoring event to build upon the elation felt by the scoring team's supporters and to deliver a message for which they will be more receptive at that moment and thus would be willing to bid a higher price to reach a targeted audience at that moment. In addition to contextual First Device data, the system may also consider data from voice recognition, facially-based or vocally-based mood recognition, heart rate based on wearable computing devices, accelerometer data, and/or text messages to identify situations during which an advertiser can send a message regarding a temporarily increased payout for consuming or responding to an advertisement. An advertiser's matching criteria and payout formula for their message may contain certain inputs which take advantageous situations for message delivery into account, setting up increased payout in advance.

An embodiment of the system exemplifying targeted advertising alerts is as follows: Joseph is a Pittsburgh Steelers fan, as shown in his Arkiïs™ Profile, and he is in a sports bar watching one of their games. With 50 seconds left on the clock, the Steelers have just scored a dramatic touchdown to take the lead. Their opponents have just called a time-out and a commercial message is now ready to be served up. Corvette wants to target Joseph for an ad for their new model year car and offers him SS to view and respond to their ad at that moment given his elated state as confirmed by his Arkiïs™ enabled smartwatch's detection of an elevated heart rate. His mobile device's Arkiïs™ app causes his phone to vibrate three times to alert him, 15 seconds before the ad airs, that a high paying ad is about to come his way. He pulls out his smartphone and sees the alert that he will earn $5, which just adds to his good mood from the recent score, and he turns his attention to the screen. The ad is displayed and, at the end, he returns his attention to his phone to answer a few short questions in the Arkiïs™ app that are supplied by the Arkiïs™ cloud to confirm he viewed the ad and provide Feedback that takes around 45 seconds and satisfies the payout requirements and he receives his $5.

Similarly to alerts about high paying advertising, when consuming Content on Devices owned or controlled by someone else, in the case that forthcoming Content would violate your Profile requirements, you may get an alert on your phone giving you the chance to separate yourself from the Device before the offending Content is served up. An alert may be in the form of, for example, one or more of: an audible alert through a Device's speakers, light emitted from a Device's screen or camera flash, and vibration.

Another kind of advertising alert is for a Product going on sale in which you have previously expressed an interest. For example, Amazon® can have a Lightning Sale for the next fifteen minutes on a laptop you are considering buying as part of your Assertion to purchase a laptop in the next month. Your smartwatch can vibrate and direct you to check your email for the limited-time special offer from Amazon® that additionally includes a coupon for free two-day shipping.

9. Sharing Targeted Advertising Between Users

Group consumption is best at locations where there is Targeted Content Delivery to First Device to enable shared consumption of targeted advertising.

Arkiïs™ Users combine together into a SyncGroup when they join together in a group to collectively share consumption of Content, communicate with other group members, and/or network with other like-minded Users. A SyncGroup may be formed from members that are in Physical Proximity to each other or alternatively that are in Virtual Proximity to each other or a combination of both. An example of a SyncGroup formed due to Virtual Proximity is Arkiïs™ fortuitously noting that your friend or group of friends is also about to watch the same show that you are about to watch. You can be asked, through a visual, audio, and/or tactile notification on any of your Devices, whether you would like to join up with them to watch the show together in a SyncGroup. Automatic SyncGroup creation with certain Users watching the same show may also be enabled in a User's Arkiïs™ preferences. Virtual Proximity may also include Users with a Physical Proximity to each other. Virtual and/or Physical Proximity may come and go but a User may elect to remain in a SyncGroup. Alternatively, a User may return to a previous SyncGroup they were in that has a persistent Profile even though they may not presently be in Virtual and/or Physical Proximity with other members.

Members of a SyncGroup may elect to integrate one or more communication technologies into their group including telephony, video conferencing, text messaging, instant messaging, Skyping, Twitter, Instagram, Facebook posting (e.g. wall posts), etc. depending on the embodiment. Each member may configure, using their Arkiïs™ app on their smartphone, how they wish to receive and send their communications. For shared displays, they may agree to configure the sending and receiving of communications for members using a particular shared display to be via the shared display. While in a group, members may be able to send messages only to specific individuals of the group instead of to the whole group. Third parties such as Twitter, Facebook, and Skype® may choose to provide integrated Arkiïs™ functionality with their Products and directly communicate with the Arkiïs™ cloud servers to notify them of messages sent by other members of SyncGroups. In an alternate embodiment, Users may provide their login credentials for third parties and allow Arkiïs™ to log into their third party accounts from the cloud to receive message notification. For example, in some embodiments Users may send text messages to a special number associated with their SyncGroup and have those messages appear to each User, such as by a quote bubble appearing superimposed over the Content they are sharing along with an attribution. Such messages may be omitted from the display being used by the sender to receive group messages. Members may receive their messages on either one or more first Device(s) or their one or more Alternate Device(s). Messages may be integrated into Content feeds by the Arkiïs™ cloud servers or overlaid on top of Content by display and Content feed devices or presented on an Alternate Device that may not be receiving the Primary Content feed. Another type of message is survey/voting results, which may also be integrated into or overlaid upon Content feeds. SyncGroup members may configure their viewing to display survey results for Arkiïs™ surveys or for surveys in third-party applications like Twitter and Facebook. These surveys may provide real-time Feedback as to what Consumers are thinking regarding a show as it unfolds. For example, in TV shows, such surveys may indicate what viewers think should or is likely to happen next. Depending on the embodiment, survey results may be configured to display individual responses, SyncGroup average responses, total audience average responses, and/or etc. Such displays of survey results may compare and contrast results across different groupings (e.g. males vs. females or SyncGroup members vs. total audience.)

The following example usage scenario describes the use of SyncGroups within the Arkiïs™ system. After graduating from high school, Ashley, Lisa, and Julie have each gone off to different colleges but wish to maintain their friendship. On Wednesdays, they get together in a virtual SyncGroup to view new episodes of their favorite show, Arrested Development. They join up each week and share synchronized viewing of the episodes along with a shared 60-second commercial for the group to pay for their viewing. During the show, they use their smartphones to video chat with each other and talk about the show as it unfolds as if they were in the same room together. Ashley's new friend Jennifer has joined the SyncGroup and is physically present with Ashley. By default, the SyncGroup advertising would be skewed toward Jennifer because she spends ten times as much as the other girls. However, in this SyncGroup Jennifer has configured a separate incognito Sub Profile to represent herself that does not make her stick out relative to her new friends. Without this, the SyncGroup Targeted Marketing Content would be skewed toward her and her proclivity for Coach Products. Instead, the Profile she has adopted for this SyncGroup makes her appear more in line with the norms of her age group and thus with her new friends. Because she is using this alternate Profile, her addition to the SyncGroup has not disrupted the Targeted Marketing Content they would get without her added presence. Because the viewers are in different time zones, the SyncGroup naturally avoids targeted ads that payout more during dinnertime hours. This is because their selection would only payout well for Lisa, who is on the East Coast, since it is only dinnertime for her each week when they view whereas it is well before normal dinnertime for Julie in Mountain Time and Ashley and Jennifer in Pacific Time.

Arkiïs™ Users in SyncGroups may elect to maintain a group Profile. For example, an Arkiïs™ User may join together with their spouse to create a persistent or ongoing SyncGroup Profile to share information, such as future intents, spending, and income between their two Individual User Profiles. Their SyncGroup Profile enables joint marketing that may target both of them together as decision makers, such as for purchasing a car.

Figure 20:
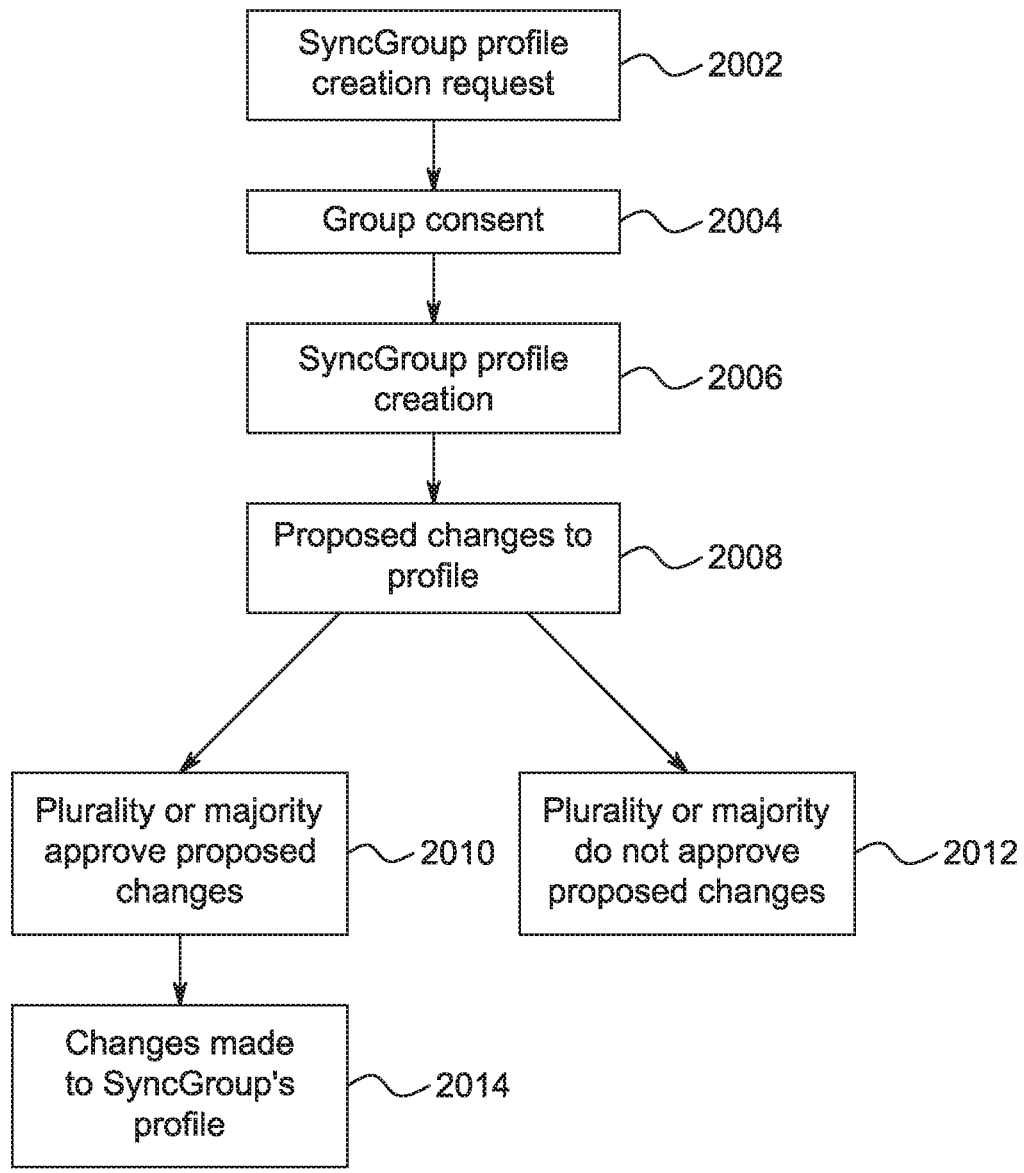
FIG. 20 is a flowchart of SyncGroup Profiles, that can be privacy protected.

FIG. 20 shows the general steps and factors in creating and updating a SyncGroup Profile. A SyncGroup Profile may be limited by the Profiles of the members of that SyncGroup. For example, a User may prohibit the creation of a SyncGroup Profile for a SyncGroup they are a member of without their consent. SyncGroup Profiles may be configured to allow more or less control over the changes made to that SyncGroup's Profile. In some embodiments, a SyncGroup may allow any member to edit its Profile, or may only allow a subset of its members to edit its Profile. The same processes that are used by organizations such as described in the book Democratic Rules of Order by Fred Francis and Peg Francis, available from Cool Heads Publishing, Merville BC, Canada (democraticrules.com), may govern a SyncGroup. In alternate embodiments, a SyncGroup Profile may require a majority to approve proposed changes before they take effect or may require some other plurality of Users agree. In other embodiments, a SyncGroup may allow any member to veto proposed changes. A SyncGroup's rules, constitution, and/or preferences may be visible to the public or only visible to members, based on preferences agreed upon by the SyncGroup members. A User's Profile may specify a default authorization for SyncGroups they join and newly created SyncGroups may default to the most stringent authorization of any of its members. In some preferred embodiments, a SyncGroup's authorization may change from its initial setting by some form of mutual consent, some of which consent may be offered by default for some members based upon preferences in their own Profile. Mutual consent may take the form of, for example, on-screen electronic display and acceptance, text message query and reply of consent, or voice recognition and/or lip-reading of an affirmation of consent presented verbally or gesture recognition such as nodding the head in agreement, shaking the head to signify no, or giving a thumbs up or down signal.

SyncGroups may have a designated member who is the group leader. The group leader may be the only group member whose identity is shared with other group members. With the consent of another group member, the leader may pass their leadership role to the consenting other member. The group leader may serve to indicate the group's location and may serve as a beacon to bring the other group members together. A Product Champion may create a SyncGroup where they are the leader. In some embodiments, when a SyncGroup has a leader, the group's identity follows the leader when one or more members including the leader leave the group, perhaps to form a new group.

Figure 21:
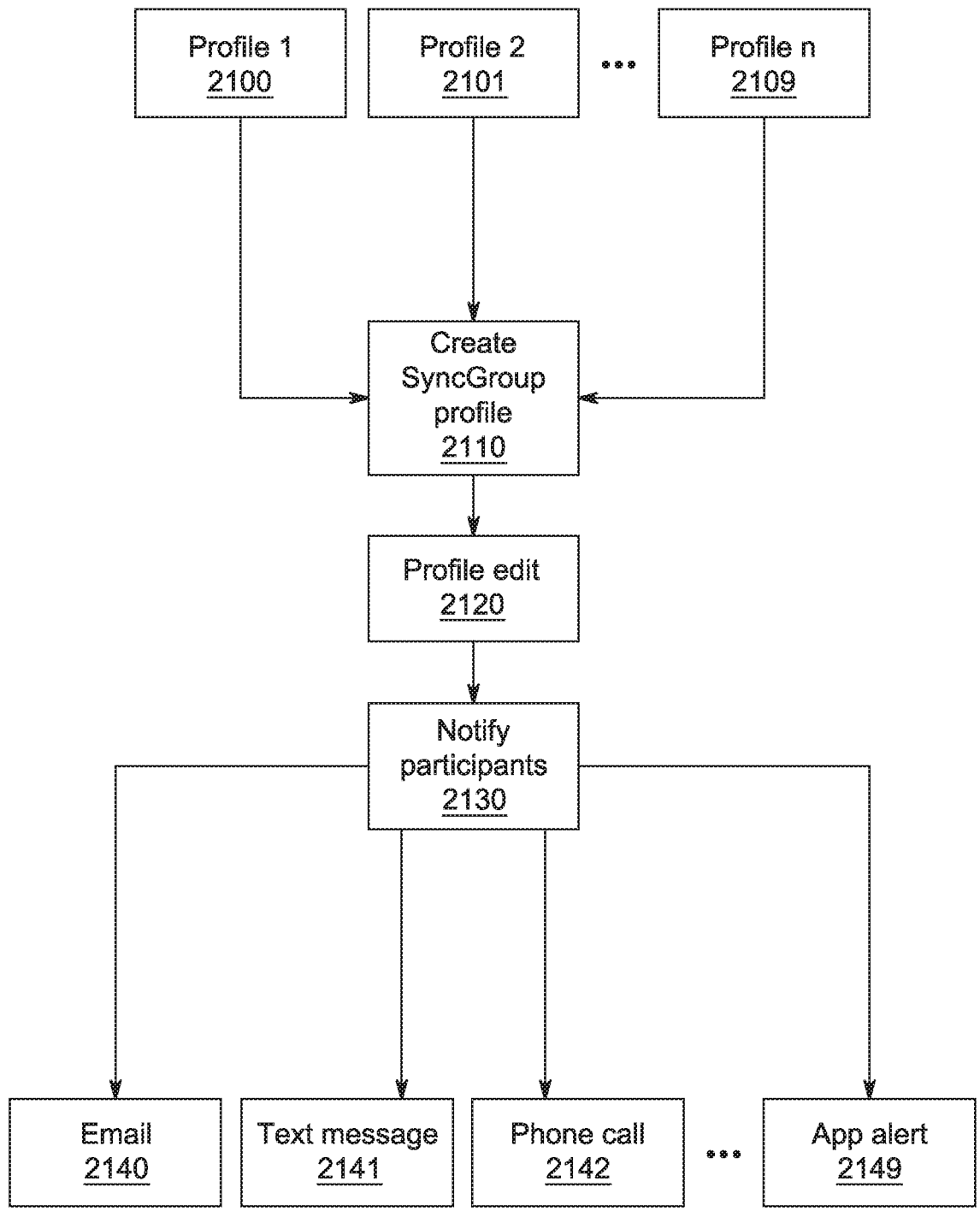
FIG. 21 is an exemplary SyncGroup Profile creation and notification system that can be used in conjunction with the technologies described herein.

FIG. 21 is an exemplary SyncGroup Profile creation and notification system that can be used in conjunction with the technologies described herein.

In FIG. 21 User Profiles 2100, 2101, . . . , 2109 are combined together to Create SyncGroup Profile 2110. Upon Profile Edit 2120 of SyncGroup Profile 2110, Notify Participants 2130 occurs via Email 2140, Text Message 2141, Phone Call 2142, . . . , App Alert 2149.

A SyncGroup may be formed intentionally by a group, or grown by spontaneously searching for friends (or compatible Users) that are presently available to join a new virtual group. In some embodiments, a User inviting another User to connect their Profiles as being friends in the Arkiïs™ system identifies them as being friends to the Arkiïs™ system. Additionally, linking ones Profile with other online social networks including Facebook, Google®+, Twitter, and LinkedIn may identify friends or potential friends to the Arkiïs™ system by those friends having also linked their Profiles to their social network accounts. Another method of identifying friends involves importing contacts from linked email accounts or smartphone contact lists. In some embodiments, friends may also be suggested by pattern matching of names and demographic information to suggest matches in the Arkiïs™ system that are likely to correspond to real world friendships. Friends may be suggested based upon shared values, ethics, politics, religious beliefs, tastes, preferences, common friends, purchases, or other possible links to each other. Friends may also be suggested based upon shared relationships such as confirmed friends held in common, common interests, locales, and/or employers. In some embodiments, invitations to become Arkiïs™ friends may require demonstration of an actual connection such as by answering questions about a member or providing identifying information such as email address, telephone number, or physical address. Demonstration may also include uploading photographs or audio samples of a friend that the system can confirm matches the identity of the target friend. In other embodiments, to prevent advertisers or other Users from adding Profiles they do not personally know to glean information from Users, Users may set their discoverability settings to require a one-time passcode (given to the User searching for their friend by the User being found) or require the use of NFC, Infrared communication, etc. so that Users must be in Physical Proximity to become friends on Arkiïs™.

A friendship connection within the Arkiïs™ system can be used for advertising purposes, e.g. by predicting a User's desires based on those of their friends. For example, if five of a User's friends buy fishing gear, the User may receive advertisements for fishing gear that may list the friends who recently bought fishing gear, so that the User can join their friends. However, in a preferred embodiment, friendship connections can only be used for advertising purposes if both Users agree that the connection can be used for advertising purposes.

A User may also seek to create a SyncGroup of like-minded individuals by using Arkiïs'™ targeting capabilities to reach out to other Users that have a high likelihood of sharing their interest and a desire to join together for support and communication. Each User may configure in their Profile the discoverability of their interests by other Users for this purpose. Configuration choices include, private (not discoverable by anyone unless explicitly shared), selected friends or groups of friends, all friends, $2^{nd}$ level connections (friends of friends), $3^{rd}$ level connections, or everyone. Other configuration choices include matching criteria, such as only by women, or only by those that have a particular interest or trait. A User may change their discoverability preferences for a Sub Profile or subset of information individually, without affecting discoverability preferences for the rest of their information.

In a preferred embodiment, Arkiïs™ may be used as a platform to aggregate multiple social media feeds, expanding a User's Profile and, thus, increasing their relevance to advertisers while the User browses social media in a streamlined and convenient fashion. The configurability of Arkiïs™ allows a User to fine-tune their feed by limiting the friends and followed accounts whose Content is imported into Arkiïs™. Furthermore, a User may choose settings to filter out Content from their feed, for example Content including inappropriate language or external hyperlinks. In some embodiments, a User may post directly from the Arkiïs™ social media feed. A User can choose which linked social media accounts to post to from Arkiïs™ for each post, as well as fine-tune privacy settings for each post. Feeds may be imported and posts may be exported using Open API (i.e. public API) technology.

A User may utilize Arkiïs'™ discoverability preferences (e.g. selected friends or groups of friends, all friends, $2^{nd}$ level connections (friends of friends), $3^{rd}$ level connections, or everyone) to utilize their connections on Arkiïs™ or on social media accounts for networking, advertising, and contributing to causes they find important. As shown in FIG. 13 at 1302, 1304, 1306, 1308, a User may obtain potential friends and/or connections from a variety of sources. As seen at 1310, A User may specify in their settings that they want to be notified of how many friends, groups of friends, or other Users using Arkiïs™ are within a certain radius (e.g. ten miles) at any given time. This notification may be automatic or in response to a query by the User. The User can notify these friends in close proximity to join them at a location at which the User is currently present, or will be present at a certain time in the near future (1310). A Goods & Services Provider may be notified that a User is inviting friends to their property, either automatically or through an alert sent by the User, and may offer the User a portion of the profits from any resulting sales and/or donate a certain percentage of the profit to a charity of the User's choice and/or offer the User and his or her friends coupons through Arkiïs™ (1314, 1316).

The following example embodiment shows how Arkiïs™ can be used to connect with friends and find nearby friends. Since it is Friday, Chloe has decided to take half the day off from work and visit her favorite snow ice café, Arctic Fluff, after lunch. She drives to the complex where the café is located, arriving at around 1, and orders a turkey and avocado sandwich from the restaurant next door. As she waits for her meal, she decides she wouldn't mind some company for dessert and checks Arkiïs™ on her smartphone to see if any of her coworkers, college friends, and close friends are in the area. She has already created these groups, so she selects checkboxes to search for nearby Arkiïs™ Users within these three groups, and drags a slider to limit her search to anyone within a 10-mile radius. Chloe is surprised to see that she has 46 connections within this radius who allow friends to view their location. On the same page, she searches for Arctic Fluff to see if they have an Arkiïs™ Profile, and finds that they do indeed have one. After selecting Arctic Fluff as a message recipient on the same search page, she sends an anonymous message to the owners stipulating that she will invite all 46 connections to their café within the hour if 10% of all proceeds are donated to the Women's Global Empowerment Fund, a charity she supports monthly which aids women in northern Uganda through education programs and microfinance loans. The owners agree to these conditions and Chloe sends an invitation for all 46 nearby connections to meet at Arctic Fluff at 2, along with a picture she has taken of her favorite snow ice: half strawberry and half mango with strawberries, mangoes, yogurt chips, and strawberry drizzle on top. The owners send to Arkiïs™, a coupon for 15% off a medium or large snow ice with a valid Arkiïs™ cash identifier that is distributed to Chloe and the friends she has invited. Seventeen of Chloe's friends show up; by using their Arkiïs™ cash identifiers, they receive 15% off their snow ices and $13.60 is donated to the Women's Global Empowerment Fund. By the time Chloe and her friends have finished their dessert and their conversation, it is already 4:30. Chloe plans on attending happy hour at a dive bar a few miles away and wants to see as many friends as possible, so she changes her Arkiïs™ settings to automatically notify her every 30 minutes of how many friends are within a 5-mile radius.

In some preferred embodiments, advertisers may create fun games that promote their Products through competitive play amongst friends and also provide some form of compensation such as game winner prizes or Profile Badges that are visible to friends. For example, a company may have a new Product they are rolling out to the market and offer a game around the new Product that allows friends to compete where the winner gets a free Product sample. Games can be audio, video, tactile, and/or movement (accelerometer) based. During the evening commute, co-workers can play a friendly audio game as they wait in rush hour traffic. Arkiïs™ provides the infrastructure to link together the friends into a game SyncGroup where they can see each other's progress and relative standing. In some embodiments, the game may include linking the group together in real-time for live audio or video so that they can compete directly against each other and see and/or hear each other.

The following example embodiment of the system describes group gameplay through Arkiïs™. Nancy, Betty, and Kris are friends driving in a car together on their way to the beach. Nancy is driving her own car where she is streaming her virtual Arkiïs™ station from her smartphone that is connected to the car's entertainment system. All three have their smartphones with them and because they have already linked their Profiles as friends on Arkiïs™, they are automatically synced up into an Arkiïs™ group after being in close Physical Proximity for more than three minutes. While driving, Nancy's radio is synced up to the group as described in Alternate Device Synchronization and begins streaming Content that is customized based upon their three Profiles combined. Because their Profiles all allow it, their radio prompts them asking if they would like to play a new game that promotes a new romantic comedy that is coming to NBC. The game is a word game where words from the series are incorporated into the play so that the players will become familiar with the series' concepts and themes. The game takes about ten minutes to play while they are driving and the winner, Betty, receives $5 and for participating all receive free commercial-free access to the first three episodes.

The Arkiïs™ Alternate Device application (e.g., mobile phone app) and shared First Devices may facilitate Users joining together into a SyncGroup. In some embodiments, SyncGroups are formed by detecting group consumption situations due to sustained Device proximity for Users that are logged into their Profile on their mobile device. Such detection can be performed on a server in the cloud, with each Device registering its contextual information with the server, which then organizes Device owners into Sync- Groups. In other embodiments, SyncGroups are formed through direct communication among pairs of mobile devices. Individual Device owners may join into a SyncGroup that can merge any other Users they may already be paired with into a larger group, merging previous SyncGroups into a larger SyncGroup. Depending on the embodiment, direct communication between mobile devices can be through Near Field Communication (NFC), Bump Technologies like validation/coordination (analyzing accelerometer data to match two phones being bumped together, see bu.mp/company/faq), or local communication inside a Wi-Fi network. Once a SyncGroup is detected, each User within the group may select how they wish to consume Targeted Content. Such a selection may be preselected or chosen manually in each instance as they occur. In group consumption situations, Alternate Device Synchronization is shared across the mobile devices so that they do not need to all specify the show being watched, but instead piggyback on the selection of others in the group.

In group consumption situations, there are multiple metrics to coordinate. These include filtering and interest preferences as well as payout preferences. One may choose to loosen one's filtering requirements (e.g., allow advertising for alcoholic beverages that are normally suppressed) and to optionally specify that advance warning be given on one's personal mobile device before such messages are to be delivered to allow one to either switch to consuming alternate Content on one's mobile device, or to briefly leave the First Device's room. On the payout side, one can choose between optimizing the group's payout as a whole versus optimizing the minimum payout across the whole group. Users may tailor or customize all of these choices, in some embodiments, this is accomplished by a SyncGroup settings page that stores User input within a database to affect filtering and payout according to the User's preferences. In some embodiments, during viewing, the First Device can split in half with SyncGroup members using their mobile device to receive audio for whichever half of the split screen applies best to their profile.

During shared Targeted Marketing Content, each participant can view on their mobile device how much they will get for consuming the ad (based upon how well it is optimized for their profile) and decide whether they are going to pay attention, opt-out and consume a personally targeted ad on an Alternate Device, such as their mobile device, or leave the room to take care of other business.

Additionally, in a preferred embodiment during shared Targeted Marketing Content, each participant may also view on their mobile device how much payout they can receive for giving Feedback and they may choose individually whether to leave Feedback on their mobile device or receive further messages expounding on the Marketing Content that interests them while others may continue on with other ads.

Figure 22:
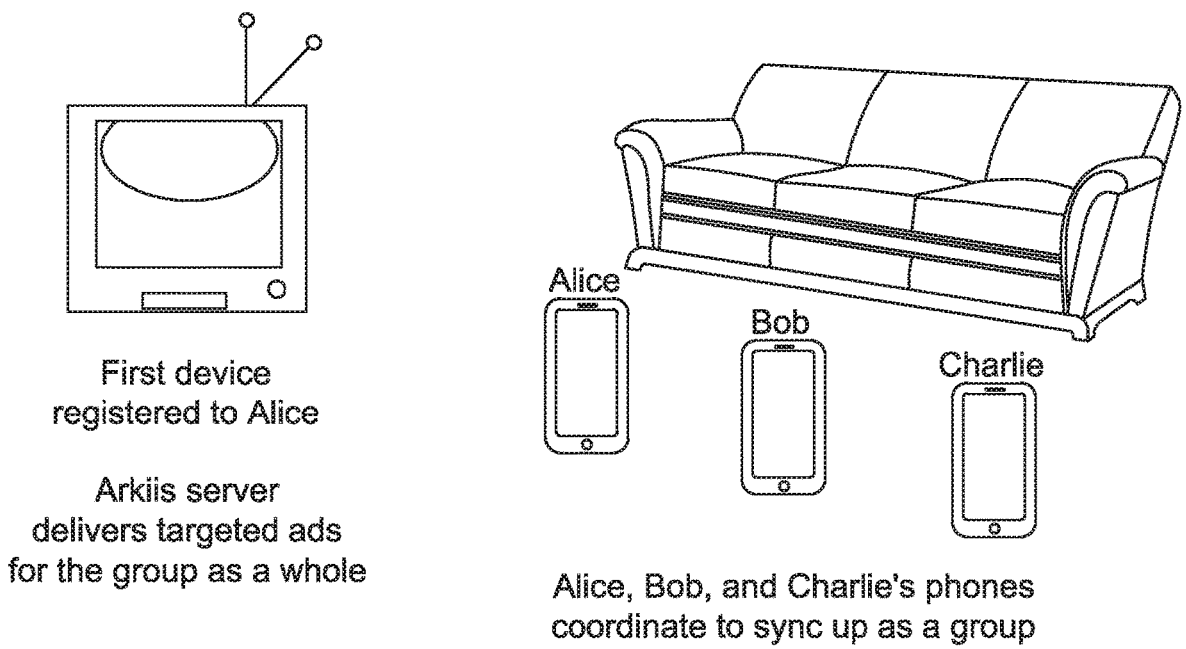
FIG. 22 is an exemplary depiction of a SyncGroup of three individuals coordinated by their mobile phones with targeted advertising delivered to a shared First Device.
Figure 23:
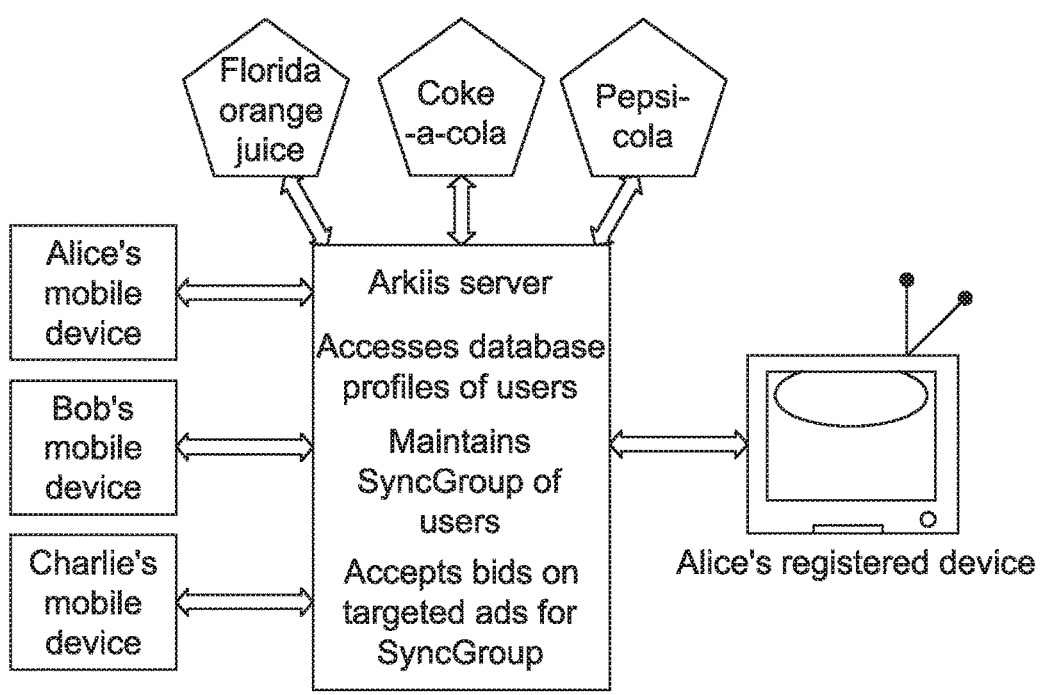
FIG. 23 is a flowchart of an exemplary depiction of a SyncGroup of three individuals coordinated by their mobile phones with targeted advertising delivered to a shared First Device.

The following example usage scenario depicts a User independently branching out from group advertising in the Arkiïs™ system. Phillip is hanging out with his college buddies who are all members of Arkiïs™. An ad for Samuel Adams beer is selected that is optimal for the group as a whole, but this is not optimal for Phillip individually because his Profile shows he does not drink alcohol. Looking down at his Arkiïs™-enabled smartwatch, he is alerted that the ad will only pay him five cents to view and that it does not match his interests, so he decides to instead watch his own personally targeted ad on his smartphone from eTrade to open an IRA while the rest of the group watches a humorous beer commercial on the television. Since the Arkiïs™ cloud servers know he is in a distracting situation, the servers query him in more in-depth on his smartphone to confirm cognition of the personal ad he views, which he does and earns one dollar. See FIG. 22 and see FIG. 23. In FIG. 22, Alice, Bob, and Charlie are in Physical Proximity to each other as detected by their phones and join together into a SyncGroup that includes as a First Device, Alice's registered television which is delivered targeted ads, targeting the SyncGroup as a whole by the Arkiïs™ server. In FIG. 23, Alice, Bob, and Charlie have mobile devices that are connected to the Arkiïs™ servers and associated with their individual Profiles, additionally, they have joined together into a SyncGroup and are sharing a display that is registered to belong to Alice as noted in her Profile. The Arkiïs™ server accepts bids to deliver targeted advertising from advertisers whose target audience parameters match the characteristics of the SyncGroup. The Arkiïs™ server selects from the available bids from Florida Orange Juice, Coke-a-Cola®, and Pepsi-Cola® to choose the advertising message that best fits the Profile preferences of the SyncGroup members individually and collectively and such selected message is delivered to Alice's registered Device.

Another embodiment of the Arkiïs™ system in which Users may branch out from an advertising group is as follows: Bob and Charlie visit Alice in her apartment to watch the Big Game between Stanford (their alma mater) and UC Berkeley. Alice tunes her television to her personal Roku™ Arkiïs™ channel and selects the Big Game. Because each of them is logged into Arkiïs™ using their mobile device (e.g., always logged in) and they are in sustained close Physical Proximity to each other, their Profiles automatically sync up for shared viewing using their previously configured SyncGroup. Because Alice is viewing her personal Roku™ channel and she has synced up with her friends, her channel automatically delivers Targeted Marketing Content optimized for the group as a whole. During halftime, Alice's dad stops by and he also automatically joins into the SyncGroup. Because his net worth is so much greater than these recent college graduates, the targeting switches to weighting his Profile much more heavily and his presence triggers a quick one-minute ad for the new BMW® 7 Series ActiveHybrid 750i earning him $15. He decides to allocate a small portion of his earnings (the total amount of which only he knows) to cover the cost of the rest of the game so they can watch the remainder commercial free, and he also purchases the premium behind-the-scenes interviews of the Stanford players and coaches to substitute for the normal commercial breaks. Right before his BMW® commercial airs, Bob and Charlie receive alerts on their phone that the upcoming advertisement falls below their watching threshold since it would only pay them five cents. They both choose to temporarily switch to Alternate Device viewing of personally targeted advertisements because the BMW® advertisement would pay them so little. Alice does not get such an alert because her payout is fifty cents, since she might influence her father's decision.

Content consumed by a SyncGroup is earned and paid for by all Consumers of the SyncGroup even though they may be sharing a single Device. A User may choose to sponsor a SyncGroup to allow for a reduced commercial or commercial-free experience, or to tilt a Targeted Premium Content feed toward the perspective they desire. In commercial venues such as a sports bar or movie theatre, a sponsor may require a portion of any revenue earned by SyncGroup members. In some embodiments, conflicting requests may be resolved by selecting the highest bidder. A User who wishes to sponsor a SyncGroup for a party or an event may use Arkiïs™ to send invitations to the event, where an Arkiïs™ User's acceptance of an invite places them into the SyncGroup for the event automatically or after being prompted to join the event's SyncGroup.

The following example usage scenario exemplifies group sponsorship within the Arkiïs™ system. Joseph is hosting a party at his house and decides to budget up to $20 to cover a commercial-free feed of the Super Bowl with behind-the-scenes extras during the commercial breaks. Arkiïs™ estimates the viewership at his home by utilizing the number of members in the SyncGroup of Arkiïs™ Users that come to his party. Additionally, his First Device is coupled with video and audio recording devices to combine the SyncGroup numbers with viewership estimates based on audio identification of voices and facial recognition of faces in the vicinity of the television. This allows for a more accurate estimation of viewers to take into account Arkiïs™ Users whose phones are turned off and non-Arkiïs™ attendees. The final viewership fee ends up being $10.85 based upon the duration and number of viewers coming and going during the game. Eight of his guests are Arkiïs™ Users and each donated $1 towards the cost, leaving Joseph just owing $2.85 for the balance.

The following is an example embodiment of the system, in which Users can influence the advertising shown to a group: Sarah and Jessica are vegetarians and go to the movie theatre. Before the movie starts, there are targeted commercials being shown. Sarah and Jessica have put up a budget of $5 to possibly inhibit any advertising for meat Products that may arise. If at any point during the pre-movie show a targeted advertisement for meat would be the highest bidding commercial, the next highest bidding non-meat advocating commercial can be selected instead as long as the total payout difference between the two is less than the $5 they have allocated. The difference between the two commercials is subtracted from their budgeted amount and redistributed to the Arkiïs™ Users present proportionally to their respective payouts for the replacement targeted advertisement. The ad they bought out is then treated as if it had played and may not be resubmitted for that session. Their remaining budget is then applied to any different additional meat advocating commercials that may arise, and if inadequate and not replenished, subsequent different meat commercials may still air.

The video-on-demand service may also be used to deliver Content to public places with commercial Arkiïs™ Profiles. For example, a sports bar or movie theatre can create a Profile that represents their average audience demographics. The DVR can employ video and audio monitoring to gauge the audience size and reaction. The audience size may be determined through face recognition, Jacobs' Method, or other methods. Based on the audience size, the owner is paid for commercials. In a preferred embodiment, Arkiïs™ Users at the establishment may register their presence, and may confirm their location though means such as GPS, Wi-Fi triangulation, IPS (indoor positioning systems), cell-tower triangulation, and the like, to receive credit for ads and to help build the demographics model of the establishment. Many establishments have multiple screens so Arkiïs™ Users can have their Profiles coupled with the specific screens in their proximity and thus influence the Targeted Marketing Content being delivered to their locale within the bar. The owner of an establishment may specify in their Arkiïs™ settings whether they prefer to maximize profit from advertisements by playing Targeted Marketing Content which is heavily influenced by the crowd of Arkiïs™ Users present at any given time, or gain less in profit from advertisements but have more influence on the advertisements that are playing.

The following is an example usage scenario of the disclosed system: AMC theatres rolls out Arkiïs™ for their pre-movie Content and offers free movie tickets for a subsequent show for viewers that choose to sign up for the first time to the Arkiïs™ network. Arkiïs™ Users check-in with their phones at the screen they are viewing and are credited for commercials they view in the theatre. The pre-movie Content presented varies dynamically based upon each movie's projected audience demographics and varies as Arkiïs™ theatergoers arrive and register in the theatre.

The following is an exemplary usage scenario of the disclosed system. Regal Cinemas offers a special Arkiïs™ promotion (possibly spearheaded by a Champion) for their 4 pm showing of The Hobbit, if the show is sold to at least 25% capacity and at least 80% of attendees are Arkiïs™ Users with confirmed attendance (by either bringing their mobile device to confirm their attendance or buying their ticket using an Arkiïs™ enabled payment system method to document their purchase or submitting their ticket stub) then all such confirmed Arkiïs™ attendees will receive a $2 rebate on their movie ticket price.

When Arkiïs™ Users are synchronized together into a SyncGroup, advertisers may compete with each other to deliver Targeted Marketing Content to the group as a whole. In some embodiments, advertisers may place bids that include an attribution of the bid across each of the individual SyncGroup members. A bid may include sub-bids for each proper subset of the SyncGroup and thus may place a premium on some form of group participation (e.g., the whole group or a majority of the group, or some key influencers of the group). The SyncGroup members may choose to redistribute the payout attribution among themselves differently than it was assigned by the bid. For example, one group member that would earn much more than the others might agree to share a portion of their proceeds with the other group members in order to encourage participation and a shared group consumption experience.

The SyncGroup members may utilize their individual Profile Content filtering preferences to construct the Sync Group's Content filtering preferences. There are a variety of ways their individual preferences may be combined, depending on the embodiment. At one end of the spectrum, they may choose to filter Content to that which satisfies all SyncGroup members' individual filtering criteria. At the other end, they may choose to filter Content to that which satisfies any member's individual filtering criteria. In other embodiments they may also pick somewhere in between these two ends of the spectrum, such as Filtering Content to that which satisfies a majority of SyncGroup members' individual criteria. In further embodiments, SyncGroup members may also pick and choose how to filter Content, within this spectrum, along different Content filtering dimensions (e.g., humor criteria may be based on satisfying the majority, whereas moral criteria may require satisfying everyone, and interest criteria may only require satisfying one member). The selection of SyncGroup Content filtering choices may be tailored though the SyncGroup's Profile page accessed from a mobile phone, tablet, computer, DVR, etc. and may require mutual consent as discussed in group consumption (See Section 9—Sharing Targeted Advertising between Users).

Figure 24:
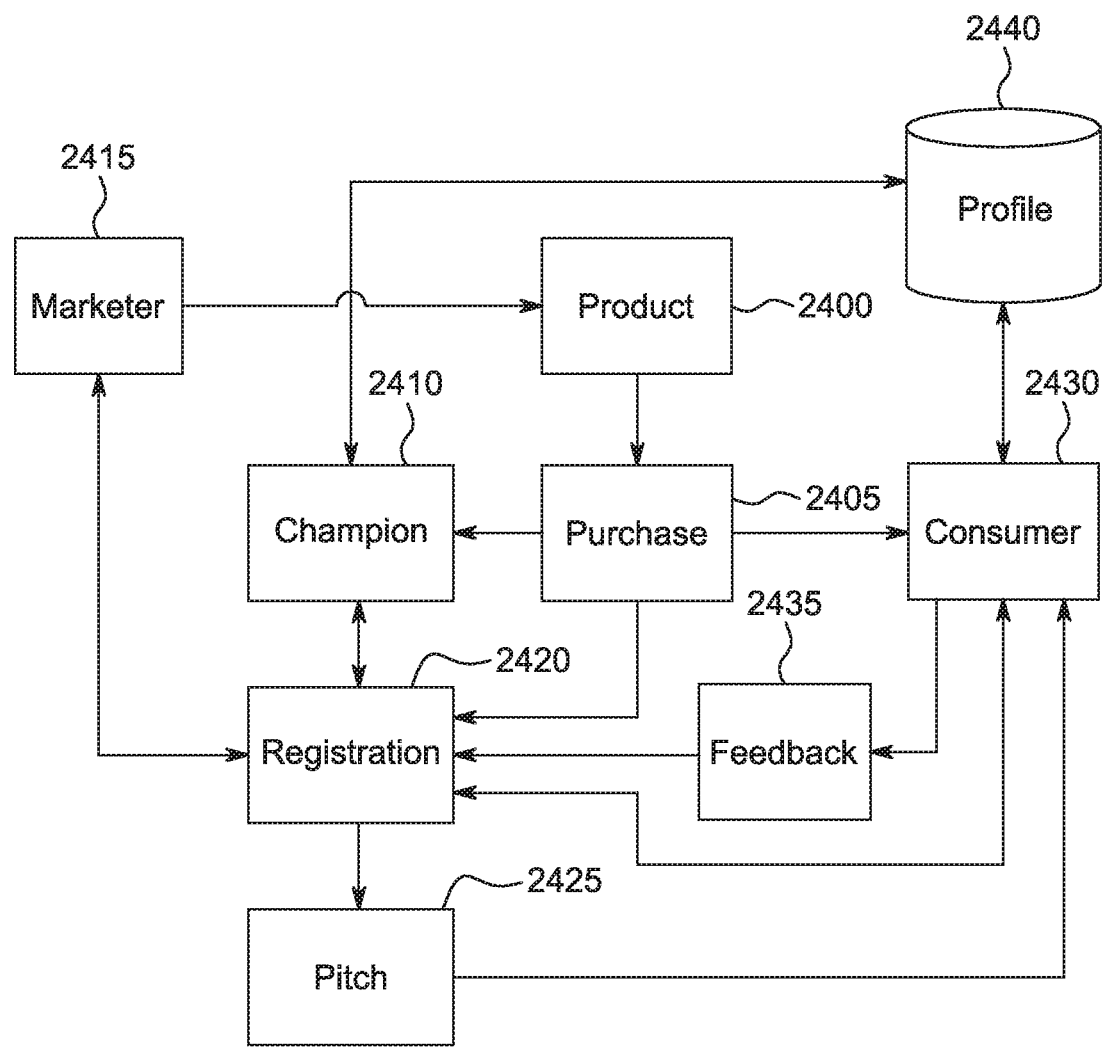
FIG. 24 is a diagram of the Champion process.

As shown in FIG. 24, Arkiïs™ Users that purchase (2405) Products (2400) of a company can register/request (2420)

the Marketer (2415) to be Product Champions (2410) of a company or its Products. A Marketer (2415) may configure their Business Profile to indicate their desire to solicit registration (2420) of Champions (2410) for the company or its Products so that prospective Champions may discover them and submit applications for possible approval by the company. In a preferred embodiment, prospective Champions (2410) may discover businesses potentially matching their preferences by querying the Arkiïs™ databases for companies and Products that are open to Champions and that align with their Profile (2440) interests. Such results may be ranked by how well the prospective match aligns with the User's Profile. Depending on the embodiment, algorithms to rank how well the prospective match aligns with the User's Profile may take into account the percentage of the User's Profile contents which match with the company's Profile, the percentage of the company's Profile which does not match or conflicts with the User's Profile, statistical inferences based on similar Users, etc.

Champions agree to pitch a company or Product based upon their own personal experience. Product Champions may compare different Products, or criticize a competitor's Products. Champions (2410) may create pitches (2425) in the form of testimonial video messages that may be integrated into Marketer (2415) Content messages when delivered to a consuming (2430) group that may include the Champion (2410). One example of this is the Champion recording a testimonial against a green-screen backdrop to allow the advertiser to easily place Content behind the Champion to enhance their presentation.

In some embodiments, when a Consumer (2430) purchases (2405) a Product (2400) and they previously consumed a pitch (2425) for that Product (2400) the purchase (2405) is included in the registration (2420) so that Marketer (2415) may take action on that information. Such action may include providing compensation to the Champion (2410) according to the details of the registration (2420). The Marketer (2415) may also adjust the registration (2420) to account for which pitch (2425) messages are more or less effective and thus more or less likely to be offered to the Consumer (2430).

In some embodiments, Marketers (2415) may receive Champion pitch (2425) video submission Registration (2420) and select which messages they approve for inclusion in their advertising campaigns as well as possibly grade them to adjust the Champion's (2410) payout rate through registration (2420). This approval/selection process may be done manually by the company, through an external agency or automatically through, for example, voice recognition and/or lip-reading analyzing the Champion's tone and keywords within the video submission depending on the embodiment. Consumers (2430) may filter their exposure to Champions (2410) in one or more topic areas by requiring in their Profile (2440) that Champions (2410) have a high integrity rating and/or have used the Product (2400) for at least some minimum time frame. A Champion may substantiate their claim to having used a Product by many means such as the attestation of another User, scanning a QR code included inside the Product's packaging, supplying a confirmation code included inside a product's packaging, linking their Profile to a credit card used to purchase the Product, linking their Profile to a store account used to purchase the Product, providing a receipt of their purchase, providing a video of themselves using the Product, etc.

Other types of Champion messages include live performances that integrate the marketing message being promoted by the Champion. This can take many forms such as: standup comedy routine, magic show, juggling act, or simply a straightforward extemporaneous message. Hybrid performances are also possible whereby a live Champion combines their performance with on-screen prerecorded Content. In some embodiments, Arkiïs™ Consumers (2430) that are consuming a Champion's performance pitch (2425) may offer their services to document the live performance by noting in their Profile (2440) that they are willing to be a videographer or audiographer. The Arkiïs™ system may allow the Marketer (2415) to designate via Registration (2420) and pay a willing recorder to document these live messages so that they may be reused and analyzed by those not present. Such documentation may also allow for feedback (2435) confirmation of the Champion's message and facilitate payment for their services via Registration (2420). In some embodiments, a Champion (2410) may register (2420) a description of their pitch (2425) performance in the Arkiïs™ system databases that may include show times, criteria required for spontaneous exhibitions, performance descriptions/genre/classifications, etc. in order to facilitate the easy location of Champion messages and performances by other Consumers. Consumers may annotate the database description in Registration (2420) with the addition of Feedback (2435) in the form of reviews, ratings, video/audio recordings, confirmation of performance information, etc. Mobile device applications may facilitate the addition of information by detecting or confirming a User's consumption of a performance and facilitating uploading of recordings, reviews, ratings, etc.

An example usage scenario describing a User who wishes to Champion a Product or service through the Arkiïs™ system is as follows: Robert can juggle lit torches and has integrated his performance with an advertising message for Geico® auto insurance. He has been invited through his Arkiïs™ Profile to a swimming party next Saturday evening with many friends that know him He decides to publish a Market Request to Champion Geico® auto insurance at the party to see if there is sufficient interest. There are twenty guests invited to the party using the Arkiïs™ system. These guests receive notice of the Market Request and may see Robert's Feedback and reviews of prior performances of his Geico® Champion message. These guests may then decide whether they wish to support the Market Request. Twelve of the guests indicate their support with one objecting and the rest abstaining. This support level being sufficient, the Market Request proceeds to actualization and Robert prepares for his performance on Saturday and schedules it for 8 pm. On Saturday evening, there are 24 Arkiïs™ Users present at the party when the appointed time arrives. Karen has registered with Geico® to record the performance and submit it to Geico® for their review in return for $5. Robert receives $20 for his ten-minute performance. The guests that know Robert well receive on average $2 for watching while those that do not know him well receive on average $1. Robert's friend Justin, who is in the process of buying his first car, is particularly well-targeted and receives $4.

A Champion (2410) may give permission in their Profile (2440) to create new pitches (2425) such as in the form of virtual ads (based on samples of their likeness and voice) or reuse existing Champion ads, after their death with the proceeds being paid to their estate. In such embodiments, Arkiïs™ provides a system of synchronizing the now-deceased Champion with Products that would have fit with their aspirations and values as determined by independent third parties to ensure integrity. The foregoing embodiment may entail statistical analysis of a Champion's Profile to judge a product's match level being sufficient to be a match.

Such analysis may include matching the deceased Profile to find similar Profiles who are known to acknowledge or disavow a Product affinity for the purpose of predicting whether the deceased Champion would have an affinity for the Product. The aforementioned matching may be carried out by a trained neural network, or any other means employed by matching schemes such as prediction algorithms similar to Netflix® movie suggestions. The Champion's Profile may have been configured during their life to require review and approval of prospective matching Products after their death by their family, agent, estate, and/or other approved entity they trusted. In other embodiments, similar approval system may apply to living celebrity figures that may not want to spend the time to review and approve all the ways their likeness can be reused to create new virtual advertisements, but are willing to allow their likeness to be reused provided the Product meets their values and constraints.

When bidding, a Marketer (2415) may place a premium on delivering messages to a SyncGroup that includes one of the company's registered (2420) Champions (2410). The Champion's position is divulged to the group to ensure transparency and integrity. The SyncGroup may be surveyed to see if members are willing to listen to someone from their group that is a Champion for a particular Product and even pay the other group members for answering yes or no and giving their reasons for saying so. Their decision as to whether to listen can be aided by Arkiïs™ presenting the reputation details of the Champion (2410) based upon Feedback (2435) they have received within the Arkiïs™ registration (2420) system. In some embodiments, the Marketer (2415) can decide, based upon survey results, whether to engage the Champion (2410), perhaps requiring total consensus or a supermajority before so deciding. After consuming the Champion's (2410) pitch (2425) message, these Consumers (2430) may be surveyed for Feedback (2435) to rate the effectiveness of the Champion's (2410) pitch (2425). This Feedback (2435) rating allows Marketers (2415) to choose Champions (2410) who meet their requirements and/or select Champions (2410) who have been rated highly in Feedback (2435) by similar audiences in the past. It also aids future potential Consumers (2430) in deciding whether to consume the Champion's (2410) pitch (2425) message and to see whether others with similar interests provided Feedback (2435) indicating they liked it. For example, Consumer (2430) may see a predicted Feedback (2435) rating of how Consumer (2430) will likely Feedback (2435) when rating the pitch (2435) Content. This may be based upon Content ratings you have already supplied that link you to like-minded people who have already consumed the pitch (2425) Content (e.g., like the algorithms Netflix utilizes to rate movies in order to predict what you will like).

The following example usage scenario describes one embodiment of the system in which a User becomes a Champion for a Product. Dexter is a long-standing customer of CutCo® kitchen knives. He is very impressed with how sharp the knives are and likes the fact that they are made in the USA, and has therefore decided to accept an email invitation he received to register himself as an Arkiïs™ Champion for these knives. He is entertaining another friend at his house and they decide to watch an a la carte HBO movie together. To pay for the movie, they agree to watch a one-minute commercial for CutCo® knives, knowing that Dexter is a Champion for the company. The message ends with reference to the fact that Dexter can demonstrate the knives and talk about his own use of them and offers a 20% discount for any knives purchased that evening. Dexter selects one from the kitchen after the message is delivered and briefly goes over why he is so happy with them (e.g., their ability to cut human flesh so effortlessly). His friend tries to leave early.

In some embodiments, Users may detect the physical presence of highly rated Champions (through GPS, mobile networks, Wi-Fi triangulation, and the like) and publish a Market Request for the Champion to perform for those present. A User may alert all similar Users within the vicinity whose Profile preferences allow such communication, to support the initial Champion Market Request. This data may be transmitted to the Champion so they can gauge/determine how many Consumers would come to the performance. Champions may decline such requests or offer conditions under which they would be willing to perform. For example, the Champion may require each participant's payout for the Targeted Content be allocated to themselves. If a sufficient number of those present agree to the Market Request terms agreed to by the Champion, then the Champion can perform their act. In other embodiments, a performer may also use this method to advertise their act and collect revenues for their accepted on-demand performances.

Goods & Services Providers (e.g., Coca-Cola®) may agree to compensate Champions for creating Content that includes placement of their Products (either actual placement or virtual via agreed upon digital substitution for revised product placement). To achieve this purpose, in some embodiments Arkiïs™ may provide software that automatically detects the presence and/or dissemination of Provider goods and services for the purpose of auditing, detecting, and/or measuring such placement and rewarding the Champion. Automatic computer detection of a product's presence may be performed analogously to facial recognition in photographs but adjusted for object detection. Processing to transcribe the audio into text may be searched by computerized means for mention of a Product. Positive matches may be subject to manual human review for confirmation and to ensure usage is not sarcastic or negative in nature. Such confirmation process may be facilitated by the Arkiïs™ system and results stored in the system databases for subsequent reference. In additional embodiments, the Champion or other Users may notify a Provider of such placement.

In a preferred embodiment, if a Product is being simultaneously consumed while it is being advertised, a User may earn a bonus payout offered by an advertiser. Product packages may have a QR code (matrix barcode) to identify the Product being consumed and an Arkiïs™ offer. Near the time that a coordinated message is being consumed, the User can scan the QR code to demonstrate that they are simultaneously consuming the Product being sold while the marketing message is being delivered and earn the bonus payout.

In the case that Product samples are being distributed and Championed in an environment (e.g., a theatre) where other Targeted Content is competing for User attention, the Arkiïs™ system discounts for the distraction from receiving Product samples in the payout formula of the Targeted Content that is competing for attention in some embodiments. Such discounting may be agreed upon by advertisers with Arkiïs™ and included in their agreed upon payout formula and automatically apply whenever the foregoing competing messages are presented such that their delivery overlaps temporally with delivery of the other Targeted Content. In the case that the Targeted Content is aligned with the Product sample, the system may increase the payout due to the synergy of the messages as agreed upon by advertisers and included in their agreed upon payout formula in some embodiments.

The consumption coupled message delivery may be organized around a SyncGroup that may have as its leader the Champion that is facilitating the delivery.

The following scenario is an example of one of the embodiments of the System, in which a User is able to utilize SyncGroup functionality for consumption coupled message delivery. Henry indicates in his Profile that he is hosting a Monday night football party next week for a group of five of his male friends and is presented with a shopping offer on his phone while at the grocery store to buy a case of a new Budweiser dark ale, a jumbo sized new Lime Chili Doritos chips, and a case of Coca-Cola® to serve at his party since during the show there will be targeted commercials presented to the group for these three Products. In return for serving the Product and providing Feedback on the Product and the commercial messages, Henry will be credited back with half the sale price and each participant will be credited with coupons for half off a future purchase of these Products. Right before the party begins, Henry scans the QR code with his phone for each of these Products with the Arkiis™ application to substantiate their being served at the party. After viewing the Targeted Marketing Content for these Products and providing Feedback, he receives a credit for half of his prior purchase. His friends check-in to the party with their Arkiis™ application and after the commercial message is supplied and they have provided their Feedback, depending upon their responses they receive coupons to buy these or other Products at half off the normal price.

The following is an example embodiment of the system: Michiko loves Skittles and has spontaneously decided to Champion Skittles today by passing out free samples at the mall starting at 10 am. Another Champion, Lucy, had previously signed up to do this starting at 9:30 am, but because Lucy did not arrive as scheduled, her slot is instead given to Michiko, who creates a SyncGroup where she is the leader. She uses her smartphone to receive directions around the mall to locate open-minded targeted recipients. Possible recipients may see details about the samples Michiko is offering together with information about Michiko so they can decide how credible she is and how well her interests align to their own and may then choose to join her SyncGroup and make themselves visible to Michiko on her smartphone so she can locate them. Once they have opted into the offer and joined the SyncGroup, they can also see Michiko's location and may choose to locate her, the group leader. When they meet up, they may scan the Skittles QR code or bump their phones together (Bump Technologies validation, as Incorporated by Reference) after locating Michiko so that she will be paid for her work. While receiving their free samples, Michiko extolls the virtues of Skittles and tells the story of how she became such a big fan. Because Michiko is at the mall while she is promoting as a Champion, she shares 5% of her earnings with the mall. However, as lunch time approaches at 11:30 Michiko goes home because the mall's agreement with her states that Michiko must suspend giving out free samples during lunch from 11:30 am to 1:30 pm so as not to compete with the food court.

A Champion may be required to have used a Product before becoming a Champion, and generally is sponsored by a Provider to create new material—whether a video advertisement, a pitch, or a live performance—which supports the Provider's Product. However, there are other methods of promoting a Provider's Products or advertisements that do not require company support or approval. The informal Champions who promote a Provider's Products or advertisements may be referred to as Influencers.

One type of Influencer is a User who likes a particular ad (e.g., because they find it hilarious) and saves it to their Profile so that they can later replay it for their friends in a group sharing event. In one embodiment, the Influencer may be able to see aspects of their friends' Profiles (based on their friends' Profile information sharing settings) in order to determine whether any of their friends have previously purchased similar Products, or alternatively, to see a graded list of how well the Product matches the interests of each of their friends. As a reward for promoting the commercial itself (not its message) the Influencer may get paid for each friend that they share it with in some embodiments. The sharing may be done one-on-one in Physical Proximity, or virtually. In some cases, the ad may be shared together with some Premium Content to help defray the cost of the Premium Content. The recipient of a shared commercial may configure their Profile to rank the foregoing shared ads more highly when choosing advertisements for consumption than they would be ranked without the Champion's advocacy of the shared ads. The foregoing ranking adjustment may vary depending upon the identity of the Influencer, the integrity rating of the Influencer, and/or the Influencer's relationship with the recipient.

Another type of Influencer is one where a User or group of Users bands together to attract more Users to purchase a Product with the goal of reaching a reward threshold when a sufficient number of Users have joined the group and purchased. For example, the group may get a 10% rebate on their purchase if they are able to link up ten purchasers in a 24-hour period to create a spontaneous cooperative to buy Products.

Another form of Champion is one where a Champion agrees to include RFID tags on Products or on their person for things they are promoting when they are being presently worn or used. Such tags allow for automatic identification of Products (e.g. clothing, mobile devices, shoes, watches, sports equipment, glasses, perfume, foods, drinks, etc.) such that other Users in Physical Proximity to the Champion can detect the RFID tags with their mobile device and retrieve information about such Products on their mobile device. For example, a Champion may include in their wardrobe clothing that they are promoting and when other Users see them and like what they are wearing, they are able to easily retrieve information about what they are wearing. If a User likes the shirt a Champion is wearing and such shirt includes an RFID tag because they are championing it, a User can easily bring up details about the shirt if they like it and possibly order their own. Alternatively, when adorning a perfume or consuming food or drink, a Champion may place or activate an identifying RFID tag on their person. In the case of Virtual Proximity, a Champion's own mobile device in Physical Proximity may detect the RFID tags on the champion's own body and communicate such tags to other Users in Virtual Proximity. Alternatively, a Champion may just publish in their Profile the Products they are presently using for detection by other interested Users analogously to RFID tags.

10. Providing Targeted and/or Premium Content

In some preferred embodiments, cooperating broadcasters may provide Arkiis™ with an alternate live broadcast feed to continue live coverage while their generic broadcast stream goes to commercial breaks. The broadcasters may be paid by the Consumer through Arkiïs™ for this live feed at a rate commensurate with what they receive from the commercial messages being supplanted by their continued live feed. For example, in live sporting events, added in-depth replays, interviews, and commentary may be provided, or behind-the-scenes locker room discussions and strategy sessions may be exposed. As this use of continuous Content feeds/programming matures, alternate feeds can evolve where a User's Arkiïs™ Profile preferences can automatically select the feed that best matches their interests. For example, if you are a San Francisco 49ers fan, the Content can be more focused towards that team, or alternatively, if you are interested in a particular position, such as the quarterback, the feeds can be selected to emphasize that preference. In a public situation such as a bar, an Arkiïs™ User can pay to sponsor Premium Content ad-free, much like how one used to put money into a jukebox to hear a song, but everyone in the room got to listen.

Arkiïs™ may allow live sports events to change how they are played so that they no longer have arbitrary commercial breaks and hold up game play to wait for the commercials to end before resuming play. Instead, the natural breaks that occur in the game between plays and during time-outs become sufficient to consume commercials if desired and pay for the cost of receiving the Premium Content.

In some embodiments, during commercial break of a live program (e.g. a football game), other unrelated or independent premium channel Content (not necessarily live) can be temporarily tuned in and upon the original live Content's return from commercial break, the Device or individually customized feed can automatically return to the Primary Content channel being viewed or split the screen and show two or more feeds.

The commercial break Premium Content may even be expanded into the traditional broadcast Premium Content. For example, a broadcast network may produce alternate feeds that target specific demographics in return for a premium from the Consumer. For sports programming, a broadcaster can produce two or more additional feeds beyond their traditional generic broadcast that target the fans of the two teams competing. The team-targeted feeds can include announcers with an affinity towards the team whose fans are being targeted; further, the choice of cameras and instant replay perspectives during the game can be adjusted to serve the desires of the fans of a particular team. Additional feeds can also be created around other target audience metrics, for example, when watching football, one demographic may prefer to only view the game with a focus on the quarterback.

Figure 43A:
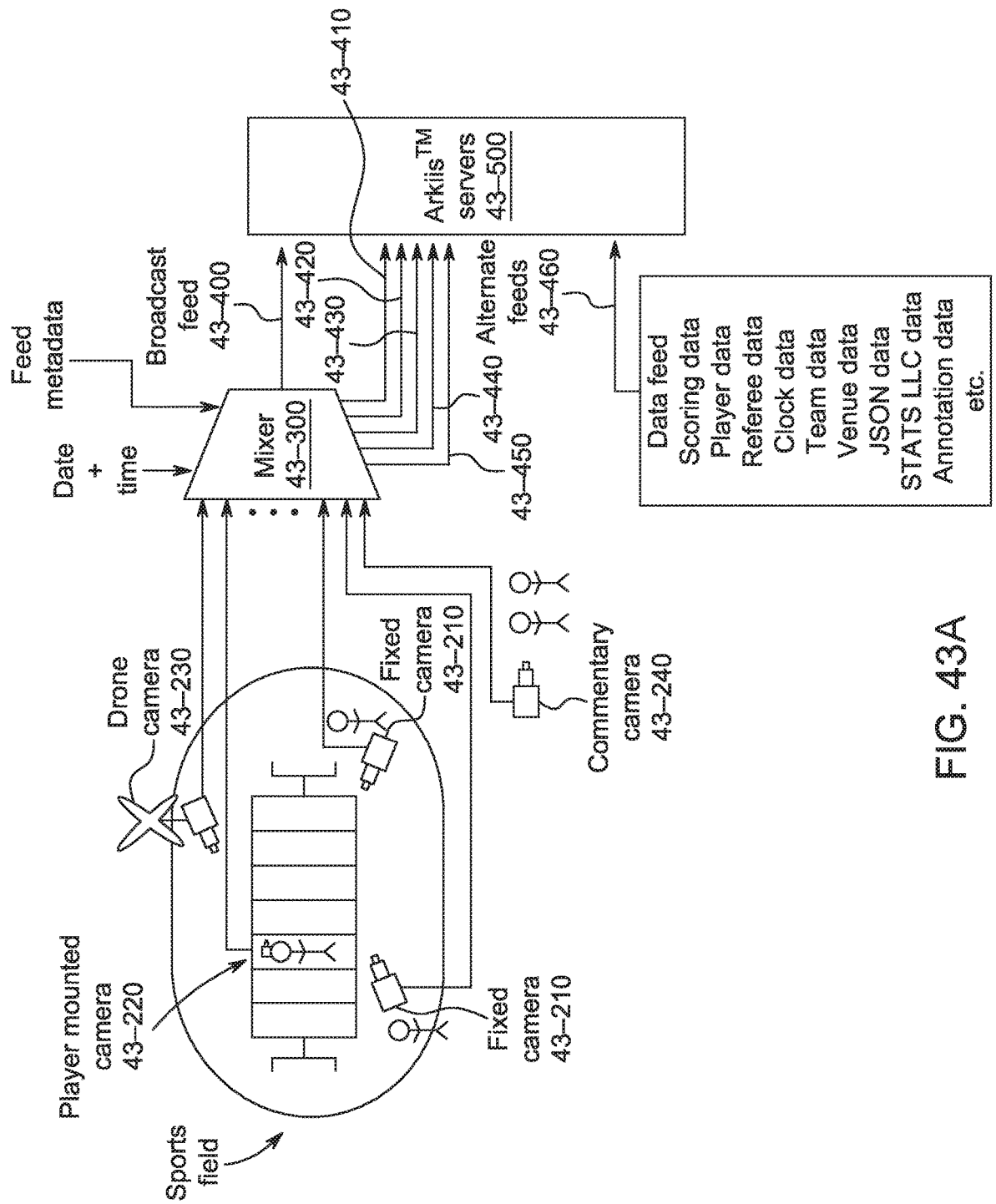
FIG. 43A is an overview flow chart that illustrates a sports game being recorded via various feeds of different perspective and those feeds being combined by a video mixer to create a broadcast feed that is extended to include alternate feeds, data, and metadata for transmission to the Arkiïs™ servers.
Figure 43B:
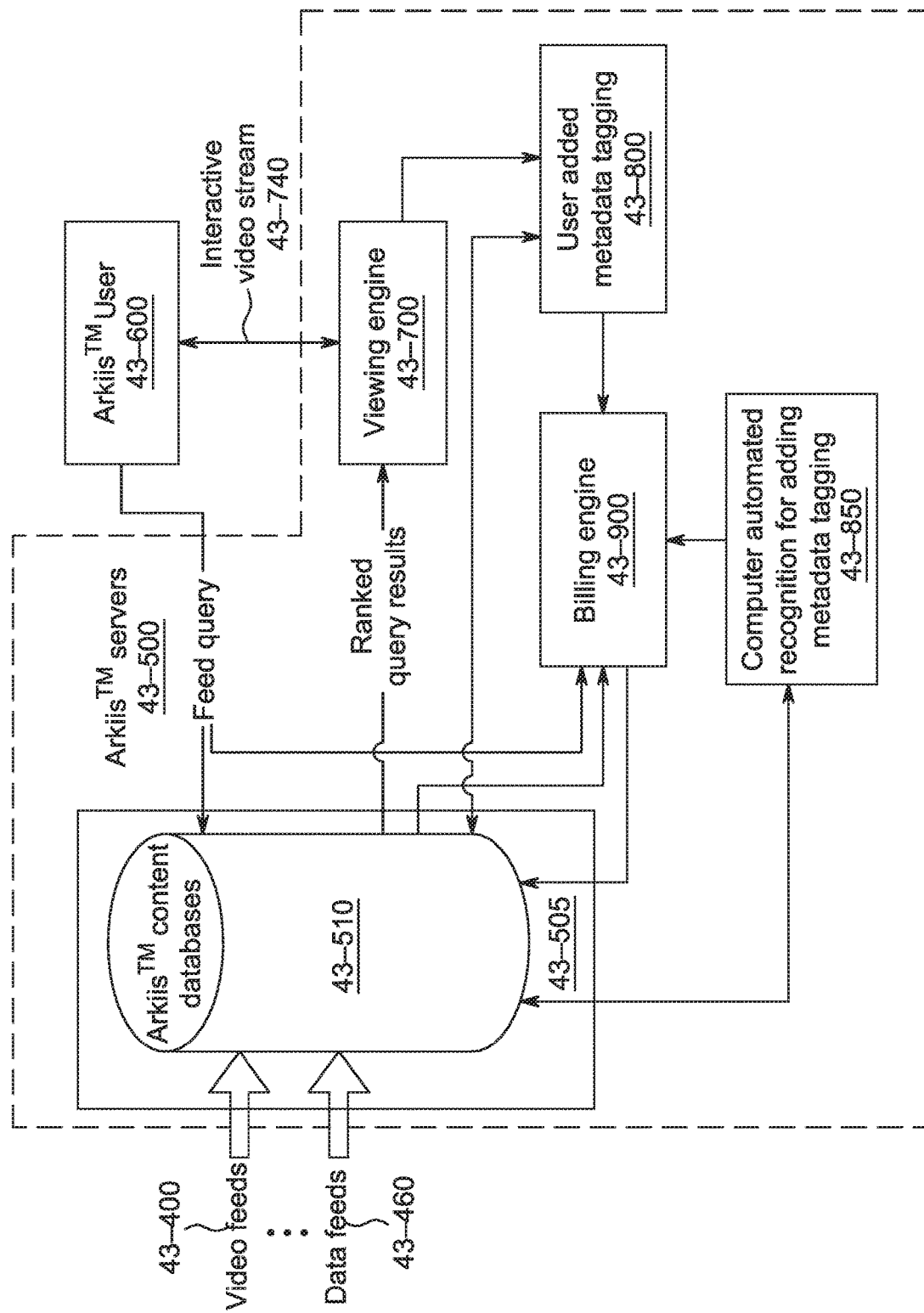
FIG. 43B is a flow chart that illustrates reception of the various video and data feeds and their composition into a personally customized feed for an Arkiïs™ User.
Figure 43C:
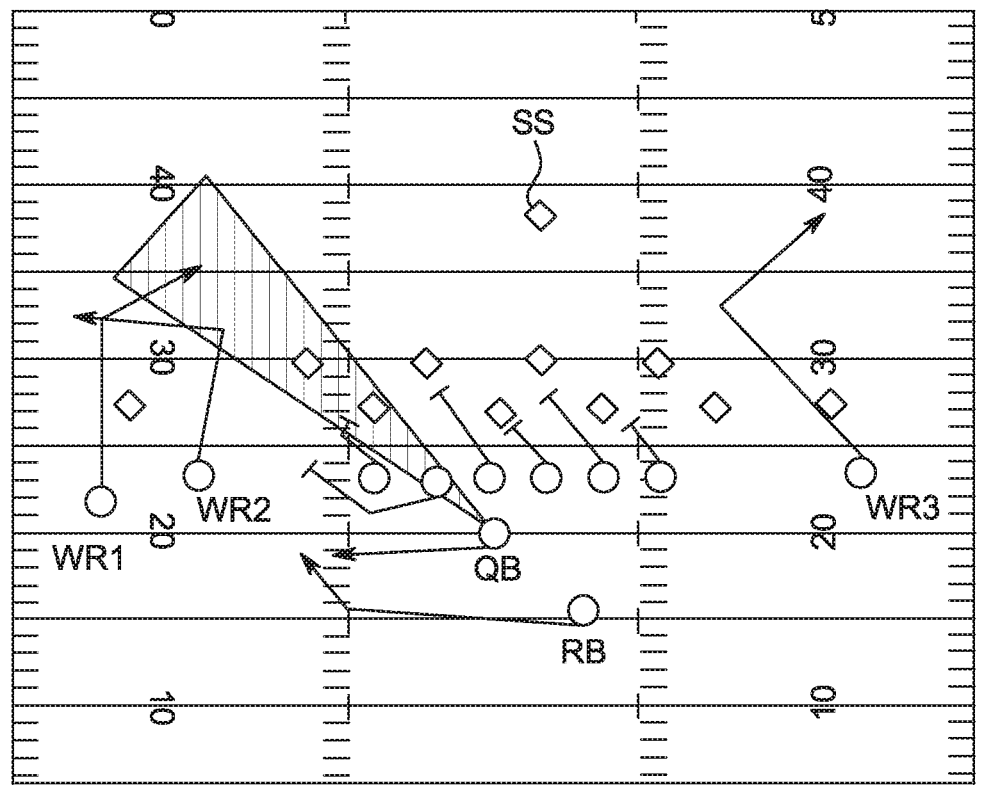
FIGS. 43C, 43D, and 43E each illustrate example metadata associated with a video clip of a video feed for a play within a game.
Figure 43D:
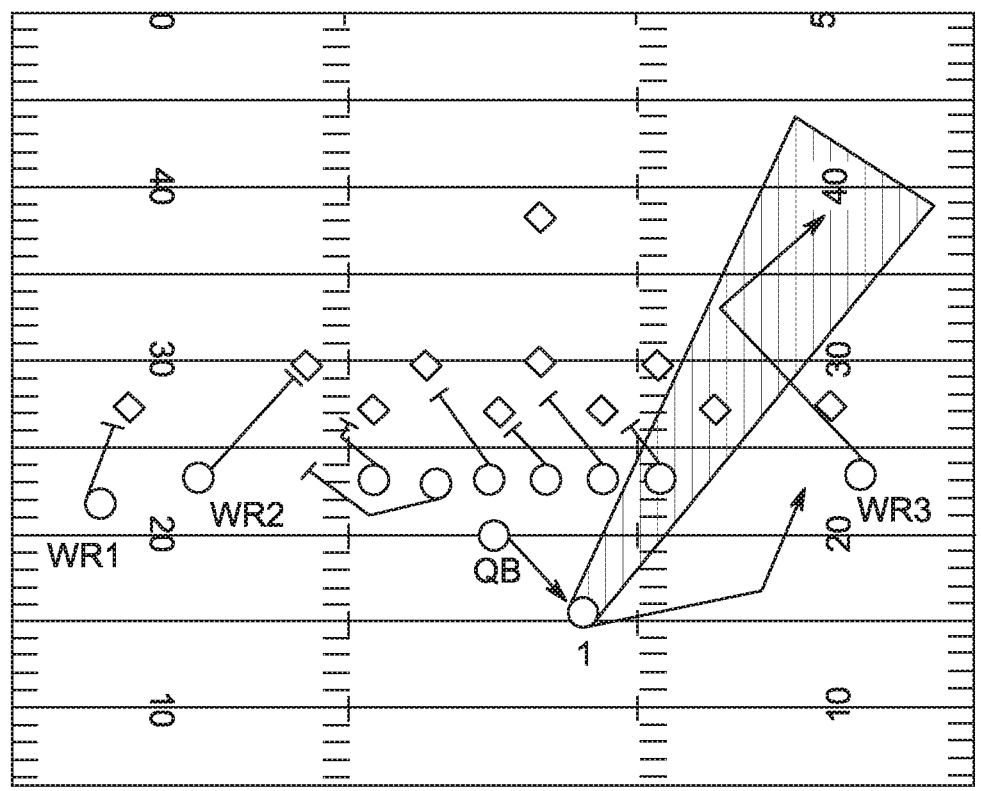
Figure 43E:
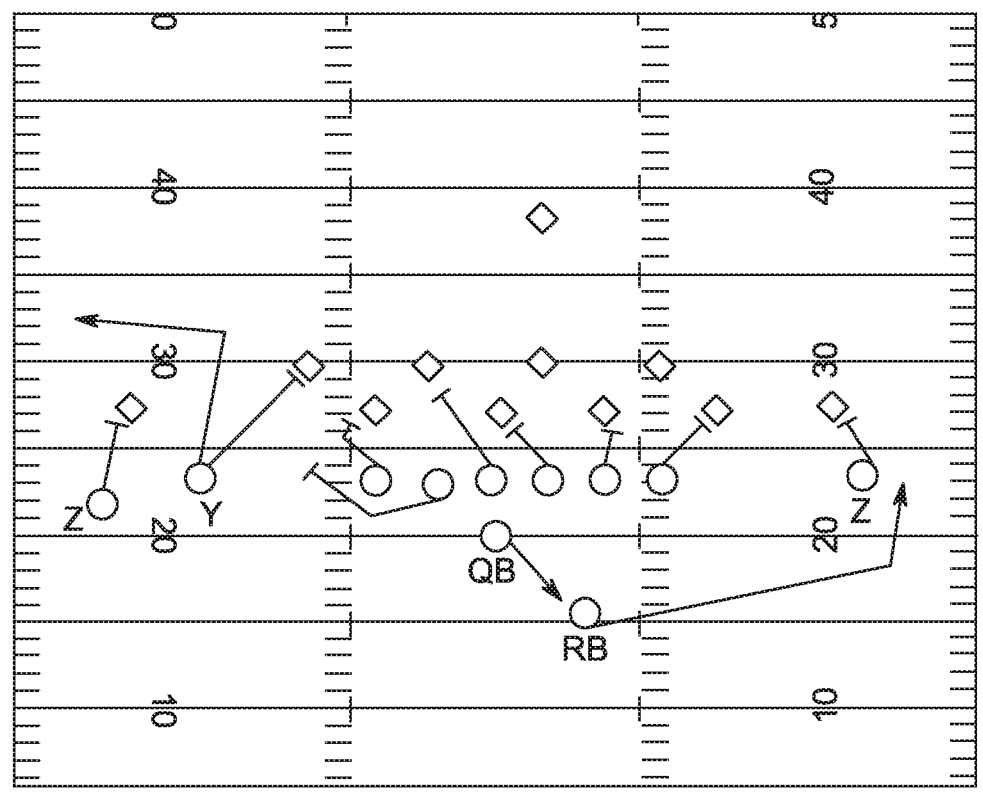

In a preferred embodiment, a User (e.g. Arkiïs™ User 43-600) may associate their Fantasy Football Team (or other Fantasy Sports Team) within a league with their Profile in order to receive (such as by Viewing Engine 43-700) an anthology of the plays (or portion(s) thereof) such as depicted in FIGS. 43C, 43D, and 43E and for which Video Clips 43-1000 are generated in which one or more of their Fantasy Football Team members featured prominently during the last few seconds, minutes, hours or days. Per User preferences, such anthologies may not feature a whole play, but instead focus on one or more sub-portions, such as the portions in which their team member scores points in the Fantasy Football competition. This association can be done by linking a User's Arkiïs™ Profile to a Fantasy Football application (e.g. ESPN Fantasy Football, Yahoo Fantasy Football) on a mobile phone or other computing device or in the cloud, wherein such application is integrated by its publisher through published APIs to communicate and coordinate with the Arkiïs™ servers. In an alternate embodiment, a User's Arkiïs™ Profile may import the lineup and other details of their Fantasy Football Team such as their league and rules, such as by User providing login credentials to a Fantasy Football application in their Profile to allow their Fantasy Football team members and other league information to be imported by the Arkiïs™ servers logging into the application and gathering any necessary information. Such league information may also be available in the SyncGroup Profile of SyncGroup 43-650 for which Arkiïs™ User 43-600 is a member. Such importation may be regularly synchronized by the Arkiïs™ servers 43-500 or the Fantasy Football application may be integrated with the Arkiïs™ system by the use of published APIs and link a User's information with Arkiïs™ and proactively send updates and changes to a User's team as represented in their Profile in the Arkiïs™ servers as they are affected (e.g. such as by a trade of a player in a league from one User or Contestant to another). Users may also associate their Fantasy Football tool/auxiliary accounts such as their ScoutPRO.com® account (or other similar service) with their Profile so that customized statistics, analysis, and predictions may be incorporated into their Fantasy Football Arkiïs™ replays (e.g. during a replay involving the User's quarterback, their ScoutPRO.com® account may be queried to display additional statistical information and predictions for their quarterback such as Annotation Component 43-574).

In some embodiments, the Content Providers and/or computer automated recognition 43-850 may tag play Content (such as feeds 43-400, 43-410, . . . , 43-450) with identifiers for the players who figure prominently in each play (e.g. players that are attributed with a Fantasy Football scoring action in the play or whose actions in the play are tagged as exciting such as determined by measuring crowd noise reaction (e.g. via crowd feed in FIG. 43I) via their decibel level and/or its rate of change (i.e. its derivative)). Alternatively, some or all tagging of play Content may be automated or aided, such as by Computer Automated Recognition for Adding Metadata Tagging 43-850. Such recognition may entail analyzing announcer commentary and analysis for key words, phrases, or tonal quality changes (e.g. "incredible", "that's amazing", "unbelievable", volume spike, pitch changes, etc.) and tagging content preceding such exclamations as being exciting and thus more likely of interest to Users. Users consuming content may likewise have their viewing room listened to via microphone for likewise analysis, searching for key words, phrases, or tonal quality changes and tagging content preceding such exclamations as being exciting and thus more likely of interest to other Users. In other embodiments, Users may tag plays they are consuming (e.g. such as by using record metadata tagging 43-800) to crowdsource the building of aspects of the database 43-510. Other Users that benefit from the tagging produced may compensate the Users contributing such tagging for their efforts by allocating a portion of the Content fee to those Users (e.g. such as by use of billing engine 43-900). Each player tag may have entry and exit time points for portions within the play Content wherein the player's action is most prominent, important and/or transpires. The tags may be graded in terms of the magnitude of their role in a play (either positively or negatively). Additionally, the Content may be tagged to identify the entry and exit time points for individual portion(s) of plays 43-560 wherein individual players may come into and out of key action and/or perform a Fantasy Football scoring action. The plays or sub-portions pertaining to a particular player may be graded (such as by Users, commentators, and/or computer heuristic analysis) in terms of dramatic impact as well as overall scoring potential and actual impact. Grades may be crowdsourced, so that the dramatic impact, scoring potential and actual impact may be denoted as the average grade for each category possibly weighted for User 43-600 so that the average favors the ratings of like-minded individuals. In some embodiments, Users may also be allowed to leave comments on each play (or portion thereof), possibly associated with particular time points or ranges within a play, which may be subject to filtering, review, and deletion for inappropriate Content, such as by participant added metadata tagging 43-800 provided in create feedback 43-3020. In some preferred embodiments, cooperating broadcasters may provide Arkiïs™ with an alternate live broadcast feed to continue live coverage while their generic broadcast stream goes to commercial breaks. By providing all these grades and tags upon the array of all plays (or portion(s) thereof) for the actual games played in a league and thus building up a rich database of Content 43-510, Arkiïs™ can easily allow (such as by shown in FIG. 43B) a User's Profile to specify feed queries of exactly what they value and wish to see in plays of their Fantasy Football Team members and thus build (such as by Viewing Engine 43-700) custom alternate Premium Content (such as with interactive video stream 43-740, possibly audio only or text based) that a User may consume in whatever fashion they desire, such as during commercial break while they are consuming a game, as a priority interruption (per Profile preferences) during regular game play, or as a standalone custom show without interruption. In some embodiments, "live" television/radio broadcasts are actually delayed slightly but a JSON feed (or other alternate feed 43-460) may be in realtime, thus allowing the replay of an interesting play (or portion thereof) to be received contemporaneously with its slightly delayed "live" broadcast.

In alternative embodiments, a User correspondingly consumes Fantasy Football replay Content without the traditional means of a video replay stream on a device such as a television. Such means may be as by audio only (e.g. radio-like) or web-based HTML text, with stills and video links. In such embodiments, feeds 43-400, 43-410, . . . , 43-450 and stream 43-470 may correspond to audio-only feeds/streams or textual feeds/streams providing written descriptions of plays, possibly including HTML and/or other web page instructions. For example, while driving in a vehicle, a User may request audio highlights for their Fantasy Football Team, whereby the highlights are presented in narrative form such as that found in traditional radio broadcast coverage of a sports event. Such narrative may be annotated with additional User specific custom content such as computer voice generated reading of overlaid graphical annotation of statistical information such as the Fantasy Football scoring value of the play (or portion thereof) being presented. As another example, a User can view a custom generated web page that lists their Fantasy Sport team's roster and recent scoring events for their team players (i.e. team members), with textual commentary, play description and links to audio and/or video feeds to hear and/or see the plays (or portion(s) thereof) alternatively provided by more traditional means of a video replay stream, such as on their television. Such embodiments can employ the mechanisms and methods described in the foregoing descriptions for video, with the video content being supplemented or replaced with audio or web content that represents the plays (or portion(s) thereof) that can be shown or provided to the User in video form.

A User may specify which Fantasy Football rules they would like their Arkiïs™ Profile to reflect. Arkiïs™ may allow the User to select rules for a league from a drop-down list of league types each with preset rules, for example head-to-head leagues (where a new team is picked every week and matched against one other team), "keeper" leagues (where rules dictate the number of players that can be kept from year to year, and there is a penalty for keeping a player"), etc. Checkboxes may be utilized where standard rules that are compatible with each other can be picked in an a-la-carte manner. In the case of rule variants that are mutually exclusive, radio buttons may be employed. Users may submit new sets of rules for approval to Arkiïs™. In some embodiments, Fantasy Football league SyncGroups (such as SyncGroup 43-650) may be created where the group leader (e.g. Arkiïs™ User 43-620) acts as the league manager, and creates league rules for shared benefit of the other SyncGroup members (e.g. Arkiïs™ Users 43-600, 43-610, etc.). These rules may have to be approved by, for example, a majority vote within the SyncGroup. Sync-Groups may also be utilized to facilitate trades of players from one User to another. Approval by the SyncGroup leader, a majority vote within the SyncGroup or some other form of group consent may be required to allow a trade.

In some embodiments, Users may also use Arkiïs™ credits or rewards points (such as by Billing Engine 43-900) as a wager, such as on a future Fantasy Football outcome, and may for example transfer credits or rewards points to another User for that User gaining more Fantasy Football scoring points throughout the Fantasy Football season. However, this feature is subject to state and federal laws and may not be available in all states or countries.

A User may wish to evaluate players for trade-consideration and/or for drafting selection. Just as a User may see plays (or portion(s) thereof) related to their current team members, they may request plays (or portion(s) thereof, such as by Feed Query in FIG. 43B) for a player of interest to them, such as one being considered for trade. A User can request to view video feeds and corresponding statistics for one or more players of interest and easily be able to review plays (or portion(s) thereof) of players they are interested in. The system may provide what-if scenarios whereby a User hypothetically substitutes a current player with another not on their team presently and sees the scoring impact such a trade would have had were it previously enacted. The what-if scenario may provide scoring effect (such as by Annotation Component 43-574) as well as play highlights (portions) involving the hypothetical player (such as by one or more Video Clip 43-1000) and the scoring impact those plays would have had.

Further details, features and functions of providing premium content, including specifically for sporting events, are described in FIGS. 43A, 43B, 43C, 43D, 43E, 43F, 43G, 43H, 43I, 43J, and the description accompanying these figures in Section 20—Providing Customized Entertainment Content.

11. Providing Feedback on Content, Goods, and Services

When a Marketer buys access to deliver Content to a Consumer, by way of the Marketer's criteria matching the Consumer's Profile for the purpose of delivering Content, they may gain the right to report on their relationship with the Consumer such as whether the Consumer commits to making a purchase from them and their performance on any such commitment. In a preferred embodiment, such reporting will retain the anonymity of the Consumer from the Marketer. At the same time, the Consumer may earn the right to report on their relationship with the Marketer such as whether their Products fulfill the promises of any Marketing Content provided to the Consumer.

Figure 25:
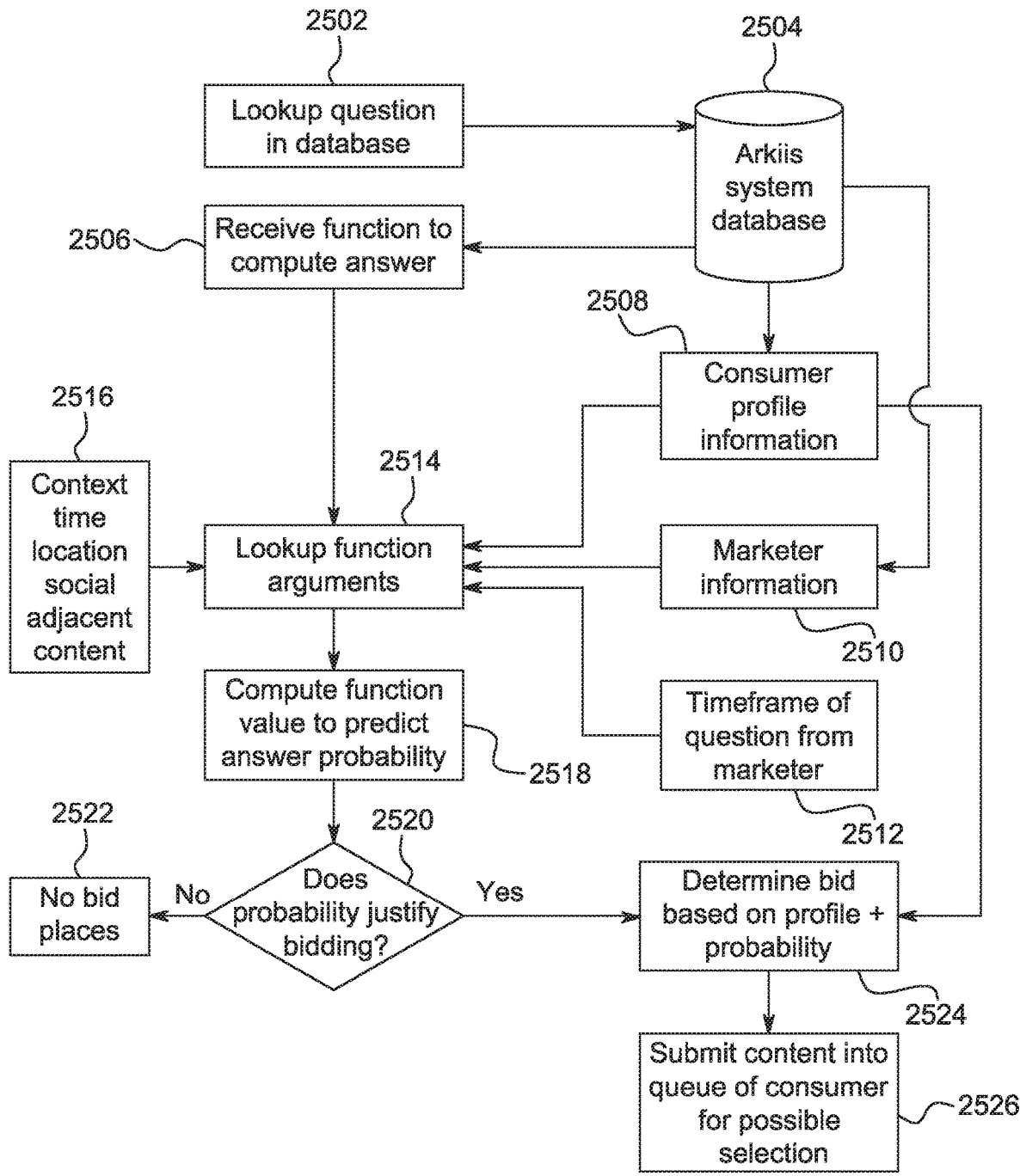
FIG. 25 is a flow chart depicting a Content Producer asking a question about Consumers that is answered by a function that takes as input the context, the Consumer's Profile, and the producer's information to receive the probability of a positive answer to the question that is used to inform the decision as to whether to bid and how much to bid to submit Content to a particular Consumer for possible consumption by the Consumer.

Arkiïs™ may combine the information gathered by all the parties to compute or generate individually custom tailored scores for any pairing of a Consumer and a Marketer, such as shown in FIG. 15 and FIG. 25. This scoring takes into account the general Consumer's behavior as well as their specific behavior towards the one Marketer being explored. The Consumer's score is actually a set of functions (either calculated instantaneously or over a period of time) that predict the likelihood that the Consumer will have performed a particular action immediately or by a given time point in the future (timeframe of question from marketer 2512). These functions may be stored within the Arkiïs™ system databases 2504, calculated (lookup function arguments 2514) for each Consumer/Marketer (Consumer profile information 2508/Marketer information 2510) pairing query and context time, location, social, and adjacent Content 2516, and stored long enough to determine whether or not an advertisement will be added to a Consumer's queue (Does probability justify bidding? 2520, Determine bid based on Profile+probability 2524 and Submit content into queue of consumer for possible selection 2526 in Content selector 208). Examples such as shown in FIG. 26 include a function to predict the likelihood that the Consumer will buy, or lease, a new car in general, or another more specific to buying/leasing a new car through that particular Marketer. Other similar functions might suggest their proclivity to buying a new car or a used car, whether they would likely pay cash or finance, whether they would trade in an old car, etc.

Conversely, the Consumer is given scoring information on the Marketer to predict the likelihood that the Marketer will deliver on its promises or a prediction as to the likelihood that the Consumer will judge the Marketer as meeting their criteria.

Figure 27:
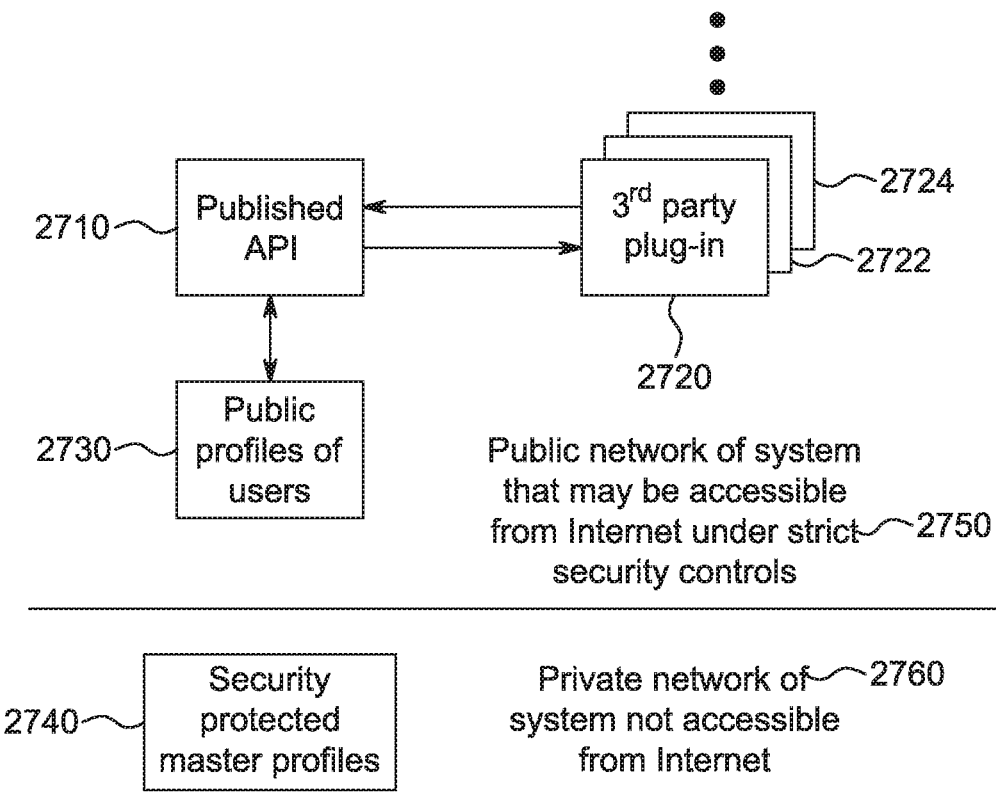
FIG. 27 is a diagram depicting the use of $3^{rd}$ party plug-ins to extend the Arkiïs™ system through published APIs while maintaining security of Profile information.

In a preferred embodiment, as illustrated in FIG. 27, the database of information is accessed by the Arkiïs™ system through a published API (2710) that allows licensed third-party applications to be plugged into the platform (2720, 2722, 2724, . . . ) and to provide additional value or functionality beyond what Arkiïs™ provides. Such plug-ins generally function within the Arkiïs™ system and do not export or expose any information to the outside public network (2750) except under strict security controls and monitoring to ensure privacy. Only the public facing Profiles (2730) are accessible through the API. The Master Profiles (2740) are held under strict security controls to reduce the chance of unauthorized access. These controls may include the use of, for example, private networks (2760) that may employ laser communications systems instead of the Internet when moving the Master Profile data around the world to reduce the chance of unauthorized snooping to glean information. The interface which faces the Internet may only access a single Profile at a time to allow individual maintenance of a Consumer's own Profile and may require authentication. This helps prevent wholesale intrusions of the whole database.

The User may choose to omit certain information from their Profiles to aid in privacy preservation. For example, blank fields may be automatically seeded with false demographic information to increase the privacy of the system, should the Master Profile database be breached. Such erroneous information is omitted when queried through the published APIs and is only present as an added security measure in case the Master Profile database was directly breached. The Marketers query for a set of Profiles that meet their criteria; further drilling down for additional details on matching Profiles is subject to tracking and analysis to confirm the database is not being abused. Confirmed abuse can result in a Marketer (or any User) being restricted or barred from accessing the database (or using other elements of the Arkiïs™ system) or being required to hire and pay for an independent overseer to audit and supervise all their activities until such time as they are deemed trustworthy again. Aberrant patterns that are detected include systematic rotation of query parameters that can be used to eventually query the whole public facing database for prohibited replication of the database outside our system, or the use of false demographic information intentionally placed within the system to detect abuse. Additionally, once a Marketer has a set of targeted Consumers for which they are querying for ever more detailed information (drilling down for more information), any set of expansive queries that in aggregate covers large portions of a specific Consumer's public facing Profile are subject to review relative to their legitimate need for the information, or if not, then for flagging for manual review as possible abuse. In a preferred embodiment, User may indicate in their Profile that they wish to be omitted from any queries where the set of matching Profiles is small or below a certain threshold to reduce the chance that their identity might be surmised by constructing a query to locate a known person's potentially anonymous public Profile.

As shown in FIG. 15, Consumers (1560) of Content (1520) may be asked by Content Producers (1510) to supply Feedback (1580) on Targeted Content they consume, receiving a notification (e.g. visual, audio, tactile) on an Arkiïs™ enabled Device that their Feedback is wanted. This applies to both Premium Content and Marketing Content. In the case of Marketing Content, the Feedback may be used to confirm that the Consumer actually consumed the Content for which they may be getting paid, additionally, Feedback may be used to gauge a person's interest in a Product after seeing a commercial message and to measure their receptivity to a message to allow a Content Producer to tune their delivery. In the case of Premium Content, the Feedback may be used to measure how satisfied the Consumer is with the Content and their likelihood to recommend it and consume follow-up Content. The immediacy of Feedback allows an advertiser to quickly hone their marketing message with a small set of initial Consumers to make it more effective with a larger set of subsequent Consumers.

Feedback which is used to gauge whether a Consumer actually consumed the Content may include open-ended or multiple choice questions regarding advertisement details only recognizable to a User who actually consumed the ad, for example: "Were the characters sitting in a) the office, b) a park, c) a restaurant, d) a house?" Feedback which is used to gauge a User's interest in a Product may be supplied by the advertiser and may include one or more of: open-ended questions, multiple choice questions, rating scales, rank order scaling questions, semantic differential scales, constant sum questions, and/or the Likert response scale, etc. Feedback questions which are used to gauge a User's interest in a Product may be presented to the User consecutively, or a survey may be split into portions which are then presented to the User in an order influenced by the time left in a commercial break and the monetary value the User will receive for each survey portion.

Figure 28:
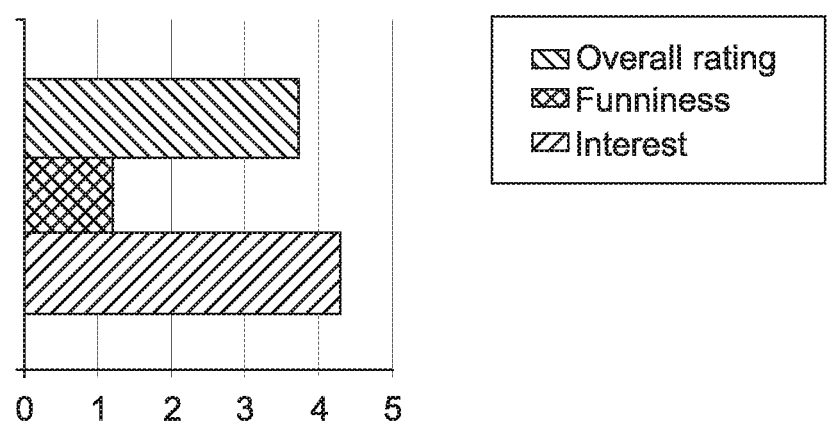
FIG. 28 is an exemplary depiction of how well a particular piece of Targeted Content matches the interests of a profile along various dimensions and in aggregate.

Feedback may be provided through a User's Alternate Device or entered through an interface presented on their First Device and controlled by their Alternate Device (e.g., smartphone), remote control, or other custom hand-held hardware device. By turning the commercial message into a bidirectional communication, the User becomes more engaged with the message, more intelligent and thoughtful, and more likely to respond favorably to a message that is providing real value to the User. This should raise the whole playing field of commercial messages and result in smarter buying populations and more interesting and useful commercials while eliminating, through competition, those messages that are not helpful. See FIG. 28. In FIG. 28, a User has provided some Feedback on a zero to five sliding scale in three parts, an overall rating of the Content, a rating with respect to how funny the Content is, and a rating of how well the Content matched the User's interests. (Ratings may be provided along many possible dimensions beyond those listed such as the Content's usefulness or relevancy to a User, how exciting it is judged to be, how well was it edited, how well was it produced, is it in User's genera of interests, etcetera.)

In some embodiments, the Feedback questions may be organized as a tree where, depending upon the response at each level of the tree, the Feedback questions continue on a chosen branch that accounts for their previous responses. Some branches are terminal based upon the Marketer's determination that a sale is unlikely, which may be based upon past experience with similar answers from similar Consumer Profiles and the resulting sales outcomes. In the case of a commercial message, some responses may lead to follow-up Targeted Marketing Content to reinforce the Marketer's message and allay discovered concerns of the Consumer and to ultimately result in a sale. The extent to which a User is willing to answer Feedback questions affects their payout; this also applies to Feedback on Premium Content. Feedback may result in payout that is proportional to the amount of Feedback given.

Feedback may also be provided during Content delivery. For example, as a message is being delivered, the User may provide continuous/ongoing Feedback using their smartphone or other Alternate Device. A User may provide Feedback in whatever dimensions the Content Producer desires. For example, a User can give Feedback as to how funny or compelling a message is as it unfolds. Additionally, sensor input data may be utilized to automate the gathering of Feedback. For example, a microphone on a smartphone may be used to detect and measure laughter levels and correlate them with Content delivery time points. Alternatively, talking during Content may be measured to detect User engagement (talking about the Content, determined by voice recognition and/or lip-reading of keywords) and disengagement (talking about something else). The accelerometer on a smartphone may be utilized to detect when a User gets up out of a chair and how quickly they did so to measure audience excitement such as upon a key scoring event in a sports game.

Other aspects of Feedback may be collected if the Consumer actually follows through and purchases the Product being advertised. After purchase, the User may choose to review the original message and judge it relative to the actual Product received. In a preferred embodiment, the Feedback continues to be collected over the lifespan of the product's effectiveness. Consumers that follow through also have increased integrity ratings that better their odds of receiving better payouts from Marketers.

In return for access to the system, Marketers agree to terms of service that may prohibit them from engaging in activity that can be used to identify individuals, retaining any information on Consumers, or attempting to cross-reference information within the system with information aggregated by outside marketing data collectors. In a preferred embodiment, if a Marketer is found to violate any of these provisions, their actions will be publicized as part of their Profile and they will be excluded from marketing to those Consumers whose filters preclude advertisers who are found to violate the terms.

Monitoring of room audio through the microphone of a device connected to the Arkiïs™ system may allow audience reaction to be measured by correlating it with the presented Content to gauge the value and effectiveness of Content. In some embodiments, audience reaction may also be measured by recording room video and performing facial recognition to determine at what points attention is directed towards the video Device and at what points it is not, to further gauge the value and effectiveness of Content. In further embodiments, facial recognition may also gauge audience emotional state/mood by detecting facial gestures such as smiling, frowning, and laughter and/or other gesture recognition such as clapping, thumbs-up or thumbs-down, etc.

In group situations, the Profile preferences of a particular User in the group may prohibit collecting any data while they are in the vicinity. Alternatively, depending on the embodiment, the audio and video and other data collected may be scrubbed to delete or censor out their presence. This may be done using vocal recognition to tie known voice prints of known User Profiles to specific voices in an audio feed and removing any unrecognized prints or prints recognized to match a Profile that controls how their data is collected and has specified they not be recorded. Similarly, individual video frames may be analyzed to perform facial recognition against known faces so that unknown faces or recognized faces with controls over data collection may be filtered out as required. The Arkiïs™ system may annotate adjacent video frames with the identity of subjects to track and maintain identity across frames where individuals may not be accurately identified, such as when a face turns away or is partially or wholly obscured in some fashion. The audio print recognition may be combined with the video to provide greater accuracy, for example, by combining facial recognition and associated lip movements (lip-reading) in the video with the voiceprint that corresponds to those movements. Other clues, such as clothing being worn, can be used to help track an individual once their face is not sufficiently viewable in a video feed where their recognized face is associated with the clothing they are wearing, thus allowing continued recognition when their face is not visible but their clothing is visible. In some embodiments, when multiple audio feeds are present, voiceprints may be assigned three-dimensional locations by triangulating the voiceprint across the audio sources. Such location aware prints may also be combined with video to further refine identification of an individual in a video. Just as multiple audio signals may be present, so may multiple video signals be present and combined to provide high fidelity identification of Users and their locations and actions in three-dimensional space.

Reviewers (a User or SyncGroup of Users providing detailed Feedback related to transactions, Content, goods, services, or others' Feedback) may share in advertising and/or revenues for goods & services that are purchased in part based upon information in their reviews. In some embodiments, the revenue share they receive may decrease over time; for example, their share may decrease by 2% for every day that elapses since their review was last referenced by a User up until the point that User actually makes a purchase of a reviewed item. In other embodiments, the revenue share may be diluted across all the reviews a User considers before a purchase. Highly regarded/rated/trusted reviews may garner a disproportionate share of revenues to reflect their greater value. For example, a Provider of a Product may allocate 2% of the sales price to Reviewers that contribute to the User's decision to buy. In alternate embodiments, the User may reject reviews paid for by the Provider/seller and instead pay for access to reviews. Users may also self-gauge the value they feel they received from a Reviewer. This valuation may be compared to the average of all Users self-gauging a Reviewer. When a User's self-gauged value is significantly lower than the average yet the User appears to have followed the recommendation of the Reviewer, the User's value may be attributed a greater value than they self-gauged. The Reviewer may earn a portion of revenue for purchases based upon their reviews that are deemed of value. Reviews may also be treated as targeted commercial messages or incorporated into such messages where the Goods & Services Provider being reviewed targets a potential buyer by presenting them with an advertisement that includes reference to the Reviewer's information. In such cases, the Reviewer may share in the revenues paid to the consumer of the targeted commercial message. In some embodiments, Reviewers may earn money for downstream purchases, for example, if Alice provides a review to Bob and Bob purchases based in part upon Alice's review and Bob now provides a review to Charlie and Charlie purchases based in part upon Bob's review, then Alice earns a portion of Bob's earnings from Charlie's purchase since Bob's original purchase resulted in part from Alice's review.

Depending on the embodiment of the disclosed system, there are many different ways a Reviewer may be paid for providing their reviews including:

Receiving a portion of sales revenue related to viewing their reviews.

Receiving subscriptions from User(s) for unlimited access to their reviews.

Selling timed, block access to all reviews in a particular domain.

Selling pre-paid access to a fixed number subsequently selected reviews.

Selling a-la-carte access to individual reviews that may include a minimum payment and optional bonus based upon the User's rating of the review (e.g. a review receives a 3 out of 5 star rating and is paid $0.07 whereas a 4 star rating by the User would have earned the Reviewer $0.10.)

Receiving a portion of all ad revenue from a User and allocated across the reviews most informative to the User's buying decision(s).

Receiving a portion of ad revenue from a User in a particular product domain and allocated across the reviews (including those of other Reviewers) most informative to the User's buying decision(s) in that domain. (e.g. the top five reviews divvy up the User's allocation equally or weighted based upon the ranking of each review.)

Joining together with other Reviewers of a Product and selling bundled access where the User ranks the bundled reviews by their value and the sales price is allocated according to the User's ranking of their review.

Selling access by the number of words, diagrams, and pictures within their review that the User sees combined with a User's rating of the review's usefulness to compute a payout (analogous to the newspaper articles by the word payment scheme, e.g. 100% of the word rate for a top rating).

By banding together with other Reviewers to form a review library and offering access to their collective reviews using the payment schemes available to individual Reviewers.

Licensing their reviews with cooperatives where Users join and pay for access and the member's access fees are allocated by the cooperative according to the Member's collective judgment of the value of the various licensed reviews.

For Marketing Content, a User may register to follow Reviewers they trust in the Arkiïs™ system and require in their Profile that Content must be recorded in the Arkiïs™ system to have been evaluated by one of their trusted Reviewers or Reviewer groups who report their independent findings to the Arkiïs™ system about the marketing message, checking for factual accuracy and/or testing the Product being sold in dimensions/aspects important to the User (as indicated in their User Profile) such as its reliability, recyclability, ease of use, aesthetic appeal, green manufacturing, fair trade, fair wages for workers, origin of manufacture, etc. In a preferred embodiment, a User's Profile may include entries for each Reviewer a User is following as well as include filtering preferences such as any requirements Content must satisfy before it may be presented to a User. A Profile may also record the aspects of a review that are important to a User along with a measure of their relative importance. For example, a User may assign relative percentages to aspects of a review in their Profile, assigning 0% to those aspects that are not important and increasing percentages to those aspects that are increasingly important to them. Aspects may include, both subjective and objective measures, including accuracy of message, efficiency rating of a Product, aesthetic appeal, durability, etc. Reviews may be stored in the Arkiïs™ databases along with aspects or dimensions being judged/assessed by a Reviewer as part of a review. A User may require their Reviewers to have purchased and used a Product, as registered in the Arkiïs™ system, before they will consider paying for a review. Such requirements may be included as part of a User's Profile, and database review entries may include whether a confirmed purchase by the Reviewer is present and may reference the purchase proof. A Reviewer may have their friends attest to their using a Product on a regular basis and such attestations may be recorded in the attester's Profile and/or in the attested Reviewer's Profile. In a preferred embodiment, falsely attesting to another's behavior may result in penalties such as reduced revenues, reduced Arkiïs™ integrity score, and/or temporary exclusion from direct participation in Arkiïs™ or required to use a trusted proxy (who is paid a portion of revenues) to access Arkiïs™ on their behalf.

This process may be applied to Political Action Committee (PAC) ads and a User may require that only PAC ads that have been fact checked by a specialized reviewing group they trust may be presented to them. In this way, a sufficiently large group of Users may influence the political discourse by only being reachable by candidates and/or PACs that adhere to accepted norms of the group and whose messages are independently audited for accuracy.

Content may include metadata stored in the Arkiïs™ databases to associate Content with Reviewers, ratings, scores, blurbs, blog entries, etc. A Reviewer may also include metadata stored in the Arkiïs™ databases to associate the Reviewer with their reviews of Products, Reviewer name, Reviewer integrity rating score, attestations (including visibility e.g., public, only attestor's friends, only Reviewer's friends, only friends of attestor or reviewer, only friends and friends of friends), Reviewer consumption/ purchase confirmation of Product including date and time and method of independent verification, etc. An attestor may also include metadata stored in the Arkiïs™ databases to associate the attestor with their attestations, Reviewers attested, attestor integrity score, name of attestor, visibility of attestations, dates of attestations, etc.

The Content ranking system of Arkiïs™ prioritizes the presentation of Content according to a Consumer's preferences as stated in their Profile. Such ranking system has a configurable algorithm that can be configured, substituted, or modified by other plug-in algorithms and variable controls. Such algorithms account for these Consumer preferences and create a prioritized queue of Content for the Consumer to consume. Such queue is drawn from all Content whose targeting criteria matches the User's demographics and thus may be presented to the Consumer if the Consumer's preferences also result in a match as determined by the ranking system algorithm. In one embodiment, a Consumer may prefer that Targeted Marketing Content only be ranked according to the payout offered by a Marketer. In such a case, all other aspect variables are weighted with a value of zero and the aspect variable of payout is weighted with a value of one, resulting in a ranking score for each possible Targeted Marketing Content such that the highest paying Content for a Consumer is ranked first, followed by the second highest paying Content, etc. all the way down to the lowest ranked Content being the one that offers the lowest payout. In the case of a tied ranking score, the Targeted Marketing Content that was first (chronologically) offered to a Consumer may be ranked ahead of subsequently offered Targeted Marketing Content with matching score. In another embodiment, a Consumer may prefer that Targeted Marketing Content be ranked according to trusted reviews providing grades on a scale of 1 to 10 in the areas of humor, carbon-footprint of Product, and working conditions for manufacture. In such a case, humor may be weighted 20%, carbon-footprint may be weighted 45% and working conditions 35%, such that the average review rating of all Reviewers a Consumer trusts that have provided a review rating in that category for that Targeted Marketing Content/ Product is multiplied by the Consumer's weighting in that aspect and summed together with the other aspects to generate a ranking score for each possible Targeted Marketing Content such that Content may be ranked and presented in order of rank. Such rankings may be dynamically computed for each point at which a Consumer is ready to receive a new piece of Content to account for changes including: new trusted reviews, the changing set of available Targeted Marketing Content that is matched to a Consumer over time, and updates to a Consumer's preferences.

A Certifier is a special kind of Reviewer, which may be a Non-Governmental Organization (NGO) and which provides Independent Reviewer Certification about Providers and/or Products along specific metrics. In a preferred embodiment, these certifications are stored within the Arkiïs™ system databases and retrieved in response to a User's Product search or other query. Just like Reviewer revenue, these Certifiers may share in advertising revenues, and/or may share in revenues (e.g. advertising and/or purchasing) when goods are purchased based in part upon information in their Independent Reviewer Certifications. An Independent Reviewer Certification provides a trusted independent check on facts put forth by a Provider or on measured standards applied across multiple vendors. For example, a User may wish to only buy goods that are more than 50% manufactured in the United States, and thus may rely upon one or more Certifiers to independently fact check any such claims put forth by a Provider. Just as negative reviews are also credited in a decision, so are reviews that denounce a Provider as not meeting the mark.

A Certifier's Profile may include associated metadata stored in the Arkiïs™ databases including: trust level, integrity rating score, the kind of Certifier (e.g. NGO, independent person), certifications provided including scores and ratings applied to Content and Products, number of Users that trust a Certifier, number of Users that trust Certifier above a threshold (e.g. above 75% trust level), number of Users that trust Certifier at a level in the top quartile of all Certifiers they trust (to normalize trust levels across Users), etc.

A Certifier may be paid in many ways through the Arkiïs™ system for their certification services, depending on the embodiment. These ways include all the ways in which a Reviewer may be paid that are described above in Reviewer Revenue. A User may subscribe to a Certifier's certification information by allocating a specific percentage of all the advertising revenues they receive for Products certified by that Certifier. Such a percentage may be under complete control of the User and adjusted in their Arkiïs™ Profile from time to time, as they desire. A Certifier may designate a minimum percentage share that they require in order for a User to subscribe to the certification information they provide. In a preferred embodiment, when a User chooses to subscribe to a Certifier's certification information, an access token is created for the User. This access token is comprised of multiple fields, which may include, but are not limited to the following: an identifier associated with the current session (i.e. attempt to access Content), a User identifier, privileges, restricting group identifiers, etc. Subscribing to a Certifier's certification information may be required by a Certifier in order for any of their certification information to become visible to a User, or alternatively, a Certifier may provide sample selected certification information to all Users while their complete certification information may be reserved for subscribers. Another embodiment involves providing summary or overview certification information, such as only the beginning of an Independent Reviewer Certification report and selected certification facts/grades to all Users and reserving the complete certification report for subscribers. If a Certifier decides to offer limited Independent Reviewer Certification information to Users, a User Profile which is not associated with an access token for the particular Certifier may temporarily be assigned a "guest" access token—this may include fields identifying the current session (i.e. attempt to access content), privileges of a non-subscribing viewer, restricting group identifiers to restrict access to paid certification information, etc. If a Certifier decides to restrict all of its certification information so that only paying Users can view said information, the lack of an access token associated with a User may bar the User from viewing all information. In these situations, a temporary access token may contain fields where restricting group identifiers bar all access, or all privileges may be disabled. For a Certifier wishing to make all of their certification information freely available to the public, the lack of an access token may generate a "guest" token associated with the session which contains fields giving the User full privileges in accessing the Certifier's Content, or the Content may not require an access token. The presence of a User identifier in these "guest" access tokens may depend on the User's privacy settings or the Certifier's Profile settings. A Certifier may offer a la carte pricing where a User, instead of subscribing, may purchase specific certification information or a specific certification report. Such a la carte pricing may be fixed, suggested, minimum, or variable based upon User demographics. Alternatively, a User may subscribe to a specific kind of certification information a Certifier provides instead of to all the certification information they supply (e.g. a Certifier's certification grade of made in the US or certification of a manufacturer paying a living wage to workers in China). The foregoing and following mechanisms describing how a Certifier may be paid, their records maintained, their certifications are shared, etc. can also be adapted and utilized for paying Reviewers for reviews.

The Profile of an Certifier may be associated with metadata stored within the Arkiïs™ databases, including but not limited to: the category of Certifier (e.g. political organization, community group, special interest group), the date of the Certifier Profile creation within the Arkiïs™ system, the number of certifications created by the Certifier, and statistics about associated Users who trust or subscribe to the Certifier (in a preferred embodiment, without revealing the identity of these Users). The aforementioned metadata may be public to Users, depending on the privacy settings of the Certifier. The aforementioned metadata may also be selected, deselected, or given a relative importance (e.g. 28%) by a User in order to find Certifiers matching the interests listed within their User Profiles. Statistics about Users (as listed above) may include, but are not limited to: the number of Users who subscribe to the Certifier, the percentage of Users who have unsubscribed from the Certifier, the number of Users who trust the Certifier (e.g. the percentage of Users who have given the Certifier a minimum trust level rating, for example 70%; the percentage of Users for whom the Certifier appears in the top quartile of trust levels associated with Certifiers, etc.) Certifier Profiles may also be associated with metadata related to pricing. This metadata may include, but is not limited to, the minimum acceptable price per view, review, or session; pricing scheme options available to a User (e.g. fixed, one-time subscription, yearly subscription, a la carte reviews, required minimum percentage of revenue from a User); the acceptable price range or percentage of revenue range that a User must pay in order to access the certification information.

A User's filtering capabilities extend into certified values and metrics such that a User may filter out advertising messages that do not adhere to the User's specified values and metrics. A User may mix and choose values and metrics that they require be met through their Profile preferences (e.g. require that eight out of ten values be met and two out of three metrics be met). Examples of values and metrics that a User can filter upon include:

- Customer support phone calls are answered at an average rate of less than 3 minutes.
- Wall Street Journal ranks the company's employee satisfaction above 60%.
- Average customer overall rating of at least 3 out of 5 stars.
- Products manufactured in the their home country
- Products sold by corporations where the CEO does not make more than 500 times their least paid worker or 250 times their median paid worker.
- Products produced with at least 20% post-consumer recycled composition.
- Products packaged and shipped with minimal packaging as certified by trusted Certifier(s).
- Products produced using environmentally sustainable methods as certified by trusted Certifier(s).

The values and metrics listed above may be stored within the Arkiïs™ databases as metadata associated with a Provider. The values and metrics may be listed alphabetically or by category on, for example, a search page, where Users can select or deselect values and metrics, or assign relative importance ratings to each value and/or metric. Depending on the embodiment, relative importance ratings may add up to 100%, or they may be chosen by the User as any percentage from 0-100%, then normalized by the Arkiïs™ engine so that their relative importance scores (from 0.000 to 1.000 and in aggregate totaling 1.000) can be assigned. Alternatively, a User may choose to copy the settings of another User or a standard published/recommended by a Reviewer. In some embodiments, for metrics/values that can be selected or deselected, the number of parameters which Content does not satisfy may be added together, multiplied by a factor depending on how important the User feels their metrics and values are, and subtracted from the score, representing the suitability of Content for a User, used to rank Content. In embodiments where the metrics or values have a relative importance score, this relative importance score may be multiplied with a value of 1.0 for each factor which is unmet by the Content. If a User feels a value or metric is 0% important, the value/metric will receive an adjusted relative importance score of 0. Then, in the aforementioned embodiments, the adjusted relative importance scores may be added together and subtracted from the score, representing the suitability of Content for a User, used to rank Content.

In a preferred embodiment, most of the value and metric requirements are certified by independent Certifiers that have the resources required to effectively provide certification, however, individual Reviewers may also certify values and metrics as part of their reviews. In a preferred embodiment, these certifications are stored within the Arkiïs™ databases and can be accessed in response to a User's query. The Certifiers may register value and metric certifications they support. Multiple Certifiers may register for the same value or metric certification. A Member may submit a Market Request for value or metric certifications that are not sufficiently available from a source they trust. Some Certifiers may certify the practices and integrity of other Certifiers or Reviewers. In such embodiments, the certifications may be part of the metadata associated with the Certifier or Reviewer who has been certified. In the simplest case, Certifiers supply a yes or no certification to be saved into the Arkiïs™ databases as of a particular date for a particular company or product/service of a company. More complex value and metric certifications may entail a grading system such as a letter grade (e.g. A, B, C, D, or F and possibly fine-tuned with a + or −) or numerical percentage of adherence or a numerical grade. Each value and metric certification specifies the scale upon which it is certified and the meaning of the possible grades. Some value and metric certifications may specify an expiration time period before which a certification must be reassessed by a Certifier to remain current. The expiration date of a certification will, in a preferred embodiment, be stored as one of the data fields/tags associated with the certification. Alternatively, the date of certification may be stored as one of the data fields/tags associated with the certification and each User may specify in their Profile preferences the criteria for expiration for one or more value and/or metric certifications.

As with Reviewers, a User may choose to follow Certifiers they trust, linking their User Profiles to the Content produced by the Certifier. Depending on the embodiment and a User's settings, when a User follows a Certifier they may receive notifications when a Certifier provides a new certification for a Product or shares Content. This may be done in multiple ways—for example, every time a User decides to follow a Certifier the User's Profile may accrue a data index that is a unique identifier of the Certifier's Profile. Upon each login, or after a specified time interval once logged in, or as a periodic batch process or cron job executed in the background, the Arkiïs™ system may check for new certifications by looking at all of the Certifier identifiers associated with a User's Profile. Alternatively, when a User chooses to follow a Certifier, an identifier associated with the User may be linked to the Certifier's Profile. When the Certifier posts new material, the Arkiïs™ system may access the list of User identifiers, using it to send a notification to any Users who have enabled such notifications within their Profile settings or alternatively, recording such activity in the User Profiles of each listed User for subsequent efficient retrieval on behalf of each such User. Furthermore, depending on the embodiment, a User's connection to a Certifier through following the Certifier may influence their payout for watching advertisements if the advertiser chooses to target their advertisements or hide their advertisements from Users who follow a certain Certifier or group/category of Certifiers. Trust may be provided on a sliding scale between 0% (untrusted) and 100% (absolute trust). A User's relative trust level of a Certifier may be used to sort certifications and allocate payments across Certifiers. Certifiers may also possess integrity ratings to assist others in evaluating their trustworthiness. Additionally, a User may designate value and metric requirements for Certifiers and automatically trust them if the Certifier is itself certified to meet their value and metric requirements by a Certifier they already trust. This may be done dynamically whenever a User accesses a Certifier's Profile within the Arkiïs™ system. Alternatively, these Certifiers may be suggested as possible Certifiers the User might like to trust. Alternatively, Users may initially base their trust of a Certifier upon the average trust level they have achieved by others or only by others with similar Profiles.

Figure 29:
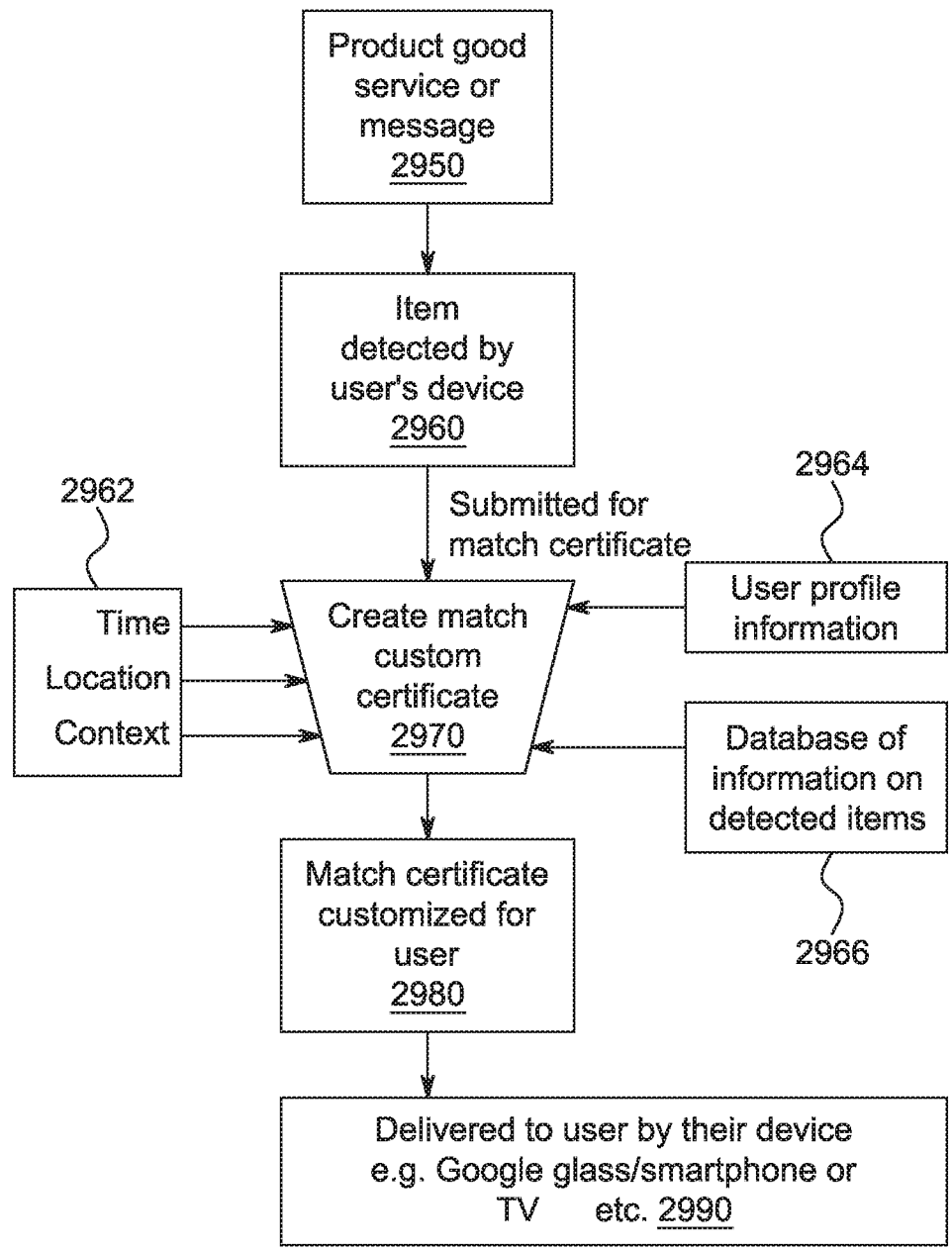
FIG. 29 is the illustration of creating a Product's User customized match level certificate that is presented to the User.

As shown in FIG. 29, Arkiïs™ provides mechanisms (create match custom certificate 2970) to associate Products (2950) with a User's personalized ratings/certifications (match certificate customized for User 2980) deemed important to them. These personalized ratings are available in many different contexts (2962) such as when shopping online or when in a brick and mortar store. In one embodiment, the personalized (customized for User) ratings match certificate (2980) may be visualized by a wheel with spokes divided into multiple pie sections, each with a size weighted by its relative importance to the User together with perimeter icons identifying the type of measurement in the adjacent pie section. In this embodiment, each section may contain ratings, metrics, and values (some of which may be certified) that are individualized based upon User Profile information (2964) preferences. For example, a perimeter leaf icon may identify one piece of the pie for a User's specified environmental impact manufacturing requirements. This section may be visualized by red meaning few requirements are met, yellow meaning an average amount are met, and green meaning most are met. Some of the metrics included within such visual representations of personalized ratings may include how readily the Product (2950) itself may be recycled at the end of its life or the relative amount of energy the production of that Product (2950) required as compared to similar Products as noted in database of information on detected items (2966). In the aforementioned embodiment, the pie section may be overlaid with the symbol for the certifying Certifier in black print. A Product in a store may contain a small QR code or RFID tag to identify the Product to a User's Google® Glasses and/or other mobile device (item detected by User's device 2960) and allow the product's values certifications to be presented (delivered to User by their device 2990) and customized for the Profile of the User (2964) viewing the Product. The customized values certification may be displayed in a standardized presentation for easy recognition and comparison with other Products. More easily on a website, a distinct Arkiïs™ template can be present for participating Products that also identifies their individualized values certification for the User viewing a webpage offering Products.

A User may be willing to pay, for example, 15% more for a Product that adheres to values standards they require, and may wish to show their stance to the world by having an easily recognizable unique look and feel for Products that adhere to such a values standard. The system's platform allows for these desires to be made known to Providers, who can then meet these desires if enough Users stand behind a request. For example, Apple can offer a special iPhone® whose case is colored with a distinctive green plaid pattern that is readily identifiable and only placed on these special phones that are produced in factories certified to be manufacturing using sustainable techniques including: paying a living wage, carbon neutral production and shipping, and with a recyclable battery. The same distinctive packaging can also be offered on other Products such as iPad®s and MacBooks that are also certified to adhere to the same standard. Users may band together to make a Market Request for such branding where it is not currently offered.

A Market Request is a published request for Products (e.g. Content, goods, services, certifications, or reviews) that do not exist yet or are out of stock but which may be desired by Users. A User may publish a Market Request for something they conceive of and would like to acquire, or for an item they would like to locate in used condition. Depending on the embodiment, a Market Request may be published through some sort of forum, discussion board, poll, or "wall" allowing Users to post their own Market Requests and endorse those of other Users. These requests will be stored in the Arkiïs™ databases and may have associated data fields including, but not limited to: date of request creation, number of endorsements, encrypted identifiers of Users who have endorsed the Market Request, etc. Market Requests may require associated keywords when creating the request, in order to facilitate simple searches. Market Requests may be placed into categories in some embodiments, and may be sorted, either automatically or by the User, through different variables depending on the embodiment including number of votes, percentage of positive votes, etc. A User may support their own or another's Market Request at a level of their choosing to encourage its being created or offered. Simple support may just entail a positive vote in support of a Market Request. Each vote may augment a variable integer within metadata associated with the Market Request in order to keep track of the number of votes, which may be used to rank Market Requests for display to Users. Alternatively, an encrypted identifier of each User who has voted for a Market Request may be stored within the Market Request metadata. More substantial support may be making a commitment to buy the object of the published request in advance of its creation or availability, perhaps even putting down a deposit in advance. Alternatively, a Provider may publish a request to spur and gauge the interest of Users to proposed Content, goods, services, or reviews they are considering offering. A User may disseminate a Market Request by using Arkiïs™' targeting capabilities to reach other Users that are more likely to respond positively. Depending on the embodiment, this dissemination may be done through the use of Sync-Groups or friendship networks or linked social media networks. A Market Request may include requirement of anonymity-preserving notification from a supplier once requested goods or services are in stock or available. The sender may help prioritize their message with the recipient by paying them to accept it. Alternatively, the recipient may encourage notification by agreeing to cover the nominal Arkiïs™ fee for anonymously brokering the message.

The Market Request mechanism may be applied to services and goods, whereby a Consumer may commit to purchase something they want but does not yet exist, such that when a sufficient body of Consumers commits a Goods & Services Provider may step in and fulfill the need. For example, a segment of the population may desire a smartphone made from recycled materials, while another segment may desire one completely manufactured in the United States. Members of these segments may commit to buying a smartphone that satisfies their criteria, and by banding together with other Arkiïs™ Users, entice a Goods & Services Provider to fulfill the need, given the Provider's reduced risk from the committed pre-orders. This feature of the Arkiïs™ system may allow Providers to reduce the uncertainty and costs of maintaining speculative inventories and move more toward demand-driven manufacturing. If more than one Marketer is competing to meet a Market Request, the Consumers may choose from among the competing Marketers and may make a monetary commitment/deposit/"pre-order" to select a particular Marketer of their choosing.

A User may find that there are no Reviewers in a Product or service area in which they are interested in purchasing. In such cases, they may publish a Market Request via Arkiïs™ indicating the need for such independent reviews and may commit to pay for such reviews out of their future ad payouts in that area. Potential Reviewers may be required to satisfy the User's predefined criteria for gaining their trust as a Reviewer in order to claim the User's pre-commitment.

Arkiïs™ allows for the efficient discovery of markets for non-existing reviews by connecting the stated Market Requests of Consumers with those potentially able to fulfill them. This may reduce the risk of the review Providers since they may anticipate a certain level of preallocated payout in addition to whatever payouts they normally accumulate as their reviews are utilized. This may make it easier for the Reviewer to judge whether it is worth their time to invest in reviewing a new area since the preallocated payouts may help them judge the return they can expect. This market may also produce competition among the Reviewers that may reduce the cost of reviews over time.

Arkiïs™ may provide the infrastructure and technology to share a small portion of revenues with those people or groups that helped to direct the User's Content choices. Arkiïs™ may maintain the accounting and distribution of funds to reward those who assist helping a User decide what Content to consume.

12. Providing Payment for Content, Goods, and Services

Arkiïs™ provides payment systems that allow for multiple ways to pay for goods and/or services. Submitting a payment through Arkiïs™ ensures the safeguarding of a User's personal information and simplifies the verification of purchases in order to track a User's Arkiïs™ credits and boost their Consumer Marketing Performance Score to reflect their integrity rating. These payment systems may be used while retaining the anonymity of the payment initiator and/or recipient from each other.

In a preferred embodiment, a Marketer (402) may have the ability to create whatever formulas they desire to value how much they will (bid 404) pay a User to consume their Targeted Marketing Content. The formula may take as input information in a User's Profile (414) such as traditional demographic information, as well as novel information not present in those models such as the Consumer's Arkiïs™ marketing performance score (410) that predicts the likelihood of a purchase. In the case of SyncGroup Profiles, the formula may apportion the payout across the SyncGroup members either evenly or by a weighted metric such as their relative contribution to the SyncGroup's Arkiïs™ marketing score. These new metrics include the context (412) such as the User's purchase intents, current emotional state (e.g. mood), friends and business associates that they are currently interacting with, current events in the world, Content recently consumed, etc.

Inputs to a bid's (404) payout formula may vary widely over time to reflect the value (actualize bid offered 430) an advertiser places on delivering (yes 426) a Content (406) message during a particular context (412) such as the current time. Such formulas in the bid (404) allow for a negative payout/actualize bid offered (430) at times when the Marketer (402) does not want the Content (406) to be consumed by a User, thus requiring at times for a User to pay Marketer (402) to consume Content (406). A Marketer may even require an infinite negative payout to signify that in the current context (406) a User is prohibited (no 424, not delivered 422) from consuming their Content (406) message through the Arkiïs™ system.

A Marketer may include in their payout formula an aspect to account for when an advertisement has been recommended or forwarded by another User to possibly apportion some of the payout to the recommending or forwarding User and/or to reduce or increase the payout to the consuming User. Such sharing may, in some embodiments, be apportioned up the chain transitively in a decaying manner (e.g. geometrically by halving) to reward key recommenders that contribute to a Content message becoming viral. For example, if Alice watches and then forwards the message to Bob, who watches and forwards it to Charlie, who watches and forwards it to Dawn, the payout related to Dawn consuming the message Content may pay Dawn $2.00 with Charlie receiving $1.00, and Bob getting $0.50, and finally Alice getting $0.25. Likewise, when Charlie viewed, he may have received $4.00, and Bob getting $2.00 and Alice receiving $1.00. If Alice sends it to multiple people and ultimately significantly contributes to a viral campaign, she may be duly compensated in this matter for her network effect in some embodiments. A Marketer may vary the payout formula to account for how much a message has been viewed, such as for example, to account for a message going viral and being suddenly watched by huge numbers of individuals. Such payout adjustment may reduce or increase the payout according to the number of views, likes, or other recommendations and comments a Content message has received.

Another aspect of the changing formula is that if a User suspends watching a message mid-stream, when they are ready to resume play, the formula may no longer provide the same payout that was originally promised when they first started watching the commercial and thus the User may choose to defer resuming the message until the same or similar circumstances/context return (if ever) such that the payout is comparable to the original promised amount.

In some embodiments, a User may see average Targeted Marketing Content payouts for those Users whose Profile demographics are similar to their own profile's demographics. This may aid the User in configuring their own profile's filters related to minimum Targeted Marketing Content payouts that they are willing to accept based upon norms for their demographics.

A User may configure their Profile to filter out advertising whose payout is disadvantageous to their current situation, needs, and/or desires. For example, Users may configure their Profiles such that when watching live sporting events, their feed is never to be delayed. Because Targeted Marketing Content may be cut off, due to, for example, being at the end of a commercial break, the User, Arkiïs™, or another service provider may select Targeted Marketing Content to statistically maximize the User's average payout.

The following scenario depicts an example of advertisement selection based on a User's Profile preferences. Daniel is watching live volleyball using his customized Arkiïs™ Roku™ channel. At the end of one of the games, the live broadcast goes to commercial break that is expected to be 3 minutes long. Daniel's Profile preferences require commercials that are rated as funny by others with similar tastes to Daniel as long as their pay is not more than 20% below the highest paying commercial available to him at any given time. At this time the Arkiïs™ cloud servers determine, based upon Daniel's Profile, that the following commercials in Table 2 can be served to Daniel:

TABLE 2

| Title | Duration | Payout | Rate/Min. | Funniness |
|---|---|---|---|---|
| Pepsi ® Elton John | 1.0 min | $1.25 | $1.25 | 9 |
| Coors Beer | 1.0 min | $1.50 | $1.50 | 6 |
| Geico Insurance | 0.5 min | $0.75 | $1.50 | 5 |
| OfficeMax | 0.5 min | $0.85 | $1.70 | 3 |
| eTrade | 1.0 min | $1.33 | $1.33 | 1 |
| Lexus Hybrid | 1.0 min | $1.65 | $1.55 | 0 |

The software-enabled algorithm on the Arkiïs™ cloud servers computes that the highest paying commercial is OfficeMax at $1.70 per minute; however, there are three funnier commercials that may be given priority based upon Daniel's Profile. Per Daniel's Profile requirements the servers do not select the Pepsi® Elton John commercial because it is not within 80% of the highest paying commercial; instead the servers stream Coors and then Geico to Daniel in the first one and a half minutes of the break. The servers compute that OfficeMax plays third, leaving one minute in the current break and Lexus as the highest paying and Pepsi® as the funniest remaining. The servers play Pepsi® as the last commercial before returning from break since it is now within 20% of the highest paying remaining commercial. Daniel has earned a total of 55.95. Alternatively, Daniel receives the list of available targeted commercials before they are played and using his smartphone he reviews the list and rejects the OfficeMax commercial and gives his reason as not being in the mood. The rejection and reason are transmitted to the Arkiïs™ cloud servers that do not immediately adjust his Profile since his reason was given as being very transitory, however, the rejection is recorded for future reference to see if a pattern develops. The server's selection algorithm honors his rejection and adjusts the computation of which commercials he is served.

Inputs to the formula may include portions of the ad that have been consumed, and in what fashion. The simplest such description is a User consuming an ad in its entirety from beginning to end in a single uninterrupted session. More complex descriptions include scenarios where the User does not finish the ad in a single session and returns to it later to complete, perhaps rewinding to an encoded entry point before resuming. The Consumer may even fast-forward and skip some portions altogether. The Marketer may structure their payout formula such that partial payouts may be earned as the ad is consumed based upon how far into the ad a User has consumed (e.g., viewed or listened) and in what manner was that point reached. For example, all payouts may be withheld until the first ten seconds of the ad has been consumed, or withheld until the whole ad is consumed in its entirety, or even require the consuming to be uninterrupted (never paused).

In some implementations, a Consumer always has the option to red-flag Content as being inappropriately targeted toward them. This can be because they judge it to not match their objectives, interests or moral thresholds. When red-flagging, the User may explain the reason(s) for rejection and, in a preferred embodiment, in return they may receive the full payout as if they had consumed the complete message. This Feedback allows the Content Producer to adjust their targeting to potentially reduce future conflicts. A User's red-flagging history may be recorded as part of their Profile and abuse of the feature can lead to advertisers reducing their payout formula to such a User or avoiding them altogether.

Figure 30:
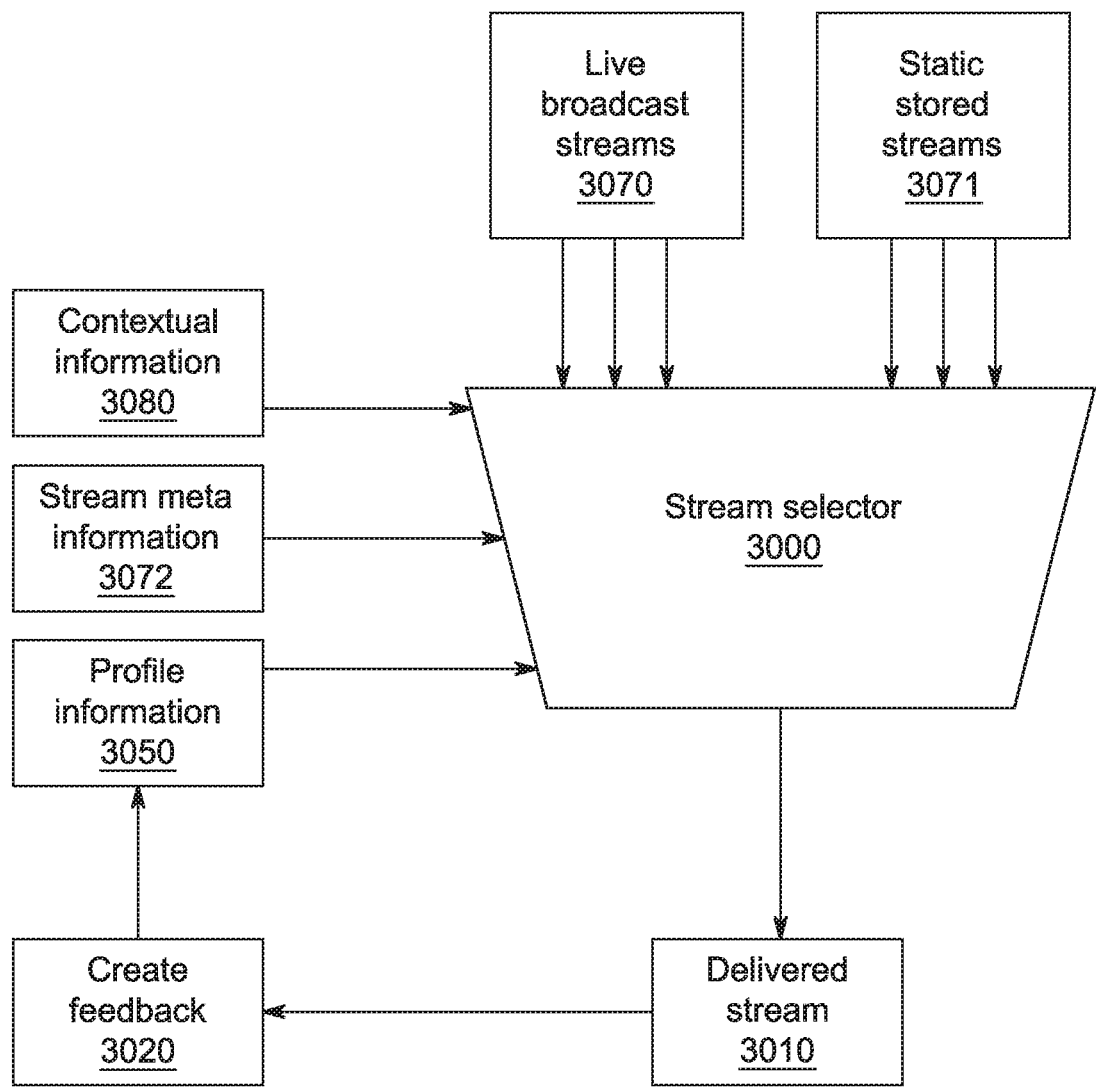
FIG. 30 is an exemplary stream selector system that can be used in conjunction with the technologies described herein.

FIG. 30 is an exemplary stream selector system that can be used in conjunction with the technologies described herein.

Figure 31:
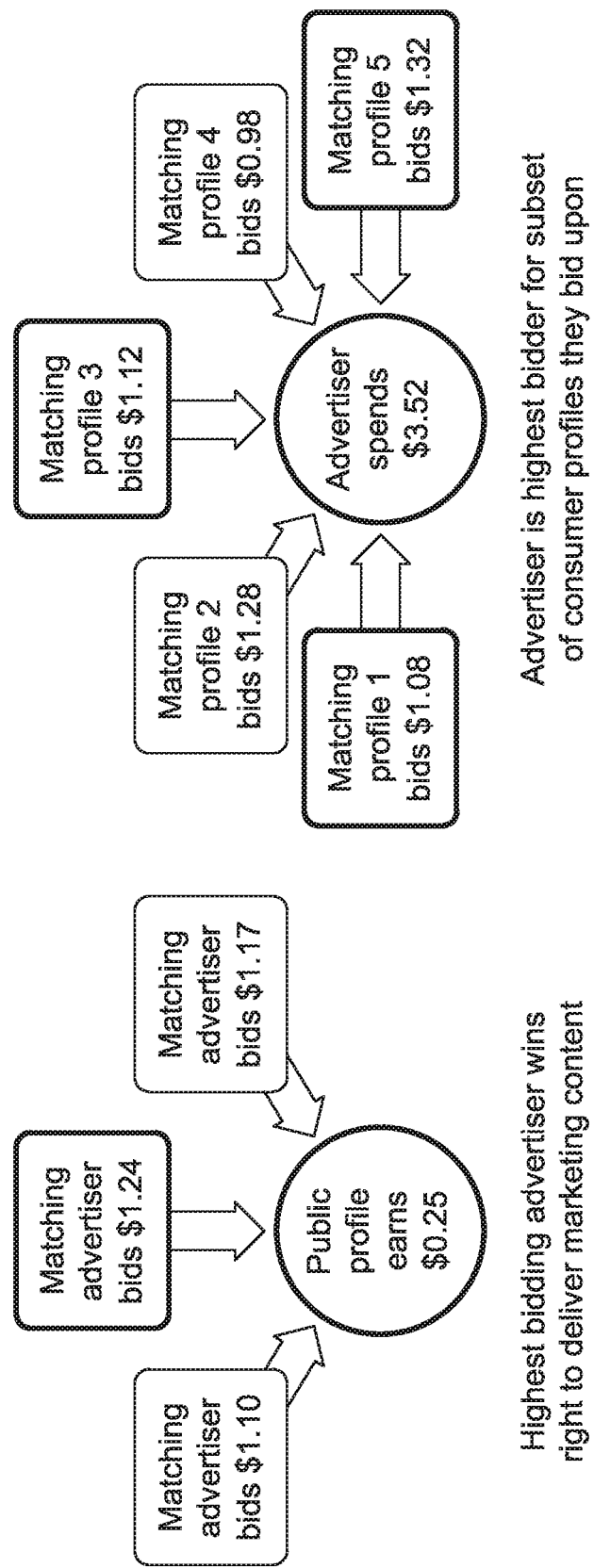
FIG. 31 is an exemplary bidding scenario wherein the highest bidding advertiser wins the right to deliver advertising to a public profile and the public profile shares in the proceeds. It is also an exemplary bidding scenario of a single advertiser bidding on several Profiles at different rates and winning a subset of these bids.

As seen in FIG. 30 Stream Selector 3000 is fed an assortment of Live Broadcast Streams 3070 together with Static Stored Streams 3071 as inputs and selects one such stream to be the Deliver Stream 3010. The selection is performed by analyzing Contextual Information 3080, Stream Meta Information 3072, and Profile Information 3050. Profile Information 3050 may be augmented by the Create Feedback 3020 in response to Delivered Stream 3010. FIG. 31 shows exemplary matching multiple Marketer 402 Bid(s) 404 that are actualized bid(s) offered 430 via static stored streams 3071. FIG. 31 shows two examples. On the left is an example of a single User receiving bids from multiple advertisers. On the right is an example of a single advertiser sending bids to multiple Users. As shown in FIG. 31, only bolded bids are delivered, stream 3010. Additionally FIG. 31 shows an example for a single Marketer 402 with multiple Bid(s) 404 for different User Profile(s) 414 where only bolded outline circles/blocks are yes 426 Deliver bid 420 in actualize bid offered 430 and unbolded outline circles/blocks are No 424 Not delivered 422. Explaining the left side example from the perspective of the flow diagram of FIG. 2, content selector 208 receives the three bids. Only the bolded bid is delivered to User 210 resulting in a payment module credit of $0.25 at 216. Each of the bids has associated therewith meta-data as shown generally at 204. Turning to the example on the right side of FIG. 31, five Users 210 submit bids for an advertisement. The examples in FIG. 31 can also be seen from the perspective of FIG. 4 where the marketer's perspective is shown. On the left example, there are three marketers 402. All three marketers 402 generated bids 404 and all three became actualized 430. Each marketer generates its bid without necessarily having knowledge of the bids by other marketers. On the right example, there is a single marketer 402 that is looking at five profiles 414. Of the five bids, three pass through content selector and delivered to User 210 resulting in a credit by payment module 216 to each corresponding User 210.

If a Consumer makes a forward-looking Assertion about their intention to purchase a particular Product in a given time frame, this may increase the payout value for receiving related ads. Advertisers may provide payouts for such ads that are divided between the standard cash portion for watching this type of advertisement and a coupon or rebate for any Product in that category (not necessarily that advertiser's product) representing the added value due to the Consumer's forward looking Assertions. In this way, advertisers only pay for forward-looking Assertions that are actually fulfilled. This allows an advertiser to value a User's statements in an area where the User has no track record by tying payment to fulfillment of their forward-looking Assertion. This can be accomplished in many ways including: providing a coupon for a purchase that matches the User's professed intentions, providing a rebate where a proof-of-purchase matching the professed Assertion qualifies for the rebate, or providing a monetary payout that is contingent upon confirmed Assertion fulfillment (e.g. purchases) by Arkiïs™. The payout may include a bonus that triggers if the purchase has additional qualities not originally specified in the User's professed Assertion. For example, if a User indicated they were going to buy a TV, an advertiser might offer a bonus if they chose an OLED type of TV because the advertiser believes that if the purchaser researches OLED TVs that they are more likely to buy their brand.

The following example shows one embodiment of the system which utilizes ensured integrity payouts: Frank is in the market for a new large screen television and Samsung targets him with an ad that will pay him $25 if he buys any 50" or larger television in the next three months because they are so confident that if they can reach him with this message about their new OLED technology that he will buy their television based on his Profile showing that he is a videophile. He receives a coupon or rebate offer that requires proof of purchase of a television and is paid, even though he buys the competing LG OLED television instead.

When using an Arkiïs™ identifier, a User may choose to shop at brick and mortar stores with cash while retaining the traceability features of using a credit card. For example, many stores can locate a receipt in their systems electronically by the shopper presenting the credit card used for purchase. When paying with cash, a User may present an Arkiïs™ identifier in one of several possible ways including: swiping an Arkiïs™ card using the credit card terminals, waving their Arkiïs™-enabled phone (e.g. using Near Field Communication (NFC) feature), scanning an Arkiïs™ loyalty card barcode or QR code, and/or manually typing in their Arkiïs™ identifier number on a terminal. Subsequently, if the shopper were to return to the store and needed their receipt, for example, because they wished to return an item, the store is able to locate it using their Arkiïs™ identifier presented again in one of these ways. Alternatively, at the time of purchase, a store may transmit a receipt to Arkiïs™ for storage with the purchaser's Profile, thus allowing easy retrieval by the User at a future time.

In some embodiments, Arkiïs™ may offer a feature that is configurable by each User such that whenever that User is shopping at the store either physically or online, the store may receive temporary access to their complete purchase history at that store for the duration of their shopping experience.

The Arkiïs™ identifier may vary by time or by store in some embodiments. For example, there may be a handshake protocol (an exchange of signals between a store and a customer when initiating communications in order to ensure anonymous synchronization) whereby the store presents an identifier to uniquely identify the store (e.g. Target or Safeway) and a unique version of the User's Arkiïs™ identifier is generated from the store's identifier for use each time the User visits that store to allow the store to retrieve permissible details about the User from Arkiïs™ The store-specific identifier may be provided using many of the same techniques in which a general identifier can be given by first supplying the store's identifier to the process which generates the User's store specific identifier. In some embodiments, a smartphone can see the names of wireless networks in its vicinity and deduce the store in which it is present and put forth a digital identifier (e.g. a QR code) on the smartphone's display for scanning by the register or transmitted to the register such as by NFC. Alternatively, GPS can be used to identify the store or NFC, or some combination of several methods. The User's identifier may vary by date, with the identifier changing periodically, such as monthly, or every two weeks. Were the customer to return to the store wishing to locate their receipt, they can provide their identifier as of the date of their purchase, or if unsure, provide a range of identifiers until a match is found, or check their Profile to see what identifiers were passed out and only supply those.

In addition, the cash identifier may also be used to build a User's Profile to include a record of confirmed purchases paid for by cash. These verified purchases will boost a User's Consumer Marketing Performance Score, especially if the purchase was the fulfillment of an Assertion. Therefore, the use of an Arkiïs™ identifier when making a purchase will augment the value of a User's attention to Providers and increase the profits the User makes when receiving advertisements relevant to a verified purchase.

For years, some credit card suppliers have allowed their customers to generate virtual credit card numbers that may only be used for a single purchase, for a set amount of time, and/or which may have a dollar limit on that purchase as selected by their customer. These one-time credit card numbers are traditionally used for online purchases to help reduce fraud and ensure unauthorized recurring charges do not appear on a credit card. Arkiïs™ facilitates, preferably with existing credit card providers, the generation and integration of these virtual credit card numbers and allows for purchases made with these cards to automatically be tracked in a User's Profile like a cash identifier. Arkiïs™ preferably maintains the total or partial anonymity of the User from vendors while partnering with other payment technology companies and servicers to facilitate returns and find receipts, thus opening a new market for these cards at brick and mortar stores to have the anonymity of cash.

In some embodiments, Arkiïs™ may offer a new kind of virtual credit card number that only places restrictions on charges while allowing unlimited credits (e.g. Product returns or advertising payouts to Users) to further facilitate returns using the same card which may no longer be valid for purchases at the time of return. Arkiïs™ may also provide a virtual card number in alternate embodiments that may only be used at one merchant, specified either at the time of virtual number generation or upon the first use of the virtual card number. In further embodiments, a card number may be generated that may only be used for a predetermined number of purchase transactions. Arkiïs™ may allow virtual credit card numbers to be used with credit card providers that do not provide this service by acting as an intermediary that does provide such numbers, then charges the original credit card provider using a traditional card number without revealing that number to the merchant and/or optionally not revealing what was purchased or what store to the credit card issuer. In the case of rebate credit cards, the User may request Arkiïs™ to properly categorize their purchase with the credit card issuer (e.g. gasoline or restaurant) so that they are properly credited with the appropriate premium rebate category (e.g. 5% for gasoline or 3% for restaurants). Depending on the embodiment, Arkiïs™ may integrate support for virtual credit card numbers through any of the mechanisms used for supplying a cash identifier. The likes of Chip-n-Pin (i.e. an integrated circuit chip card that requires a PIN to make a purchase) may be combined with virtual credit card numbers where the circuit on the credit card automatically generates and supplies a virtual credit card number. Such credit cards may be integrated with smartphone or smartwatch technology to provide an electronic wallet that securely contains all a User's payment options together with Arkiïs™ solutions to retain anonymity and tracking of confirmed purchases to build a rich profile.

The Arkiïs™ system of tools and processes includes multiple mechanisms by which third parties (preferably independent) may provide value including the addition of information, reviews, add-on tools (e.g. plug-ins), certifications, rankings, and ratings to Users in areas such as ranking or filtering Content and judging values and metrics of advertisements as well as goods and services. Users may wish to share their revenue and/or directly pay for these services because the value created by these services is great, and without payment the benefit of such services would likely not be available.

The Arkiïs™ system includes multiple ways in which remuneration may be supplied to third parties. It may be allocated as a percentage of payouts and/or purchases. Based on the embodiment, this allocation may be distributed across multiple third parties based upon their applicability, trust level, usage and/or value. For example, the period of time a User reviews the Content may be used to prorate the portion of the overall allocation that is attributed to the Content or alternatively, Content remuneration may be prorated based upon the trust level, grade or value the User places on information, possibly combined with the average or aggregate trust level, grade or value of all other Users or of only those Users with similar Profiles. Alternatively, allocations may be assigned to third parties individually.

Additionally, the suppliers of Content, goods, or services and the like may wish to compensate third-party Providers (e.g. Reviewers, advocates, and Champions) that in any way increase the probability of their wares being purchased and/or consumed. Sellers may choose to allocate a percentage of the purchase price of Products toward third parties whose work impacts the likelihood of a sale or participates in a buyer's decision process. In some embodiments, the seller may pay third parties regardless of whether their Product is actually purchased. Payments may be triggered whenever a potential buyer accesses that third party's information about their Product. The allocation may be a total allocation that is divided up proportionately across contributing third parties based upon their statistically determined contribution value. In alternate embodiments, each third party may be given a specific allocation.

In some embodiments, third parties may have minimum payout requirements that must be agreed to before their Content is visible or alternatively, their Content may only be partially visible if terms are not agreed to, or they may have multiple tiers of revelation and acceptance of each tier's terms (e.g. clicking to reveal more information) additionally reveals that tier's information. Required terms may be a fixed cost for information or a conditional cost that is only triggered if a particular action is taken or event occurs such as a purchase.

When information may be partially considered or consumed, payment structures may be prorated or adjusted based upon the relative portion of information considered, relied upon, and/or the amount of time such information is perused.

The following example usage scenario describes one embodiment of the disclosed system. Melody wants to buy a Blu-Ray player in the next month and posts her intent in her Arkiïs™ Profile. Her Profile shows that she only wants to buy consumer goods Products that are manufactured using sustainable techniques as certified by The Nature Conservancy. She also wants a Product with an interface that scores at least 4 out of 5 in usability as scored by a Human Computer Interaction expert she trusts. Because of this, she is offered a commercial for a Sony player that pays $1 for a Product that meets her criteria except that it does not have a usability certification from a Reviewer she already trusts but it has been highly reviewed by Joe, someone she does not yet trust. She accepts the commercial and the commercial ends with a link to Joe's review. She clicks on the link and reads the review from Joe, the Reviewer she is not familiar with, but who has a following of several hundred Users that give him high trust marks, including her friend Kristen. She studies the review and watches some of the review's attached video segments that demonstrate the usability features of the Sony player. Given Joe's review and the low price tag, Melody decides to take a chance on Joe and buy the player. Sony pays Joe $0.50 for presenting his review to Melody and when she subsequently follows through and purchases it, Sony pays him another $2.00. After receiving the player and using it for two weeks, Melody decides she is happy and raises her trust level on Joe from 0% to 50% and agrees to pay Joe $0.20 for each review she reads of his. A few months later, after not buying another Product based upon Joe's review and hearing of a friend who did end up buying it and was unhappy, as predicted by Joe, she raises her trust level on Joe to 75% and now agrees to pay him $0.30 for each review of his that she considers. Sony also pays The Nature Conservancy $0.25 for showing in their ad the Nature Conservancy's certification that the player's manufacture in China is using sustainable practices such as paying a living wage, buying carbon offsets, and not polluting the environment. Sony pays another $1 upon Melody's purchase since the certification was a prerequisite she listed in her buying Assertion.

13. Exemplary General Purpose Computing System

The system described herein may be implemented on a variety of general purpose or specialized computing systems. General purpose computing systems may include, laptops, desktop computers, DVR players, Roku™ devices, Blu-Ray players, set top boxes, cable boxes, etc. Specialized devices may include a DVR that is designed especially for the Arkiïs™ system to automatically collect data about a User and prepare Content for their on demand viewing. Such devices may be wholly or partially implemented with cloud functionality.

Figure 32:
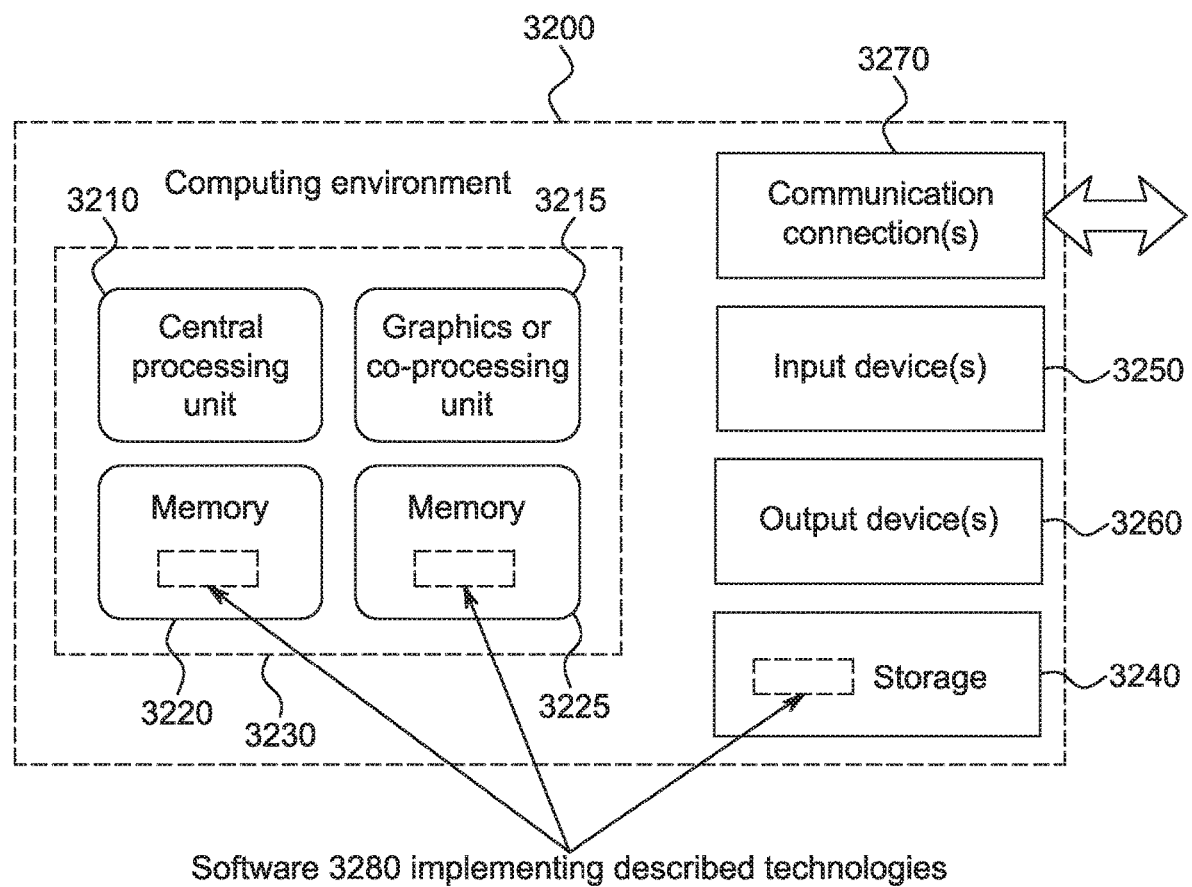
FIG. 32 is a diagram of an exemplary computing system in which some described embodiments can be implemented.

FIG. 32 depicts a generalized example of a suitable general purpose computing system 3200 in which the described innovations may be implemented. The computing system 3200 is not intended to suggest any limitation as to scope of use or functionality, as the innovations may be implemented in diverse general-purpose or special-purpose computing systems. For example, the computing system 3200 can be any of a variety of computing devices (e.g., desktop computer, laptop computer, server computer, tablet computer, media player, gaming system, mobile device, etc.).

With reference to FIG. 32, the computing system 3200 includes one or more processing units 3210, 3215 and memory 3220, 3225. In FIG. 32, this basic configuration 3230 is included within a dashed line. The processing units 3210, 3215 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 32 shows a central processing unit 3210 as well as a graphics processing unit or co-processing unit 3215. The tangible memory 3220, 3225 may be volatile memory (e.g., registers, cache, RAM), non-volatile memory (e.g., ROM, EEPROM, flash memory, etc.), or some combination of the two, accessible by the processing unit(s). In some implementations, the memory 3220, 3225 stores software 3280 implementing, at least in part, one or more innovations described herein, in the form of computer-executable instructions suitable for execution by the processing unit(s).

A computing system may have additional features. For example, the computing system 3200 includes storage 3240, one or more input devices 3250, one or more output devices 3260, and one or more communication connections 3270. An interconnection mechanism (not shown) such as a bus, controller, or network interconnects the components of the computing system 3200. Typically, operating system software (not shown) provides an operating system for other software executing in the computing system 3200, and coordinates activities of the components of the computing system 3200.

The tangible storage 3240 may be removable or non-removable, and includes magnetic disks, magnetic tapes or cassettes, CD-ROMs, DVDs, or any other medium which can be used to store information in a non-transitory way and which can be accessed within the computing system 3200. The storage 3240 stores instructions for the software 3280 implementing one or more innovations described herein.

The input device(s) 3250 may be a touch input device such as a keyboard, mouse, pen, or trackball, a voice input device, a scanning device, or another device that provides input to the computing system 3200. For video encoding, the input device(s) 3250 may be a camera, video card, TV tuner card, or similar device that accepts video input in analog or digital form, or a CD-ROM or CD-RW that reads video samples into the computing system 3200. The output device(s) 3260 may be a display, printer, speaker, CD-writer, or another device that provides output from the computing system 3200.

The communication connection(s) 3270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "computing device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

14. Exemplary General Purpose Mobile Device

The system described herein may be implemented on a variety of general purpose or specialized mobile devices. General-purpose devices may include, iPhone®, iPad®, Android Tablet, Android Smartphone, Smartwatch, etc. Specialized devices may include a smartwatch or similar mobile device that is designed especially for the Arkiïs™ system to automatically collect data about a User and coordinate with the various devices a User interacts with. Such devices may be wholly or partially implemented with cloud functionality.

Figure 33:
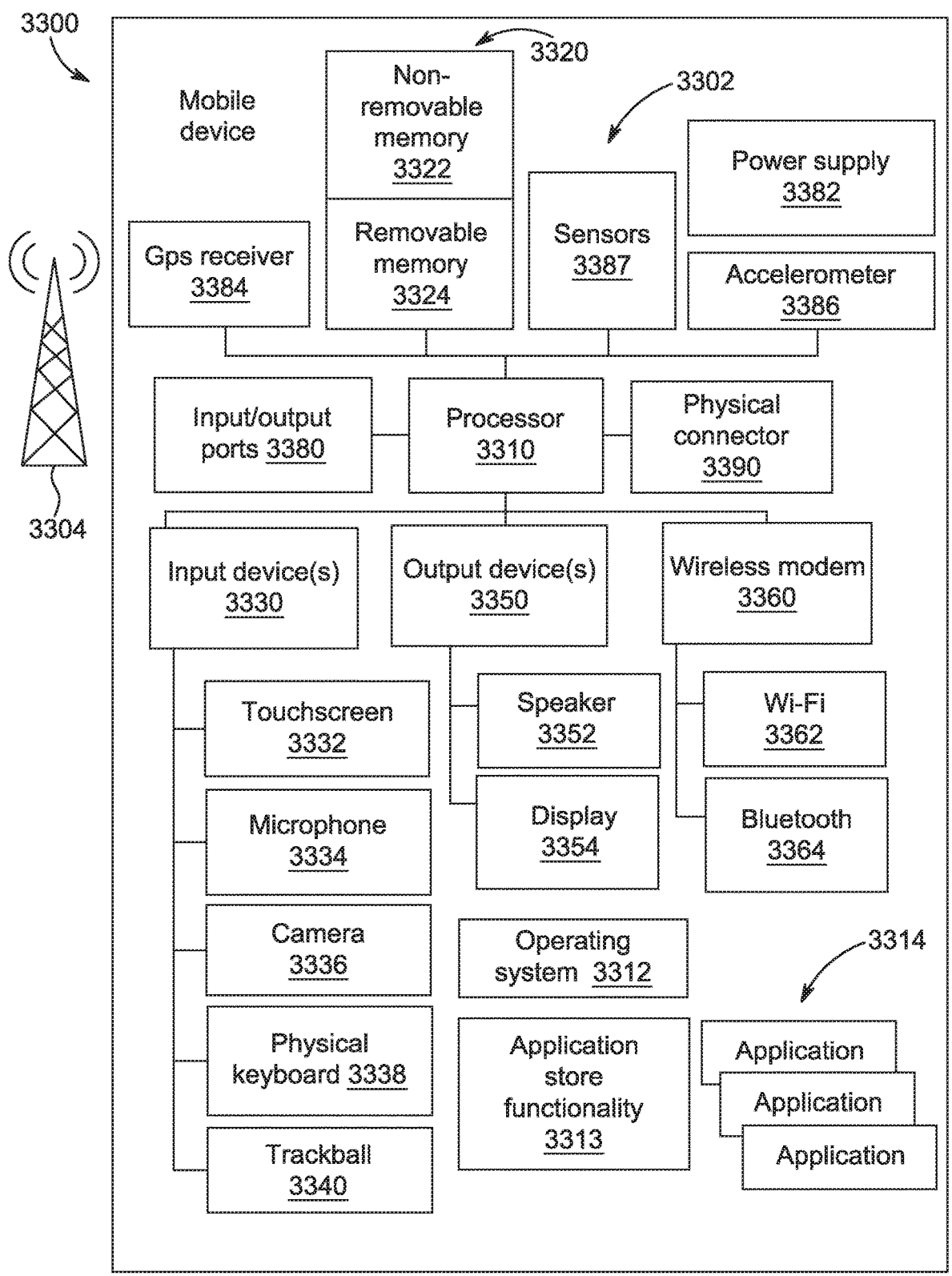
FIG. 33 is an exemplary mobile device that can be used in conjunction with the technologies described herein.

FIG. 33 is a system diagram depicting an exemplary general purpose mobile device 3300 including a variety of optional hardware and software components, shown generally at 3302. Any components 3302 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 3304, such as a cellular, satellite, or other network.

The illustrated mobile device 3300 can include a controller or processor 3310 (e.g., signal processor, microprocessor, ASIC, or other control and processing logic circuitry) for performing such tasks as signal coding, data processing, input/output processing, power control, and/or other functions. An operating system 3312 can control the allocation and usage of the components 3302 and support for one or more application programs 3314. The application programs can include common mobile computing applications (e.g., email applications, calendars, contact managers, web browsers, messaging applications), or any other computing application. Functionality 3313 for accessing an application store can also be used for acquiring and updating applications 3314.

The illustrated mobile device 3300 can include memory 3320. Memory 3320 can include non-removable memory 3322 and/or removable memory 3324. The non-removable memory 3322 can include RAM, ROM, flash memory, a hard disk, or other well-known memory storage technologies. The removable memory 3324 can include flash memory or a Subscriber Identity Module (SIM) card, which is well known in GSM communication systems, or other well-known memory storage technologies, such as "smart cards." The memory 3320 can be used for storing data and/or code for running the operating system 3312 and the applications 3314. Example data can include web pages, text, images, sound files, video data, or other data sets to be sent to and/or received from one or more network servers or other devices via one or more wired or wireless networks. The memory 3320 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 3300 can support one or more input devices 3330, such as a touchscreen 3332, microphone 3334, camera 3336, physical keyboard 3338 and/or trackball 3340 and one or more output devices 3350, such as a speaker 3352 and a display 3354. Other possible output devices (not shown) can include piezoelectric or other haptic output devices. Some devices can serve more than one input/output function. For example, touchscreen 3332 and display 3354 can be combined in a single input/output device.

The input devices 3330 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition (including using lip-reading technology to improve accuracy), touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 3312 or applications 3314 can comprise speech-recognition software, that may optionally include lip-reading technology for improved accuracy, as part of a voice user interface that allows a user to operate the device 3300 via voice commands. Further, the device 3300 can comprise input devices and software that allows for user interaction via a user's spatial gestures, such as detecting and interpreting gestures to provide input to a gaming application.

A wireless modem 3360 can be coupled to an antenna (not shown) and can support two-way communications between the processor 3310 and external devices, as is well understood in the art. The modem 3360 is shown generically and can include a cellular modem for communicating with the mobile communication network 3304 and/or other radio-based modems (e.g., Bluetooth 3364 or Wi-Fi 3362). The wireless modem 3360 is typically configured for communication with one or more cellular networks, such as a GSM network for data and voice communications within a single cellular network, between cellular networks, or between the mobile device and a public switched telephone network (PSTN).

The mobile device can further include at least one input/output port 3380, a power supply 3382, a satellite navigation system receiver 3384, such as a Global Positioning System (GPS) receiver, an accelerometer 3386, one or more other sensors 3387 (e.g., thrust/jerk sensor, barometer, thermometer, hygrometer, and/or other types of sensors), and/or a physical connector 3390, which can be a USB port, IEEE 1394 (FireWire) port, and/or RS-232 port. The illustrated components 3302 are not required or all-inclusive, as any components can be deleted and other components can be added.

Figure 34:
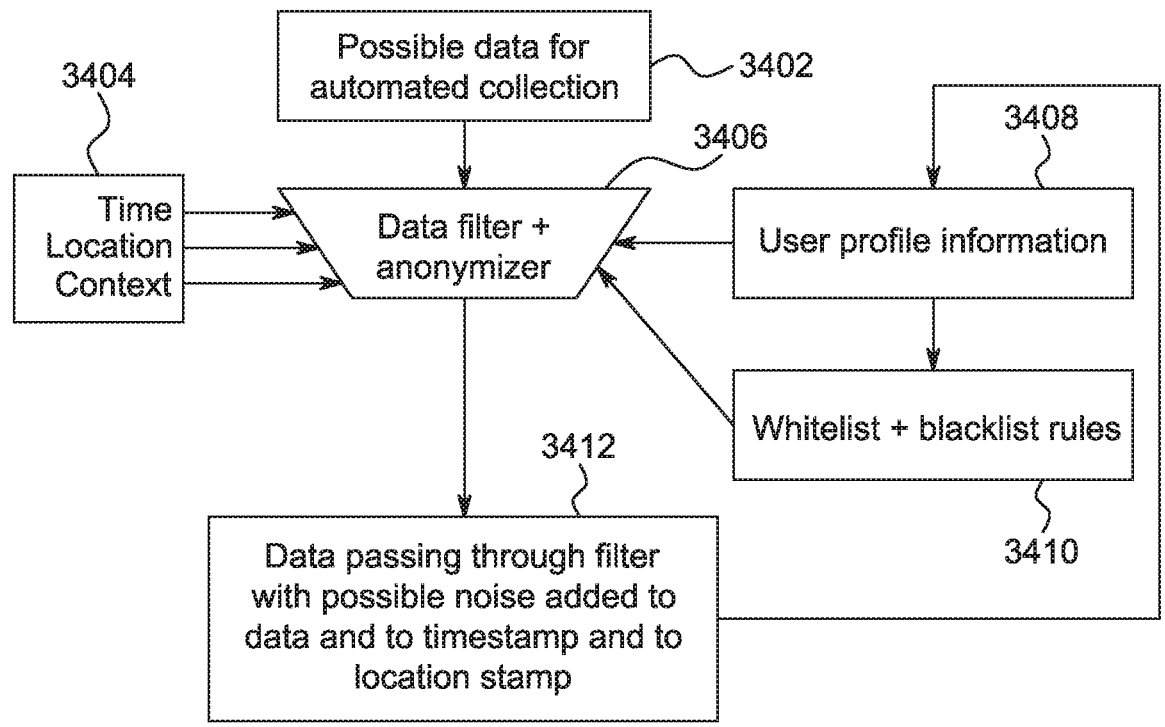
FIG. 34 is a flowchart of an example method governing the automated collection of data that can be privacy protected.

Mobile devices (and more generally computers) afford the opportunity to automatically collect vast amounts of detailed Profile information, such as illustrated in FIG. 11 with data generated by User's mobile devices and computers 1110. Within the Arkiïs™ system, Users may view and change their collection controls whenever and however they desire, and have complete control over the flow of their data into the system. The User may control collection at various levels of granularity depending on the embodiment as well as create rules that specify different collection criteria under different circumstances. Users may also configure rules to notify and/or alert them when they can potentially and/or are actually being recorded (e.g. audio, video, photo, social interaction history) by the automated collection of Profile information being performed by the Arkiïs™ system on behalf of another Arkiïs™ User on the other User's device. For example, in some embodiments, such as illustrated in FIG. 34, a User may have rules triggered by their location (Spatial Rule), other Users if they are around and engaged in activity (Social Rule), or time (Temporal Rule). As further shown in FIG. 34, rules are either default, whitelist, or blacklist rules. In one embodiment, initially, all collection is off and this is overridden by default rules that specifically enable collection of specific kinds of data. Default rules specify a static collection Profile, indicating the kinds of data to collect, the frequency of collection, and the accuracy to be retained for the collected data. A default rule may specify that a kind of data is not collected by default yet still specify a default frequency of collection and/or a default accuracy to retain, the purpose being to supply a default value for these fields in the event that a whitelist rule enables collection but does not specify frequency and/or accuracy. The static collection profile is then continually adjusted according to the whitelist and blacklist rules as they come into and out of applicability over time. The whitelist and blacklist rules are maintained in a sequential ordering that represents their relative priority and are applied in the priority order in which they are listed. In a preferred embodiment, once an aspect of collection is specified by a rule that triggers, no further lower priority rules are applied to that aspect at that moment in time (e.g. if collection of a kind of data is turned on by a whitelist rule or turned off by a black list rule, lower priority rules for that kind of data do not apply until the triggering rule no longer applies). A blacklist rule can be thought of as being equivalent to a whitelist rule with the same trigger that specifies a frequency of collection of zero, meaning the data is never collected. The ordered whitelist and blacklist rules are processed in priority order and each rule's condition is tested and if true, the rule is applied to enable some aspect of data collection (e.g. turning collection on or off, specifying the frequency of collection, or specifying the accuracy of the collected data). Condition building blocks are time, location, and social that may be combined together using Boolean operators including: AND, OR, XOR, and NOT. To make the app easier to use for those not wishing to have app complexity, the whitelist and blacklist functionality may be hidden, partially disabled, and/or completely disabled when the User Profile does not specify them as being an expert and/or according to the User Profile preference. Selecting what data to collect is too complex and time consuming for one or more humans to carry out and thus requires the automation of a rule based system implemented with a one or more computing devices, which when using this method is able to meet the exact desires of a User to control their data collection, previously unattainable without this method.

A temporal condition for a rule tests the local time for the User to see whether it falls between a start and end time. By default, such tests are time zone relative so that a rule set in the Pacific Time Zone to trigger between 9 am and 10 am still applies between 9 am and 10 am when the User happens to be located in the Eastern Time Zone instead of shifting it to between noon and 1 pm. However, a User may designate that a temporal condition be absolute and thus is adjusted for the local time zone as compared to the time zone in which it was created. Temporal conditions may also specify calendar components similar to how a calendar application functions such as allowing selection of days of the week, a recurrence interval, etc.

A spatial condition for a rule tests whether the User's present location falls within a specified geographical area. The geographical area of a spatial condition may be specified as either a circle defined by its center and radius or as a polygon specified by its vertices. Such a test may be configured to be neutral, aggressive, or conservative to take into account possible error in the location determination method being used (e.g. GPS or Wi-Fi triangulation). Aggressive and conservative configuration settings include a confidence probability setting that may default to 99% likely. An aggressive configuration may include locations outside the specified area such that the probability of mistakenly not triggering the rule matches the confidence level assigned to that condition building block. Conversely, a conservative configuration may exclude locations just within the specified area such that the probability of mistakenly triggering the rule matches the confidence level assigned. For example, if the current location identification method were accurate 99% of the time to be within two meters of the User's actual location, then an aggressive rule set to 99% confidence expands the target area outward by two meters. Similarly, a conservative configuration set to 99% confidence level contracts the target area inward by two meters. As such, it is possible for a conservative configuration to never trigger in the case that the contraction results in an empty area. When an empty area results, the User may be warned that their rule has no effect. Finally, a neutral configuration is neither expanded nor contracted.

A social condition tests whether the User is presently engaged in a SyncGroup or in Physical or Virtual Proximity of other Users or of others not identified as being Users. Alternatively, a social condition may test whether the User is presently engaged in an activity, e.g. playing golf or eating a meal. This may be determined by a User's input describing what activity they are taking part in currently, or by location data (e.g. through GPS or Wi-Fi triangulation) which matches a location where an activity generally takes place (e.g. a golf course) or by analyzing microphone data, accelerometer data, camera and video data, or a combination of the aforementioned factors. For example, a social condition may specify not to record microphone data when in Physical Proximity to others, whether they are identified as Users or not. Others not identified as being Users may include the detection of Bluetooth signals from other phones in the vicinity of a User not known to be registered to the User.

A Boolean condition tests one or more temporal, spatial, or social conditions and combines them together using Boolean operators such as AND, OR, NOT, XOR, NAND, NOR, etc. A Boolean condition may also be combined recursively within another Boolean condition, for example (Between 6 pm and 7 pm AND at home) OR (between 7 am and 8 am AND (NOT at work))) is an OR rule that itself combines two Boolean conditions that are each using an AND condition, one of which further combines a temporal condition together with a Boolean NOT condition.

Mobile devices allow for the automated collection at points in time along various metrics that include:
Location
  GPS
  Wi-Fi Triangulation (WLAN)
  Mobile Tower ID Triangulation
  Magnetic field detection (e.g. compass for orientation)
Accelerometer
Climate
  Humidity
  Temperature
  Air Pressure
Biometric
  Pulse rate
  Blood pressure
  Blood sugar level
  Blood oxygen level
  Pupil dilation
  Eye tracking point
  Facial expression
  Voice level and emotional quality
Bluetooth (e.g. visible or connected devices)
Audio
Video
Call log
SMS log
Browser history
Contacts
Installed/Running apps
Purchases made via NFC (e.g. Google® Wallet) and credit card
Screen status
Battery status
Social media (Facebook, Twitter, etc.) activity Rules for automated data collection for data types may specify how accurately the data may be recorded. For example, for location data, a User may prefer that their location only be recorded to the nearest 100 meters even though their mobile device can provide a much more accurate measure. For example, such obfuscation may be done as either rounding to the nearest 100 meters, or adding in a random plus or minus 50 meters, or some combination of both. Alternatively, for time stamp data, a User may prefer that the time stamp on their data measurements only be recorded to the nearest five minutes, by again either rounding, adding a random noise factor, or both. Similarly, a rule may specify the frequency of data collection, for example, taking a sample every six seconds or only once every 15 minutes. Such accuracy controls may have a random variation built in, e.g. sample once every 60 seconds plus or minus 10 seconds. As another example, a User may prefer that audio data only be collected when they are engaged in a telephone call, engaged in video call, or present in a public location such as a restaurant or bar.

In some embodiments, Users may wish for wholly fictitious data to be generated and added to their Profile, possibly mixed together with data actually based upon their real (non-fictitious) information.

15. Exemplary General Purpose Cloud Computing System

The system described herein may be implemented on a variety of general purpose or specialized cloud computing systems. General purpose cloud computing systems may include, Amazon® EC3, etc. Specialized cloud computing systems may include a cloud with hardware, configuration, and/or characteristics designed especially for the Arkiïs™ system to optimize services such as automatically collecting data about a User and coordinating with the various devices a User interacts with.

Figure 35:
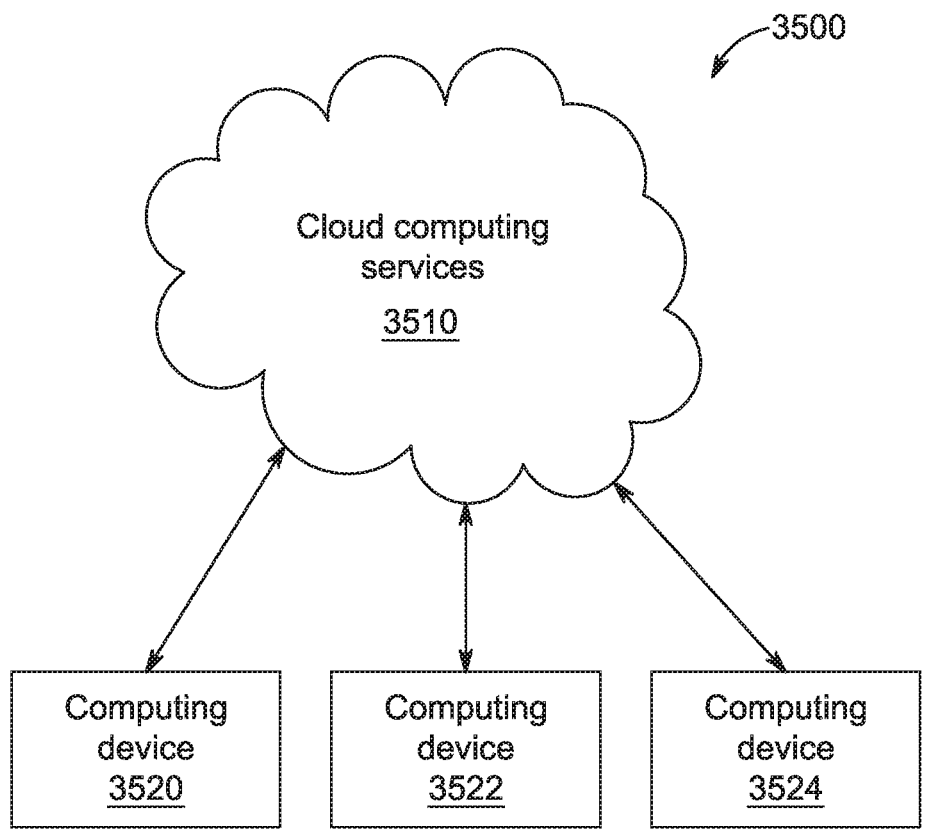
FIG. 35 is an exemplary cloud computing system that can be used in conjunction with the technologies described herein.

FIG. 35 depicts an example general-purpose cloud computing system 3500 in which the described technologies can be implemented. The cloud computing system 3500 comprises cloud computing services 3510. The cloud computing services 3510 can comprise various types of cloud computing resources, such as computer servers, data storage repositories, networking resources, etc. The cloud computing services 3510 can be centrally located (e.g., provided by a data center of a business or organization) or distributed (e.g., provided by various computing resources located at different locations, such as different data centers and/or located in different cities or countries).

The cloud computing services 3510 are utilized by various types of computing devices (e.g., client computing devices), such as computing devices 3520, 3522, and 3524. For example, the computing devices (e.g., 3520, 3522, and 3524) can be computers (e.g., desktop or laptop computers), mobile devices (e.g., tablet computers or smartphones), or other types of computing devices. For example, the computing devices (e.g., 3520, 3522, and 3524) can utilize the cloud computing services 3510 to perform computing operators (e.g., data processing, data storage, and the like).

16. Exemplary Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media and executed on a computing device (e.g., any available computing device, including smartphones or other mobile devices that include computing hardware). Computer-readable storage media are any available tangible media that can be accessed within a computing system (e.g., non-transitory computer-readable media, such as one or more optical media discs, volatile memory components (such as DRAM or SRAM), or non-volatile memory components (such as flash memory or hard drives)). By way of example and with reference to FIG. 32, computer-readable storage media include memory 3220 and 3225, and storage 3240. By way of example and with reference to FIG. 33, computer-readable storage media include memory and storage 3320, 3322, and 3324. The term computer-readable storage media does not include communication connections (e.g., 3270, 3360, 3362, and 3364) such as signals and carrier waves.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Python, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and unique features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

Further potential features, operating modes and methods of using the disclosed technology described above are disclosed below.

Hand-held device to allow interactive time coded feedback and control while viewing Content and to allow multiple devices to be simultaneously registered to individual profiles when watching in a group.

DVR to record broadcast content and instantaneously substitute commercials with those matching the viewer's profile and share revenue with the original content provider.

Smart phone and tablet applications to dynamically interact with the system and that allow individuals watching collectively in a group to choose to view custom messages on their personal device as well as give individual feedback on shared content messages. Additionally, a shared message may be more generic (e.g., a message about BMWs in general) and this may be complemented by individually targeted messages (before during or after the shared messages) delivered to each User's individual device that is more tailored to them (e.g., offers a specific BMW model that best matches their Profile).

Large screen devices which automatically register the set of Users collectively watching content and either automatically choose to deliver group messages on the large screen or individual messages on personal devices or to ask for current preference of a viewing session. Alternatively, the large screen is split in two and one half of the room watches one side and the other half takes the other side while each viewer gets the audio for the side appropriate for themselves delivered by the application on their smart phone or my Wi-Fi from the large display that is picked up by the individual devices. Ability to detect the set of smart phones around a content reproducing device such as a radio in a car or on a train and know who the audience is that is listening based upon them being logged into their accounts on their phones and know the context such as driving down the highway or stopped in traffic or parked outside the football stadium or with strangers riding the train together but not sharing content. The phones communicate with each other to link together and reach agreement that they are in the same car traveling at the same rate and in close proximity to each other and thus allowing the assumption that they are indeed in the same vehicle together. The set of Users viewing collectively is used to optimize the messages being delivered to the group to best match each of the individual preferences of each group member. Filters on content may be combined such that content satisfies all members content filters or a member may cooperate with the group and allow content outside their normal parameters but be alerted on their phone whenever such messages are forthcoming so they can excuse themselves from the room if so desired. After their smart phone shows them what they will earn for a particular shared ad, some members may choose to listen on their own using headphones while others may sync up with the group as selected on their phones or defaulted based upon their personal settings. After any content delivered to a group of viewers or listeners, their application on their phone asks directed customized questions about the content and indicates how much they would be paid to answer, for example, what was most intriguing to you about this commercial or did you get enough information about the technical details of the advertised product? It might even show you an alternate commercial and have you decide which one is more compelling.

While watching shared content, a User may choose to publish their comments on the shared display (e.g., by sending a text with their smartphone that gets momentarily displayed on top of the ad and this may be shared with the Content Producer). SyncGroups may elect to view highly rated comments originating in other SyncGroups viewing of the same content during their own viewing. Users can create subtitles to describe what a character is thinking. Advertisements can be created with thought bubbles to be filled in by viewers to make a game where the best scripts wins prizes. Marketers may provide a beginning scenario to seed the game.

Users may store their favorite ads (or links to them) onto their phone and then use their phone to send the ad to a shared display.

Ability for customers to deliver sanctioned live or prerecorded testimonials regarding products they have purchased to their friends and other members with similar profiles and be compensated both for delivery and in the event a friend or similarly profiled person ends up purchasing the product. Any such compensation can optionally be pledged to a charity to increase the testimonial's impact. Additionally this compensation is shared with their audience of friends. The testimonials can be coupled with traditional advertising messages during group shared viewing of content. For example, a professional commercial includes a space in its message where the testimonial is inserted midstream.

Technology to mark product placement in content or detect it when it is not marked and either replace or eliminate it within such content. For example, coke is being drunk on American Idol, but this is now digitized and you as a viewer being a Pepsi drinker see content that replaces the Coke with Pepsi through the broadcast.

Technology to automatically recognize the individuals comprising an audience and provide content that satisfies the combined restrictions of the audience as a whole.

Technology to share a percentage of the revenue derived from viewing a message with each piece of the whole technological solution that enables the viewing.

Technology to share loyalty card information and credit card information is already being done by websites such as eScrip (escrip.com) and uPromise (upromise.com). The ownership and control of the information collected is transferred to the consumer in return for a fee paid by consumer. To be most effective, this requires the existing collector to no longer retain the information once in is passed on.

Technology to allow configuration of triggers based upon live events to override camera angle being presented on broadcast stream. Technology to allow configuration of interests to override default camera angle being presented on broadcast stream to highlight action around one's interests.

Technology to consistently visualize in a small recognizable collection of pictograms depicting scales to show how well the content being delivered by Arkiïs™ matches a consumer's profile interests and needs along several dimensions. Technology to allow replacement plug-ins to override interest and match visualization iconography presented with all content delivered with Arkiïs™.

Technology to automatically adapt to the environment of the User or to the User's stated present desires. For example, in a noisy location, the personal content being delivered may adapt by enabling closed captions or switching to a different feed where the audio portion is not important to content message delivery. Alternatively, when the User's focus may not remain constant on the visual portion of message delivery, the content may adapt to messages where the audio portion is primary or where the visual portion may be effectively gathered when only snippets are being viewed.

Technology to adaptively challenge the viewer to prove comprehension and identity to ensure the integrity of the system. Identity metrics may be seamlessly gathered to reduce conscious intrusions to the viewer through the use of cameras and facial recognition.

Track that a User is talking on the phone while watching an ad, listening to room to hear only the ad is present, etc. to ensure integrity measure of user watching ad. They are paid more to enable these integrity checks.

Building a consumer marketing score based on the accuracy of their profile based upon external confirmation of correlating information. Details include using the person's email domain as an early indicator of their reliability.

To ensure the integrity of the User's participation and thus its value to Marketers, the system may have built in measures to minimize one's ability to consistently cheat the system. Users that are deemed to be likely cheating may be penalized in their marketing score. The measures may include random challenge questions being presented to the User to test their knowledge of content presented. Additionally, random biometric challenges may also be provided to ensure the User's identity is maintained. Some of the biometric challenges may be ongoing and not require direct User action. Failing challenge questions may cause them to be put forth more frequently while passing them may reduce their frequency.

Ad placement based upon viewing context such as in a group of male friends or with spouse. Emotional location of thought, e.g. end of day kicking back. App inhibits volume maximum.

Ad placement is contextual, e.g. volume of prior commercial exit is linked with next commercial start so that the transition is more natural by choosing commercials that transition well from one to the next, that is, volume delta does not exceed a threshold.

Dump button during a commercial that you do not like and do not wish to view anymore.

Gestures such as taps during a commercial to give feedback as it is being viewed. Gestures are slowly taught to the user as popups explaining shortcuts.

Content can be viewed at anytime, not just coupled with TV so that you can view content specific to your location, such as at the Mall etc.

Deduce contextual scenarios such as finding you are often meeting with 4 friends on Sunday nights and thus it deduces a pattern and gives commercials that contextually fit automatically.

Go to Zumba class and get an offer to bring your friends from the class and sign up for Arkiïs™ and get the jump sport class for free and be rewarded based upon how many Zumba friends sign up for and take the class from JumpSport.

Roku uses Apple's HTTP Live Streaming (HLS) over TCP. An alternative to HLS is Real-time Transport Protocol (RTP) over UDP.

Specific formulas for allotment. Revenue sharing formulas. Intention to buy percentage likelihood to buy and track performance and tie to payout.

Table of some of the processes and to whom they apply:

| Process | For Whom? |
| --- | --- |
| Record plan to make purchase (Assertion) | Consumer |
| Update plan to make purchase (Assertion) | Consumer |
| Link Profiles in a SyncGroup Profile | Consumer |
| Suggest linking Profiles | Consumer |
| Confirm/alert Profile changes | Consumer |
| Detect Consumer behaviors and patterns (what is being viewed, where they are likely to be, etc.) | Consumer |
| Match detected behaviors and patterns to Profile preferences | Consumer |
| Match detected behaviors across Profiles | Consumer |
| Confirm detected status is accurate with Consumer | Consumer |
| Store Marketer business information | Marketer |
| Store Marketer advertising offers | Marketer |
| Confirm Marketer availability | Marketer |
| Suggest content based on User Profile | Consumer |
| Record purchases made | Consumer |
| Ship package anonymously | Shipper |
| Receive package anonymously | Consumer |
| Match similar User Profiles for purchase prediction estimated accuracy | Consumer |
| Calculate Consumer Marketing Performance Score | Consumer |
| Target advertisements based on User Profiles | Marketer |
| Link to third-party data | Consumer |
| Track Consumers' content viewing habits | Consumer |
| Communicate with content providers re length of commercial breaks | Content provider |
| Serve Targeted Premium Content | Consumer & Content provider |
| Select advertisements to view from selection | Consumer |
| Calculate which advertisements to serve | Consumer |
| "Photoshop" product placement in content based on User Profile | Marketer |

Another table of some of the disclosed processes and to whom they apply:

| Process | For Whom? |
| --- | --- |
| Create a private Profile | Consumer |
| Create Sub Profiles within Master Profile | Consumer |
| Create anonymous Profile for targeted advertising | Consumer |
| Create fictitious Profile for targeted advertising | Consumer and Marketer |
| Create fictitious Profiles within a Profile which override the master Profile | Consumer |
| Select portions of a Profile to make public | Consumer |
| Select portions of a Profile to hide | Consumer |
| Access viewing history | Consumer |
| Provide different tiers of access to Consumers | Arkiïs™ Staff |
| Grant Consumer referral bonuses | Staff, Consumers |
| Proving identity to use a service | Consumer |
| Linking proven identity to a Profile provided by a service | Consumer |
| Electronically voting in the governance of a system | Consumer |
| Linking separate Profiles created by a Consumer | Consumer |

-continued

| Process | For Whom? |
| --- | --- |
| Linking separate Profiles of multiple Consumers into an online group | Consumers |
| Providing targeted advertisement to an electronically created group | Marketers, Consumers |
| Creating and maintaining a group Profile | Consumers |
| Parental settings controlling privacy of minors online | Consumers |
| Discrete, combinable levels of group privacy settings | Consumers |
| Electronic forms of mutual consent | Consumers |
| Register grocery loyalty cards to reflect purchasing decisions | Consumers |
| Register credit cards to reflect purchasing decisions | Consumers |
| Register online purchasing accounts to reflect purchasing decisions | Consumers |
| Integration of external websites to receive recommendations | Consumers |
| Text message confirmation from a website | Consumers |
| Email notifications from a website | Consumers |
| Functionality to edit website fields through text message data | Consumers |
| Analysis of past Consumer activity data for targeted advertisements | Consumers |
| Analysis of data from smartphone microphone for targeted advertisement | Consumers |
| Analysis of data from GPS data for targeted advertisement | Consumers |
| Analysis of smartphone accelerometer data for targeted advertisement | Consumers |
| Analysis of biometric data from smart wearable devices for targeted advertisement | Consumers |
| Electronic credits in exchange for a purchase through credit card data | Consumers |
| Electronic credits in exchange for a purchase online | Consumers |
| Consumer identification barcodes | Consumers |
| Supply website credentials to receive credits for a third-party purchase | Consumers |
| Create a Profile for a business for targeted advertisement | Consumers |
| Administrator privileges over other accounts of a social network | Consumers |
| Anonymous shipping through randomly generated address "nodes" | Consumers, Mail delivery |
| Encrypted shipping, sender/recipient data | Consumers, Mail delivery |
| Anonymous online feedback | Consumers |
| Consumer-generated Profile for the intent of receiving targeted advertising | Consumers |
| Method of predicting and altering a Consumer's performance score | Consumers |
| Method of using a consumer performance score to predict future purchases | System |
| Method of mapping a store's contents and item prices through UPC, QR codes | Consumers |

The term Arkiïs' is a trademarked name. It is used herein to refer to an exemplary system. A commercially available implementation of Arkiïs™ may differ from the exemplary system described herein in form, function, and/or name.

17. Advertising and Fulfillment System

Embodiments disclosed herein recognize that the more closely a person guards their private information, the more value it is to them. Retailers and advertisers will pay to gain that information, and already do, but the customer does not see any of that money. Where does it go? Clearing houses, search engine companies, and publicly traded corporations. Embodiments disclosed herein permit an individual's information to be controlled in a manner to permit the individual to be paid for usage of that information.

The disclosed system is constructed as a coop, owned by its users. Thus, any profit generated that is not fed back into the growth of the company is distributed among its members, the end users. This can also encourage networking through bonuses and such.

The disclosed system is constructed as a coop (or a standard corporation or a hybrid of the two), owned in a greater of lesser degree by its users (and investors, in the latter cases). Thus, some portion of profit generated that is not fed back into the growth of the company is distributed among its members, the end users. A hybrid of the two involves stock but as value increases they reach a threshold, and everything above that line goes back/can be bought back by the coop.

Figure 36:
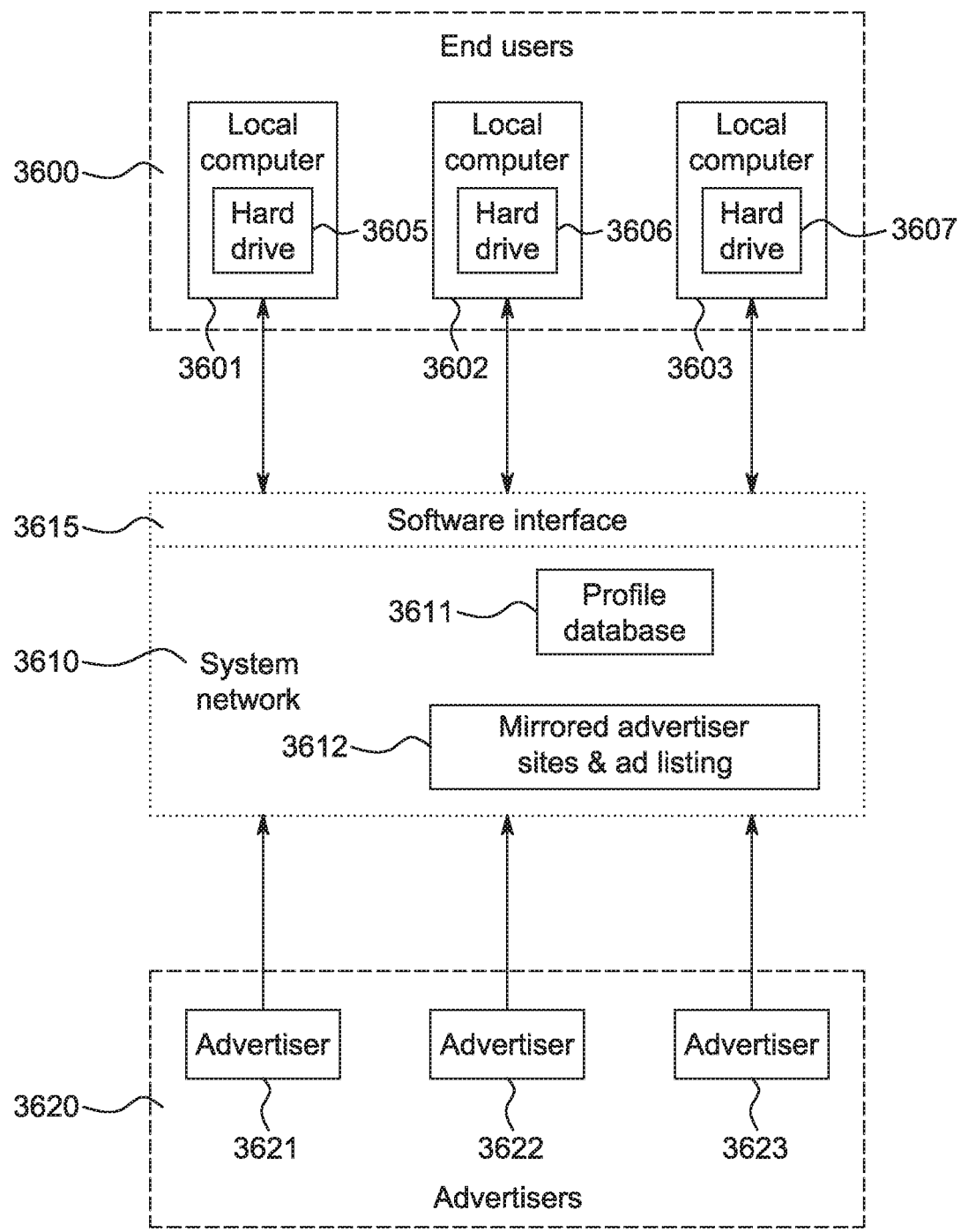
FIG. 36 is a representation of the system components and users: the system network and software interface, end users' local computers, and advertisers.

As shown in FIG. 36, when signing up for the system, the end user downloads a profile generator to the hard drive 3605, 3606, 3607 and a customizable profile is securely stored for use by the engine. A key to this profile is that it is completely up to the individual user how much information to provide. There are NO required fields except for the most standard information to set up a deposit/credit account with the system. Beyond this, any information provided by the end user performs two main functions:

1. Enhances his click value to the advertiser, thus increasing the amount of money the user will make off of each click.
2. Increases the relevance of the advertisements shown in response to each keyword, potentially saving the user the time and energy of browsing by pointing him more directly towards what he wants.

Once created, the user profile is uploaded to the cooperative's user profile database 3611. However, this profile database 3611 is dynamic, and any alterations the user wishes to make to the desktop profile will automatically upload to the online user profile database 3611.

Once created, the user profile is uploaded to the coop's user profile database and formulates a number to place them within a range of people within the database. That number defines how that user will be shown to the advertiser as buying potential. However, this profile database is dynamic, and any alterations the user wishes to make to the desktop profile will automatically upload to the online user profile database. This can be limited by honesty/normalcy tolerances provided by the Cooperative.

The search engine page 3700 has a standard, simple search engine interface 3720 for use as a standard search engine. It also has a user login option 3710 on the side. A user can only make money when he is logged into the system. Auto-login of some kind may be provided along with the system browser, password storage and homepage.

Figure 38:
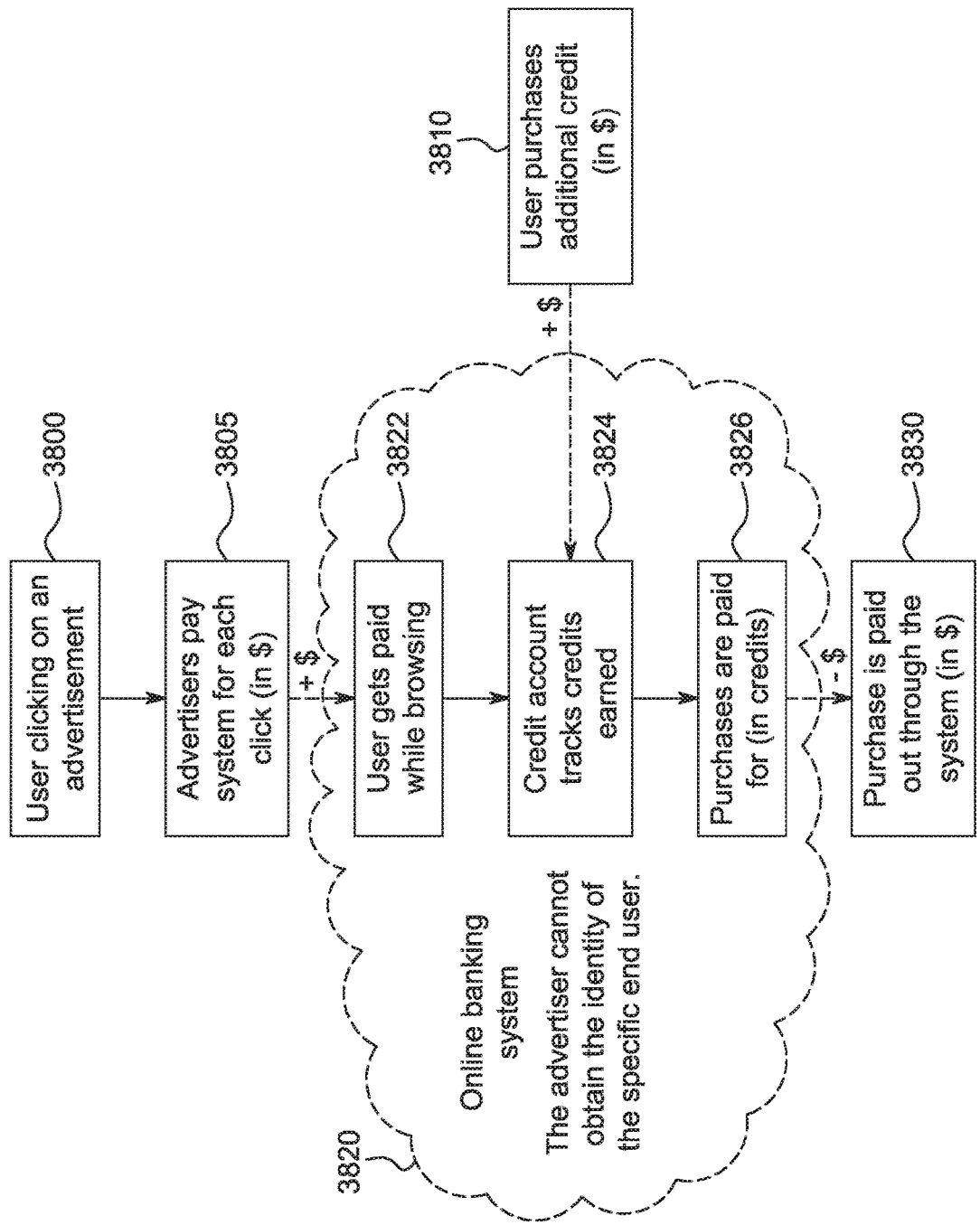
FIG. 38 is a flowchart depicting the transfer of money and credit through the provided online banking system, between the user (who may maintain anonymity) and the advertiser.

As seen in FIG. 38, once logged in, the user can get paid while browsing 3822, as well as manage a completely self-sufficient online banking system 3820 to add another level of security to online transactions by filtering them all through the system. The online retailer no longer obtains any information from the end user during the transaction because the purchase is paid for using credits 3826 and paid out through the system 3830. This further protects the end user from unsuspectingly giving out personal information and compels retailers/advertisers to join the system, because otherwise they cannot gather information about the types of users buying their products.

How the account online banking system works: a credit account comes automatically with signup to track credits earned through browsing; users can purchase additional credits 3810 to be used on any online transaction (protecting information from retailer and verifying follow-through conversion on keyword search intentions, as well as boosting click quality); a credit card can be ordered to use U-Dollars in physical transactions (also verifies purchases from "Brick & Mortar" retailers, boosts click quality).

Figure 37:
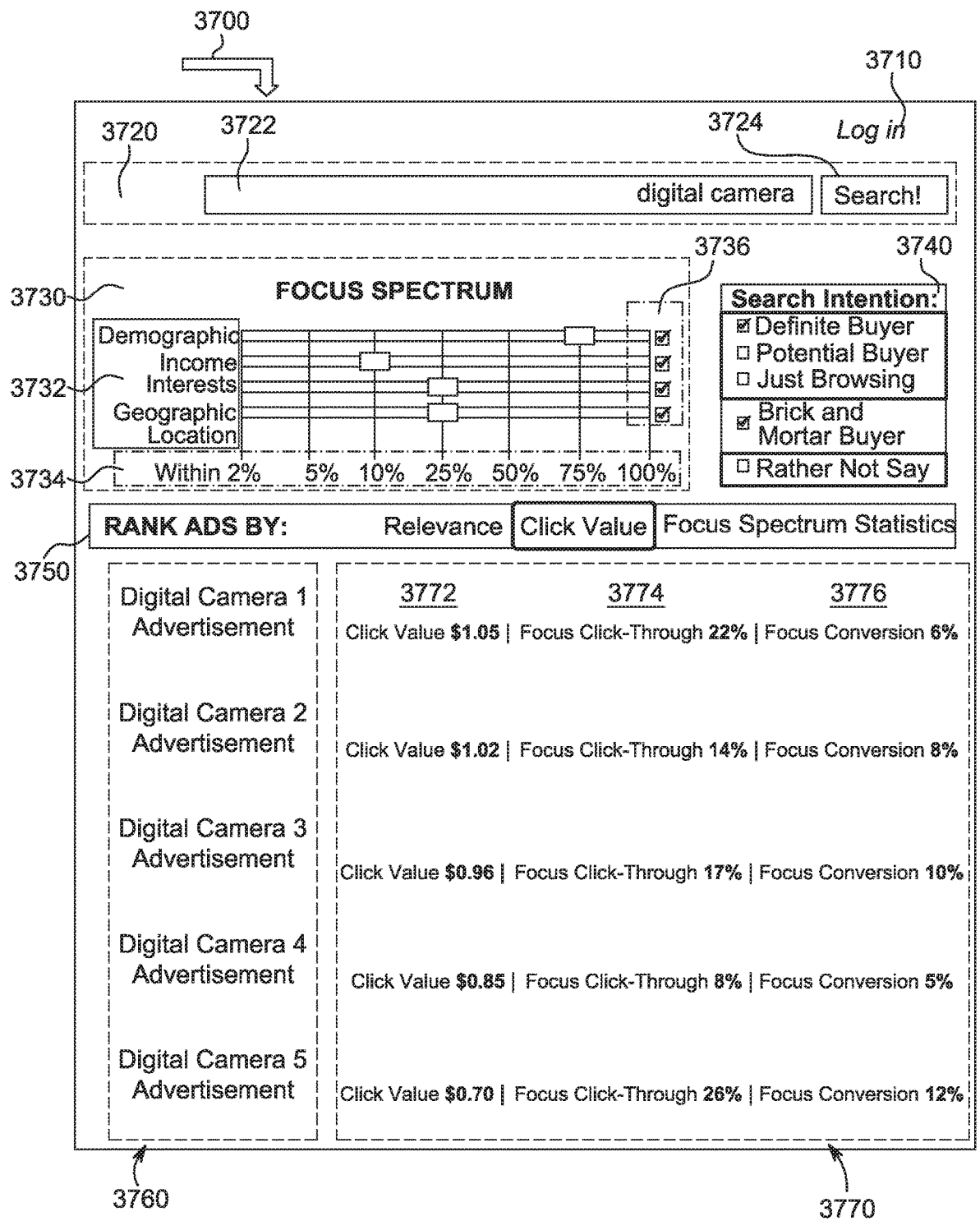
FIG. 37 is an example GUI (graphical user interface) depicting a search through the system, from the user's perspective.
Figure 39:
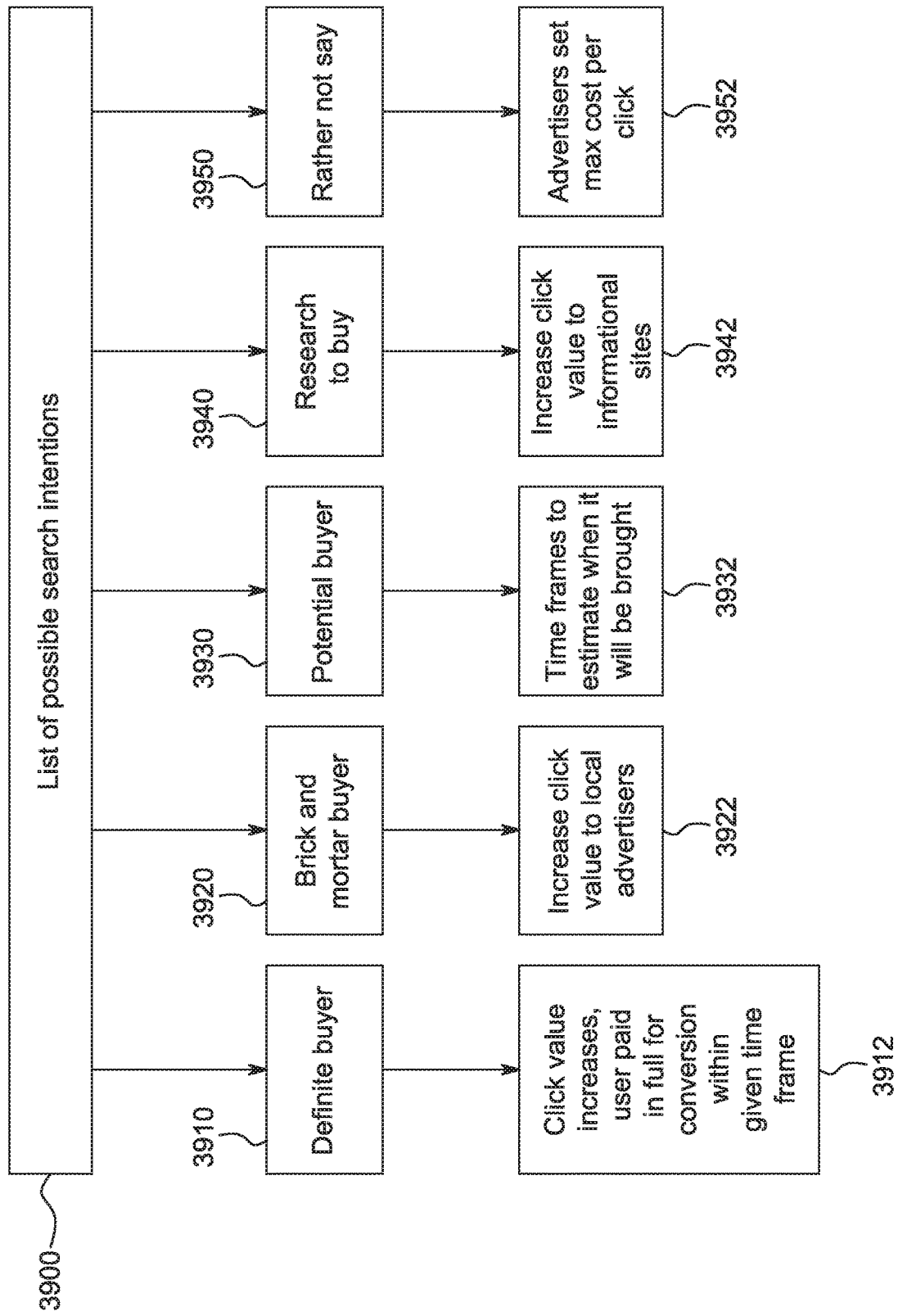
FIG. 39 is a flowchart depicting the Search Intention and the different effects caused by selecting its choices.

Turning back to FIG. 37, the search bar 3722, 3724 resembles any other search engine. As seen in FIG. 39, beneath the search bar, however, is a list of possible intentions 3900 that the user can click to tailor the search results and advertisements to his needs for that keyword search: Definite Buyer 3910 (Brick and Mortar buyer 3920 increases click value to local advertisers, decreases to others 3922), Potential Buyer 3930/Price Comparison (time frames to estimate when it will be bought 3932), Research to Buy 3940 (increases appeal to informational sites 3942), Just Browsing, Rather Not Say 3950 (advertisers will determine their own Max CPC (cost per click) for unspecified users just like standard search engines 3952).

Turning back to FIG. 37, after an intention 3740 is specified and the keyword search 3722 is submitted, the results 3760 are organized according to a user-specified ranking of factors. The advertisement results are dynamic columns that can be reorganized and reranked 3750 by:
Click Value (amount that advertisers are willing to pay for your click 3705 determined by advertiser, but based on specificity and details of user profile),
Relevancy (as determined by normal search engine relevancy),
Product Price (if specific product),
Focus Spectrum (popularity among group of similar users, as specified by end user according to interests, income, demographic, etc.)

The ads displayed in response to a search query 3760 have a few additional features 3770 compared to other search engine advertisements. Underneath the standard ad display, the system's ads display: click value 3772, Focus Spectrum statistics 3774, 3776.

The Focus Spectrum is one of the most dynamic and uniquely appealing aspects of the search engine. In the profile generator, users specify not only their personal information, but the range of interests to which they would like their ads tailored. For example, a high-income user might want to only view ads for high-end consumer products. Rather than allow the advertiser to determine what the user wants to see, the engine uses a statistical grouping formula to determine other users with similar profiles in the specified area. Thus, a high-income user who selects income as a key focus spectrum factor sees the click and purchase choices of other high-income users displayed beneath the advertisements. The statistics show the percentage of similar users who decided to click on the product 3774 and the smaller percentage that followed through with a conversion 3776.

The user also specifies the range of the Focus Spectrum to narrow or broaden the focus group. A simple focus statistics toolbar 3730 above the listing of advertisements has a customizable percentage that jumps between discrete amounts 3734 to change the range of the focus group. As the user expands or restricts the focus group size, the engine recalculates the relevancy of advertisements and adjusts their rankings accordingly.

All of the ads displayed in response to search queries are preapproved and within the network 3610 to ensure end user privacy in all click-throughs from a search. Our software/transfer page interface 3615 checks for cookies on landing sites to prevent pages within the ad network from tracking end users.

Click Value

A user's click value directly affects the amount that a user is offered by advertisers for clicking on an ad 3800. The click value is based on: click quality—loosely determined by: (# of conversions)/(# of clicks)×100%, demographic, income level, interests, geographic location, search intentions, any other profile information that the end user may provide.

The click quality formula shows that the longer a user browses without making any purchases or other types of advertiser-defined conversions (leads, signups, page views, etc.), the lower the user's quality score drops. Clicks always have an integer value (1 click=1 ad). Conversions have variable values, not necessarily integers. For example: Sale=1, Newsletter/Subscription=0.5, Lead (request for follow-up call)=0.75, Page View (length of visit)=0.05×(# of pages viewed after landing page), No Action=0.

Each advertiser can specify what aspects of a user's profile most enhance the click value to that advertiser. Thus, advertisers can target demographics, income levels, interests, geographic locations, and search intentions to fit their specific product or goal, but only for each individual end user insofar as that user supplies the information. However, the advertiser cannot obtain the identity of the specific end user. This is a part of the security promise of the system.

The advertiser can never obtain the identity of the specific end user unless the user agrees to provide some personal info. This is crucial to the security promise of the system.

Focus Spectrum

The focus spectrum uses complex statistical analysis of end user profile data to quantify the similarity of two users. The end user specifies what similarities are most important to him or her, and each keyword search groups other user data accordingly. The focus spectrum can be shifted based on: Income, Demographic, Interests/Hobbies, Geographic location (IP address), Conversion Rate (Frequent Buyer, Occasional Buyer, Brick and Mortar Buyer, Rare Buyer) 3732.

One or more factors can be selected to filter the advertisements even more thoroughly. For example, let's say an 18 year old female is searching for digital cameras online. The focus spectrum uses the groupings according to her demographic (e.g. 16-20) and expressed interest in professional photography to quantify the relevancy of the advertisements based on other similar users. The resulting ad rankings display the advertisements for higher-end cameras that garnered the most click-throughs and conversions among the 16-20 year old demographic. If she wanted to expand the search to high-end digital cameras among all ages, she can deselect 3736 the demographic factor and focus solely on the most popular and successful advertisements among those with an interest in professional photography.

The value of an end user's click may be listed underneath the ad, which states the amount paid to get through and the determined relevancy factor.

The Focus Spectrum is based on statistical data about other users with similar profiles. Personalized data provides information on other conversion profiles, using variable matching (within 5%, 10%, etc.). Users may also be paid bonuses for survey information in addition to click/conversion dollars, and also may be paid lead bonuses—newsletters, subscriptions, etc.

Advertisement Matrix

Customizable advertisement ranking is a more robust targeting mechanism for the end user, not the advertiser. It allows the viewing of statistics for other buyers without revealing the identity of those other buyers. A user can prioritize ad rankings by price (that advertisers are willing to pay for your click), relevancy, Focus Spectrum (based on end user-specified group of similar users), interests, and intention (serious buyer, research, etc.)

Figure 40:
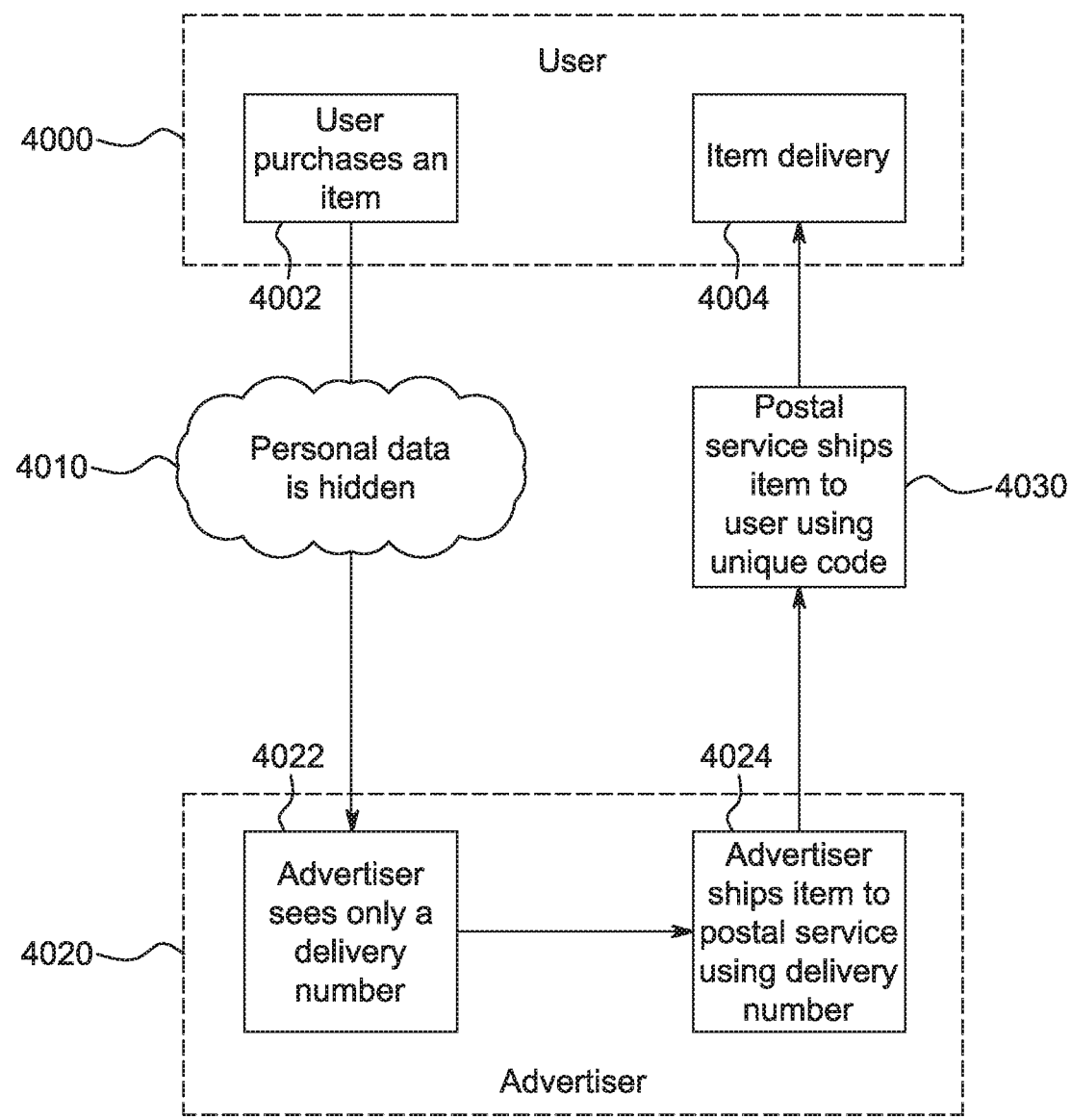
FIG. 40 is a visual representation of a shipping method that hides the user's identity from the advertiser supplying a product.

Advertisers 4020 see only delivery numbers for UPS 4022, not personal buyer information. As shown in FIG. 40, complete self-sufficient banking online allows complete anonymity: the end user 4000 buys online credit through a credit card, spends the credit on online products 4002, the retailer ships to UPS, and UPS ships to a local address 4004 based on a unique scan code 4030 which changes with every transaction.

A time-dependent click value is a model for checking the veracity of a user's click intention. For example, if claiming "Definite Buyer," the user will be paid the full amount promised by the advertiser only if they follow through with a conversion within the given time frame. If the user does not follow through, the initial SX paid for the amount will be cut to a fraction determined by the advertiser. Retailers can also choose not to cut cost no matter what, to enhance their ad's appeal to the end user.

Only advertisements for pages within the cooperative ad group are listed, for a completely sheltered coop bubble. Advertisers must mirror their sites into our system for approval and ad listing 3612, which ensures end user 3600 privacy protection. The required software interface 3615 stops other advertisers 3621, 3622, 3623 from placing cookies unknowingly on users.

Factors in Determining User Quality Score

Click quality=conversions/clicks. Time- and keyword-specific search purposes are specified for each keyword search by a selection underneath the search toolbar.

The matching of users with relevant advertisers has a general formula based on the user-specified profile. With each keyword search, the engine uses a combination of overall click value and more significant and targeted keyword-specific click value to determine how much the advertiser is willing to pay.

The first factor in matching the user with relevant and interested advertisers is relevancy, which is based on:
  the user-specified interests (advertisers create a similar interest page when creating an advertisement to select which users they would like to see their ads),
  the keyword itself (functions like a normal search engine, but combined with the other unique relevancy factors in determining the overall relevancy of ads),
  income level (for example, a high-end user would most likely buy camping supplies from REI than Target, and REI may pay more for the advertisement),
  demographic (certain companies sell the same products but target different age groups),
  geographic location (local businesses that do not sell online or ship products are only concerned with local customers, based on IP address or user profile)

The relevant advertisers then scale the user based on the user's self-expressed/determined buying potential (ex. "I promise to buy within 3 clicks"; "Frequent Buyer"; etc.), click value (performance history), keyword-specific click value (performance history within the keyword-specified area).

User profile numbers can be 100 digits long or more, where only specific digits apply to each advertiser (i.e. there is a number for camping specifically).

A matching system joins two people together; we want to join the buyer and advertiser. It includes not just user-defined information, but performance-based info ("I promise to buy within the first 3 clicks").

Rating sites by other users: a user can select to show results with only certain ratings. The click value scales the maximum cost per click. Rate different aspects of advertisers to tailor business to end user preference.

Focus Spectrum Expanded

Certain factors come into play more often than others. For example, geographic location is a much less significant factor than income, especially when searching for computer hardware, per se. The geographic location may come into play much more when searching for sleeping bags. In this way, the combination and weight of the different qualifiers in creating a focus spectrum for each individual search is dynamic and largely dependent on the keyword itself.

The number derived from the focus spectrum is the Relevancy Factor of the ad for those within the spectrum. This percentage is displayed underneath each advertisement to show how relevant other users thought that advertisement to be. The percentage is based not solely on click-throughs, but also on conversions. A conversion is worth significantly more than a click-through. Accordingly, the number generated, although a percentage, is not solely (clicks)/(impressions) for the focus group. It may look something more like [(clicks)+100*(conversions)]/(impressions).

For a definite buyer, (conversions)/(clicks) for the focus spectrum may be more useful information.

Figure 41:
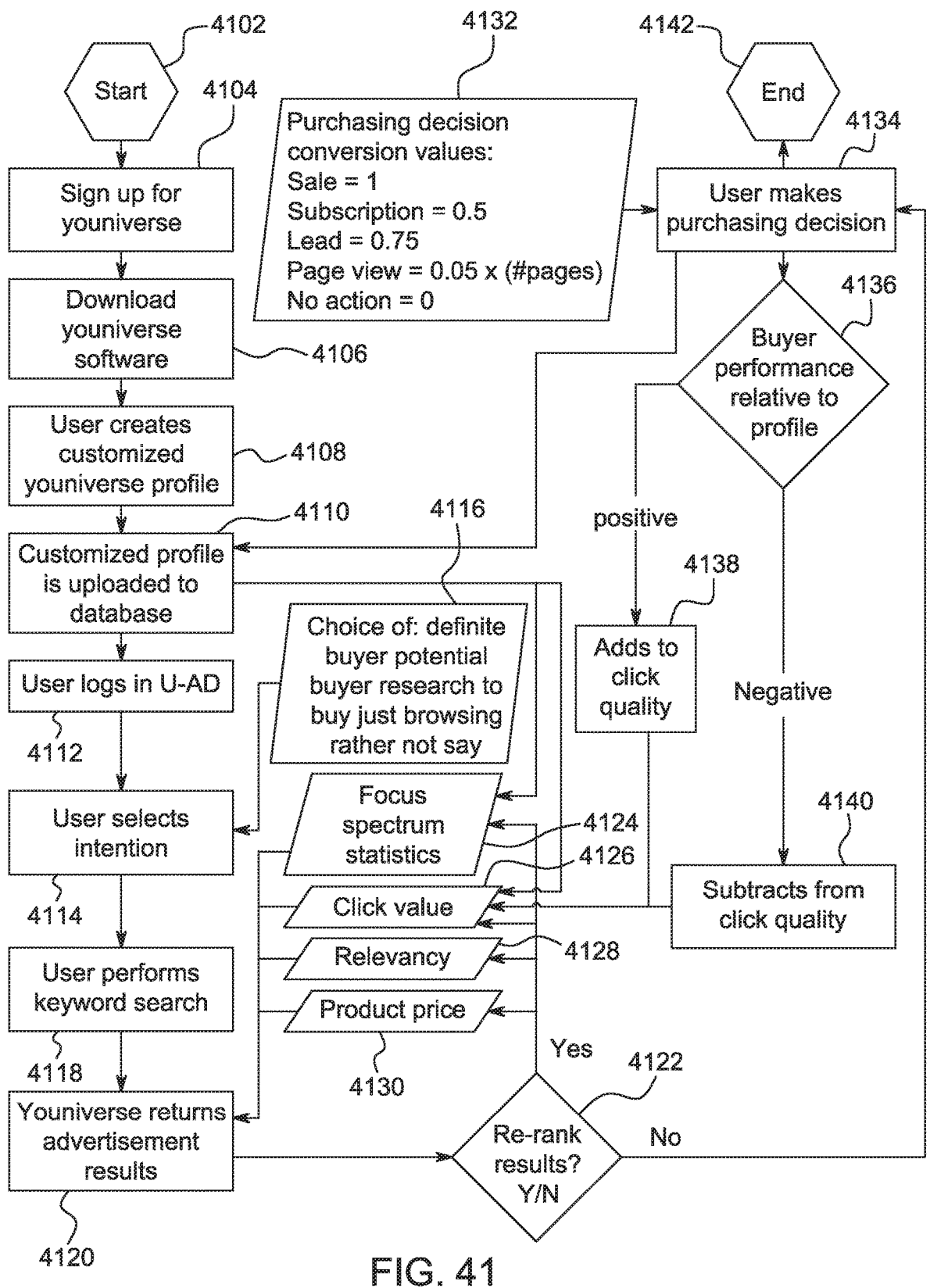
FIG. 41 is a flowchart of a system for purchasing goods online.

FIG. 41 is a flowchart of a particular system for purchasing goods online. The end user signs up for the system and downloads software for use on a local computer. The user then uses the software to create a customized profile, which may include one or more of demographic information, income level, interests/hobbies, geographic location, type of buyer, and search intentions. The user then uploads the customized profile to a database.

Figure 42:
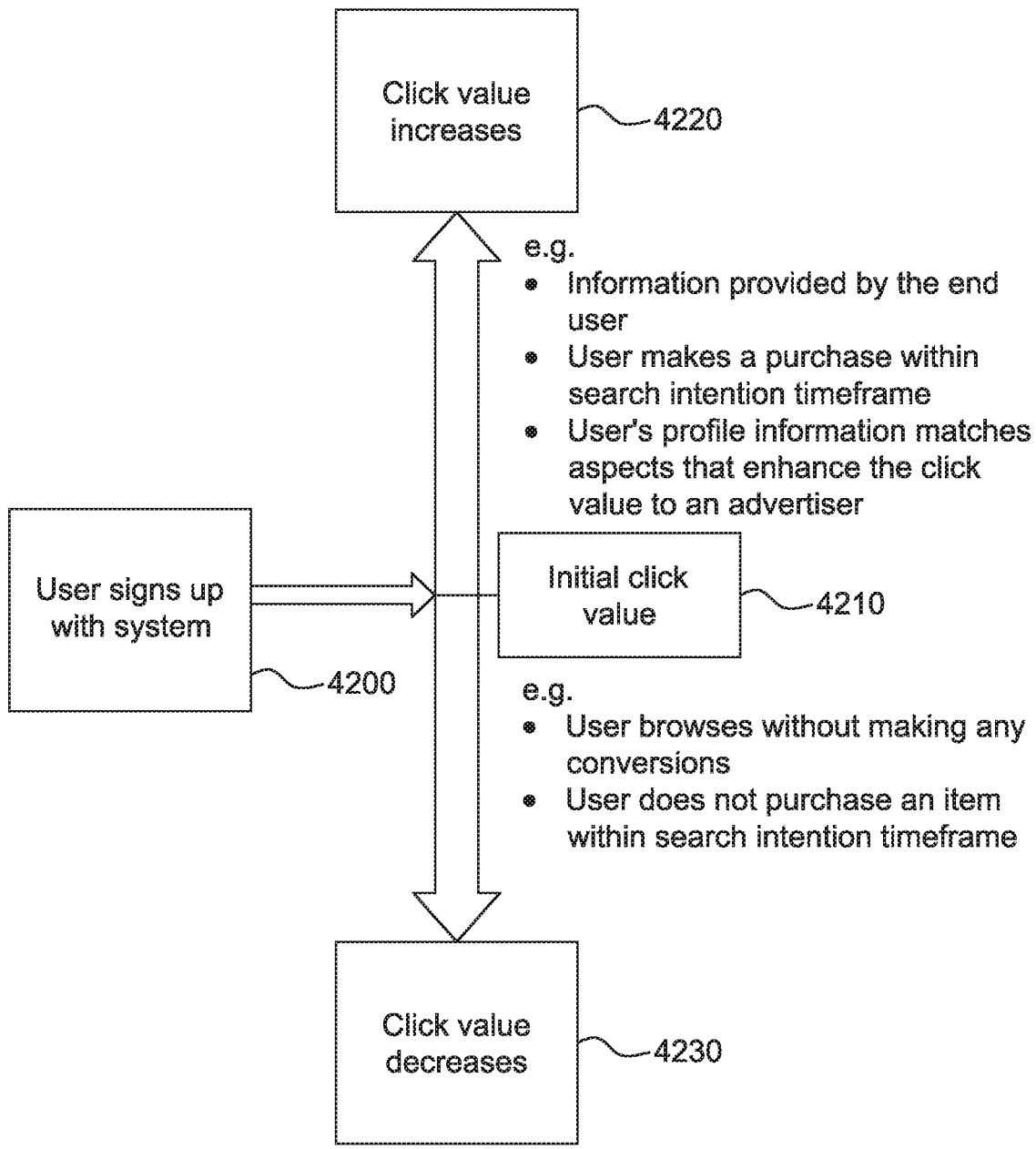
FIG. 42 is a visual representation of the Click Value and how its value can change.

As described in FIG. 42, the system assigns an initial Click Value 4210 to the user based on profile information. The customized profile is also used to determine Focus Spectrum Statistics, which encompasses the range of interests for the ads that the user will view.

The user then logs in to the system and selects an intention, specifying a choice of definite buyer, potential buyer, research to buy, just browsing or rather not say. The user then performs standard keyword searches for items and the system returns advertisement results based on the Focus Spectrum Statistics, Click Value, relevancy and product price. The user then has a yes/no choice to rerank the results based on any of these factors. Choosing yes allows the user to rerank the results and obtain a new set of advertisement results based on the user's choice. Choosing no allows the user to continue to make a purchasing decision. Depending on the nature of a purchasing decision, the system assigns a conversion value.

Purchasing decision information is used to adjust the Click Value. A positive performance adds to Click Quality and a negative performance subtracts from Click Quality. These Click Quality values are then used to adjust the user's Click Value 4220, 4230.

The system described herein can also be implemented through interactive television or radio, particularly via satellite television and radio systems and cable television systems.

19. Alternative Advertising and Fulfillment System

When signing up and/or enrolling for the disclosed system as seen in FIG. 41, a customizable profile is securely stored for use by the system's engine. In one embodiment, the end user downloads a profile generator to the hard drive.

A key to this profile is that it is completely up to the individual user how much information to provide. There are NO required fields except for the most standard information to set up a deposit/credit account through the system.

Beyond this, any information provided by the end user performs two main functions:
1. Enhances the user's Click Value to the advertiser, thus increasing the amount of money the user will make off of each click.
2. Increases the relevance of the advertisements shown in response to each keyword, potentially saving the user the time and energy of browsing by pointing him more directly towards what he wants.

Once created, the user profile is uploaded to the system's user profile database. This profile database is dynamic, so any alterations the user wishes to make to the desktop profile will automatically upload to the online user profile database, ensuring that the user's Click Value stays up to date.

In one embodiment, the system is constructed as a cooperative, so users own their own data and the system's members own the system. Thus, any profit generated that is not fed back into the growth of the company is distributed among its members, the end users.

In other embodiments, the system is constructed as a standard corporation, owned in a greater or lesser degree by its users and investors. Thus, in these embodiments, some portion of profit generated that is not fed back into the growth of the company is distributed among its members, the end users. In yet another embodiment, the system is a hybrid between a cooperative and a standard corporation. For example, stock can be owned by investors, but as the value of the company increases and reaches a threshold, any additional value goes back to the cooperative, or can be bought by the cooperative.

The system's search engine page has a standard, simple search engine interface for use as a standard search engine. It also has a user login option on the side. A user can only make money when he is logged into the system.

The system's search bar resembles any other search engine. Beneath the search bar, however, is a list of possible intentions that the user can click to tailor the advertisements, and in some embodiments the search results, to his needs for that keyword search. In one embodiment, these intentions comprise: Definite Buyer, Brick and Mortar buyer (increases Click Value to local advertisers, decreases to others), Potential Buyer/Price Comparison (user discloses a time frame to estimate when an item will be bought), Research to Buy (increases Click Value to informational sites), Just Browsing, Rather Not Say. For a 'Rather Not Say buyer, advertisers may determine their own Max CPC (cost per click) for unspecified users just like standard search engines.

After prompting the user to specify an intention and receiving the user's keyword search, the results are organized according to, in some embodiments, a user-specified ranking of factors. The advertisement results may be dynamic columns that can be reorganized and reranked by factors including: Click Value (amount that advertisers are willing to pay a user for their click, determined by the advertiser and based on specificity and details of a user's profile), relevancy (as determined by normal search engine relevancy), product price (if the user is searching for a specific product), Intention (serious buyer, research, etc.), Rating (site and/or advertiser rating by other end users) and Focus Spectrum (popularity among group of similar users as specified by end user according to, for example: interests, income, and/or demographic.)

In some embodiments, the first factor in matching the user with relevant and interested advertisers is relevancy, which may be based on: the user-specified interests (advertisers create a similar interest page when creating an advertisement to select which users they would like to see their advertisements), the keyword itself (the system functions like a normal search engine, but combined with the other unique relevancy factors in determining the overall relevancy of advertisements) income level (for example, a high-end user would more likely buy camping supplies from REI than Target, and REI may pay more for the advertisement), demographic (for example, certain companies sell the same products but target different age groups), geographic location (local businesses that do not sell online or ship products are only concerned with local customers; location may be based on IP address or the user's profile)

This provides a more robust targeting mechanism for the end user, not the advertiser. Furthermore, it makes transparent the behind-the-scenes workings of Google and other search engines. The user-specified advertisement ranking feature allows an end user to view statistics for other buyers without revealing the identity of those other buyers.

Privacy

The system will only list advertisements for pages within the cooperative advertising group, creating a completely sheltered cooperative bubble. Advertisers must mirror their sites into the system for approval and advertisement listing, to ensure the end user's privacy protection.

All of the advertisements displayed in response to search queries are preapproved and hosted within the network to ensure end user privacy in all click-throughs from a search through the system's search engine. The software/transfer page interface may check for cookies on landing sites to stop other advertisers from placing cookies unknowingly on users, preventing pages within the advertisement network from tracking end users.

Once logged in, the user can manage an online banking account. This account works as a completely self-sufficient online banking system to add another level of security to online transactions by filtering each transaction through the system. The online retailer no longer obtains any information from the end user during the transaction because the end user completes purchases through the system using the end user's credits, and the retailer is paid through the system. The filtering of each transaction by routing it through the system further protects the end user from unsuspectingly giving out personal information and compels retailers/advertisers to join the system, because otherwise they cannot gather information about the types of users buying their products.

In some preferred embodiments, user profile numbers can be, for example, 100 digits long or more, where only specific digits apply to each advertiser. For example, there may be a number for camping specifically, which is embedded within the long profile number.

In a preferred embodiment, the online banking system automatically grants each user a credit account upon signup with the disclosed system, which may be linked to the user profile number. This credit account allows users to track the money they have earned through browsing as well as other conversions. Users may purchase additional account credit to be used on any online transaction. The use of credit for purchases protects the privacy of end user information from the retailer (by only identifying, for example, a portion of a user's profile number), verifies follow-through conversion on keyword search intentions, and boosts Click Quality. In some embodiments, a credit card can be ordered to use the account's credit in physical transactions. The credit card can be used to verify purchases from brick & mortar retailers, boosting Click Quality.

To ensure anonymity, advertisers may see only delivery numbers for delivery services including UPS, not personal buyer info. In some embodiments, retailers ship packages to UPS, and UPS fulfills a purchase by shipping the package to an end user's local address based on a unique scan code. In some embodiments, this code changes with every transaction.

The advertisements displayed in response to a search query contain more information relevant to the end user's search needs compared to other search engine advertisements. Underneath the standard advertisement display, advertisements within the system display values including the Click Value, as well as Focus Spectrum statistics.

Click Value

A user's Click Value directly affects the amount that an end user is offered by advertisers for clicking on an advertisement. In some embodiments, the Click Value is the monetary value an end user is paid for clicking on an advertisement. Each advertiser can specify what aspects of a user's profile most enhance the Click Value to that advertiser. Thus, advertisers can target users within demographics, income levels, interests, geographic locations, and search intentions to fit their specific product or goal, but only target each individual end user insofar as that user supplies the information. Still, the advertiser cannot obtain the identity of any specific end user. This is a part of the security promise of the disclosed system.

The Click Value is based on, for example: Click Quality (which in some embodiments, may be determined by: (# of conversions)/(# of clicks)×100%), user demographic, income level, interests, geographic location, search intentions, and/or any other profile information that the end user may provide which matches the advertiser's preferences.

Purchasing decision information is then used to adjust the Click Value. A positive performance adds to Click Quality and a negative performance subtracts from Click Quality. These Click Quality values are then used to adjust the user's Click Value.

The Click Quality formula shows that the more a user browses without making any purchases or other types of advertiser-defined conversions (leads, signups, page views, etc.), the lower the user's quality score drops. In a preferred embodiment, clicks always have an integer value (1 click=1 advertisement). In some embodiments, conversions have variable values, not necessarily integers. In one embodiment, the weight of various conversions may be: Sale=1, Newsletter/Subscription=0.5, Lead (request for follow-up call)=0.75, Page View (length of visit)=0.05×(# of pages viewed after landing page), No Action=0.

Search Intention

The Search Intention is used to tailor the advertisements, and in some embodiments the search results, to a user's purchase plans for a keyword search.

In one embodiment, a list of possible Search Intentions comprises one or more of: Definite Buyer, Potential Buyer/Price Comparison, Brick & Mortar Buyer, Research to Buy, Just Browsing, Rather Not Say.

In a preferred embodiment, the Click Value is time dependent. This provides a model for checking the veracity of an end user's Search Intention. For example, if a user claims "Definite Buyer" as a search intention, the user may be paid the full amount promised by the advertiser only if they follow through with a conversion within a given time frame. If the user does not follow through, the initial $X paid for the amount may be cut to a fraction determined by the advertiser. In some embodiments, the retailer can also choose not to cut payout no matter what to enhance their advertisement's appeal to the end user.

In one preferred embodiment, if a user claims "Brick and Mortar Buyer" as a Search Intention, the user's Click Value is increased for local advertisers and decreased for other advertisers.

In another preferred embodiment, if a user claims "Potential Buyer"/"Price Comparison" as a Search Intention, the user is prompted to disclose a time frame to estimate when an item will be bought.

In another preferred embodiment, if a user claims "Research to Buy" as a Search Intention, the user's Click Value is increased to informational sites.

In another preferred embodiment, if a user claims "Rather Not Say" buyer, advertisers may determine their own Max CPC (cost per click) for unspecified users just like standard search engines.

Focus Spectrum

The Focus Spectrum is one of the most dynamic and uniquely appealing aspects of the system's search engine. In their profile, users specify not only their personal information, but the range of demographic variables to which they would like their advertisements tailored. For example, a high-income user might want to only view advertisements for high-end consumer products. Rather than allow the advertiser to determine what the user wants to see, the engine uses a statistical grouping formula to determine other users with similar profiles in the specified area, quantifying the similarity of a plurality of users. The end user specifies what similarities are most important to him or her, and each keyword search groups results based on other user data accordingly. The Focus Spectrum can be shifted based on factors including: income, demographic, interests/hobbies, geographic location (IP address), conversion rate (in some embodiments, users may be denoted as, for example, Frequent Buyer, Occasional Buyer, Brick and Mortar Buyer, Rare Buyer) The statistics show the percentage of similar users who decided to click on the product and the smaller percentage that followed through with a conversion. For example, a high-income user who selects income as a key Focus Spectrum factor sees the click and purchase choices of other high-income users displayed beneath the advertisements.

The user also specifies the range of the Focus Spectrum to narrow or broaden the focus group. In a preferred embodiment, a simple focus statistics toolbar above the listing of advertisements has a customizable percentage that jumps between discrete amounts to change the range of the focus group. In one embodiment, a user may specify that profile variables relevant to the Focus Spectrum must match within 5%, 10%, etc. As the user expands or restricts the focus group size, the engine may recalculate the relevancy of advertisements and adjust their rankings accordingly.

One or more factors can be modified to filter the advertisements through the controls offered by the Focus Spectrum. For example, let's say an 18 year old female is searching for digital cameras online. The Focus Spectrum uses the groupings according to her demographic (16-20, for example) and expressed interest in professional photography to quantify the relevancy of the advertisements based on other similar users. The resulting advertisement rankings display the advertisements for higher-end cameras that garnered the most click-throughs and conversions among the 16-20 year old demographic. If she wanted to expand the search to high-end digital cameras among all ages, she can deselect the demographic factor and focus solely on the most popular and successful advertisements among those with an interest in professional photography.

In some embodiments, certain factors come into play more often than others. For example, geographic location may be a much less significant factor than income, especially when searching for computer hardware, for example. The geographic location may come into play much more when searching for sleeping bags. In such embodiments, the combination and weight of the different qualifiers in creating a Focus Spectrum for each individual search are dynamic and largely dependent on the keyword itself.

In yet another embodiment, the number derived from the Focus Spectrum is the Relevancy Factor of the advertisement for those within the spectrum. This percentage is displayed underneath each advertisement to show how relevant other users thought that advertisement to be. The percentage is based not solely on click-throughs, but also on conversions. A conversion is worth significantly more than a click-through. Accordingly, the number generated, although a percentage, is not solely (clicks)/(impressions) for the focus group. It may look something more like [(clicks)+100*(conversions)]/(impressions) For a definite buyer, (conversions)/(clicks) for the Focus Spectrum may be more useful information.

In some embodiments, the system described herein can also be implemented through interactive television or radio, particularly via satellite television and radio systems and cable television systems.

20. Providing Customized Entertainment Content

FIG. 43A is an overview flow chart that illustrates a sports game being recorded via various feeds showing different perspectives of the game. The feeds correspond to video feeds received from a variety of sources that may include one or more of each of Fixed Camera 43-210, Player Mounted Camera 43-220, Flying Drone Camera 43-230, and announcers Commentary Camera 43-240. Each camera provides a video feed to Video Mixer 43-300 that outputs a Broadcast Feed 43-400 into which conventional commercial messages may be inserted such as at the national or affiliate level. Video Mixer 43-300 also provides secondary video feeds (43-410, 43-420, 43-430, 43-440, 43-450, etc.) to the servers (e.g. Arkiïs™ servers) along with their associated metadata. These secondary feeds act as alternatives to the traditional Broadcast Feed 43-400 and may include subcomponents (e.g. various video, sound, and special effects sources) out of which Broadcast Feed 43-400 is composed. The conventional Broadcast Feed 43-400 may be created by a variety of conventional techniques in Mixer 43-300, including manual and/or automated techniques, (e.g. through the use of a Video Mixer (also called vision mixer, video switcher, or production switcher) that works with a plurality of Serial Digital Interfaces (SDI) or through the use of a Non-Linear Video Editing System (NLVE)). Examples of video editing and mixing techniques may be found in the 2010 work entitled "Mastering MultiCamera Techniques: From Preproduction to Editing and Deliverables" by Mitch Jacobson or the 2014 book "Broadcast Engineer's Reference Book" edited by Edwin Paul J. Tozer. The secondary feeds may themselves also be the output of Mixer 43-300 and may take the form of raw pass-through feeds of individual Cameras and/or more refined or polished feeds that combine different camera angles, commentary, special effects overlays, etc. into a single composition analogous to Broadcast Feed 43-400 but reflect a different style or intent (e.g. a greater focus an a particular player, position, or team). Such feeds are transmitted to the Arkiïs™ servers for storage and concurrent and/or subsequent retrieval and/or broadcast to interested Users. Transmission of such feeds may be coupled with metadata from additional Alternate Feeds 43-460 that may include data that describe scoring data/activity, player statistical information, referee information, clock data, team information, and venue data. Additional Feeds may originate local to the vicinity of the Sports field and/or from outside/non-vicinity sources such as by integration with Elias Sports Bureau database, by reading a customized feed from STATS LLC, or by reading a JSON (JavaScript Object Notation) feed such as the one that powers NFL.com's live GameCenter and that updates in realtime while a game is being played and is finalized upon game completion or subsequent correction. Additional alternate feeds 43-460 may include video feed metadata to annotate subject matter being shown, source or perspective of video feed, camera operator, clock activity event points (e.g. clock start/stop or reaching halfway point), scoring activity event begin and end points (e.g. turnovers, field goals, first downs, or ball snap), etc.

FIG. 43A shows an array of feeds 43-400 through 43-460 in a single game. The actual cardinality of said feeds 43-400 through 43-460 may vary during a game as the number of cameras or other sources may change over time. At any give time, the Arkiïs™ servers may be receiving array of feeds 43-400 through 43-460 from multiple games transpiring simultaneously. Additionally there may be multiple interactive video streams 43-740 (to be described further in connection with FIG. 43B) for a User 43-600, due to, for example, a User having more than one Fantasy Sports Team (e.g. two Fantasy Football Teams and one Fantasy Baseball Team).

Figure 43F:
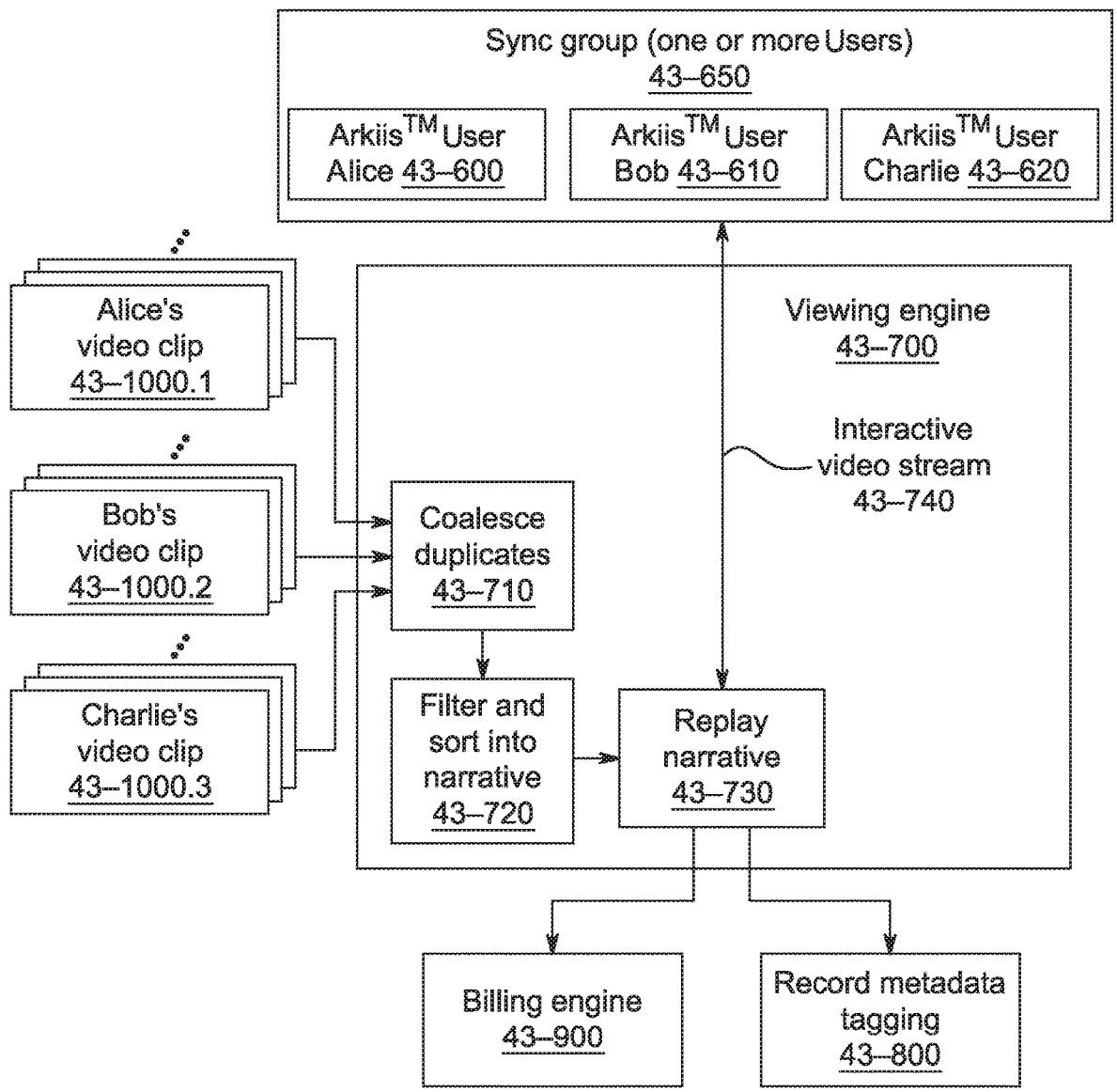
FIG. 43F illustrates operation of an exemplary viewing engine.
Figure 43G:
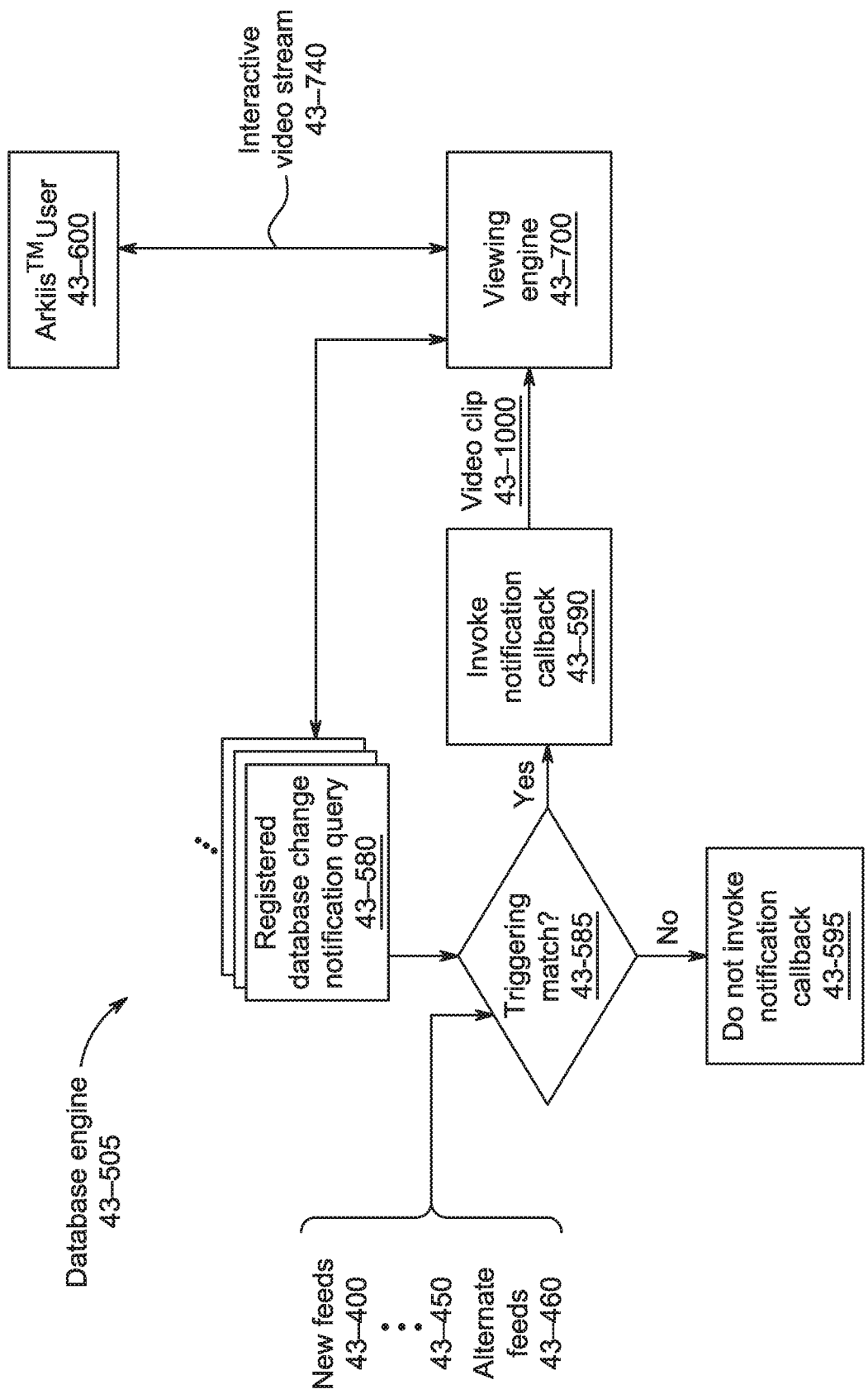
FIG. 43G illustrates further details of an exemplary database engine with respect to registering database change notifications.
Figure 43H:
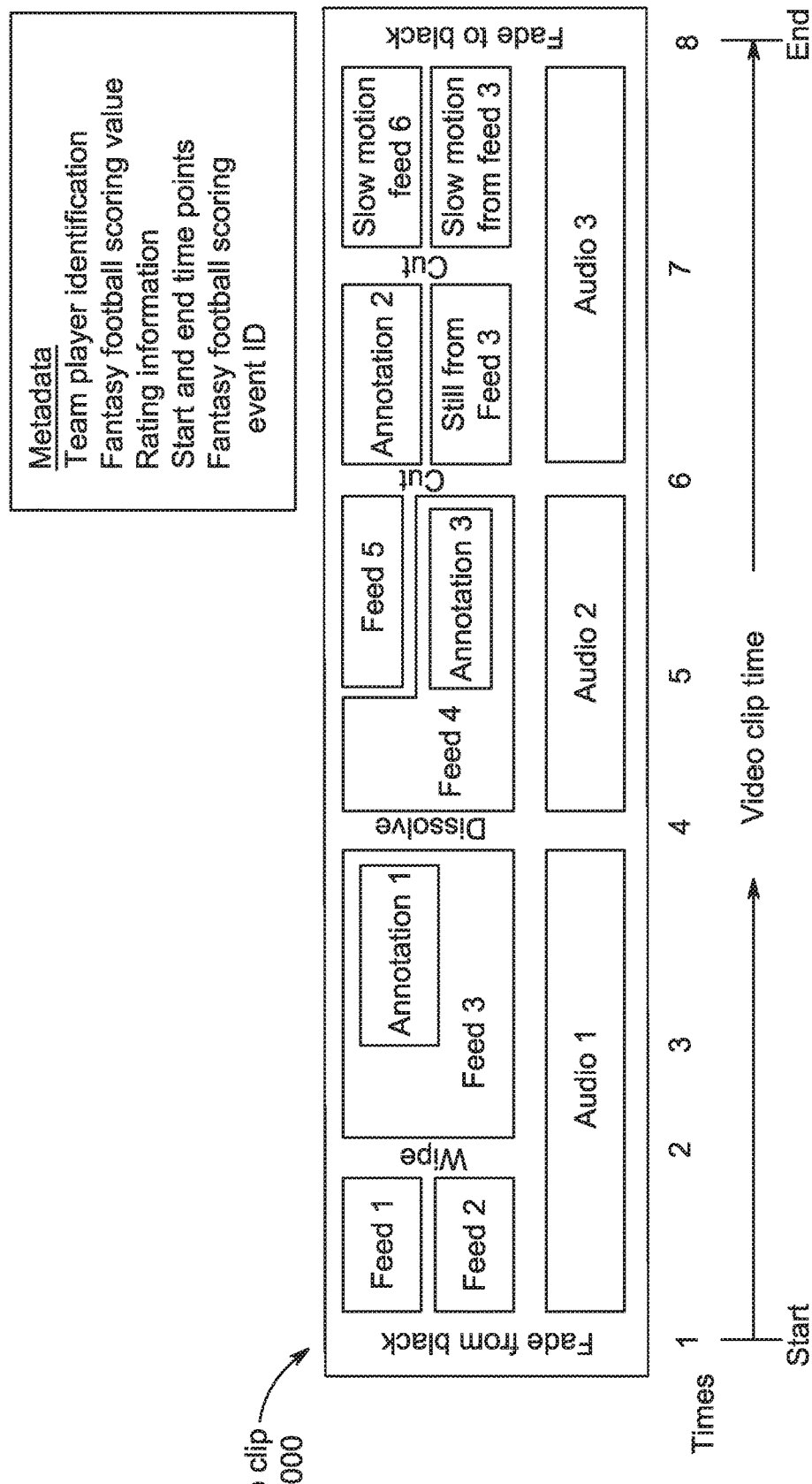
FIG. 43H illustrates further details of the composition of an exemplary video feed.
Figure 43I:
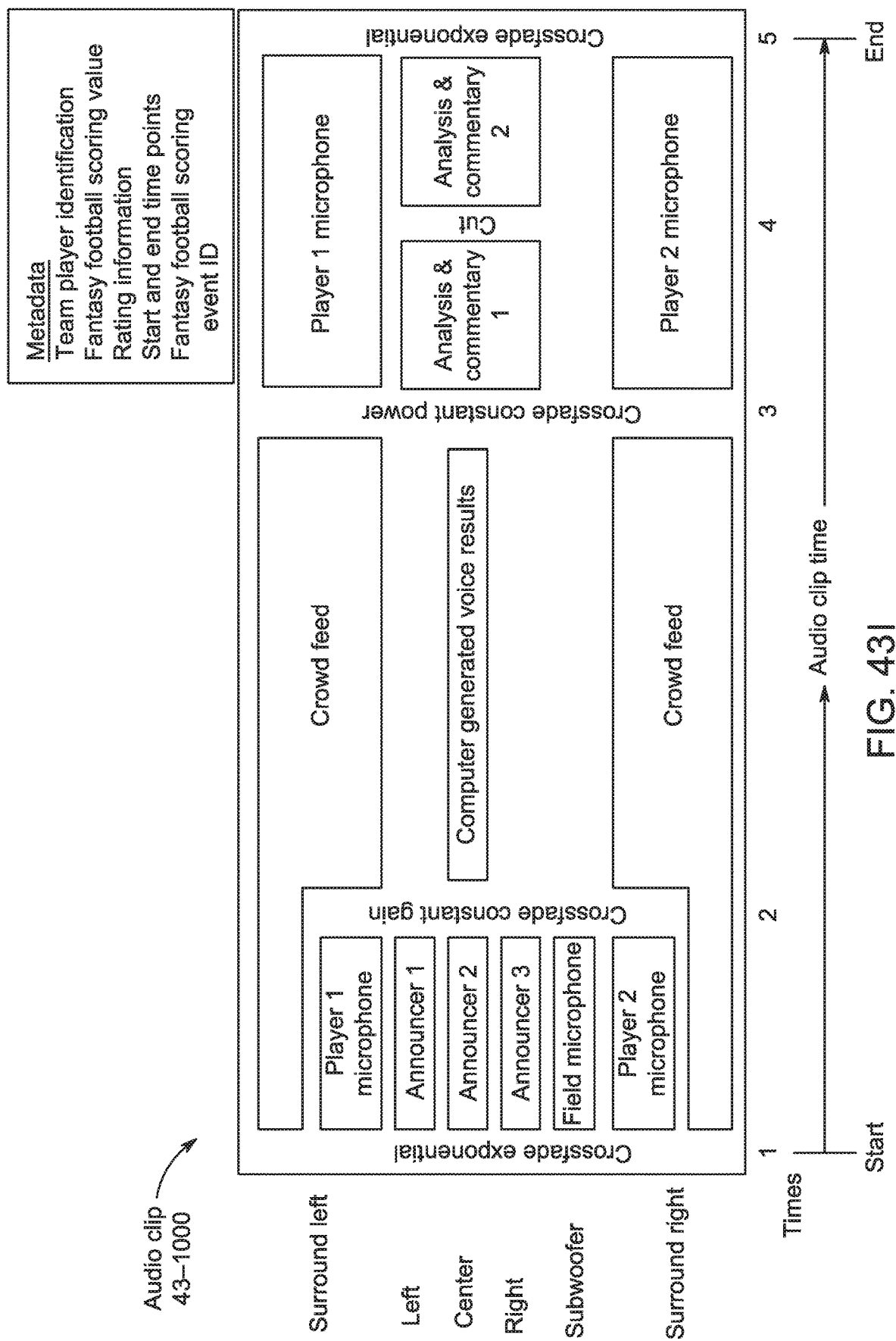
FIG. 43I illustrates further details of the composition of an exemplary audio feed.
Figure 43J:
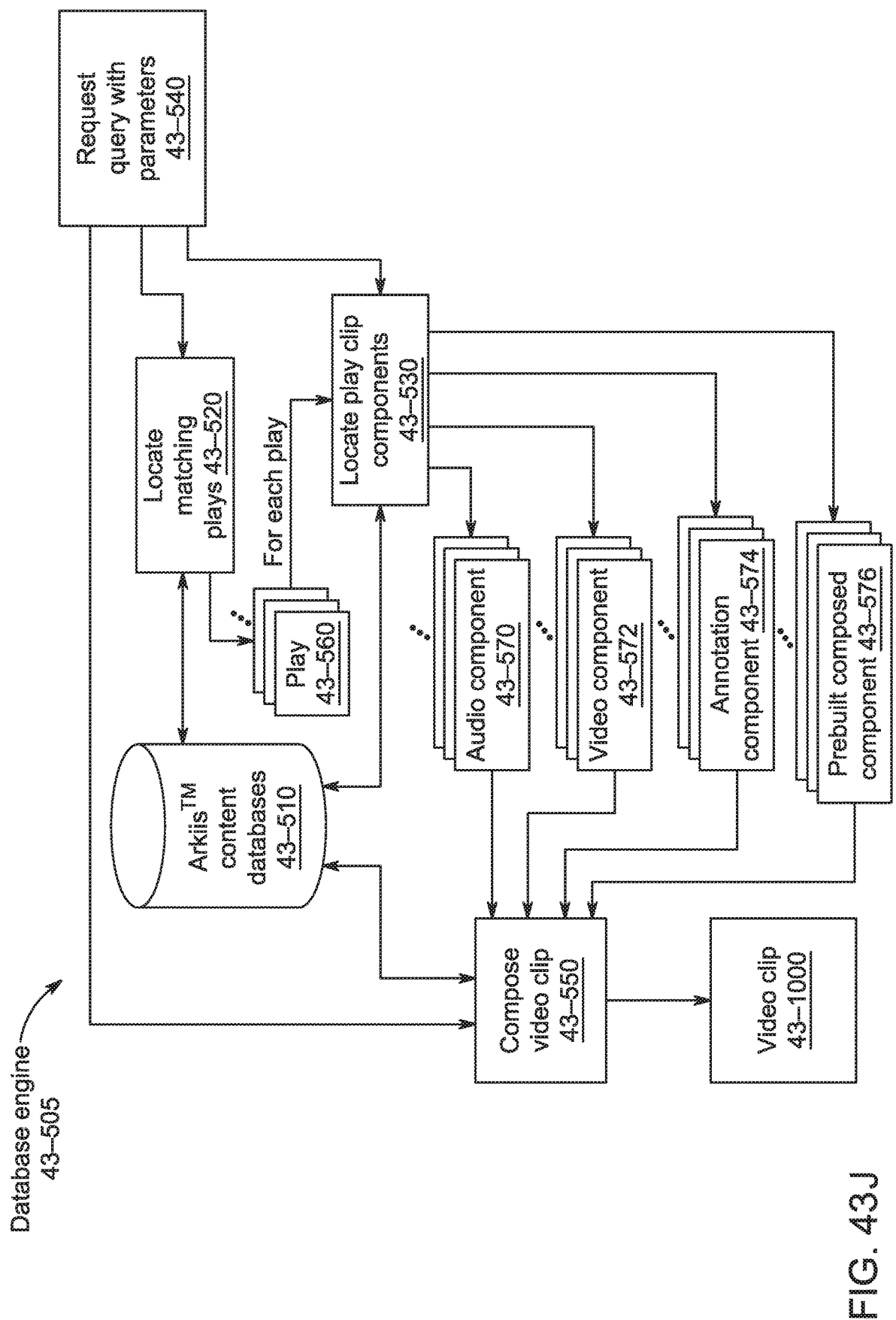
FIG. 43J illustrates further details of an exemplary database engine.

FIG. 43B is a flow diagram that illustrates reception of the various video and data feeds depicted in FIG. 43A and stored in the Arkiïs™ Content Databases 43-510 within database engine 43-505 for which additional detail is provided in FIG. 43J. (The use of multimedia in databases can be found in the literature, such as the 2014 book "Multimedia Database Retrieval—Technology and Applications" by Paisarn Muneesawang et al.) The functions shown in FIG. 43B may be implemented as part of the Arkiïs™ system that operates in conjunction with existing video delivery systems or integrated as noted previously within and among the devices and systems that provide Content to First Devices. An Arkiïs™ User 43-600 creates a request for a custom feed that is provided as a query to database engine 43-505 that includes their Profile Identifier (e.g. a unique identifier used to specify the identify of their Profile in the Arkiïs™ system and allow their specific Profile to be queried for details), Preferences and/or additional information such as their Fantasy Football Team player identifiers. Such query results in a set of Ranked Query Results of Video Clips 43-1000 that represent those video clips and associated metadata for portion(s) of plays 43-560 from recent football games that correspond to the Arkiïs™ User's Fantasy Football Team members, their current opponent's and/or other Sync Group members' team members. The query results are selected to conform to the Profile preferences of the User, for example, whether they prefer wide-angle shots of passing plays or close-ups of the pass and reception, whether they prefer a focus on defensive players over offensive ones, whether they wish to view snippets containing just their player's actions, or the whole play context around their player's actions, and/or whether they wish to only review plays not previously consumed and thus not yet billed via Billing Engine 43-900 as registered in Arkiïs™ Content Databases 43-510, etc. The Ranked Query Results are provided to the Viewing Engine 43-700 (for which additional detail is provided in FIG. 43F) for coalescing 43-710, composition and ordering 43-720 into a pleasing narrative 43-730 to create interactive video stream 43-740 that adheres to the Profile preferences of the Arkiïs™ User. Such narrative may be automatically composed by the application of Arkiïs™ User Profile rules in the Viewing Engine 43-700. The resultant customized interactive video stream 43-740 may include (such as by a custom Annotation Component 43-574) the running Fantasy Football score that results as each replay unfolds to create excitement as analogously found in the narrative of a real football game. The interactive video stream 43-740 may also include injury reports for players that are benched, possibly together with a play (or portion thereof) in which the player was injured. The stream may be optimized for delivery to a mobile device. The Arkiïs™ User may provide additional metadata tagging 43-800 upon such replay clips within interactive video stream 43-740 to add, refine and/or correct tagging information for which the Billing Engine 43-900 may credit their account for providing tagging and/or debit their account for replays consumed (viewed) and deposit such tagging into Arkiïs™ Content Databases 43-510. Play tagging may be partially or completely automated in 43-850 by the application of computer recognition, search, and other algorithms (such as described in the 2013 IEEE Transactions on Pattern Analysis and Machine Intelligence paper "Learning to Track and Identify Players from Broadcast Sports Videos" by Wei-Lwun Lu et al., the 2015 book "Computer Vision in Sports" edited by Thomas B. Moeslund et al., the 2010 book "Advances in Speech Recognition: Mobile Environments, Call Centers and Clinics" edited by Amy Neustein, the 2011 book "Recent Advances in Robust Speech Recognition Technology" by Javier Ramirez et al. or the 2011 book "Robust Speech Recognition of Uncertain or Missing Data: Theory and Applications" edited by Dorothea Kolossa et al.) to add, refine, and/or correct player identifications, play activity, and other tagging information for storage addition to Arkiïs™ Content Databases 43-510 and Billing Engine 43-900 credit. Such automated recognition systems may be aided and made more accurate by equipping players with individually identifiable and remotely trackable devices such as RFID chips/tags or remote miniature GPS tracking devices. By adding a tracking device to the ball under play in a sports game, the computer can automatically recognize who has possession or is passing and/or receiving the ball. A tracking device identifier may be associated with either the player wearing it or the ball itself according to where the device associated with the identifier is affixed. In such fashion the tracking of the device may be assigned to the player or ball to whom it is associated. Such tracking may be time coded and transmitted with a tracked player's identifier as part of Alternate feeds 43-460 for storage in Arkiïs™ Content Databases for subsequent use, such as for tagging players in feeds, detecting who has possession of the ball, and collecting statistics such as yards run. Such collected ball tracking data can provide guidance to automate video camera tracking of a sports game such that a camera automatically follows the action of play by automatic aiming based upon the tracked location it is assigned to follow. In addition to trackable devices, players and/or the ball, can be painted with special paints to create computer recognizable markings that radiate in non-visible regions of infra-red or ultra-violet such that video cameras that detect these non-visible markings can more readily identify players and/or the ball. Existing visible light cameras may be equipped with parallel cameras to record in these non-visible frequencies, or alternatively, sensor data for the additional frequencies may be embedded within the digital sensors of cameras and provide additional data beyond RGB channels for the non-visible light data collected. Additional video feeds may be created for the infrared and/or ultra-violet camera output for post-processing. Additional Fantasy Football statistics may be gathered about a player by their wearing such a trackable device that may be used to measure activity computed from their position over time including, distance traversed on the field, maximum velocity, average velocity, acceleration, time on and off the field of play, etc.

FIGS. 43C, 43D, and 43E provide an example of the contents that may be contained in interactive video stream 43-740. FIGS. 43C, 43D and 43E each illustrate a play of a football game that contains at least one player selected by a User 43-600 as part of a Fantasy Football Team. In Fantasy Football, Contestants, such as User 43-600, group together to form a league and compete throughout the NFL season. Being ardent fans, these Contestants are regular viewers of NFL games and in particular of the games involving their selected players. At times their players may be simultaneously playing in a plurality of games and User 43-600 may desire to consume (e.g. view) all of the plays (or portion(s) thereof) involving their selected players, wherein their players are attributed Fantasy Football scoring events, in as close to realtime as possible, automatically switching between a plurality of games, possibly treating one game as preferred when none of their players are currently involved in a play, and thus that game's content being provided (selected) by default. For example, stream selector 3000 may receive multiple interactive video streams 43-740 from viewing engine 43-700, such streams corresponding to either live broadcast stream 3070 or static stored stream 3071, resulting from multiple invoke notification callback 43-950. Stream selector 3000 may thus automatically switch between a plurality of games/feeds/streams, switching from the preferred game/feed/stream that may be a live broadcast stream 3070 that may be buffered, paused, and/or converted to a static stored stream 3071, whenever interactive video streams 43-740 are non-quiescent and switching back by reselecting and unpausing the preferred game/feed/stream when interactive video streams 43-740 are quiescent again. Additionally, a User 43-600 may participate in a plurality of leagues and thus have a plurality of teams for which they desire to consume all of the plays (or portion(s) thereof) involving the players of their various teams in as close to realtime as possible, and may therefore switch between such plays in a similar manner as to when the plays (or portion(s) thereof) of their players of a single league team transpire contemporaneously. Such switching may entail buffering or delaying (such as is done in a DVR when pausing a TV feed) of one or more temporally overlapping plays (or portion(s) thereof) to allow each play (or portion thereof) to be viewed in its entirety. Such temporally overlapping plays (or portion (s) thereof) may also be presented simultaneously using picture-in-picture, split screen, or other multi-view technologies.

FIGS. 43C, 43D and 43E illustrate a video anthology of plays featuring players in a User's Fantasy Football Team. For example, such an anthology can include key portions of plays by players in the User's Fantasy Football Team in games over the prior week. For example, as shown in FIG. 43C, the quarterback (QB) may be a player in a User's Fantasy Football Team. In FIG. 43C, QB completes a pass to a wide receiver (WR1) who catches the pass at approximately the 35-yard line. Because QB is a player in a User's Fantasy Football Team, the portion of the play that includes the pass from QB to WR1 will be included, subject to their preferences, in the anthology of plays (or portion(s) thereof) provided to the User. The portion of the play showing the completion by QB will affect the QB's scoring in the User's Fantasy Football Team and is of interest to the User and can therefore be included as part of interactive video stream 43-740 that is provided to the User. The User has also selected strong safety (SS) as part of their defensive team and in the play shown in FIG. 43C, SS tackles WR1. In this example, a single play shows to the User two distinct portions that each apply to a different one of the User's selected team players.

The play (or portion thereof) shown in FIG. 43D may be shown to the User immediately after the play (or portion thereof) shown in FIG. 43E as part of the anthology of plays (or portion(s) thereof) shown to the User. In FIG. 43D, an offensive team different from the team shown in FIG. 43C is shown. In the team shown in FIG. 43D, the User has previously selected wide receiver 3 (WR3) as a player on the User's Fantasy Football Team. As seen in FIG. 43D, WR3 catches a pass at approximately the 38-yard line. This play (or portion thereof) showing the quarterback (QB) passing the ball to WR3 can follow the play (or portion thereof) shown in FIG. 43C. The User can thereby view plays (or portion(s) thereof) by three players that are part of their team in two plays. The manner or sequence in which the plays (or portion(s) thereof) are displayed can be varied. For example the plays (or portion(s) thereof) can be sequentially shown or can be concurrently shown in different parts of the User's viewing area (e.g. one or more screens or sharing a single screen) or can be offered as still images (thumbnails) for interactive selection by the User to control viewing of corresponding video.

FIG. 43E illustrates a third play featuring a player selected by the User to be part of the User's Fantasy Football Team. The real life offensive team in FIG. 43E may be the same as or entirely separate from the offensive teams shown in FIG. 43C and/or FIG. 43D. In FIG. 43E, the running back (RB) is the player previously selected by the User to be part of the User's Fantasy Football Team. The play (or portion thereof) shown in FIG. 43E, is provided to the User because RB, who has been selected by User to be part of their team, receives a hand-off from the quarter back (QB) and runs to the right for a net yardage gain. RB therefor according to Fantasy Football rules, affects the scoring for the User who is able to view as part of an anthology of plays (or portion(s) thereof), the manner in which the User's score was affected by the play of the User's selected team players in the Fantasy Football league.

The three plays shown in FIGS. 43C, 43D and 43E (or portion(s) thereof) are not necessarily contiguous in the customized video stream 43-740 (though they may be contiguous) but nevertheless can provide the User with an anthology of plays (or portion(s) thereof) of interest to the User from, for example, the play of players selected by the User over a particular time period such as a single week of play or in realtime as the plays transpire. The anthology created from the three plays shown in FIGS. 43C, 43D and 43E (or portion(s) thereof) can form part of the interactive video stream 43-740 provided to the User.

FIG. 43F is a flow chart that illustrates the detailed workings of Viewing Engine 43-700 shown in FIG. 43B. As seen in FIG. 43F, Viewing Engine 43-700 generates interactive video stream 43-740 from a plurality of video clips 43-1000.1, 43-1000.2, 43-1000.3 (referred to generically as 43-1000) that have been selected for a plurality of Arkiïs™ Users 43-600. The video clips 43-1000 may correspond to portions of the video streams generated by the plurality of cameras shown in FIG. 43A such as Broadcast feed 43-400, the secondary video feeds (43-410, 43-420, 43-430, 43-440, 43-450, etcetera) or an alternate feed 43-460. A plurality of Arkiïs™ Users 43-600 may join together into an Arkiïs™ SyncGroup 43-650. FIG. 43F depicts one such SyncGroup 43-650 that corresponds to the Arkiïs™ User 43-600 in FIG. 43B but with SyncGroup 43-650 composed of Alice, Bob, and Charlie, Arkiïs™ Users 43-600, 43-610, and 43-620 respectively, wherein Charlie 43-620 may be the group leader. The Profiles of each member of the SyncGroup 43-650 are each utilized individually to query, via database engine 43-505, a set of ranked video clips 43-1000.1, 43-1000.2, and 43-1000.3 from Arkiïs™ Content Database 43-510. For example, the query for User 43-600 may request, according to their Profile preferences, plays for their team members (also denoted in their Profile) with a scoring value of at least 5 points, except for the quarterback, for which only a scoring value of at least 3 points is required that have transpired in the last 24 hours and have not been previously viewed by User 43-600 in order to receive ranked video clips 43-1000.

FIG. 43G is a flow chart that illustrates another example of using User 43-600 Profile to query via database engine 43-505 a set of ranked video clips 43-1000 via a notification 43-590 as they transpire. A database change notification query 43-580 may be registered with database engine 43-505 on behalf of User 43-600 in order to receive callback notifications 43-590 upon a triggering match 43-585 being positively detected and no invocation of callback 43-595 when not detected. Each of the callback notifications 43-590 includes a composed Video Clip 43-1000 in response to a new live play, that transpires with a matching criteria such as a matching metadata tagging assigned scoring value, for one of their team players being added to database 43-510. (An alternative matching criteria may be a play that is rated exceptionally highly by other Users.) The video clip 43-1000 may correspond to portions of the video feeds generated by the plurality of cameras shown in FIG. 43A such as Broadcast feed 43-400, the secondary video feeds (43-410, 43-420, 43-430, 43-440, 43-450, etcetera) or an alternate feed 43-460. In such fashion, an intermittent semi-live stream of plays may be provided to User via interactive video stream 43-740 where the stream goes quiescent whenever all presently triggered matching plays have been completely delivered to User in the stream 43-740. This feed corresponds to one of the live broadcast streams 3070 and is selected by stream selector 3000 according to its Profile assigned precedence and other preferences when not quiescent to be delivered at 3010 such as by picture-in-picture or by taking over the whole display and temporarily pausing the feed it is interrupting such that the interrupted feed may be resumed upon stream 43-740 going quiescent again.

The video clips 43-1000.1, 43-1000.2, and 43-1000.3, for each of the SyncGroup 43-650 Users are selected, composed, and ranked such that their corresponding metadata match and order according to the corresponding User's Profile preferences, e.g. Arkiïs™ User 43-600, 43-610, and 43-620. In such a fashion, video clips are chosen that feature the Fantasy Football Team members of the Arkiïs™ User 43-600, 43-610, and 43-620 subject to their Profile preferences. Each such selected video clip 43-1000.1, 43-1000.2, and 43-1000.3 (see more details in FIG. 43H) corresponds to at least one Fantasy Football scoring event (e.g. a scoring kick, an unassisted tackle, a pass completion, a first-down run, a goal, etc.) from the beginning to end of such scoring event and that is tied to at least one team player and assigned at least one scoring value according to User's Profile preferences designating their league's rules. Said selected video clips may themselves be composed of one or more camera angles, perspectives, video overlays, and/or audio commentary of the scoring event(s) such that the angles and perspectives chosen reflect the preferences of each Arkiïs™ User 43-600, 43-610, and 43-620. Such combined video feeds may be composed together in a single frame, such as by picture-in-picture or side-by-side, or edited together via effects such as a video dissolve or wipe. Annotations may appear overlaid on top of the original video feed, such as by a virtual marker drawing a future path or highlighting locations for viewer special attention, graphics depicting the assigned scoring value and/or their updated relative ranking within their league. Such video feeds may be stopped as still frames to allow commentary and annotations or be played back at slow motion or even fast motion instead of the normal rate of play.

Selected Video Clips 43-1000.1, 43-1000.2, and 43-1000.3 are searched for duplications, by for example, examining the associated metadata (such as a game identifier, play identifier, and/or game time encoding), for adjacencies, and/or overlaps by processing in Coalesce Duplicates Engine 43-710. Such duplications may arise due to, for example, multiple players (possibly coming from both the offensive and defensive teams) being involved in a single play, each being attributed a Fantasy Football scoring event for one or more portions of the play, such players possibly being on the same Arkiïs™ User 43-600 Fantasy Football Team or being on a plurality of Arkiïs™ User 43-600, 43-610, 43-620 Fantasy Football Teams. For example, a first such player may be the quarterback in a play (e.g. the QB in the play depicted in FIG. 43C), that completes a reception to a wide receiver (e.g. the WR1 in FIG. 43C), being a second such player, who runs and is tackled by a defensive strong safety (e.g. the SS in FIG. 43C), being a third such player. Identified duplicated Video Clips 43-1000 are merged together, combining their metadata into a single merged Video Clip 43-1000, such merging may be of the same time of play, overlapping times of play, or adjacent times of play, and thus merging may entail combining, interleaving and/or concatenation of Video Clips 43-1000 into a single coalesced Video Clip. Such coalescing may entail merging or replacing custom annotation such as custom Annotation 3 in FIG. 43H with a merged or recreated custom annotation that reflects a plurality of Fantasy Football team players and/or a plurality of Fantasy Football teams, such merging or recreation may derive from analysis of the associated metadata.

Coalesced Video Clips are filtered and sorted into a pleasing (e.g. cohesive) narrative according to pre-established algorithms and heuristics and/or the SyncGroup 43-650 combined preferences in Filter and Sort Narrative Engine 43-720. (Note that throughout this specification, an Arkiïs™ User such as 43-600 by themselves may be considered a degenerate kind of SyncGroup such as 43-650 and thus either one may be substituted for the other as appropriate.) Such filtering and sorting may entail a ranking and/or ordering of coalesced Video Clips 43-1000 to create a composed stream (or possibly multiple streams, customized for each of the SyncGroup 43-650 members Arkiïs™ Users 43-600, 43-610, 43-620) for viewing, the stream including appropriate break points and including a custom running tally of the relative score between the SyncGroup members for presentation to Arkiïs™ User 43-600 while consuming the stream or integrated into the stream such as by Annotation Component 43-574. The stream may include chapter points (analogous to DVD or Blu-Ray chapter points), such as between coalesced Video Clips 43-1000 and/or within each Video Clip 43-1000 between feed points. Such chapter points allow easy navigation within the stream during User consumption to move by wholesale chunk relatively from one chapter point to the next or absolutely to a named and/or numbered chapter point. Pleasing narrative may be composed according to User preferences, such as to be in absolute chronological ordering as the Video Clips 43-1000 unfolded in real time, or in relative chronological ordering as to the relative time within their containing game each Video Clip 43-1000 unfolded, such relative time being either based upon game clock time, or absolute time elapsed from the beginning of the game. Alternatively, pleasing narrative may be ordered such as to create dramatic narrative tension whereby the video stream is ordered so as to create a back and forth scoring tension as the presently winning Fantasy Football Team during stream play varies among the SyncGroup 43-650 Users in such a way as to create mystery as to who will ultimately win, possibly deferring very large scoring plays (or portion(s) thereof) to the end of narrative. The techniques employed in creating pleasing narrative may benefit from shot transition management for cohesion such as the avoidance of "jump cuts" by extrapolation of the ideas presented in papers like the 2012 IEEE International Conference on Multimedia and Expo (ICME) in "Automatic Video Editing for Video-Based Interactive Storytelling" by E. S. de Lima et al. or the 1998 IEEE Transactions on Knowledge and Data Engineering, (Volume: 10, Issue: 6) in "Automatic composition techniques for video production" by G. Ahanger et al.

Filtered and sorted Video Clips 43-1000 are made available as interactive video stream 43-740 (that may be considered to correspond to Live broadcast streams 3070 and/or Static stored streams 3071 in FIG. 30) to SyncGroup Users using Replay Narrative Engine 43-730. The replay engine allows Users to pause, rewind, fast-forward, and explore their custom narrative, track which portions they have previously viewed, as well as to see their accumulated Fantasy Football score relative to the other Users at a given point (but not necessarily the present point of viewing) in the narrative, and/or their score as it will be at the end of the narrative, at times, only a subset of the available scores may be shown. Exploring their custom narrative includes being able to provide Feedback 3020 to request expansion of Video Clip 43-1000 by for example either exploring alternative feeds or traversing beyond the beginning or end of Video Clip 43-1000 to see what transpired before or after it. Such exploration may generate a revised database engine 43-504 query through Profile information 3050 to receive an updated Video Clip 43-1000 for further exploration. Arkiïs™ User 43-600 may vote upon or judge the various Video Clips 43-1000 (included as part of interactive video stream 43-740) they view to provide an assessment/opinion of how compelling, entertaining, exciting, important, or other measurement (such as via Create feedback 3020) the Video Clips 43-1000 are, and to record such additional metadata tagging via Record Metadata Tagging 43-800 and give credit to User 43-600 for their contribution with Billing Engine 43-900. The generation of subsequent Video Clip 43-1000 query results for subsequent Users may employ the additional metadata tagging according to subsequent User's Profiles, so as to provide Video Clips 43-1000 that best match the needs and interest of subsequent Users.

FIG. 43H is a block diagram of an exemplary Video Clip 43-1000 for a portion of the exemplary play depicted in FIG. 43C. The clip begins with a fade from black at time point 1 (2 seconds after the ball snap) with Audio Commentary 1 (composed from Audio Component 43-570, originating from Alternative Feed 43-440) and a split screen showing Video Feed 1 (composed from Video Component 43-572, originating from Alternative Feed 43-420) on the left with focus on the quarterback (denoted as QB in FIG. 43C) and Video Feed 2 on the right focused on the wide receiver (denoted as WR1 in FIG. 43C) that is the Fantasy Football player for whom this Video Clip portion of the play was composed. At time point 2, Audio Commentary 1 continues, but the video wipes across to reveal Video Feed 3 showing an overview of the play in action (a wide-angle shot showing most of the field of play depicted in FIG. 43C). At time point 3, computer graphics Annotation 1 (composed from Annotation Component 43-574, originating from one or more Alternate Feeds 43-460) is superimposed on top of Video Feed 3 with a virtual marker drawing lines to indicate where a gap is forming (denoted as the shaded triangle region emanating from QB towards WR1 in FIG. 43C) that the wide receiver (WR1) is going to run through. At time point 4, the sound cross fades to Audio Commentary 2 and the video dissolves over to Video Feed 4 with a point of view shot of the wide receiver (WR1) catching the ball and running down the field. At time point 5, Video Feed 5 is added as a picture-in-picture (PIP) showing a defensive strong safety (denoted as SS in FIG. 43C) coming and tackling the wide receiver (WR1), ending the play at time point 6. Also at time point 5, custom Annotation 3 is overlaid on top of Feed 4 for User 43-600 to show the Fantasy Football scoring value earned and/or their updated league standings, etc. At time point 6, the video cuts to Prebuilt Composed Component 43-576 (originating from Broadcast Feed 43-400), which is the composition of interesting still-frame from Video Feed 3 upon which Annotation 2 is drawn, and sound cuts to Audio Commentary 3 that discusses what is being annotated. At time point 7, the Prebuilt Composed Component 43-576 cuts to a split frame showing a slow-motion of Video Feed 6 (not previously viewed) above a corresponding time-point slow-motion of Video Feed 3 in the bottom half as Audio Commentary 3 continues its discussion as part of Prebuilt Composed Component 43-576, going into the two slow-motion plays, showing interesting portions as a critical part of the play unfolds for the wide receiver (WR1). At time point 8, the clip fades to black/silence and ends at the point that Prebuilt Composed Component 43-576 comes to an end. The Video Clip 43-1000 may include metadata that describe any necessary details required to formulate the foregoing composition such as start and end time point encodings for component feeds. Metadata may also include team player identification such as for the quarterback, Fantasy Football event identifier, and/or Fantasy Football scoring value earned. Metadata may additionally include rating information on the play, particular feeds and/or sections of the play.

In the case that User 43-600 participates in multiple leagues and therefore has multiple Fantasy Football teams, the custom Annotation 3 may include designation of the one or more leagues for which the Video Clip 43-1000 applies and corresponding scoring value earned and/or updated league standings. Each league's designation may be assigned a distinctive look-and-feel, either as assigned by the User and/or defaulted by their league's SyncGroup. The distinctive look-and-feel allows the User to easily recognize which of their leagues is being presented to them at a given time. The distinctive look-and-feel may include a league name and/or logo that is shown as a digital on-screen graphic, as well as a distinctive color-scheme, font or layout for statistical and other Fantasy Football information pertaining to plays (or portion(s) thereof) being viewed. In audio content, the distinctive look-and-feel may correspond to a unique voice, accent, pace, cadence and/or tonal quality being assigned to a league.

Just as FIG. 43H represents a Video Clip 43-1000, FIG. 43I corresponds to an Audio Clip 43-1000 for use such as in a sound only medium like radio. The below functions may be employed in composing the audio portion of a Video Clip 43-1000 as shown in conjunction with FIG. 43H. FIG. 43I is a block diagram of an exemplary Audio Clip 43-1000 for a portion of the exemplary play depicted in FIG. 43C. The play depicted in FIG. 43C may have associated audio commentary that does not depend upon a video component, such as that created for a radio broadcast. There may be multiple sources of such commentary (e.g. for competing radio stations, or a provider targeting different demographics with multiple feeds, such as a feed for fans of a particular team). Such commentary may include feeds that correspond to action (e.g. Announcer 1, Announcer 2, Announcer 3) as the play transpires as well as feeds that correspond to discussion and/or analysis after the play transpires (e.g. Analysis & Commentary 1, Analysis & Commentary 2). Custom annotations may correspond to computer generated voice dictation of the resultant Fantasy Football scoring value and/or the updated league standings (e.g. Computer Generated Voice Results). There may be audio feeds that record the sounds of the crowd (e.g. Crowd Feed) and/or the sounds of the players on the field (e.g. Player 1 Microphone, Player 2 Microphone, Field Microphone), such as by one or more players wearing microphones to provide sound from their point-of-view or a microphone aimed at the line of scrimmage on the field to pick up the low-frequency sounds of player collisions. These various feeds may be composed together in database engine 43-505 such as by mixing, directing to specific audio channels (e.g. 5.1 audio channels: left, center, right, surround left, surround right, and subwoofer), cuts and/or cross fades (e.g. crossfade constant gain, crossfade constant power, and crossfade exponential). The resultant Audio Clip 43-1000 also includes metadata analogous to that associated with Video Clip 43-1000. At time point 1 a crossfade exponential brings up Announcer 1 on the left channel, Announcer 2 on the center channel, and Announcer 3 on the right channel who are describing the play in concert with each other. Additionally, the sound of the crowd feed is on the left and right surround channels, together with a player 1 microphone from the play also mixed into surround left and player 2 microphone mixed into surround right. The low-frequency sounds of players colliding with each other are sent to the subwoofer channel. At time point 2, the play completes and all channels get a crossfade constant gain transition to silence except for the crowd feed that remains unfaded in the surround channels. Also at time point 2, a computer generated voice results is brought up in the cross fade on the center channel to read a customized rendition of the Fantasy Football scoring value effected by the play for the User followed by an update of their standings in their league. At time point 3, a crossfade constant power transition is applied to bring up Analysis & Commentary 1 on channels left, center, and right with a replay of player 1 microphone on surround left and player 2 microphone on surround right. At time point 4, the left, center, and right channels cut to Analysis & Commentary 2 while the player microphones continue on the surround channels. At time point 5, the audio clip 1000 comes to an end with a crossfade exponential.

The pieces of Video Clip 43-1000 may be composed of raw feed components (such as originating from feeds 43-410, 43-420, . . . , 43-450) in order that irrelevant information may be omitted. For example, within the Fantasy Football context, the actual game score and/or stats, may be overlaid as a component of a video feed (originating from Broadcast Feed 43-400) that is composed for an audience wishing to enjoy a single traditional broadcast football game. Such overlay may be irrelevant in the context of a Fantasy Football scoring event, and thus, in Video Clip 43-1000, when it includes a feed that may be correspondingly included within a traditional game transmission 43-400, such included feed may not include overlaid information that is not relevant within a particular Fantasy Football context, such as the aforementioned game score and/or stats.

The Video Clip 43-1000 has associated metadata that describes the Video Clip 43-1000 as a whole and additional metadata that describes the individual pieces and how they are composed together to make the Video Clip 43-1000. Metadata describing the Video Clip as a whole include an identifier that designates at least one team player whose scoring event is being explored by the Video Clip 43-1000 as well as the Fantasy Football scoring value(s) assigned to the play (or portion thereof) for each of the Fantasy Football team players featured in the clip for the Arkiïs™ User 43-600 for whom the feed query was made that resulted in the formulation of the Video Clip 43-1000. Other metadata may include rating information about the significance, importance or entertainment value of the play (or portion thereof) as automatically determined by computer, as judged by other Arkiïs™ Users, or as judged by commentators. Metadata may include the start and end time points of the play in absolute time as compared to all games and/or in relative time to the start of the game in which it occurred as either wall clock time and/or game clock time. Metadata may also include a uniquely assigned Fantasy Football scoring event identifier, such identifier being assigned uniquely to a particular scoring event of a play (or portion thereof with corresponding start and end time points) within a particular set of Fantasy Football league rules. Metadata may include Video Clip 43-1000 duration, frame rate, pixel resolution, pixel aspect ratio, copyright ownership, licensing terms, credit for contributors, etc. The individual pieces that are composed together into Video Clip 43-1000 (e.g. Feeds, Annotations, Audios, Special Effects, etc.) may themselves include similar kinds metadata as that of the Video Clip 43-1000 as a whole, for example, source information (player 43-220 head mounted camera), credit (e.g. camera operator), time point begin and end (relative, absolute, etc.), identification of players being shown/heard in a piece, pixel resolution, copyright, etc.

FIG. 43J is a flow diagram illustrating generation of video clip 43-1000 by Database Engine 43-505. An Arkiïs™ User 43-600 has a Query Request 43-540 that includes parameters derived from Arkiïs™ User 43-600 and their Profile preferences. Such Query Request 43-540 is fed into the Locate Matching Plays 43-520 engine for query processing against the Arkiïs™ Content Databases 43-510 to select a set of plays 43-560 that are interesting (e.g. result in a Fantasy Football scoring event for User) to Arkiïs™ User 43-600 due to the plays 43-560 involving one or more of the User's Fantasy Football Team members and being assigned a Fantasy Football scoring event for at least a portion of the play. The plays 43-560 each include various metadata information such as, the one or more players involved, the fantasy football scoring value(s), and play portion begin and end time points. For example, in the play depicted in FIG. 43C for player SS, the play portion begin and end time points may be determined according to the preferences of requesting User 43-600, e.g. if the User prefers to see play context, then the play portion start point may be at the point of ball snap or huddle completion, even though the scoring event for SS may only arise upon SS tackling WR1, several seconds after the ball snap, alternatively, the User may prefer play portion start point to be from the later time point of ball reception by WR1, or according to grading evaluations on that play (or portion(s) thereof) by other Users that have already reviewed the play (or portion(s) thereof) and provided feedback on the most interesting portion time points.

Each such selected play 43-560 is provided to the Locate Play Clip Components 43-530 engine to query the Arkiïs™ Content Databases 43-510 for one or more of Audio Component 43-570, Video Component 43-572, Annotation Component 43-573, and/or Prebuilt Composed Component 43-576. Such selected components are chosen to match play 43-560 (e.g. one of the plays (or portion(s) thereof) depicted in FIGS. 43C, 43D, and 43E) and reflect the preferences of Arkiïs™ User 43-600 as registered in their Profile. The selected components begin and end according to the selected play's 43-560 begin and end time point portions. The selected components may be chosen according to the requesting User's preferences, such as selecting those components rated highly by other Users that have previously provided rating feedback on the most interesting components, favoring close-ups over long shots, and/or preferring one commentator over another.

The various Components are all provided to the Video Clip Composer 43-550 to create Video Clip 43-1000 according to Arkiïs™ User's preferences and to store Video Clip 43-1000 composition in the Arkiïs™ Content Databases 43-510 for future reuse (e.g. as a source of additional Prebuilt Composed Component 43-576), metadata tagging in Record Metadata Tagging 43-800 and for reference by Billing Engine 43-900. Video Clip 43-1000 may duplicate the various Components composed together into a new clip that stands on its own or it may simply contain the information necessary and sufficient to compose Video Clip 43-1000 on demand from its constituent pieces or some combination thereof. For example, such information necessary to compose Video Clip 43-1000 may include references to the component clips or pieces within the database 43-510 together with entry and exit time points for each portion and whether only a part, such as just audio or just video, is being taken, and how to mix such part as by for example picture-in-picture or directing sound to particular audio channel such as surround speakers. The techniques used to automatically generate video highlights in response to game events (e.g. scoring, interception, etc.) for sports video feeds is known and may be analogously adapted, applied and extended to the generation of Video Clip 43-1000 described here, examples include those employed by Pointstreak Sports Technologies Inc. in their "Hockey Live Video Highlights Software" and also such as those described in "Sports scorekeeping system with integrated scoreboard and automatic entertainment system" WO 2012006498 A2. Additionally, the previously disclosed techniques for creating pleasing narrative may be applied here to benefit the generation of Video Clip 43-1000 such as shot transition management for cohesion within a play 43-560, such as the avoidance of "jump cuts".

21. Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope of these claims.

What is claimed is:

1. A method for computerized management of content by way of a content management system, comprising:
   receiving an identity for a first individual user;
   receiving from a content provider content meta-data and business preference information, the content meta-data comprising one or more identities of the provider, an author, or a subject of the content;
   utilizing the identity of the first individual user to access individual user preference information provided and/or authorized by the first individual user, wherein the user preference information includes certification preferences comprising a set of certifications, comprising at least one certification, and defining criteria relative to the set of certifications for one or more of filtering, prioritizing, or modifying content;
   retrieving a set of certificates, comprising at least one certificate, from the set of certifications, comprising a certificate for each certification in the set of certifications wherein each certificate indicates the degree to which one or more of the provider, the author, or the subject of the content meets the one or more criteria defined by the certification;
   deriving certificate fit data as an aggregation of the set of certificates and the criteria defined in the first individual user's certification preferences;
   utilizing the identity of the first individual user to derive business preference fit data by determining a degree to which the first individual user satisfies the business preference information; and
   providing to the content provider the certificate fit data and business preference fit data to permit one or more of filtering, prioritizing, or modifying the content in its provision to the first individual user.

2. The method of claim 1 further comprising:
   maintaining a portion of the identity for the first individual user as a privacy protected identity.

3. The method of claim 1 further comprising:
   providing to the first individual user an emblem containing information indicative of a relation between the certificate fit data and the individual user preference information by permitting display of the emblem as an overlay to the content; and
   permitting the first individual user to provide one or more inputs to accept or reject receipt of the provided content.

4. The method of claim 1 further comprising, in response to a request for feedback regarding provided content:
   receiving feedback from the first individual user pertaining to the provided content, wherein the feedback comprises an assessment of content consumed by the first individual user,
   storing the feedback, and
   retrieving the feedback.

5. The method of claim 1 further comprising accepting and storing from the first individual user a market request comprising information delineating a desired goods or service and optionally commitments to buy the delineated goods or service and providing to one or more product providers information contained within or derived from the market request.

6. The method of claim 1 further comprising maintaining an account for the first individual user, the account receiving inputs to credit and debit the account and wherein the first individual user is offered a payment, as a function of fields containing information to compute an economic value of providing the content to the first individual user, creditable to the account for the first individual user to receive the content.

7. The method of claim 6 wherein the first individual user provides a payment, as a function of fields containing information to compute an economic value of providing the content to the first individual user, debitable to the account for the first individual user to receive the content.

8. The method of claim 6 wherein a first portion of the payment is credited to the account for the first individual user and a second portion of the payment is credited to an account for a certifier corresponding to a certifier profile in a set of certifier profiles.

9. The method of claim 8 wherein the certifier profile to which the second portion of the payment is credited comprises:
a certifier minimum payment field specifying a minimum amount or portion required by the certifier corresponding to the certifier profile to which the second portion of the payment is credited.

10. The method of claim 1 further comprising:
associating the first individual user with other individual users as a shared advertising group;
associating a device used by a user in the shared advertising group as a function of one or more of a group of criteria comprising
physical location of the device used by the user in relation to physical location of devices used by other users,
content being displayed on the device used by the user in relation to content being displayed on devices used by other users, and
explicit association by the user into the shared advertising group;
receiving from the device used by the user, context information associated with content being consumed by the user, the context information comprising data that indicates content currently being consumed by the consumer; and
generating one or more targeted advertisements for presentation to the shared advertising group based, at least in part, on information pertaining to users of the shared advertising group.

11. The method of claim 1 further comprising:
maintaining an account for the first individual user, the account receiving inputs to credit and debit the account and wherein the first individual user is offered a payment or a charge, as a function of fields containing information to compute a corresponding economic value or cost of providing the content to the first individual user, correspondingly creditable or debitable to the account for the first individual user to receive the content;
permitting selection by the first individual user of a plug-in and causing storage of the selection of the plug-in to the individual user preference information, wherein the plug-in generates certification preferences for the first individual user;
utilizing certification preferences, that are generated by the plug-in, when provisioning content to the first individual user;
subtracting an amount creditable to the first individual user when the first individual user is provisioned with content utilizing certification preferences that are generated by the plug-in to to generate a plug-in creditable amount; and
causing a second account associated with a source of the plug-in to be credited with the plug-in creditable amount.

12. The method of claim 1 wherein each certificate from the set of certificates is obtained by way of a request to at least a first certification provider.

13. The method of claim 12 wherein at least a first certification provider has an identity separate from the first individual user and the content provider.

14. The method of claim 1 wherein each certificate from the set of certificates is obtained by way of a lookup to a profile or wallet associated with the identity of the content or the provider, author, or subject of the content.

15. The method of claim 1 wherein utilizing the identity of the first individual user to derive business preference fit data by determining a degree to which the first individual user satisfies the business preference information comprises:
using the identity of the first individual user to access individual user demographic and/or preference information provided and/or authorized by the first individual user; and
determining the degree to which the first individual user satisfies the business preference information is represented by a maximum currency amount the business is willing to pay or minimum currency amount the business is willing to accept to present the content to the first individual user.

16. The method of claim 1 wherein the demographic and/or preference information provided and/or authorized by the first individual user comprises one or more of: age range, income range, region, credit score, financial history, psychometric profile, future intent of purchasing plans, online behavior, and demographic and/or preference information of other individual users with which the first individual user is associated.

17. The method of claim 1 wherein modifying the content in its provision to the first individual user comprises:
utilizing the set of certificates to identify portions of the content to be modified; and
in accordance with the set of certificates modifying the portions of the content to be modified by performing one or more of: removing, replacing, obscuring, redacting, or reformatting the content to be modified.

18. The method of claim 1 wherein deriving certificate fit data as an aggregation of the set of certificates and the criteria defined in the first individual user's certification preferences comprises:
retrieving a function in the first individual user's certification preferences for each certification in the set of certifications;
applying each function to any corresponding certificates in the set of certificates; and combining the function results according to the preferences of the user to create certificate fit data.

19. A content management system, comprising:
storage containing one or more sets of computer instructions; and
a processor that executes the one or more sets of computer instructions, the one or more sets of computer instructions causing the processor to perform the operations of:
receiving an identity for a first individual user;
receiving from a content provider content meta-data and business preference information, the content meta-data comprising one or more identities of the provider, an author, or a subject of the content;
utilizing the identity of the first individual user to access individual user preference information provided and/or authorized by the first individual user, wherein the user preference information includes certification preferences comprising a set of certifications, comprising at least one certification, and defining criteria relative to the set of certifications for one or more of filtering, prioritizing, or modifying content;
retrieving a set of certificates, comprising at least one certificate, from the set of certifications, comprising a certificate for each certification in the set of certifications wherein each certificate indicates the degree to which one or more of the provider, the author, or the subject of the content meets the one or more criteria defined by the certification;

deriving certificate fit data as an aggregation of the set of certificates and the criteria defined in the first individual user's certification preferences;

utilizing the identity of the first individual user to derive business preference fit data by determining a degree to which the first individual user satisfies the business preference information; and providing to the content provider the certificate fit data and business preference fit data to permit one or more of filtering, prioritizing, or modifying the content in its provision to the first individual user.

20. A non-transitory storage medium having stored thereupon one or more sets of computer instructions that cause a processor, when executing the one or more sets of computer instructions to perform the operations of:

receiving an identity for a first individual user;

receiving from a content provider content meta-data and business preference information, the content meta-data comprising one or more identities of the provider, an author, or a subject of the content;

utilizing the identity of the first individual user to access individual user preference information provided and/or authorized by the first individual user, wherein the user preference information includes certification preferences comprising a set of certifications, comprising at least one certification, and defining criteria relative to the set of certifications for one or more of filtering, prioritizing, or modifying content;

retrieving a set of certificates, comprising at least one certificate, from the set of certifications, comprising a certificate for each certification in the set of certifications wherein each certificate indicates the degree to which one or more of the provider, the author, or the subject of the content meets the one or more criteria defined by the certification;

deriving certificate fit data as an aggregation of the set of certificates and the criteria defined in the first individual user's certification preferences;

utilizing the identity of the first individual user to derive business preference fit data by determining a degree to which the first individual user satisfies the business preference information; and providing to the content provider the certificate fit data and business preference fit data to permit one or more of filtering, prioritizing, or modifying the content in its provision to the first individual user.

\* \* \* \* \*